United States Patent
Mochizuki et al.

(10) Patent No.: US 10,427,111 B2
(45) Date of Patent: *Oct. 1, 2019

(54) GAS SEPARATION MEMBRANE, METHOD OF PRODUCING GAS SEPARATION MEMBRANE, GAS SEPARATION MEMBRANE MODULE, AND GAS SEPARATOR

(71) Applicant: FUJIFILM Corporation, Tokyo (JP)

(72) Inventors: Yusuke Mochizuki, Ashigarakami-gun (JP); Makoto Sawada, Ashigarakami-gun (JP); Takeshi Narita, Ashigarakami-gun (JP); Shigehide Itou, Ashigarakami-gun (JP); Hiroyuki Noda, Ashigarakami-gun (JP); Atsushi Mukai, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 15/458,407

(22) Filed: Mar. 14, 2017

(65) Prior Publication Data
US 2017/0182469 A1    Jun. 29, 2017

Related U.S. Application Data

(63) Continuation of application No. PCT/JP2015/075187, filed on Sep. 4, 2015.

(30) Foreign Application Priority Data

Sep. 30, 2014 (JP) .................................. 2014-201930
Feb. 27, 2015 (JP) .................................. 2015-038734
(Continued)

(51) Int. Cl.
*B01D 71/70* (2006.01)
*B01D 53/22* (2006.01)
(Continued)

(52) U.S. Cl.
CPC .......... *B01D 71/70* (2013.01); *B01D 53/228* (2013.01); *B01D 69/02* (2013.01); *B01D 69/125* (2013.01);
(Continued)

(58) Field of Classification Search
CPC .... B01D 53/22; B01D 53/228; B01D 67/009; B01D 69/02; B01D 69/10; B01D 69/12;
(Continued)

(56) References Cited

U.S. PATENT DOCUMENTS

2003/0207099 A1* 11/2003 Gillmor .............. B01D 67/009
506/30
2005/0103193 A1* 5/2005 Lyons .................... B01D 53/22
95/54
(Continued)

FOREIGN PATENT DOCUMENTS

EP    0 174 918 A1    3/1986
JP    60-139316 A    7/1985
(Continued)

OTHER PUBLICATIONS

Matsuyama, Hideto et al., "Effect of plasma treatment on CO2 permeability and selectivity of poly(dimethylsiloxane) membrane", Journal of Membrane Science, 99, 1995, pp. 139-147. (Year: 1995).*

(Continued)

*Primary Examiner* — Jason M Greene
(74) *Attorney, Agent, or Firm* — Sughrue Mion, PLLC

(57) ABSTRACT

Provided are a gas separation membrane which has a resin layer containing a compound having a siloxane bond, in which the resin layer containing a compound having a siloxane bond satisfies Expressions 1 and 2, and at least one of gas permeability or gas separation selectivity is high under high pressure; a method of producing a gas separation membrane; a gas separation membrane module; and a gas separator.

(Continued)

$$0.9 \geq A/B \geq 0.55 \quad \text{Expression 1}$$

$$B \geq 1.7 \quad \text{Expression 2}$$

In the expressions, A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond, and B represents an O/Si ratio that is a ratio of the number of oxygen atoms relative to the number of silicon atoms in the surface of the resin layer containing a compound having a siloxane bond.

3 Claims, 4 Drawing Sheets

(30) Foreign Application Priority Data

| | | |
|---|---|---|
| Jul. 24, 2015 | (JP) | 2015-146305 |
| Jul. 24, 2015 | (JP) | 2015-146306 |
| Jul. 24, 2015 | (JP) | 2015-146307 |
| Jul. 24, 2015 | (JP) | 2015-146308 |

(51) Int. Cl.
  *B01D 69/12* (2006.01)
  *B01D 71/64* (2006.01)
  *B01D 69/02* (2006.01)

(52) U.S. Cl.
  CPC .......... *B01D 71/64* (2013.01); *B01D 2256/10* (2013.01); *B01D 2256/16* (2013.01); *B01D 2256/24* (2013.01); *B01D 2256/245* (2013.01); *B01D 2257/302* (2013.01); *B01D 2257/304* (2013.01); *B01D 2257/308* (2013.01); *B01D 2257/404* (2013.01); *B01D 2257/504* (2013.01); *B01D 2323/12* (2013.01)

(58) Field of Classification Search
  CPC ...... B01D 69/125; B01D 71/64; B01D 71/70; B01D 2257/504
  See application file for complete search history.

(56) References Cited

U.S. PATENT DOCUMENTS

| | | | | |
|---|---|---|---|---|
| 2011/0261112 | A1* | 10/2011 | Okamura | B41J 2/14233 347/45 |
| 2014/0208949 | A1 | 7/2014 | Ishizuka et al. | |
| 2016/0263531 | A1* | 9/2016 | Odeh | B01D 53/228 |
| 2017/0341017 | A1* | 11/2017 | Dutta | B01D 69/10 |

FOREIGN PATENT DOCUMENTS

| | | | |
|---|---|---|---|
| JP | 61-054222 A | 3/1986 | |
| JP | 03-008808 A | 1/1991 | |
| JP | 4-305238 | * 10/1992 | ............. B01D 71/70 |
| JP | 04-305238 A | 10/1992 | |
| JP | 2010-240622 A | 10/2010 | |
| JP | 2013-075264 A | 4/2013 | |

OTHER PUBLICATIONS

Maki, Taisuke et al., "Effect of Atmospheric Glow Discharge Plasma Treatment on CO2 Permeability and Chemical Structure of Poly(dimethylsiloxane) Membranes", Polymer Membranes for Gas and Vapor Separation ACS Symposium Series, American Chemical Society, 1999, pp. 135-148. (Year: 1999).*
English language machine translation of JP 4-305238. Retrieved from http://jpo.go.jp on Feb. 5, 2019. (Year: 2019).*
English language machine translation of JP 2010-240622. Retrieved from http://jpo.go.jp on Feb. 5, 2019. (Year: 2019).*
Office Action dated May 23, 2017, issued from the Japan Patent Office in corresponding Japanese Application No. 2015-146306.
Office Action dated May 23, 2017, issued from the Japan Patent Office in corresponding Japanese Application No. 2015-146307.
Office Action dated May 23, 2017, issued from the Japan Patent Office in corresponding Japanese Application No. 2015-146308.
International Preliminary Report on Patentability dated Apr. 13, 2017 issued by the International Bureau with translation of Written Opinion in corresponding Application No. PCT/JP2015/075187.
Hideto Matsuyama et al., "Effect of plasma treatment on CO2 permeability and selectivity of poly(dimethylsiloxane) membrane," Journal of Membrane Science, 1995, pp. 139-147, vol. 99, No. 2.
Jung-Tsai Chen et al., "Surface modification of poly(dimethylsiloxane) by atmoshperic pressure high temperature plasma torch to prepare high-performance gas separation membranes," Journal of Membrane Science, 2013, pp. 1-8, vol. 440, No. 1.
Written Opinion of the International Searching Authority of PCT/JP2015/075187 dated Oct. 27, 2015.
International Search Report of PCT/JP2015/075187 dated Oct. 27, 2015.

* cited by examiner

… (1)

GAS SEPARATION MEMBRANE, METHOD OF PRODUCING GAS SEPARATION MEMBRANE, GAS SEPARATION MEMBRANE MODULE, AND GAS SEPARATOR

CROSS-REFERENCE TO RELATED APPLICATIONS

This application is a Continuation of PCT International Application No. PCT/JP2015/075187, filed on Sep. 4, 2015, which claims priority under 35 U.S.C. Section 119(a) to Japanese Patent Application No. 2014-201930 filed on Sep. 30, 2014, Japanese Patent Application No. 2015-038734 filed on Feb. 27, 2015, Japanese Patent Application No. 2015-146305 filed on Jul. 24, 2015, Japanese Patent Application No. 2015-146306 filed on Jul. 24, 2015, Japanese Patent Application No. 2015-146307 filed on Jul. 24, 2015, and Japanese Patent Application No. 2015-146308 filed on Jul. 24, 2015. Each of the above applications is hereby expressly incorporated by reference, in its entirety, into the present application.

BACKGROUND OF THE INVENTION

1. Field of the Invention

The present invention relates to a gas separation membrane, a method of producing a gas separation membrane, a gas separation membrane module, and a gas separator. More specifically, a first aspect and a fourth aspect of the present invention relate to a gas separation membrane which has gas separation selectivity under high pressure, a method of producing the gas separation membrane, a gas separation membrane module having the gas separation membrane, and a gas separator having the gas separation membrane module. More specifically, a second aspect of the present invention relates to a gas separation membrane in which at least one of gas permeability or gas separation selectivity is high under high pressure and bending resistance is excellent, a gas separation membrane module having the gas separation membrane, and a gas separator having the gas separation membrane module. Still more specifically, a third aspect of the present invention relates to a gas separation membrane in which at least one of gas permeability or gas separation selectivity is high under high pressure and pressure resistance is excellent, a gas separation membrane module having the gas separation membrane, and a gas separator having the gas separation membrane module.

2. Description of the Related Art

A material formed of a polymer compound has a gas permeability specific to the material. Based on this property, it is possible to cause selective permeation and separation out of a target gas component using a membrane formed of a specific polymer compound (gas separation membrane). As an industrial use aspect for this gas separation membrane related to the problem of global warming, separation and recovery from large-scale carbon dioxide sources with this gas separation membrane has been examined in thermal power plants, cement plants, or ironworks blast furnaces. Further, this membrane separation technique has been attracting attention as a means for solving environmental issues which can be achieved with relatively little energy. In addition, the technique is being used as a means for removing carbon dioxide from natural gas mainly including methane and carbon dioxide or biogas (biological excrement, organic fertilizers, biodegradable substances, sewage, garbage, fermented energy crops, or gas generated due to anaerobic digestion).

The following methods are known to be used for securing gas permeability and gas separation selectivity by making a site contributing to gas separation into a thin layer to be used as a practical gas separation membrane. A method of making a portion contributing to separation serving as an asymmetric membrane into a thin layer which is referred to as a skin layer, a method of using a thin film composite provided with a selective layer contributing to gas separation which is disposed on a support having mechanical strength, or a method of using hollow fibers including a layer which contributes to gas separation and has high density is known.

As typical performances of a gas separation membrane, a gas separation selectivity shown when a target gas is obtained from a mixed gas and a gas permeability of a target gas are exemplified. For the purpose of enhancing the gas permeability or gas separation selectivity, gas separation membranes having various configurations have been examined.

For example, JP1986-54222A (JP-S61-54222A) describes a method of enhancing gas separation selectivity of a mixed gas of carbon dioxide and methane using a gas separation membrane having a configuration in which a non-porous interlayer containing a compound having a siloxane bond is provided on a porous support and a layer containing cellulose triacetate or polyimide is provided thereon.

JP1985-139316A (JP-S60-139316A) described a method of producing a laminated composite membrane for gas separation having high selectivity (gas separation selectivity) in which a low-temperature plasma treatment is performed on the surface of a composite membrane for gas separation using a non-polymerizable gas and a thin layer of a silicon-containing polymer such as a compound having a siloxane bond is formed on the surface subjected to the plasma treatment. In this literature, polydimethylsiloxane is exemplified as a gas separation composite membrane on which a low-temperature plasma treatment is performed. In this literature, argon or the like is exemplified as a non-polymerizable gas used for the low-temperature plasma treatment. Further, in each example of this literature, only an example of performing the low-temperature plasma treatment on the surface of the composite membrane for gas separation which is formed of a polydimethylsiloxane copolymer using argon gas as the non-polymerizable gas is described.

JP1991-8808B (JP-H03-8808B) describes a composite membrane in which a thin membrane formed of a siloxane compound having a specific structure is laminated on a polymer porous support and a plasma polymerization membrane is laminated thereon, and only the surface layer of the thin membrane formed of a siloxane compound is subjected to a plasma treatment using a non-polymerizable gas. Further, this literature further describes that the composite membrane having such a configuration has excellent gas selection permeability (high gas separation selectivity and high gas permeability).

JP2013-75264A describes a method of providing a hydrophilic modification treatment surface having a film thickness of 0.1 μm or less on the surface of the layer having separation selectivity by performing a UV ozone irradiation treatment and a silane coupling agent treatment carried out after the UV ozone irradiation treatment, in a thin film composite including a support and a layer which is formed of polydimethylsiloxane and has separation selectivity. The examples of this literature describe that the film thickness of the hydrophilic modification treatment surface provided on the surface of the layer having separation selectivity is in a range of approximately 1 nm to 21 nm and gas permeability is degraded when the film thickness is extremely large.

Moreover, this literature describes a plasma treatment together with the UV ozone irradiation treatment as an example of the hydrophilic modification treatment, but an example of using the plasma treatment is not described in the examples of this literature. Further, this literature describes a method of introducing a gas mainly including argon gas into a process chamber and performing an atmospheric pressure plasma treatment, as an example of the plasma treatment.

Journal of Membrane Science 99 (1995) pp. 139 to 147 describes that, when the surface of a membrane formed of a polyimide support and polydimethylsiloxane is treated at a low power of 5 W or less in the order of minutes (during 120 seconds), the ratio of permeability of carbon dioxide relative to the permeability of methane is increased compared to the original polydimethylsiloxane under atmospheric pressure after 30 minutes from the treatment, but high gas separation selectivity has not been obtained.

Journal of Membrane Science 440 (2013) pp. 1 to 8 describes that, when the surface of a polydimethylsiloxane film is subjected to a plasma treatment at a high temperature under atmospheric pressure, the ratio between oxygen atoms and silicon atoms in the surface is increased by 1.6, but high gas separation selectivity has not been obtained.

SUMMARY OF THE INVENTION

However, it has been required that a mixed gas is treated with a gas separation membrane under high pressure when practically used during a purification process of natural gas. As a result of research on the performance of the gas separation membranes described in theses literatures conducted by the present inventors, it was understood that there was a problem of the gas permeability and gas separation selectivity being low under high pressure. For example, the gas separation membranes described in Journal of Membrane Science 99 (1995) pp. 139 to 147 and Journal of Membrane Science 440 (2013) pp. 1 to 8 do not exhibit excellent separation properties under high pressure.

An object of the first and fourth aspects of the present invention is to provide a gas separation membrane in which at least one of gas permeability or gas separation selectivity is high under high pressure.

Further, when the present inventors conducted research on bending resistance of gas permeability performance in a case where the gas separation membranes described in JP1986-54222A (JP-S61-54222A), JP1985-139316A (JP-S60-139316A), JP1991-8808B (JP-H03-8808B), JP2013-75264A, Journal of Membrane Science 99 (1995) pp. 139 to 147, and Journal of Membrane Science 440 (2013) pp. 1 to 8 are wound around rolls, it was found that the bending resistance is also degraded.

An object of the second aspect of the present invention is to provide a gas separation membrane in which at least one of gas permeability or gas separation selectivity is high under high pressure and bending resistance is excellent.

Further, there are sites where a change in which the pressure is high and the pressure is further increased occurs in the natural gas. When the present inventors conducted research on pressure resistance of gas permeability performance in a case where the gas separation membranes described in JP1986-54222A (JP-S61-54222A), JP1985-139316A (JP-S60-139316A), JP1991-8808B (JP-H03-8808B), JP2013-75264A, Journal of Membrane Science 99 (1995) pp. 139 to 147, and Journal of Membrane Science 440 (2013) pp. 1 to 8 are wound around rolls, it was found that the pressure resistance is also degraded.

An object of the third aspect of the present invention is to provide a gas separation membrane in which in which at least one of gas permeability or gas separation selectivity is high under high pressure and pressure resistance is excellent.

As a result of intensive research conducted by the present inventors in order to solve the problem by the first aspect of the present invention, it was found that a gas separation membrane which has a resin layer containing a compound having a siloxane bond and in which at least one of gas permeability or gas separation selectivity is high under high pressure is obtained by allowing permeation of oxygen atoms to a portion of at least 10 nm in the thickness direction of the resin layer containing a compound having a siloxane bond from the surface of the resin layer containing a compound having a siloxane bond.

As a result of intensive research conducted by the present inventors in order to solve the problem by the second aspect of the present invention, it was found that a gas separation membrane in which at least one of gas permeability or gas separation selectivity is high under high pressure and bending resistance is excellent is obtained by allowing the gas separation membrane having a resin layer containing a compound having a siloxane bond to have a region GLi present in a porous support B and a region GLe present on the porous support B and controlling the layer configuration and the composition of each region to be in a specific range.

Moreover, the gas separation membranes produced by the methods described in JP1986-54222A (JP-S61-54222A), JP1985-139316A (JP-S60-139316A), JP1991-8808B (JP-H03-8808B), JP2013-75264A, Journal of Membrane Science 99 (1995) pp. 139 to 147, and Journal of Membrane Science 440 (2013) pp. 1 to 8 do not have GLi nor GLe prescribed in the present invention or are departed from the ranges of the layer configurations or the compositions of each region of GLi and GLe prescribed in the present invention.

As a result of intensive research conducted by the present inventors in order to solve the problem by the third aspect of the present invention, it was found that a gas separation membrane which has a resin layer containing a compound having a siloxane bond and in which at least one of gas permeability or gas separation selectivity is high under high pressure and pressure resistance is excellent is obtained by controlling the minimum value of the proportion of peaks of $Si^{2+}$ and $Si^{3+}$ to peaks of all Si in ESCA depth analysis of the resin layer containing a compound having a siloxane bond to be in a specific range.

Moreover, the gas separation membranes produced by the methods described in JP1986-54222A (JP-S61-54222A), JP1985-139316A (JP-S60-139316A), JP1991-8808B (JP-H03-8808B), JP2013-75264A, Journal of Membrane Science 99 (1995) pp. 139 to 147, and Journal of Membrane Science 440 (2013) pp. 1 to 8 are departed from the range of the minimum value of the proportion of peaks of $Si^{2+}$ and $Si^{3+}$ to peaks of all Si, prescribed in the present invention.

An object of the fourth aspect of the present invention will be described.

It is generally considered that the gas separation selectivity of the gas separation membrane is correlated with the pore diameter of micropores present in the membrane. Here, as a method of acquiring the pore diameter of micropores present in the membrane, a method of calculating the pore diameter by measuring the positron lifetime τ3 of a third component using a positron annihilation method is known.

The pore diameter of micropores present in the gas separation membrane obtained using the method described in Journal of Membrane Science 99 (1995) pp. 139 to 147 is calculated, by the present inventors, by measuring the positron lifetime τ3 of a third component using a positron annihilation method. As the result, for example, in the gas separation membrane produced using the method described in Journal of Membrane Science 99 (1995) pp. 139 to 147, the positron lifetime τ3 of the third component in a case where the positron is implanted at a strength of 1 keV from the surface of the membrane according to the positron annihilation method is 4.21 (ns).

Further, in a membrane in which silica is deposited by chemical vapor deposition (CVD), the positron lifetime τ3 of the third component in a case where the positron is implanted at a strength of 1 keV from the surface of the membrane according to the positron annihilation method is 3.15 (ns).

As a result of intensive research conducted by the present inventors in order to solve the problem by the fourth aspect of the present invention, it was found that a gas separation membrane in which at least one of gas permeability or gas separation selectivity is high under high pressure is obtained by controlling the positron lifetime τ3 of the third component in a case where the positron is implanted at a strength of 1 keV from the surface of the resin layer containing a compound having a siloxane bond to be in a specific range.

Moreover, the positron lifetime τ3 of the third component in a case where the positron is implanted at a strength of 1 keV from the surface of the resin layer containing a compound having a siloxane bond, which is defined in the present invention, of the gas separation membranes produced by the methods described in JP1986-54222A (JP-S61-54222A), JP1985-139316A (JP-S60-139316A), JP1991-8808B (JP-H03-8808B), JP2013-75264A, Journal of Membrane Science 99 (1995) pp. 139 to 147, and Journal of Membrane Science 440 (2013) pp. 1 to 8 is departed from the specific range.

The present invention as specific means for solving the above-described problems is as follows.

[1] A gas separation membrane which satisfies any one of the following Conditions 1 to 4, Condition 1: a gas separation membrane which has a resin layer containing a compound having a siloxane bond, in which the resin layer containing a compound having a siloxane bond satisfies the following Expressions 1 and 2, $$0.9 \geq A/B \geq 0.55, \text{ and} \qquad \text{Expression 1}$$

$$B \geq 1.7 \qquad \text{Expression 2}$$

in Expressions 1 and 2, A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond, and B represents an O/Si ratio that is a ratio of the number of oxygen atoms relative to the number of silicon atoms in the surface of the resin layer containing a compound having a siloxane bond, Condition 2: a gas separation membrane which includes a porous support A; and a resin layer containing a compound having a siloxane bond positioned on the porous support A, in which the compound having a siloxane bond includes at least a repeating unit represented by the following Formula (2) or a repeating unit represented by the following Formula (3), the resin layer containing a compound having a siloxane bond includes a region GLi present in the porous support B and a region GLe present on the porous support B, the thickness of GLe is in a range of 50 to 1,000 nm, the thickness of GLi is 20 nm or greater and the thickness of GLe is in a range of 10% to 350%, and a difference between the content of the repeating unit represented by Formula (3) in 20 nm of the GLe surface layer and the content of the repeating unit represented by Formula (3) in 20 nm of the GLi surface layer is in a range of 30% to 90%,

Formula (2)

Formula (3)

in Formulae (2) and (3), $R^{11}$ represents a substituent, the symbol "*" represents a binding site with respect to # in Formula (2) or (3), and the symbol "#" represents a binding site with respect to * in Formula (2) or (3), Condition 3: a gas separation membrane which has a resin layer containing a compound having a siloxane bond, in which a minimum value $Si_0$ of the proportion of peaks of $Si^{2+}$ and $Si^{3+}$ to peaks of all Si in ESCA depth analysis of the resin layer containing a compound having a siloxane bond is in a range of 1% to 40%, and Condition 4: a gas separation membrane which has a resin layer containing a compound having a siloxane bond, in which positron lifetime τ3 of a third component in a case where the positron is implanted at a strength of 1 keV from the surface of the resin layer containing a compound having a siloxane bond is in a range of 3.40 to 4.20 ns.

[2] It is preferable that the gas separation membrane according to [1] satisfies Condition 1.

[3] In the gas separation membrane according to [2], it is preferable that the compound having a siloxane bond includes at least a repeating unit represented by the following Formula (2) or a repeating unit represented by the following Formula (3),

Formula (2)

Formula (3)

in Formulae (2) and (3), R¹¹ represents a substituent, the symbol "*" represents a binding site with respect to # in Formula (2) or (3), and the symbol "#" represents a binding site with respect to * in Formula (2) or (3).

[4] In the gas separation membrane according to [2] or [3], it is preferable that the compound having a siloxane bond includes a repeating unit represented by the following Formula (1),

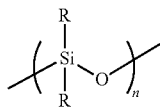

Formula (1)

in Formula (1), R's each independently represent a hydrogen atom, an alkyl group having 1 or more carbon atoms, an aryl group, an amino group, an epoxy group, a fluorinated alkyl group, a vinyl group, an alkoxy group, or a carboxyl group, and n represents an integer of 2 or greater.

[5] In the gas separation membrane according to [4], it is preferable that the surface of the resin layer containing a compound having a siloxane bond includes a compound which has a siloxane bond having a repeating unit represented by Formula (1) described above and at least a repeating unit represented by Formula (2) described above or a repeating unit represented by Formula (3) described above.

[6] In the gas separation membrane according to any one of [2] to [5], it is preferable that the ratio of the number of carbon atoms relative to the number of silicon atoms in the surface of the resin layer containing a compound having a siloxane bond is 1.6 or less.

[7] In the gas separation membrane according to any one of [2] to [6], it is preferable that B is 1.95 or greater, and B represents an O/Si ratio that is a ratio of the number of oxygen atoms relative to the number of silicon atoms in the surface of the resin layer containing a compound having a siloxane bond.

[8] In the gas separation membrane according to any one of [2] to [7], it is preferable that A/B is 0.6 or greater, and A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond and B represents an O/Si ratio that is a ratio of the number of oxygen atoms relative to the number of silicon atoms in the surface of the resin layer containing a compound having a siloxane bond.

[9] In the gas separation membrane according to any one of [2] to [8], it is preferable that A/B is 0.65 or greater, and A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond and B represents an O/Si ratio that is a ratio of the number of oxygen atoms relative to the number of silicon atoms in the surface of the resin layer containing a compound having a siloxane bond.

[10] It is preferable that the gas separation membrane according to any one of [2] to [9] further comprises a layer which contains a polyimide compound.

[11] In the gas separation membrane according to any one of [2] to [10], it is preferable that the thickness of the layer containing a polyimide compound is in a range of 0.03 to 0.3 μm.

[12] In the gas separation membrane according to any one of [2] to [11], it is preferable that the thickness of the resin layer which contains a compound having a siloxane bond is in a range of 0.1 to 5 μm.

[13] In the gas separation membrane according to any one of [2] to [12], it is preferable that the resin layer containing a compound having a siloxane bond includes a compound having a repeating unit that contains at least silicon atoms, oxygen atoms, and carbon atoms.

[14] It is preferable that the gas separation membrane according to any one of [2] to [13] further comprises a support.

[15] In the gas separation membrane according to any one of [2] to [14], it is preferable that the gel fraction of the gas separation membrane is 45% or greater.

[16] It is preferable that the gas separation membrane according to [1] satisfies Condition 2.

[17] In the gas separation membrane according to [16], it is preferable that the thickness of GLe is in a range of 200 to 900 nm.

[18] In the gas separation membrane according to [16] or [17], it is preferable that the thickness of GLi is 20% to 90% of the thickness of GLe.

[19] It is preferable that the gas separation membrane according to [1] satisfies Condition 3.

[20] In the gas separation membrane according to [19], it is preferable that a difference $\Delta 1$ between a ratio $Si_{10}$ of peaks of $Si^{2+}$ and $Si^{3+}$ relative to peaks of all Si at a depth of 10 nm from the position having a minimum value $Si_0$ of the proportion of peaks of $Si^{2+}$ and $Si^{3+}$ relative to peaks of all Si and the minimum value $Si_0$ of the proportion of peaks of $Si^{2+}$ and $Si^{3+}$ relative to peaks of all Si in ESCA depth analysis of the resin layer containing a compound having a siloxane bond is in a range of 50% to 90%.

[21] In the gas separation membrane according to [19] or [20], it is preferable that a difference $\Delta 2$ between a ratio $Si_m$ of peaks of $Si^{2+}$ and $Si^{3+}$ relative to peaks of all Si at a depth of 20 nm from the position having the minimum value $Si_0$ of the proportion of the peaks of $Si^{2+}$ and $Si^{3+}$ relative to peaks of all Si and the minimum value $Si_0$ of the proportion of peaks of $Si^{2+}$ and $Si^{3+}$ relative to peaks of all Si in ESCA depth analysis of the resin layer containing a compound having a siloxane bond is in a range of 55% to 90%.

[22] In the gas separation membrane according to any one of [19] to [21], it is preferable that the thickness of the resin layer containing a compound having a siloxane bond is in a range of 150 to 900 nm.

[23] It is preferable that the gas separation membrane according to any one of [19] to [22] further comprises a support.

[24] It is preferable that the gas separation membrane according to [1] satisfies Condition 4.

[25] In the gas separation membrane according to [24], it is preferable that relative strength I3 of the third component in a case where the positron is implanted at a strength of 1 keV from the surface of the resin layer containing a compound having a siloxane bond is in a range of 13% to 41%.

[26] In the gas separation membrane according to [24] or [25], when positron lifetime τ3 of the third component in a case where the positron is implanted at a strength of 1 keV from the surface of the resin layer containing a compound having a siloxane bond is set to X and positron lifetime τ3 of the third component in a case where the positron is implanted at a strength of 3 keV from the surface of the resin layer containing a compound having a siloxane bond is set to Y, it is preferable that the expression of $0.88 \leq X/Y \leq 0.99$ is satisfied.

[27] It is preferable that the gas separation membrane according to any one of [24] to [26] further comprises a layer which contains a polyimide compound.

[28] In the gas separation membrane according to [27], it is preferable that the thickness of the layer containing a polyimide compound is in a range of 0.03 to 0.3 μm.

[29] In the gas separation membrane according to any one of [24] to [28], it is preferable that the thickness of the resin layer which contains a compound having a siloxane bond is in a range of 0.1 to 5 μm.

[30] In the gas separation membrane according to any one of [24] to [29], it is preferable that the resin layer containing a compound having a siloxane bond includes a compound having a repeating unit that contains at least silicon atoms, oxygen atoms, and carbon atoms.

[31] It is preferable that the gas separation membrane according to any one of [24] to [30] further comprises a support.

[32] A gas separation membrane module comprising: the gas separation membrane according to any one of [1] to [31].

[33] A gas separator comprising: the gas separation membrane module according to [32].

[34] A method of producing a gas separation membrane which satisfies the following Condition P1 or P4, Condition P1: a method of producing a gas separation membrane including an oxygen atom permeating treatment of allowing oxygen atoms to permeate into a resin layer precursor containing a compound having a siloxane bond, in which the oxygen atom permeating treatment is a plasma treatment using carrier gas having an oxygen flow rate of 10 cm³ (STP)/min or greater at an input power of 23 W or greater, and Condition P4: a method of producing a gas separation membrane including an oxygen atom permeating treatment of allowing oxygen atoms to permeate into a resin layer precursor containing a compound having a siloxane bond, in which the oxygen atom permeating treatment is a plasma treatment using carrier gas having an oxygen flow rate of 45 cm³ (STP)/min or greater and using anode coupling at an input power of 23 W or greater.

[35] It is preferable that the method of producing a gas separation membrane according to [34] satisfies Condition P1.

[36] In the method of producing a gas separation membrane according to [35], it is preferable that the resin layer containing a compound having a siloxane bond includes a compound having a repeating unit that contains at least silicon atoms, oxygen atoms, and carbon atoms.

[37] In the method of producing a gas separation membrane according to [35] or [36], it is preferable that the resin layer containing a compound having a siloxane bond is formed on a support.

[38] A gas separation membrane which is produced using the method of producing a gas separation membrane according to any one of [35] to [37].

[39] It is preferable that the method of producing a gas separation membrane according to [34] satisfies Condition P4.

[40] In the method of producing a gas separation membrane according to [39], it is preferable that the resin layer containing a compound having a siloxane bond includes a compound having a repeating unit that contains at least silicon atoms, oxygen atoms, and carbon atoms.

[41] In the method of producing a gas separation membrane according to [39] or [40], it is preferable that the resin layer containing a compound having a siloxane bond is formed on a support.

In the present specification, when a plurality of substituent groups or linking groups (hereinafter, referred to as substituent groups or the like) shown by specific symbols are present or a plurality of substituent groups are defined simultaneously or alternatively, this means that the respective substituent groups may be the same as or different from each other. In addition, even in a case where not specifically stated, when a plurality of substituent groups or the like are adjacent to each other, they may be condensed or linked to each other and form a ring.

In regard to compounds (including resins) described in the present specification, the description includes salts thereof and ions thereof in addition to the compounds. Further, the description includes derivatives formed by changing a predetermined part within the range in which desired effects are exhibited.

A substituent group (the same applies to a linking group) in the present specification may include an optional substituent group of the group within the range in which desired effects are exhibited. The same applies to a compound in which substitution or non-substitution is not specified.

According to the first aspect and the fourth aspect of the present invention, it is possible to provide a gas separation membrane in which at least one of gas permeability or gas separation selectivity is high under high pressure. According to the present invention, it is possible to provide a method of producing a gas separation membrane in which at least one of gas permeability or gas separation selectivity is high under high pressure. Further, according to the present invention, it is possible to provide a gas separation membrane module having a gas separation membrane in which at least one of gas permeability or gas separation selectivity is high under high pressure.

According to the second aspect of the present invention, it is possible to provide a gas separation membrane in which at least one of gas permeability or gas separation selectivity is high under high pressure and the bending resistance is excellent. Further, according to the present invention, it is possible to provide a gas separation membrane module and a gas separator which have a gas separation membrane in which at least one of gas permeability or gas separation selectivity is high under high pressure and the bending resistance is excellent.

According to the third aspect of the present invention, it is possible to provide a gas separation membrane in which at least one of gas permeability or gas separation selectivity is high under high pressure and the pressure resistance is excellent. Further, according to the present invention, it is possible to provide a gas separation membrane module and a gas separator which have a gas separation membrane in which at least one of gas permeability or gas separation selectivity is high under high pressure and the pressure resistance is excellent.

DESCRIPTION OF THE PREFERRED EMBODIMENTS

Figure 1:
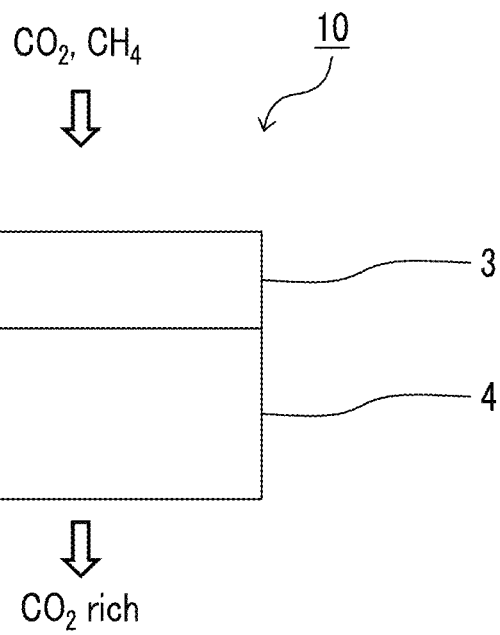
FIG. 1 is a schematic view illustrating an example of a gas separation membrane of the present invention.

Hereinafter, the present invention will be described in detail. The description of constituent elements described below is occasionally made based on the exemplary embodiments of the present invention, but the present invention is not limited to such embodiments. In addition, the numerical ranges shown using "to" in the present specification indicate ranges including the numerical values described before and after "to" as the lower limits and the upper limits.

A gas separation membrane of the present invention is a gas separation membrane which satisfies any one of the following Conditions 1 to 4.

Condition 1: a gas separation membrane which has a resin layer containing a compound having a siloxane bond, in which the resin layer containing a compound having a siloxane bond satisfies the following Expressions 1 and 2, $0.9 \geq A/B \geq 0.55$, and         Expression 1

$B \geq 1.7$         Expression 2 in Expressions 1 and 2, A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond, and B represents an O/Si ratio that is a ratio of the number of oxygen atoms relative to the number of silicon atoms in the surface of the resin layer containing a compound having a siloxane bond, Condition 2: a gas separation membrane which includes a porous support A; and a resin layer containing a compound having a siloxane bond positioned on the porous support A, in which the compound having a siloxane bond includes at least a repeating unit represented by the following Formula (2) or a repeating unit represented by the following Formula (3), the resin layer containing a compound having a siloxane bond includes a region GLi present in the porous support B and a region GLe present on the porous support B, the thickness of GLe is in a range of 50 to 1,000 nm, the thickness of GLi is 20 nm or greater and the thickness of GLe is in a range of 10% to 350%, and a difference between the content of the repeating unit represented by Formula (3) in 20 nm of the GLe surface layer and the content of the repeating unit represented by Formula (3) in 20 nm of the GLi surface layer is in a range of 30% to 90%,

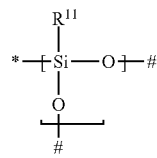

Formula (2)

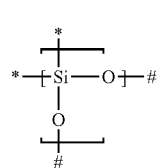

Formula (3)

in Formulae (2) and (3), $R^{11}$ represents a substituent, the symbol "*" represents a binding site with respect to # in Formula (2) or (3), and the symbol "#" represents a binding site with respect to * in Formula (2) or (3), Condition 3: a gas separation membrane which has a resin layer containing a compound having a siloxane bond, in which a minimum value $Si_0$ of the proportion of peaks of $Si^{2+}$ and $Si^{3+}$ to peaks of all Si in ESCA depth analysis of the resin layer containing a compound having a siloxane bond is in a range of 1% to 40%, and Condition 4: a gas separation membrane which has a resin layer containing a compound having a siloxane bond, in which positron lifetime τ3 of a third component in a case where the positron is implanted at a strength of 1 keV from the surface of the resin layer containing a compound having a siloxane bond is in a range of 3.40 to 4.20 ns.

A method of producing a gas separation membrane of the present invention is not particularly limited, but a method of producing a gas separation membrane that satisfies the following Condition P1 or the following Condition P4 is preferable.

Condition P1: a method of producing a gas separation membrane including an oxygen atom permeating treatment step of allowing oxygen atoms to permeate into a resin layer precursor containing a compound having a siloxane bond, in which the oxygen atom permeating treatment step is a step for performing a plasma treatment using carrier gas having an oxygen flow rate of 10 cm³ (STP)/min or greater at an input power of 23 W or greater, and Condition P4: a method of producing a gas separation membrane including an oxygen atom permeating treatment step of allowing oxygen atoms to permeate into a resin layer precursor containing a compound having a siloxane bond, in which the oxygen atom permeating treatment step is a step for performing a plasma treatment using carrier gas having an oxygen flow rate of 45 cm³ (STP)/min or greater and using anode coupling at an input power of 23 W or greater.

An embodiment that satisfies Condition 1 is set to a first embodiment; an embodiment that satisfies Condition 2 is set to a second embodiment; an embodiment that satisfies Condition 3 is set to a third embodiment; and an embodiment that satisfies Condition 4 is set to a fourth embodiment.

It is preferable that the gas separation membrane according to the first embodiment satisfying Condition 1 is produced using a method of producing a gas separation membrane which satisfies Condition P1. It is preferable that the gas separation membrane according to the fourth embodiment satisfying Condition 4 is produced using a method of producing a gas separation membrane which satisfies Condition P4.

Hereinafter, the first embodiment, the second embodiment, the third embodiment, and the fourth embodiment will be sequentially described.

First Embodiment

First, the first embodiment that satisfies Condition 1 will be described.

[Gas Separation Membrane]

A gas separation membrane according to the first embodiment of the present invention includes a resin layer containing a compound having a siloxane bond and the resin layer containing a compound having a siloxane bond satisfies the following Expressions 1 and 2.

$0.9 \geq A/B \geq 0.55$, and  Expression 1

$B \geq 1.7$  Expression 2

In Expressions 1 and 2, A represents an O/Si ratio that is a ratio of the number of oxygen atoms relative to the number of silicon atoms contained in the resin layer containing a compound having a siloxane bond at a depth of 10 nm (preferably at a depth of 10 nm in the direction of a support) from the surface of the resin layer containing a compound having a siloxane bond, and B represents an O/Si ratio that is a ratio of the number of oxygen atoms relative to the number of silicon atoms in the surface of the resin layer containing a compound having a siloxane bond.

With such a configuration, at least one of gas permeability and gas separation selectivity of the gas separation membrane of the present invention is high under high pressure.

When the ratio of A:B in the above-described Expression 1 is high, oxygen atoms permeate into the inside of the resin layer (this resin layer containing a compound having a siloxane bond functions as a layer having high gas separation selectivity, that is, so-called separation selectivity) containing a compound having a siloxane bond in the thickness direction. When a corona treatment or a plasma treatment that is only used to modify the surface and improve the adhesiveness is carried out, oxygen atoms do not sufficiently enter the resin layer containing a compound having a siloxane bond at a depth of 10 nm from the surface thereof as the gas separation selectivity is higher. The surface of the resin layer containing a compound having a siloxane bond is modified so that a large amount of oxygen atoms enter the resin layer as the value of B in Expression 2 is higher. In the present invention, it is possible to obtain a gas separation membrane in which at least one of gas permeability and gas separation selectivity is high under high pressure, by the resin layer containing a compound having a siloxane bond satisfying the above-described Expressions 1 and 2. It is not intended to adhere to any theory, but it is considered that the separation selectivity is exhibited by the oxygen atoms entering not only the surface of the resin layer containing a compound having a siloxane bond but also the inside of the resin layer in the thickness direction.

A layer having separation selectivity indicates a layer in which a ratio ($PCO_2/PCH_4$) of a permeability coefficient ($PCO_2$) of carbon dioxide to a permeability coefficient ($PCH_4$) of methane, when a membrane having a thickness of 0.1 to 30 μm is formed and pure gas of carbon dioxide ($CO_2$) and methane ($CH_4$) is supplied to the obtained membrane at a temperature of 40° C. by setting the total pressure of the gas supply side to 0.5 MPa, is 1.5 or greater.

In the related art, a layer containing a polyimide compound has been frequently used as the layer having separation selectivity of a gas separation membrane, and the configuration of the gas separation membrane of the present invention in which at least one of the gas permeability and the gas separation selectivity is high under high pressure without having the layer containing a polyimide compound by means of having a resin layer containing a compound having a siloxane bond, to which an oxygen atom permeating treatment is applied is not known conventionally.

Here, the gas permeability and the gas separation selectivity of the gas separation membrane are typically in a trade-off relationship. That is, in the gas separation membrane, there is a tendency that the gas separation selectivity is decreased when the gas permeability is increased and the gas separation selectivity is increased when the gas permeability is decreased. Accordingly, it is difficult to increase both of the gas permeability and the gas separation selectivity in a case of a gas separation membrane of the related art. Meanwhile, it is possible to increase both of the gas permeability and the gas separation selectivity in a case of the gas separation membrane of the present invention.

Figure 6A:
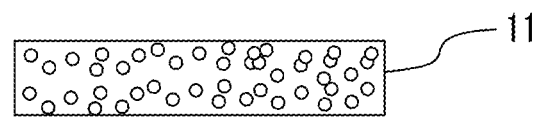
FIG. 6A is a schematic view of a polydimethylsiloxane film which is not subjected to an oxygen atom permeating treatment step.
Figure 6B:
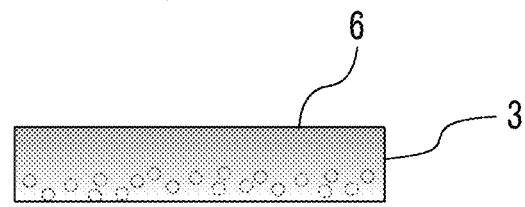
FIG. 6B is a schematic view of a resin layer containing a compound having a siloxane bond according to an example of the gas separation membrane of the present invention.

This is because the gas separation membrane of the present invention includes a resin layer 3 containing a compound having a siloxane bond which has a structure to which oxygen atoms are introduced with a gradation from the surface as illustrated in FIG. 6B. The portion to which oxygen atoms are introduced is formed with holes due to the siloxane bond. Because of introduction of oxygen, thermal motion of a polymer is reduced. Therefore, holes which are capable of selective permeation of a large amount of gas are generated. Accordingly, high gas separation selectivity can be obtained unlike the resin layer (polydimethylsiloxane film 11 which is not subjected to an oxygen atom permeating treatment step as illustrated in FIG. 6A) containing a compound having a siloxane bond before the surface is treated.

Figure 6C:
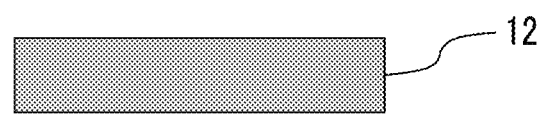
FIG. 6C is a schematic view illustrating a polydimethylsiloxane film to which oxygen atoms are uniformly introduced in the film thickness direction.

A polydimethylsiloxane film to which oxygen atoms are uniformly introduced in the film thickness direction as illustrated in FIG. 6C can be prepared using a chemical vapor deposition (CVD) method or the like without a gradation having oxygen atoms being introduced in the film thickness direction. When such a film is compared to the resin layer 3 containing a compound having a siloxane bond of the gas separation membrane of the present invention, the portion to which oxygen atoms are densely introduced in the resin layer 3 containing a compound having a siloxane bond of the gas separation membrane of the present invention is thinner than a polydimethylsiloxane film 12 to which oxygen atoms are uniformly introduced in the film thickness direction. It is difficult for the polydimethylsiloxane film to which oxygen atoms are uniformly introduced in the film thickness direction to be made thin similar to the thickness of the portion to which oxygen atoms are densely introduced in the resin layer 3 containing a compound having a siloxane bond of the gas separation membrane of the present invention. Therefore, extremely high gas permeability and gas separation selectivity can be achieved by the present invention.

Further, the gas separation membrane of the present invention can be designed such that the gas permeability is greatly increased and the gas separation selectivity is decreased. In addition, the gas separation membrane of the present invention can be also designed such that the gas permeability is decreased and the gas separation selectivity is greatly increased. Even in these cases, the gas separation selectivity of the gas separation membrane of the present invention is higher than that of a gas separation membrane of the related art when the gas separation membrane is designed to have performance of gas permeability similar to the performance of gas permeability of the gas separation membrane of the related art and the gas permeability of the gas separation membrane of the present invention is higher than that of the gas separation membrane of the related art when the gas separation membrane is designed to have performance of gas separation selectivity similar to the performance of gas separation selectivity of the gas separation membrane of the related art.

It is preferable that the gas separation membrane of the present invention is produced using a method of producing a gas separation membrane of the present invention described below. Since the gas separation membrane obtained by the production method of the present invention has high performance, a gas separation membrane with high performance is prescribed in the gas separation membrane of product-by-process claims. The mechanism of the performance of the gas separation membrane is considered to be determined according to the size of holes in the plane of a layer contributing to gas separation, but the operation of specifying the size of holes is impractical at the time of filing because it takes time and cost even when an electron microscope is used. Alternatively, in the present specification, it is found that the values of A/B and B and the performance of the gas separation membrane are highly correlated to each other and thus a gas separation membrane with excellent performance can be provided as long as the values are within the specific range of the present invention. Since the scope of the gas separation membrane of the product-by-process claims does not completely match the scope of the gas separation membrane represented by the values of A/B and B, the same scope of the product-by process claims cannot be specified as the pure product claims. Further, the same product as the gas separation membrane produced by the plasma treatment is expected to be produced when a method of providing energy from active energy rays similar to the plasma treatment is used.

Hereinafter, preferred embodiments of the gas separation membrane of the present invention will be described.

<Configuration>

It is preferable that the gas separation membrane of the present invention is a thin film composite (also referred to as a gas separation composite membrane) or an asymmetric membrane or is formed of hollow fibers. Among these, a thin film composite is more preferable.

Hereinafter, a case where the gas separation membrane is a thin film composite is occasionally described as a typical example, but the gas separation membrane of the present invention is not limited by the thin film composite.

A preferred configuration of the gas separation membrane of the present invention will be described with reference to the accompanying drawings. An example of a gas separation membrane 10 of the present invention illustrated in FIG. 1 is a gas separation membrane which is a thin film composite and includes a support 4 and a resin layer 3 containing a compound having a siloxane bond.

Figure 2:
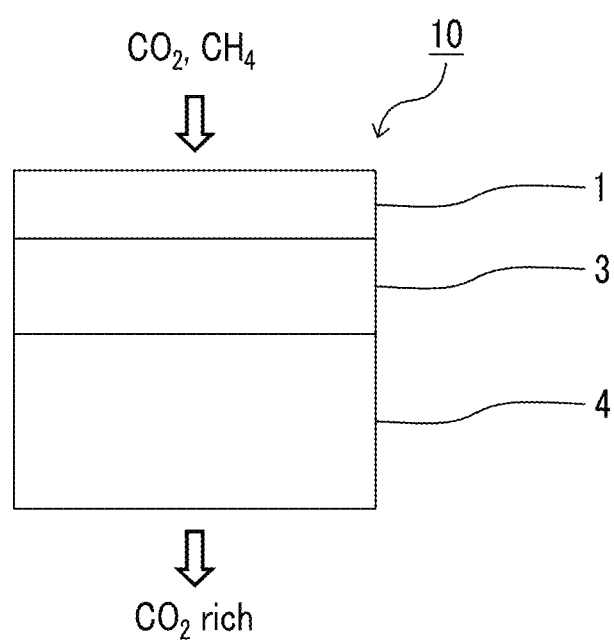
FIG. 2 is a schematic view illustrating another example of the gas separation membrane of the present invention.

Another example of the gas separation membrane 10 of the present invention which is illustrated in FIG. 2 further includes a layer (an additional resin layer described below) 1 containing a polyimide compound of the resin layer 3 containing a compound having a siloxane bond on a side opposite to the support 4 in addition to the support 4 and the resin layer 3 containing a compound having a siloxane bond.

Figure 3:
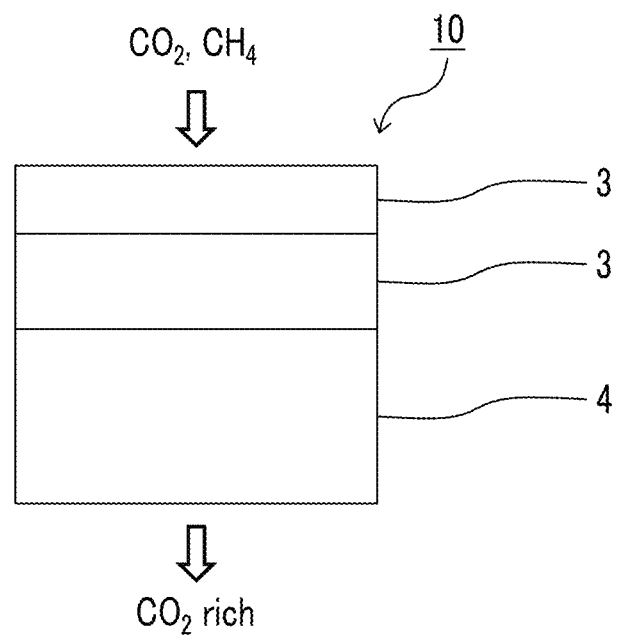
FIG. 3 is a schematic view illustrating still another example of the gas separation membrane of the present invention.

The gas separation membrane of the present invention may have only one or two or more resin layers containing a compound having a siloxane bond. The gas separation membrane of the present invention has preferably one to five resin layers containing a compound having a siloxane bond, more preferably one to three resin layers, particularly preferably one or two resin layers, and more particularly preferably only one resin layer from the viewpoint of production cost. Another example of the gas separation membrane 10 of the present invention illustrated in FIG. 3 has two resin layers 3 containing a compound having a siloxane bond.

The expression "on the support" in the present specification means that another layer may be interposed between the support and a layer having separation selectivity. Further, in regard to the expressions related to up and down, the direction in which a gas to be separated is supplied to is set as "up" and the direction in which the separated gas is discharged is set as "down" as illustrated in FIG. 1 unless otherwise specified.

Further, in the gas separation membrane of the present invention, the resin layer containing a compound having a siloxane bond satisfies the following Expression 1 and the following Expression 2.

$$0.9 \geq A/B \geq 0.55, \text{ and} \qquad \qquad \text{Expression 1}$$

$$B \geq 1.7 \qquad \qquad \text{Expression 2}$$

In Expressions 1 and 2, A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond, and B represents an O/Si ratio that is a ratio of the number of oxygen atoms relative to the number of silicon atoms in the surface of the resin layer containing a compound having a siloxane bond.

Figure 4:
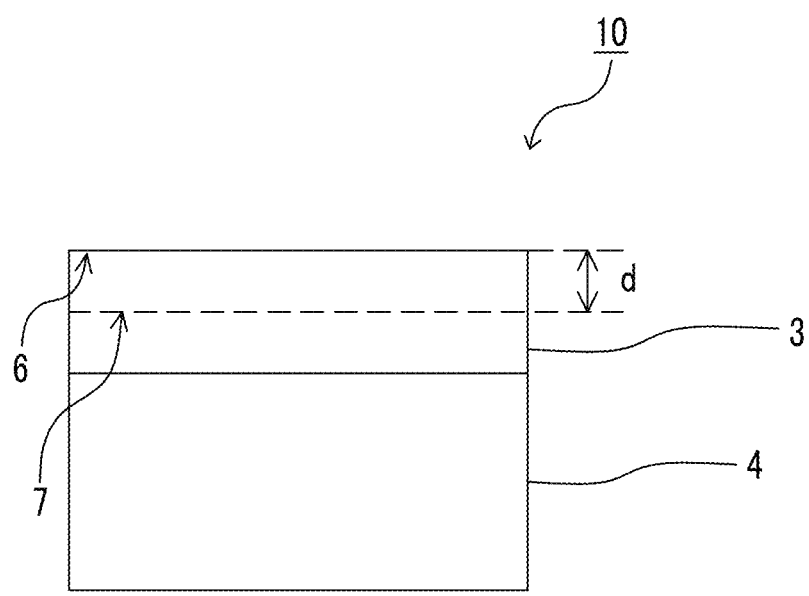
FIG. 4 is a schematic view for describing a position of the surface of a resin layer containing a compound having a siloxane bond at a depth d from the surface (in the direction of a support) of the resin layer containing a compound having a siloxane bond and a position of the surface of the resin layer containing a compound having a siloxane bond, according to an example of the gas separation membrane of the present invention.

The above-described Expressions 1 and 2 which the resin layer containing a compound having a siloxane bond satisfies will be described with reference to FIG. 4. In FIG. 4, the surface of the resin layer 3 containing a compound having a siloxane bond is denoted by the reference numeral 6. B in the above-described Expressions 1 and 2 represents an O/Si ratio that is a ratio of the number of oxygen atoms relative to the number of silicon atoms in the surface 6 of the resin layer containing a compound having a siloxane bond.

In FIG. 4, in a case where the depth d is 10 nm, the surface parallel with the "surface 6 of the resin layer containing a compound having a siloxane bond" at a depth 10 nm (in the direction of a support) from the surface of the resin layer 3 containing a compound having a siloxane bond is a "surface of a resin layer containing a compound having a siloxane bond at a depth of 10 nm (in the direction of the support) from the surface of the resin layer containing a compound having a siloxane bond" which is represented by the reference numeral 7. A in the above-described Expression 1 represents an O/Si ratio that is a ratio of the number of oxygen atoms relative to the number of silicon atoms contained in the "surface 7 of the resin layer containing a compound having a siloxane bond at a depth of 10 nm (in the direction of the support) from the surface of the resin layer containing a compound having a siloxane bond".

<Support>

It is preferable that the gas separation membrane of the present invention includes a support and more preferable that the resin layer containing a compound having a siloxane bond is formed on the support. Since the gas permeability can be sufficiently secured, it is preferable that the support is thin and is formed of a porous material.

The gas separation membrane of the present invention may be obtained by forming and disposing the resin layer 3 containing a compound having a siloxane bond on or in the surface of the porous support or may be a thin film composite conveniently obtained by forming the resin layer on the surface thereof. When the resin layer 3 containing a compound having a siloxane bond is formed on the surface of the porous support, a gas separation membrane with an advantage of having high separation selectivity, high gas permeability, and mechanical strength at the same time can be obtained.

In a case where the gas separation membrane of the present invention is a thin film composite, it is preferable that the thin film composite is formed by coating (the term "coating" in the present specification includes a form made by a coating material being adhered to a surface through immersion) the surface of the porous support with a coating solution (dope) that forms the resin layer 3 containing a compound having a siloxane bond. Specifically, it is preferable that the support has a porous layer on the side of the resin layer 3 containing a compound having a siloxane bond and more preferable that the support is a laminate formed of non-woven fabric and a porous layer disposed on the side of the resin layer 3 containing a compound having a siloxane bond.

The material of the porous layer which is preferably applied to the support is not particularly limited and may be an organic or inorganic material as long as the material satisfies the purpose of providing mechanical strength and high gas permeability. A porous membrane of an organic polymer is preferable, and the thickness thereof is in a range of 1 to 3,000 µm, preferably in a range of 5 to 500 µm, and more preferably in a range of 5 to 150 µm. In regard to the pore structure of the porous layer, the average pore diameter is typically 10 µm or less, preferably 0.5 µm or less, and more preferably 0.2 µm or less. The porosity is preferably in a range of 20% to 90% and more preferably in a range of 30% to 80%. Further, the molecular weight cut-off of the porous layer is preferably 100,000 or less. Moreover, the gas permeability is preferably $3 \times 10^{-5}$ cm$^3$ (STP: STP is an abbreviation for standard temperature and pressure)/cm$^2$·cm·sec·cmHg (30 GPU: GPU is an abbreviation for gas permeation unit) or greater in terms of the permeation rate of carbon dioxide. Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous layer, any of a flat shape, a spiral shape, a tubular shape, and a hallow fiber shape can be employed.

In the thin film composite, it is preferable that woven fabric, non-woven fabric, or a net used to provide mechanical strength is provided in the lower portion of the porous layer disposed on the side of the resin layer 3 containing a compound having a siloxane bond. In terms of film forming properties and the cost, non-woven fabric is suitably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer Containing Compound Having Siloxane Bond>

The gas separation membrane of the present invention includes a resin layer containing a compound having a siloxane bond.

In the gas separation membrane of the present invention, the resin layer containing a compound having a siloxane bond satisfies the following Expression 1 and the following Expression 2.

$$0.9 \geq A/B \geq 0.55, \text{ and} \qquad \text{Expression 1}$$

$$B \geq 1.7 \qquad \text{Expression 2}$$

In Expressions 1 and 2, A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond, and B represents an O/Si ratio that is a ratio of the number of oxygen atoms relative to the number of silicon atoms in the surface of the resin layer containing a compound having a siloxane bond.

In the resin layer containing a compound having a siloxane bond, A/B is preferably 0.60 or greater, A/B is more preferably 0.63 or greater, and A/B is particularly preferably 0.65 or greater.

In the resin layer containing a compound having a siloxane bond, B is preferably 1.95 or greater.

In the present specification, the ratio of the number of oxygen atoms relative to the number of silicon atoms in each surface of the resin layer containing a compound having a siloxane bond, that is, an O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and an O/Si ratio (B) that is a ratio of the number of oxygen atoms relative to the number of silicon atoms in the surface of the resin layer containing a compound having a siloxane bond can be measured as relative amounts. An O/Si ratio (C) that is a ratio of the number of oxygen atoms relative to the number of silicon atoms contained in the resin layer containing a compound having a siloxane bond at depths of 30 nm and 50 nm (preferably at a depth of 30 nm in the direction of the support and a depth of 50 nm in the direction of the support) from the surface of the resin layer containing a compound having a siloxane bond can be measured as a relative amount similar to the O/Si ratio (A) and the O/Si ratio (B). Moreover, the carbon/silicon ratio that is a ratio of the number of carbon atoms relative to the number of silicon atoms in the surface of the resin layer containing a compound having a siloxane bond can be measured as a relative amount similar to the O/Si ratio (A) and the O/Si ratio (B).

The O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the O/Si ratio (B) that is a ratio of the number of oxygen atoms relative to the number of silicon atoms in the surface of the resin layer containing a compound having a siloxane bond are calculated using electron spectroscopy for chemical analysis (ESCA). Further, the carbon/silicon ratio that is a ratio of the number of carbon atoms relative to the number of silicon atoms in the surface of the resin layer containing a compound having a siloxane bond are calculated in the same manner as described above.

The O/Si ratio (B) that is a ratio of the number of oxygen atoms relative to the number of silicon atoms in the surface of the resin layer containing a compound having a siloxane bond is calculated by putting the porous support on which the resin layer containing a compound having a siloxane bond is formed into Quantera SXM (manufactured by Physical Electronics, Inc.) under conditions of using Al-Kα rays (1,490 eV, 25 W, diameter of 100 μm) as an X-ray source with Pass Energy of 55 eV and Step of 0.05 eV in a measuring region having a size of 300 μm×300 μm.

Next, in order to acquire the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond, etching is performed using $C_{60}$ ions.

Specifically, the ion beam intensity is set to $C_{60}^+$ of 10 keV and 10 nA and a region having a size of 2 mm×2 mm is etched by 10 nm using a $C_{60}$ ion gun belonging to Quantera SXM (manufactured by Physical Electronics, Inc.). With this membrane, the O/Si ratio (A) that is a ratio of the number of oxygen atoms relative to the number of silicon atoms in the surface of the resin layer containing a compound having a siloxane bond is calculated using an ESCA device. The depth of the resin layer containing a compound having a siloxane bond from the surface of the resin layer containing a compound having a siloxane bond is calculated at an etching rate of 10 nm/min of the material of the resin layer containing a compound having a siloxane bond. As this value, an optimum numerical value is appropriately used depending on the material.

The value of A/B is calculated from the obtained O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the obtained O/Si ratio (B) that is a ratio of the number of oxygen atoms relative to the number of silicon atoms in the surface of the resin layer containing a compound having a siloxane bond.

The O/Si ratio (C) that is a ratio of the number of oxygen atoms relative to the number of silicon atoms of the resin layer containing a compound having a siloxane bond at a depth of 30 nm from the surface of the resin layer containing a compound having a siloxane bond is acquired in the same manner as that of the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond. Further, the value of C/B is calculated from the O/Si ratio (B) and the O/Si ratio (C).

In the present specification, the surface of the resin layer containing a compound having a siloxane bond is a surface which has a maximum O/Si ratio in a case where the O/Si ratio is measured from the surface (preferably a surface on a side opposite to the support) of the gas separation membrane and contains 3% (atomic %) or greater of silicon atoms.

In a case where the surface of the resin layer containing a compound having a siloxane bond does not have another layer, the O/Si ratio is the maximum in a case where the O/Si ratio is measured from the surface of the gas separation membrane using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond, and the surface having 3% (atomic %) or greater of silicon atoms is specified.

As the result, according to the above-described method, it is confirmed that the surface of the resin layer containing a compound having a siloxane bond in a state in which the resin layer containing a compound having a siloxane bond is formed on the porous support (in a state without another layer (for example, a layer containing polyimide)) is a "surface which has a maximum O/Si ratio in a case where the O/Si ratio is measured from the surface of the gas separation membrane and contains 3% (atomic %) or greater of silicon atoms".

In a case where the surface of the resin layer containing a compound having a siloxane bond has another layer (for example, a layer containing polyimide), the surface of the resin layer containing a compound having a siloxane bond (that is, the surface which has the maximum O/Si ratio in a case where the O/Si ratio is measured from the surface of the gas separation membrane and contains 3% (atomic %) or greater of silicon atoms) is acquired using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond.

As the result, according to the above-described method, the surface of the resin layer containing a compound having a siloxane bond in a state in which the resin layer containing a compound having a siloxane bond is formed on the porous support (in a state without another layer (for example, a layer containing polyimide)) is the "surface which has a maximum O/Si ratio in a case where the O/Si ratio is measured from the surface of the gas separation membrane and contains 3% (atomic %) or greater of silicon atoms". Specifically, the "surface of the resin layer containing a compound having a siloxane bond in a state in which the resin layer containing a compound having a siloxane bond is formed on the porous support (in a state without another layer (for example, a layer containing polyimide))" is the "surface which has a maximum O/Si ratio in a case where the O/Si ratio is measured from the surface of the gas separation membrane and contains 3% (atomic %) or greater of silicon atoms".

In a case where the amount of oxygen atoms per unit area in each surface of the resin layer containing a compound having a siloxane bond is measured as a relative amount, in the resin layer containing a compound having a siloxane bond, the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond is preferably greater than 1.0 and 3.0 or less, more preferably in a range of 1.1 to 2.4, and particularly preferably in a range of 1.3 to 2.35.

The O/Si ratio (C) that is a ratio of the number of oxygen atoms relative to the number of silicon atoms of the resin layer containing a compound having a siloxane bond at a depth of 30 nm from the surface of the resin layer containing a compound having a siloxane bond is preferably in a range of 1.0 to 2.4 and particularly preferably in a range of 1.05 to 2.3.

The value of C/B is preferably in a range of 0.50 to 0.95, more preferably in a range of 0.50 to 0.90, and particularly preferably in a range of 0.50 to 0.85.

In the gas separation membrane of the present invention, the ratio (ratio of carbon/silicon) of the number of carbon atoms relative to the number of silicon atoms in the surface of the resin layer containing a compound having a siloxane bond is preferably 1.6 or less, more preferably in a range of 0.1 to 1.3, and particularly preferably in a range of 0.1 to 1.1.

From the viewpoint of improving storage tolerance, it is preferable that the gel fraction of the gas separation membrane of the present invention is 45% or greater. The moisture-heat resistance of the gas separation membrane can be improved by controlling the gel fraction of the gas separation membrane. As the result, since the performance of the gas separation membrane with respect to the environment at the time of storage is stabilized, the performance thereof is not departed from the range of gas separation performance specified by the specification at the time of shipping. Further, the yield after the shipping is improved.

From the viewpoint of improving moisture-heat (conveyance) resistance in addition to storage tolerance, the gel fraction of the gas separation membrane is preferably greater than 55% and particularly preferably 70% or greater. Since the performance of the gas separation membrane with respect to the wet heat environment at the time of storage is stabilized, the performance thereof is not departed from the range of gas separation performance specified by the specification at the time of shipping. Further, the yield after the shipping is improved.

In the present specification, a value measured by the following method is employed as the gel fraction of the gas separation membrane. A sample formed by coating a porous support with a resin layer containing a compound having a siloxane bond which has a thickness of 10 µm or less and curing the resin layer is prepared. Signal strength Xa of Si components is measured by performing XRF measurement on this sample. Meanwhile, a sample formed by coating a support with a resin layer containing a compound having a siloxane bond, curing the resultant, immersing the resultant in a chloroform solvent for 24 hours, and extracting elution components therefrom is prepared. Thereafter, the signal strength Xb of Si components is measured by performing the XRF measurement on the sample from which elution components are extracted. Xb/Xa*100% is defined as the gel fraction. A solvent other than chloroform may be used as the solvent for extraction and examples thereof include hexane.

In the gas separation membrane, the value of the resin layer containing a compound having a siloxane bond, which is represented by the following expression, is preferably 5,000 nm or less, more preferably 900 nm or less, and particularly preferably in a range of 100 to 900 nm.

Expression: thickness of resin layer containing compound having siloxane bond×(1−gel fraction/100)

In the gas separation membrane, the resin layer containing a compound having a siloxane bond which satisfies the above-described expression is present in the plane of the gas separation membrane by preferably 50% or greater, more preferably 70% or greater, and particularly preferably 90% or greater.

Another region other than the resin layer containing a compound having a siloxane bond which satisfies the above-described expression may be present in the plane of the gas separation membrane. Examples of another region include a region for which an adhesive or a pressure sensitive adhesive is provided and a region in which the resin layer containing a compound having a siloxane bond is not sufficiently subjected to a specific treatment (preferably an oxygen atom permeating treatment).

The resin layer containing a compound having a siloxane bond contains a compound having a siloxane bond. The compound having a siloxane bond may be a "compound which includes a repeating unit having at least silicon atoms, oxygen atom, and carbon atoms". Further, the compound having a siloxane bond may be a "compound having a siloxane bond and a repeating unit", and a compound having a polysiloxane bond is preferable.

In the gas separation membrane of the present invention, it is preferable that the compound having a siloxane bond includes at least a repeating unit represented by the following Formula (2) or a repeating unit represented by the following Formula (3).

Formula (2)

Formula (3)

In Formulae (2) and (3), $R^{11}$ represents a substituent, the symbol "*" represents a binding site with respect to # in Formula (2) or (3), and the symbol "#" represents a binding site with respect to * in Formula (2) or (3).

$R^{11}$ in Formula (2) represents preferably a hydroxyl group, an alkyl group having 1 or more carbon atoms, an aryl group, an amino group, an epoxy group, or a carboxyl group, more preferably a hydroxyl group, an alkyl group having 1 or more carbon atoms, an amino group, an epoxy group, or a carboxyl group, and still more preferably a hydroxyl group, an alkyl group having 1 or more carbon atoms, an epoxy group, or a carboxyl group.

The hydroxyl group or the carboxyl group represented by $R^{11}$ in Formula (2) may form an arbitrary salt.

In Formulae (2) and (3), the symbol "*" represents a binding site with respect to # in Formula (2) or (3) and the symbol "#" represents a binding site with respect to "*" in Formula (2) or (3). Further, the symbol "*" may be a binding site with respect to an oxygen atom in the following Formula (1) and the symbol "#" may be a binding site with respect to a silicon atom in the following Formula (1).

In the gas separation membrane of the present invention, it is preferable that the compound having a siloxane bond includes a repeating unit represented by the following Formula (1).

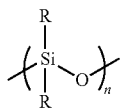

Formula (1)

In Formula (1), R's each independently represent a hydrogen atom, an alkyl group having 1 or more carbon atoms, an aryl group, an amino group, an epoxy group, a fluorinated alkyl group, a vinyl group, an alkoxy group, or a carboxyl group, and n represents an integer of 2 or greater.

In a case where a resin layer containing a compound having a siloxane bond which satisfies the above-described Expressions 1 and 2 is formed using such a compound having a siloxane bond as the material of the resin layer containing a compound having a siloxane bond, it is possible to exhibit high gas permeability and gas separation selectivity under high pressure.

Further, in the case where a resin layer containing a compound having a siloxane bond which satisfies the above-described Expressions 1 and 2 is formed using such a compound having a siloxane bond as the material of the resin layer containing a compound having a siloxane bond, it is not intended to adhere to any theory, but it is considered that high gas permeability and gas separation selectivity are exhibited under high pressure because oxygen atoms enter not only the surface of the resin layer containing a compound having a siloxane bond but also the inside of the resin layer in the thickness direction so as to be the composition of SiOx. Particularly, even in a case where polydimethylsiloxane that is known to have high gas permeability is used, a resin layer containing a compound having a siloxane bond which satisfies the above-described Expression 1 is formed using dimethylsiloxane, and it is possible to exhibit high gas permeability and gas separation selectivity under high pressure. In the surface of the resin layer containing a compound having a siloxane bond and the inside of the resin layer containing a compound having a siloxane bond in the thickness direction after oxygen atoms enter not only the surface of the resin layer containing a compound having a siloxane bond but also the inside of the resin layer in the thickness direction, it is preferable that the compound having a siloxane bond includes at least a repeating unit represented by Formula (2) or a repeating unit represented by Formula (3).

In Formula (1), R's each independently represent preferably an alkyl group having 1 or more carbon atoms, an aryl group, an amino group, an epoxy group, or a carboxyl group, more preferably an alkyl group having 1 or more carbon atoms, an amino group, an epoxy group, or a carboxyl group, and particularly preferably an alkyl group having 1 or more carbon atoms, an epoxy group, or a carboxyl group.

The alkyl group having 1 or more carbon atoms which is represented by R in Formula (1) is preferably an alkyl group having 1 to 10 carbon atoms, more preferably a methyl group, an ethyl group, or a propyl group, and particularly preferably a methyl group. The alkyl group having 1 or more carbon atoms which is represented by R may be linear, branched, or cyclic.

The aryl group represented by R in Formula (1) is preferably an aryl group having 6 to 20 carbon atoms and particularly preferably a phenyl group.

The fluorinated alkyl group represented by R in Formula (1) is preferably a fluorinated alkyl group having 1 to 10 carbon atoms, more preferably a fluorinated alkyl group having 1 to 3 carbon atoms, and particularly preferably a trifluoromethyl group. The fluorinated alkyl group represented by R may be linear, branched, or cyclic.

The alkoxy group represented by R in Formula (1) is preferably an alkoxy group having 1 to 10 carbon atoms, more preferably a methoxy group, an ethoxy group, or a propyloxy group, and particularly preferably a methoxy group. The alkoxy group having 1 or more carbon atoms which is represented by R may be linear, branched, or cyclic.

In Formula (1), n represents an integer of 2 or greater, preferably in a range of 40 to 800, more preferably in a range of 50 to 700, and particularly preferably in a range of 60 to 500.

The compound having a siloxane bond which has a repeating unit represented by Formula (1) may include an arbitrary substituent other than the repeating unit represented by Formula (1) in the terminal of a molecule. Examples and preferable ranges of the substituent which the terminal of a molecule of the compound having a siloxane bond which includes a repeating unit represented by Formula (1) may have are the same as the examples and preferable ranges of R in Formula (1).

In the gas separation membrane of the present invention, it is preferable that the surface of the resin layer containing a compound having a siloxane bond contains a compound having a siloxane bond which includes a repeating unit represented by Formula (1) and at least a repeating unit represented by Formula (2) or a repeating unit represented by Formula (3).

In the gas separation membrane of the present invention, the ratio of the repeating unit represented by Formula (3) to the repeating unit represented by Formula (2) and the repeating unit represented by Formula (1) in the compound having a siloxane bond contained in the surface of the resin layer containing a compound having a siloxane bond is preferably in a range of 100% to 600% by mole, more preferably in a range of 200% to 600% by mole, and particularly preferably in a range of 300% to 600% by mole.

In the gas separation membrane of the present invention, it is preferable that the resin layer containing a compound having a siloxane bond at a depth of 10 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 10 nm from the surface of the resin layer containing a compound having a siloxane bond is preferably in a range of 3.0% to 500% by mole, more preferably in a range of 3.5% to 450% by mole, and particularly preferably in a range of 4.0% to 400% by mole.

Further, in the gas separation membrane of the present invention, it is preferable that the resin layer containing a compound having a siloxane bond at a depth of 30 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 30 nm from the surface of the resin layer containing a compound having a siloxane bond is preferably in a range of 2.0% to 400% by mole, more preferably in a range of 2.5% to 350% by mole, and particularly preferably in a range of 3.0% to 300% by mole.

It is preferable that the compound having a siloxane bond used for the resin layer containing a compound having a siloxane bond has a functional group which can be polymerized. Examples of such a functional group include an epoxy group, an oxetane group, a carboxyl group, an amino group, a hydroxyl group, and a thiol group. It is more preferable that the resin layer containing a compound having a siloxane bond includes an epoxy group, an oxetane group, a carboxyl group, and a compound having a siloxane bond which includes two or more groups among these groups. It is preferable that such a resin layer containing a compound having a siloxane bond is formed by being cured by irradiating a radiation-curable composition on the support with radiation.

The compound having a siloxane bond which is used for the resin layer containing a compound having a siloxane bond may be polymerizable dialkylsiloxane formed from a partially cross-linked radiation-curable composition having a dialkylsiloxane group. Polymerizable dialkylsiloxane is a monomer having a dialkylsiloxane group, a polymerizable oligomer having a dialkylsiloxane group, or a polymer having a dialkylsiloxane group. As the dialkylsiloxane group, a group represented by $-\{O-Si(CH_3)_2\}_{n2}-$ (n2 represents a number of 1 to 100) can be exemplified. A poly(dialkylsiloxane) compound having a vinyl group at the terminal can be preferably used.

It is preferable that the compound having a siloxane bond which is used for the material of the resin layer containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane], and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

Commercially available materials can be used as the compound having a siloxane bond which is used for the material of the resin layer containing a compound having a siloxane bond and preferred examples of the compound having a siloxane bond which is used for the resin layer containing a compound having a siloxane bond include UV9300 (polydimethylsiloxane (PDMS), manufactured by Momentive Performance Materials Inc.) and X-22-162C (manufactured by Shin-Etsu Chemical Co., Ltd.).

UV9380C (bis(4-dodecylphenyl)iodonium hexafluoroantimonate, manufactured by Momentive Performance Materials Inc.) can be preferably used as other materials of the resin layer containing a compound having a siloxane bond.

The material of the resin layer containing a compound having a siloxane bond can be prepared as a composition including an organic solvent when the resin layer containing a compound having a siloxane bond is formed, and it is preferable that the material thereof is a curable composition. The organic solvent which can be used when the resin layer containing the compound having a siloxane bond is formed is not particularly limited, and examples thereof include n-heptane.

(Characteristics)

The film thickness of the resin layer containing a compound having a siloxane bond is not particularly limited, but the film thickness of the resin layer containing a compound having a siloxane bond is preferably 0.1 μm from the viewpoint that film formation is easily carried out, more preferably in a range of 0.1 to 5 μm, particularly preferably in a range of 0.1 to 4 μm, and more particularly preferably in a range of 0.3 to 3 μm. The film thickness of the resin layer containing a compound having a siloxane bond can be acquired by SEM.

The film thickness of the resin layer containing a compound having a siloxane bond can be controlled by adjusting the coating amount of the curable composition.

<Additional Resin Layer>

The gas separation membrane of the present invention may contain an additional resin layer other than the resin layer containing a compound having a siloxane bond (hereinafter, the additional resin layer will be described).

Examples of the resin contained in the additional resin layer are described below, but are not limited thereto. Specifically, the compound having a siloxane bond, polyimides, polyamides, celluloses, polyethylene glycols, and polybenzoxazoles are preferable and at least one selected from the compound having a siloxane bond, polyimide, polybenzoxazole, and acetic acid cellulose is more preferable. It is particularly preferable that the gas separation membrane of the present invention includes the resin layer containing a compound having a siloxane bond and further includes a layer containing a polyimide compound as the additional resin layer.

Polyimide having a reactive group is preferable as the polyimide compound.

Hereinafter, a case where the resin of the additional resin layer is polyimide having a reactive group will be described as a typical example, but the present invention is not limited to the case where a polymer having a reactive group is polyimide having a reactive group.

The polyimide having a reactive group which can be used in the present invention will be described below in detail.

According to the present invention, in a polyimide compound having a reactive group, it is preferable that a polymer having a reactive group includes a polyimide unit and a repeating unit having a reactive group (preferably a nucleophilic reactive group and more preferably a carboxyl group, an amino group, or a hydroxyl group) on the side chain thereof.

More specifically, it is preferable that the polymer having a reactive group includes at least one repeating unit represented by the following Formula (I) and at least one repeating unit represented by the following Formula (III-a) or (III-b).

Further, it is more preferable that the polymer having a reactive group includes at least one repeating unit represented by the following Formula (I), at least one repeating unit represented by the following Formula (II-a) or (II-b), and at least one repeating unit represented by the following Formula (III-a) or (III-b).

The polyimide having a reactive group which can be used in the present invention may include repeating units other than the respective repeating units described above, and the number of moles thereof is preferably 20 or less and more preferably in a range of 0 to 10 when the total number of moles of the respective repeating units represented by each of Formulae is set to 100. It is particularly preferable that the polyimide having a reactive group which can be used in the present invention is formed of only the respective repeating units represented by each of the following formulae.

Formula (I)

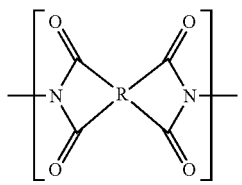

In Formula (I), R represents a group having a structure represented by any of the following Formulae (I-a) to (I-h). In the following Formulae (I-a) to (I-h), the symbol "*" represents a binding site with respect to a carbonyl group of Formula (I). R in Formula (I) is occasionally referred to as a mother nucleus, and it is preferable that this mother nucleus R is a group represented by Formula (I-a), (I-b), or (I-d), more preferable that this mother nucleus R is a group represented by Formula (I-a) or (I-d), and particularly preferable that this mother nucleus R is a group represented by Formula (I-a).

(I-a)
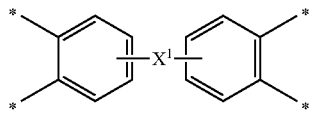

(I-b)
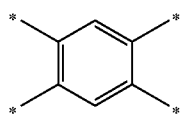

(I-c)
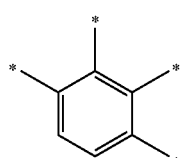

(I-d)
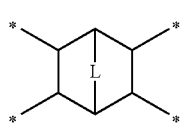

(I-e)
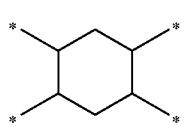

(I-f)
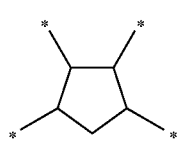

(I-g)
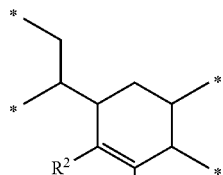

(I-h)
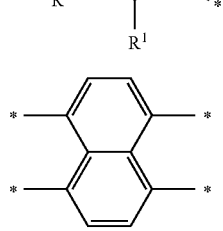

Formula (II-a)
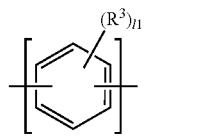

Formula (II-b)
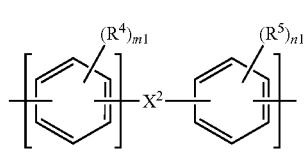

Formula (III-a)
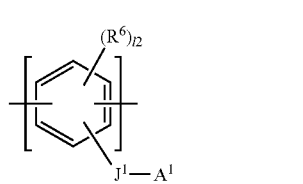

Formula (III-b)
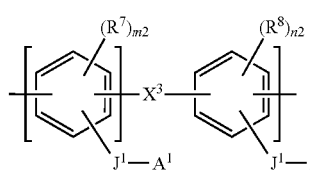

$X^1$, $X^2$, and $X^3$ $X^1$, $X^2$, and $X^3$ represent a single bond or a divalent linking group. As the divalent linking groups of these, —C($R^x$)$_2$— ($R^x$ represents a hydrogen atom or a substituent group. In a case where $R^x$ represents a substituent group, $R^x$'s may be linked to each other and form a ring), —O—, —SO$_2$—, —C(=O)—, —S—, —NR$^Y$— ($R^Y$ represents a hydrogen atom, an alkyl group (preferably a methyl group or an ethyl group), or an aryl group (preferably a phenyl group)), or a combination of these is preferable and a single bond or —C($R^x$)$_2$— is more preferable. When $R^x$ represents a substituent group, a group Z of substituent groups described below is specifically exemplified. Among these, an alkyl group is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and then a cyclic structure may be formed or condensation may be made and then a condensed ring structure may be formed.

L

L represents —CH$_2$=CH$_2$— or —CH$_2$— and —CH$_2$=CH$_2$— is preferable.

$R^1$ and $R^2$ $R^1$ and $R^2$ represent a hydrogen atom or a substituent group. As the substituent group, any one selected from the group Z of substituent groups described below can be used. $R^1$ and $R^2$ may be bonded to each other and form a ring.

$R^1$ and $R^2$ represent preferably a hydrogen atom or an alkyl group, more preferably a hydrogen atom, a methyl group, or an ethyl group, and still more preferably a hydrogen atom.

$R^3$ $R^3$ represents an alkyl group or a halogen atom. The preferable ranges of the alkyl group and the halogen atom are the same as those of an alkyl group and a halogen atom defined in the group Z of substituent groups described below. l1 showing the number of $R^3$'s represents an integer of 0 to 4, is preferably in a range of 1 to 4, and is more preferably 3 or 4. It is preferable that $R^3$ represents an alkyl group and more preferable that $R^3$ represents a methyl group or an ethyl group.

$R^4$ and $R^5$ $R^4$ and $R^5$ represent an alkyl group or a halogen atom or a group in which $R^4$ and $R^5$ are linked to each other and form a ring together with $X^2$. The preferable ranges of the alkyl group and the halogen atom are the same as those of an alkyl group and a halogen atom defined in the group Z of substituent groups described below. The structure formed by $R^4$ and $R^5$ being linked to each other is not particularly limited, but it is preferable that the structure is a single bond, —O—, or —S—. m1 and n1 respectively showing the numbers of $R^4$'s and $R^5$'s represent an integer of 0 to 4, are preferably in a range of 1 to 4, and are more preferably 3 or 4.

In a case where $R^4$ and $R^5$ represent an alkyl group, it is preferable that $R^4$ and $R^5$ represent a methyl group or an ethyl group and also preferable that $R^4$ and $R^5$ represent trifluoromethyl.

$R^6$, $R^7$, and $R^8$ $R^6$, $R^7$, and $R^8$ represent a substituent group. Here, $R^7$ and $R^8$ may be bonded to each other and form a ring. l2, m2, and n2 respectively showing the numbers of these substituents represent an integer of 0 to 4, are preferably in a range of 0 to 2, and are more preferably 0 or 1.

$J^1$

J1 represents a single bond or a divalent linking group. As the linking group, *—COO⁻N⁺$R^b$$R^c$$R^d$-** ($R^b$ to $R^d$ represent a hydrogen atom, an alkyl group, or an aryl group, and preferable ranges thereof are respectively the same as those described in the group Z of substituent groups described below), *—SO₃⁻N⁺$R^e$$R^f$$R^g$-** ($R^e$ to $R^g$ represent a hydrogen atom, an alkyl group, or an aryl group, and preferable ranges thereof are respectively the same as those described in the group Z of substituent groups described below), an alkylene group, or an arylene group is exemplified. The symbol "*" represents a binding site on the phenylene group side and the symbol "**" represents a binding site on the opposite side of the phenylene group. It is preferable that $J^1$ represents a single bond, a methylene group, or a phenylene group and a single bond is particularly preferable.

$A^1$ $A^1$ is not particularly limited as long as $A^1$ represents a group in which a crosslinking reaction may occur, but it is preferable that $A^1$ represents a nucleophilic reactive group and more preferable that $A^1$ represents a group selected from a carboxyl group, an amino group, a hydroxyl group, and —S(=O)₂OH. The preferable range of the amino group is the same as the preferable range of the amino group described in the group Z of substituent groups below. $A^1$ represents particularly preferably a carboxyl group, an amino group, or a hydroxyl group, more particularly preferably a carboxyl group or a hydroxyl group, and still more particularly preferably a carboxyl group.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, para-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methyl carbamoyl, diethyl carbamoyl, and phenyl carbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxyl group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

In the polyimide compound which can be used in the present invention, the ratios of the respective repeating units represented by Formulae (I), (II-a), (II-b), (III-a), and (III-b) are not particularly limited and appropriately adjusted in consideration of gas permeability and gas separation selectivity according to the purpose of gas separation (recovery rate, purity, or the like).

In the polyimide having a reactive group which can be used in the present invention, a ratio ($E_{II}/E_{III}$) of the total number ($E_{II}$) of moles of respective repeating units represented by Formulae (II-a) and (II-b) to the total number ($E_{III}$) of moles of respective repeating units represented by Formulae (III-a) and (III-b) is preferably in a range of 5/95 to 95/5, more preferably in a range of 10/90 to 80/20, and still more preferably in a range of 20/80 to 60/40.

The molecular weight of the polyimide having a reactive group which can be used in the present invention is preferably in a range of 10,000 to 1,000,000, more preferably in a range of 15,000 to 500,000, and still more preferably in a range of 20,000 to 200,000 as the weight-average molecular weight.

The molecular weight and the dispersity in the present specification are set to values measured using a gel permeation chromatography (GPC) method unless otherwise specified and the molecular weight is set to a weight-average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

The polyimide having a reactive group which can be used in the present invention can be synthesized by performing condensation and polymerization of a specific bifunctional acid anhydride (tetracarboxylic dianhydride) and a specific diamine. As the method, a technique described in a general book (for example, "*The Latest Polyimide~Fundamentals and Applications~*" edited by Toshio Imai and Rikio Yokota, NTS Inc., pp. 3 to 49) can be appropriately selected.

Preferred specific examples of the polyimide having a reactive group which can be used in the present invention will be described below, but the present invention is not limited thereto. Further, "100," "x," and "y" in the following formulae indicate a copolymerization ratio (molar ratio). Examples of "x," "y," and the weight-average molecular weight are listed in the following Table 1. Moreover, in the polyimide compound which can be used in the present invention, it is preferable that y does not represent 0.

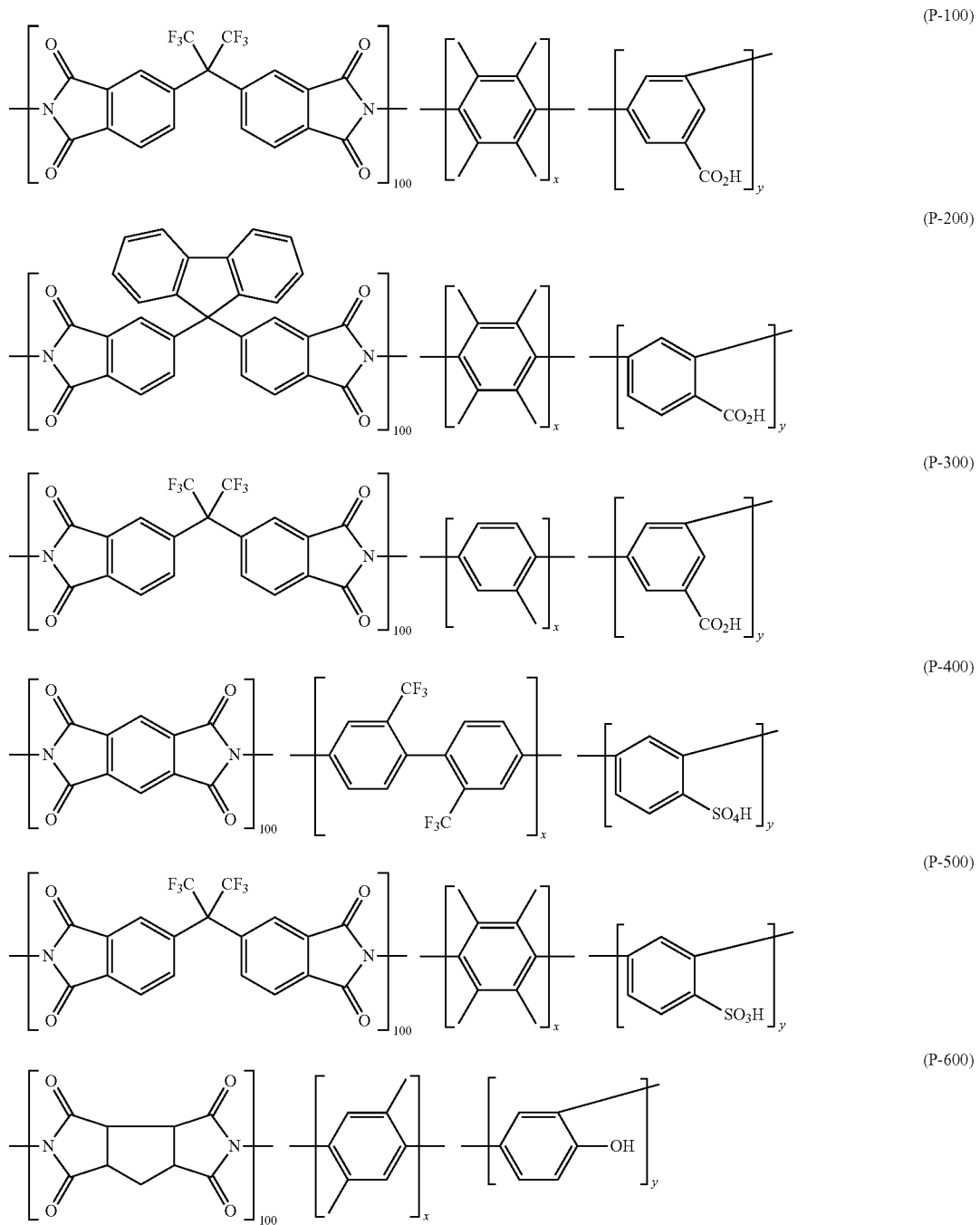

-continued

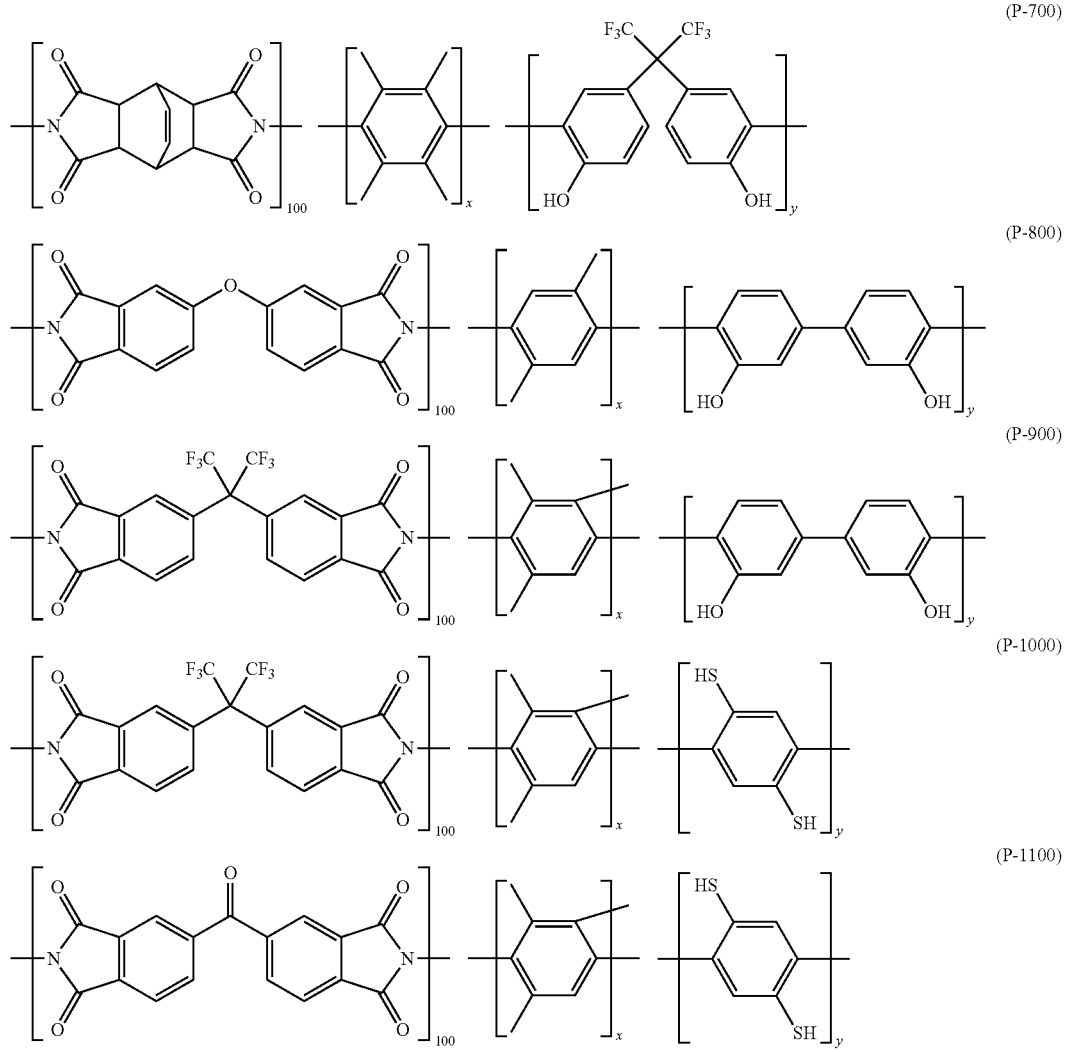

| | Copolymerization ratio | | Weight-average |
|---|---|---|---|
| Polymer | x | y | molecular weight |
| P-100 | 30 | 70 | 132,000 |
| P-200 | 40 | 60 | 168,000 |
| P-300 | 60 | 40 | 165,000 |
| P-400 | 10 | 90 | 158,000 |
| P-500 | 20 | 80 | 128,000 |
| P-600 | 50 | 50 | 155,000 |
| P-700 | 70 | 30 | 112,500 |
| P-800 | 30 | 70 | 158,000 |
| P-900 | 20 | 80 | 128,000 |
| P-1000 | 60 | 40 | 150,000 |
| P-1100 | 40 | 60 | 117,000 |

TABLE 1

Moreover, in the copolymerization ratio of the polyimide compound P-100 exemplified above, a polymer (P-101) in which x is set to 20 and y is set to 80 can be preferably used.

Further, in a case where the resin of the additional resin layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

In addition, the resin of the additional resin layer other than polyimide can be selected from celluloses such as cellulose acetate, cellulose triacetate, cellulose acetate butyrate, cellulose propionate, ethyl cellulose, methyl cellulose, and nitrocellulose. As the celluloses which can be used for the additional resin layer, it is preferable that the degree of substitution of all acyl groups is in a range of 2.0 to 2.7. Cellulose acetate L-40 (degree of substitution of acyl groups: 2.5, manufactured by Daicel Corporation) which is commercially available as a product of cellulose acetate can be preferably used.

As other resins of the additional resin layer, polyethylene glycols such as a polymer obtained by polymerizing polyethylene glycol #200 diacrylate (manufactured by Shin-Nakamura Chemical Co., Ltd.); and a polymer described in JP2010-513021A can be selected.

Another additional resin layer may be interposed between the support and the resin layer containing a compound having a siloxane bond. As another additional resin layer, PVA whose hydrophilicity and hydrophobicity are adjusted or the like may be exemplified.

(Characteristics)

It is preferable that the film thickness of the additional resin layer is as small as possible under the conditions of imparting high gas permeability while maintaining the mechanical strength and gas separation selectivity.

From the viewpoint of improving the gas permeability, it is preferable that the additional resin layer other than the resin layer containing a compound having a siloxane bond of the gas separation membrane of the present invention is a thin layer. The thickness of the additional resin layer other than the resin layer containing a compound having a siloxane bond is typically 10 µm or less, preferably 3 µm or less, particularly preferably 1 µm or less, more particularly preferably 0.3 µm or less, and still more particularly preferably 0.2 µm or less.

Further, the thickness of the additional resin layer other than the resin layer containing a compound having a siloxane bond is typically 0.01 µm or greater, preferably 0.03 µm or greater from the practical viewpoint that film formation is easily carried out, and more preferably 0.1 µm or greater.

<Protective Layer>

The gas separation membrane of the present invention may include a protective layer formed on the additional resin layer or the resin layer containing a compound having a siloxane bond. The protective layer is a layer disposed on the additional resin layer or the resin layer containing a compound having a siloxane bond. At the time of handling or use, unintended contact between the additional resin layer or the resin layer containing a compound having a siloxane bond and other materials can be prevented.

(Material)

The material of the protective layer is not particularly preferable, but the preferable ranges of the material used for the protective layer are the same as the preferable ranges of the material used for the resin layer containing a compound having a siloxane bond. Particularly, it is preferable that the protective layer described above is at least one selected from polydimethylsiloxane, poly(1-trimethylsilyl-1-propyne), and polyethylene oxide, more preferable that the protective layer is polydimethylsiloxane or poly(1-trimethylsilyl-1-propyne), and particularly preferable that the protective layer is polydimethylsiloxane.

(Characteristics)

The film thickness of the protective layer is preferably in a range of 20 nm to 3 µm, more preferably in a range of 50 nm to 2 µm, and particularly preferably in a range of 100 nm to 1 µm.

<Characteristics and Applications>

The separation membrane of the present invention can be suitably used according to a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable.

It is preferable that the gas separation membrane of the present invention selectively separates carbon dioxide from the gas mixture including particularly carbon dioxide and hydrocarbon (methane).

In addition, in a case where gas subjected to a separation treatment is mixed gas of carbon dioxide and methane, the permeation rate of the carbon dioxide at 30° C. and 5 MPa is preferably 10 GPU or greater, more preferably in a range of 10 to 300 GPU, and particularly preferably in a range of 15 to 300 GPU.

Further, 1 GPU is $1\times10^{-6}$ cm$^3$(STP)/cm$^2$·sec·cmHg.

In the case where the gas separation membrane of the present invention is a membrane in which the gas subjected to a separation treatment is mixed gas of carbon dioxide and methane, a gas separation selectivity a which is a ratio of the permeation flux of carbon dioxide at 30° C. and 5 MPa to the permeation flux of methane is preferably 30 or greater, more preferably 35 or greater, particularly preferably 40 or greater, and more particularly preferably greater than 50.

It is considered that a mechanism of dissolution and diffusion in a membrane is involved in the selective gas permeation. From this viewpoint, a separation membrane including a polyethyleneoxy (PEO) composition is examined (see Journal of Membrane Science, 160 (1999), pp. 87 to 99). This is because interaction between carbon dioxide and the polyethyleneoxy composition is strong. Since this polyethyleneoxy film is a flexible rubber-like polymer film having a low glass transition temperature, a difference in the diffusion coefficient resulting from the kind of gas is small and the gas separation selectivity is mainly due to the effect of a difference in solubility. Meanwhile, the preferred embodiments of the present invention can be significantly improved from the viewpoints of the high glass transition temperature of the compound having a siloxane bond contained in the resin layer containing a compound having a siloxane bond and the thermal durability of the membrane while the above-described action of dissolution and diffusion is exhibited.

<Method of Producing Gas Separation Membrane>

A method of producing the gas separation membrane of the present invention is not particularly limited.

In the method of producing a gas separation membrane of the present invention, it is preferable that a specific treatment is performed on a resin layer precursor containing a compound having a siloxane bond. As the specific treatment performed on the resin layer precursor containing a compound having a siloxane bond, an oxygen atom permeating treatment of allowing oxygen atoms to permeate into the resin layer precursor containing a compound having a siloxane bond is preferable and a plasma treatment is more preferable.

It is preferable that the method of producing a gas separation membrane of the present invention is a method of producing a gas separation membrane of the present invention described below.

The method of producing a gas separation membrane of the present invention includes an oxygen atom permeating treatment step of allowing oxygen atoms to permeate into a resin layer precursor containing a compound having a siloxane bond, in which the oxygen atom permeating treatment step is a step for performing a plasma treatment using carrier gas having an oxygen flow rate of 10 cm³ (STP)/min or greater at an input power of 23 W or greater.

The method of producing a gas separation membrane of the present invention and preferred configurations of the method of producing a gas separation membrane of the present invention will be described with reference to the accompanying drawings.

Figure 5:
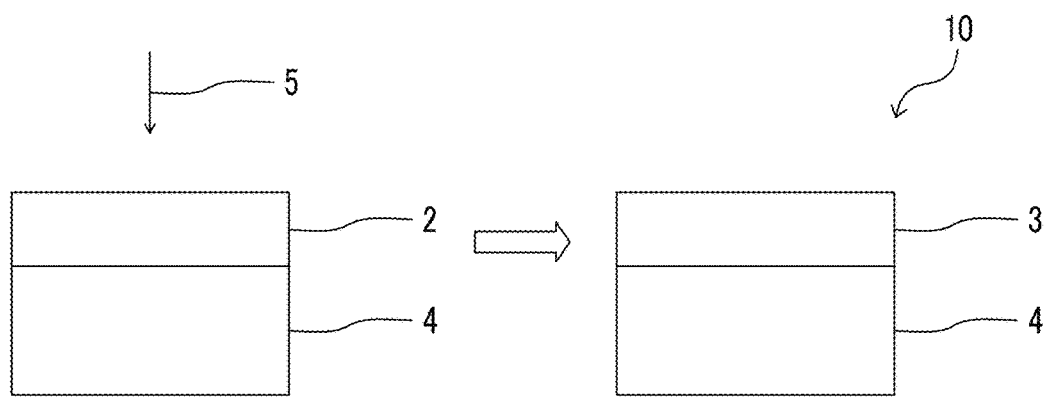
FIG. 5 is a schematic view illustrating an example of a method of producing a gas separation membrane of the present invention.

It is preferable that the method of producing a gas separation membrane of the present invention includes a step of applying a specific treatment (oxygen atom permeating treatment 5) to a laminate of the support 4 and a resin layer precursor 2 containing a compound having a siloxane bond from one surface side of the resin layer precursor 2 containing a compound having a siloxane bond as illustrated in FIG. 5.

Thereafter, the method of producing a gas separation membrane of the present invention may include a step of forming an additional resin layer on the surface of the resin layer precursor containing a compound having a siloxane bond, which is subjected to the specific treatment (oxygen atom permeating treatment 5) (not illustrated).

<Formation of Resin Layer Precursor Containing Compound Having Siloxane Bond>

It is preferable that the method of producing the gas separation membrane of the present invention includes a step of forming a resin layer precursor containing a compound having a siloxane bond on a support.

The method of forming the resin layer precursor containing a compound having a siloxane bond on the support is not particularly limited, but it is preferable to coat the surface with a composition including a material of the resin layer precursor containing a compound having a siloxane bond and an organic solvent. The coating method is not particularly limited and a known method can be used. For example, the coating can be appropriately performed according to a spin coating method, a dip coating method, or a bar coating method.

It is preferable that the composition including a material of the resin layer precursor containing a compound having a siloxane bond and an inorganic solvent is a curable composition. The method of irradiating a curable composition with radiation when the resin layer containing a compound having a siloxane bond is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy (radiation intensity) is preferably in a range of 10 to 2,000 mW/cm².

The integrated accumulate light quantity (integrated accumulate radiation energy amount) is preferably greater than 0.05 J/cm² (UV-A) from the viewpoint of improving the gel fraction of the gas separation membrane, more preferably greater than 0.1 J/cm² (UV-A), particularly preferably in a range of 0.1 to 60 J/cm² (UV-A), and more particularly preferably in a range of 0.1 to 5 J/cm² (UV-A).

It is preferable that the compound having a siloxane bond which is used for the material of the resin layer precursor containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane], and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

<Treatment of Resin Layer Precursor Containing Compound Having Siloxane Bond>

It is preferable that the method of producing a gas separation membrane of the present invention includes a step of performing a specific treatment (oxygen atom permeating treatment) of allowing oxygen atoms to permeate into the resin layer precursor (preferably from one surface side thereof) containing a compound having a siloxane bond and more preferable that the above-described specific treatment is performed until the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the O/Si ratio (B) that is a ratio of the number of oxygen atoms relative to the number of silicon atoms in the surface of the resin layer containing a compound having a siloxane bond satisfy the above-described Expression 1.

The method of performing the above-described specific treatment is not particularly limited, and examples thereof include a method of performing a plasma treatment from one surface side of the resin layer precursor containing a compound having a siloxane bond.

The method of producing a gas separation membrane of the present invention includes an oxygen atom permeating treatment step of allowing oxygen atoms to permeate into the resin layer precursor containing a compound having a siloxane bond, in which the oxygen atom permeating treatment step is a step for performing a plasma treatment using carrier gas having an oxygen flow rate of 10 cm³ (STP)/min or greater at an input power of 23 W or greater.

For example, a method of performing the plasma treatment under the following conditions for 5 to 30 seconds may be exemplified.

Plasma treatment conditions: oxygen flow rate of 10 cm³ (STP)/min or greater, argon flow rate of 100 cm³ (STP)/min, and input power (discharge output) of 23 W or greater.

From the viewpoints of improving the gas separation selectivity and the scratch resistance so that the separation selectivity is unlikely to be degraded, the plasma treatment is carried out preferably for 5 seconds or longer under the above-described conditions, particularly preferably 10 seconds or longer, and more particularly preferably 20 seconds or longer.

Meanwhile, it is preferable that the plasma treatment is performed for 1,000 seconds or shorter under the above-described conditions. Since the effects are sufficiently exhibited by performing the treatment for a short time in a case where the above-described specific treatment is a plasma treatment, applications of the plasma treatment to the production using a roll-to-roll system can be made. It is more preferable that the plasma treatment is performed for 40 seconds or shorter under the above-described conditions and particularly preferable that the plasma treatment is performed for 30 seconds or shorter.

Moreover, the integrated accumulate energy amount resulting from the plasma treatment amount is preferably in a range of 25 to 500,000 J/cm² and more preferably in a range of 2,500 to 100,000 J/cm².

As the plasma treatment applied to the present invention, an embodiment in which a workpiece is treated in a large vacuum chamber using a reduced-pressure plasma in order to generate a stabilized plasma is exemplified. Recently, an atmospheric pressure plasma treatment apparatus which is capable of performing a treatment in an atmospheric pressure atmosphere has been developed. Using the atmospheric pressure plasma treatment apparatus, gas is introduced into a process chamber and a high-density plasma can be stably generated in an atmospheric pressure atmosphere. As an example of the system configuration of the atmospheric pressure plasma treatment apparatus, a configuration formed of a gas mixing and controlling unit, a reactor, and a conveying conveyor (alternatively, an XY table) is exemplified. A configuration in which a treatment is carried out by blowing a plasma jet from a circular nozzle in a spot form has been suggested.

In regard to the plasma treatment conditions, the flow rate of argon is preferably in a range of 5 to 500 $cm^3$(STP)/min, more preferably in a range of 50 to 200 $cm^3$(STP)/min, and particularly preferably in a range of 80 to 120 $cm^3$(STP)/min. In the method of producing a gas separation membrane of the present invention, the flow rate of oxygen is 10 $cm^3$(STP)/min, preferably in a range of 10 to 100 $cm^3$(STP)/min, more preferably in a range of 15 to 100 $cm^3$(STP)/min, and particularly preferably in a range of 20 to 50 $cm^3$(STP)/min. The total pressure of gas or the partial pressure of $CO_2$ to be supplied to the gas separation membrane is not sufficiently high, and the flow rate of oxygen may be less than 45 $cm^3$(STP)/min in a case where the total pressure of gas is 5 MPa and the partial pressure of $CO_2$ is 0.65 MPa.

In regard to the plasma treatment conditions, the vacuum degree is preferably in a range of 0.6 Pa to 100 Pa, more preferably in a range of 1 to 60 Pa, and particularly preferably in a range of 2 to 40 Pa.

In regard to the plasma treatment conditions of the method of producing a gas separation membrane of the present invention, the input power (discharge power) is 23 W or greater, preferably in a range of 23 W to 1,000 W, more preferably in a range of 40 to 1,000 W, and particularly preferably in a range of 110 to 500 W.

A corona treatment can be used in place of the plasma treatment.

<Method of Additional Resin Layer>

The method of preparing the additional resin layer other than the resin layer containing a compound having a siloxane bond is not particularly limited, and the additional resin layer may be formed by obtaining a commercially available product of a known material, may be formed according to a known method, or may be formed according to a method described below using a specific resin.

The method of forming the additional resin layer other than the resin layer containing a compound having a siloxane bond is not particularly limited, but it is preferable that an underlayer (for example, a resin layer containing a compound having a siloxane bond) is coated with a composition including a material of the additional resin layer other than the resin layer containing a compound having a siloxane bond and an organic solution. The coating method is not particularly limited and the coating can be performed according to a known method, for example, a spin coating method.

The conditions for forming the additional resin layer other than the resin layer containing a compound having a siloxane bond of the gas separation membrane of the present invention are not particularly limited, but the temperature thereof is preferably in a range of −30° C. to 100° C., more preferably in a range of −10° C. to 80° C., and particularly preferably in a range of 5° C. to 50° C.

In the present invention, the air and a gas such as oxygen may coexist at the time of forming the additional resin layer other than the resin layer containing a compound having a siloxane bond, but it is desired that the additional resin layer is formed in an inert gas atmosphere.

<Formation of Protective Layer>

The method of producing a gas separation membrane of the present invention may include a step of forming a protective layer on the surface of the resin layer precursor containing a compound having a siloxane bond which is subjected to a surface treatment.

The method of forming a protective layer on the surface of the resin layer precursor containing a compound having a siloxane bond which is subjected to the surface treatment is not particularly limited, but it is preferable to coat the surface with a composition including a material of the protective layer and an organic solvent. Examples of the organic solvent include organic solvents used to form the resin layer containing a compound having a siloxane bond. The coating method is not particularly limited and a known method can be used. For example, the coating can be performed according to a spin coating method.

The method of irradiating a curable composition with radiation when the protective layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy is preferably 10 to 2,000 $mW/cm^2$.

<Method of Separating Gas Mixture>

Using the gas separation membrane of the present invention, it is possible to perform separation of a gas mixture.

In the method of separating a gas mixture used for the gas separation membrane of the present invention, the components of the gas mixture of raw materials are affected by the production area of the raw materials, the applications, or the use environment and are not particularly defined, but it is preferable that the main components of the gas mixture are carbon dioxide and methane, carbon dioxide and nitrogen, or carbon dioxide and hydrogen. That is, the proportion of carbon dioxide and methane or carbon dioxide and hydrogen in the gas mixture is preferably in a range of 5% to 50% and more preferably in a range of 10% to 40% in terms of the proportion of carbon dioxide. In a case where the gas mixture is present in the coexistence of an acidic gas such as carbon dioxide or hydrogen sulfide, the method of separating the gas mixture using the gas separation membrane of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the method of separating a gas mixture includes a process of allowing carbon dioxide to selectively permeate from mixed gas including carbon dioxide and methane. The pressure during gas separation is preferably in a range of 3 MPa to 10 MPa, more preferably in a range of 4 MPa to 7 MPa, and particularly preferably in a range of 5 MPa to 7 MPa. Further, the temperature during gas separation is preferably in a range of −30° C. to 90° C. and more preferably in a range of 15° C. to 70° C.

[Gas Separation Membrane Module and Gas Separator]

A gas separation membrane module of the present invention includes the gas separation membrane of the present invention.

It is preferable that the gas separation membrane of the present invention is used for a thin film composite obtained by combining with a porous support and also preferable that the gas separation membrane is used for a gas separation membrane module using this thin film composite. Further, using the gas separation membrane, the thin film composite, or the gas separation membrane module of the present invention, a gas separator having means for performing separation and recovery of gas or performing separation and purification of gas can be obtained. The gas separation membrane of the present invention can be made into a module and suitably used. Examples of the module include a spiral type module, a hollow fiber type module, a pleated module, a tubular module, and a plate & frame type module. The gas separation membrane of the present invention may be applied to a gas separation and recovery apparatus which is used together with an absorption liquid described in JP2007-297605A according to a membrane/absorption hybrid method.

Second Embodiment

Next, the second embodiment that satisfies Condition 2 will be described.

[Gas Separation Membrane]

A gas separation membrane of the present invention is a gas separation membrane which includes a porous support A; and a resin layer containing a compound having a siloxane bond positioned on the porous support A, in which the compound having a siloxane bond includes at least a repeating unit represented by the following Formula (2) or a repeating unit represented by the following Formula (3), the resin layer containing a compound having a siloxane bond includes a region GLi present in the porous support B and a region GLe present on the porous support B, the thickness of GLe is in a range of 50 to 1,000 nm, the thickness of GLi is 20 nm or greater and the thickness of GLe is in a range of 10% to 350%, and a difference between the content of the repeating unit represented by Formula (3) in 20 nm of the GLe surface layer and the content of the repeating unit represented by Formula (3) in 20 nm of the GLi surface layer is in a range of 30% to 90%,

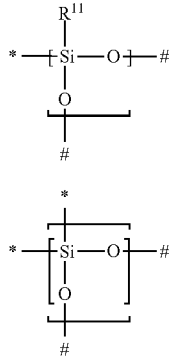

Formula (2)

Formula (3)

in Formulae (2) and (3), $R^{11}$ represents a substituent, the symbol "*" represents a binding site with respect to # in Formula (2) or (3), and the symbol "#" represents a binding site with respect to * in Formula (2) or (3).

With such a configuration, at least one of gas permeability and gas separation selectivity of the gas separation membrane of the present invention is high under high pressure and bending resistance is excellent.

When the difference between the content of the repeating unit represented by Formula (3) in 20 nm of the GLe surface layer and the content of the repeating unit represented by Formula (3) in 20 nm of the GLi surface layer is in a range of 30% to 90%, oxygen atoms permeate into the inside of the resin layer (this resin layer containing a compound having a siloxane bond functions as a layer having high gas separation selectivity, that is, so-called separation selectivity) containing a compound having a siloxane bond in the thickness direction. When a corona treatment or a plasma treatment that is only used to modify the surface and improve the adhesiveness is carried out, oxygen atoms do not sufficiently enter the resin layer containing a compound having a siloxane bond at a depth of 20 nm from the surface thereof as the gas separation selectivity is higher. The surface of the resin layer containing a compound having a siloxane bond is modified so that a large amount of oxygen atoms enter the resin layer as the difference between the content of the repeating unit represented by Formula (3) in 20 nm of the GLe surface layer and the content of the repeating unit represented by Formula (3) in 20 nm of the GLi surface layer is higher. In the present invention, it is possible to obtain a gas separation membrane in which at least one of gas permeability and gas separation selectivity is high under high pressure. It is not intended to adhere to any theory, but it is considered that the separation selectivity is exhibited by the oxygen atoms entering not only the surface of the resin layer containing a compound having a siloxane bond but also the inside of the resin layer in the thickness direction.

A layer having separation selectivity indicates a layer in which a ratio ($PCO_2/PCH_4$) of a permeability coefficient ($PCO_2$) of carbon dioxide to a permeability coefficient ($PCH_4$) of methane, when a membrane having a thickness of 0.1 to 30 μm is formed and pure gas of carbon dioxide ($CO_2$) and methane ($CH_4$) is supplied to the obtained membrane at a temperature of 40° C. by setting the total pressure of the gas supply side to 0.5 MPa or greater, is 1.5 or greater.

In the related art, a layer containing a polyimide compound has been frequently used as the layer having separation selectivity of a gas separation membrane, and the configuration of the gas separation membrane of the present invention in which at least one of the gas permeability and the gas separation selectivity is high under high pressure without having the layer containing a polyimide compound by means of having a resin layer containing a compound having a siloxane bond, to which an oxygen atom permeating treatment is applied is not known conventionally.

Here, the gas permeability and the gas separation selectivity of the gas separation membrane are typically in a trade-off relationship. That is, in the gas separation membrane, there is a tendency that the gas separation selectivity is decreased when the gas permeability is increased and the gas separation selectivity is increased when the gas permeability is decreased. Accordingly, it is difficult to increase both of the gas permeability and the gas separation selectivity in a case of a gas separation membrane of the related art. Meanwhile, it is possible to increase both of the gas permeability and the gas separation selectivity in a case of the gas separation membrane of the present invention.

This is because the gas separation membrane of the present invention includes a resin layer 3 containing a compound having a siloxane bond which has a structure to which oxygen atoms are introduced with a gradation from the surface as illustrated in FIG. 6B. The portion to which oxygen atoms are introduced is formed with holes due to the siloxane bond. Because of introduction of oxygen atoms, thermal motion of a polymer is reduced. Therefore, holes which are capable of selective permeation of a large amount of gas are generated. Accordingly, high gas separation selectivity can be obtained unlike the resin layer (polydimethylsiloxane film 11 which is not subjected to an oxygen atom permeating treatment step as illustrated in FIG. 6A) containing a compound having a siloxane bond before the surface is treated.

A polydimethylsiloxane film to which oxygen atoms are uniformly introduced in the film thickness direction as illustrated in FIG. 6C can be prepared using a chemical vapor deposition (CVD) method or the like without a gradation having oxygen atoms being introduced in the film thickness direction. When such a film is compared to the resin layer 3 containing a compound having a siloxane bond of the gas separation membrane of the present invention, the portion to which oxygen atoms are densely introduced in the resin layer 3 containing a compound having a siloxane bond of the gas separation membrane of the present invention is thinner than a polydimethylsiloxane film 12 to which oxygen atoms are uniformly introduced in the film thickness direction. It is difficult for the polydimethylsiloxane film to which oxygen atoms are uniformly introduced in the film thickness direction to be made thin similar to the thickness of the portion to which oxygen atoms are densely introduced in the resin layer 3 containing a compound having a siloxane bond of the gas separation membrane of the present invention. Therefore, extremely high gas permeability and gas separation selectivity can be achieved by the present invention.

Further, the gas separation membrane of the present invention can be designed such that the gas permeability is greatly increased and the gas separation selectivity is decreased. In addition, the gas separation membrane of the present invention can be also designed such that the gas permeability is decreased and the gas separation selectivity is greatly increased. Even in these cases, the gas separation selectivity of the gas separation membrane of the present invention is higher than that of a gas separation membrane of the related art when the gas separation membrane is designed to have performance of gas permeability similar to the performance of gas permeability of the gas separation membrane of the related art and the gas permeability of the gas separation membrane of the present invention is higher than that of the gas separation membrane of the related art when the gas separation membrane is designed to have performance of gas separation selectivity similar to the performance of gas separation selectivity of the gas separation membrane of the related art.

When the gas separation membrane of the present invention includes a region GLi present in the porous support B and a region GLe present on the porous support B, the thickness of GLe is in a range of 50 to 1,000 nm, the thickness of GLi is 20 nm or greater, and the thickness of GLe is in a range of 10% to 350%, a part of the porous support and the resin layer containing a compound having a siloxane bond are integrated with each other and the bending resistance becomes excellent.

Hereinafter, preferred embodiments of the gas separation membrane of the present invention will be described.

<Configuration>

It is preferable that the gas separation membrane of the present invention is a thin film composite (also referred to as a gas separation composite membrane) or an asymmetric membrane or is formed of hollow fibers. Among these, a thin film composite is more preferable.

Hereinafter, a case where the gas separation membrane is a thin film composite is occasionally described as a typical example, but the gas separation membrane of the present invention is not limited by the thin film composite.

Figure 7:
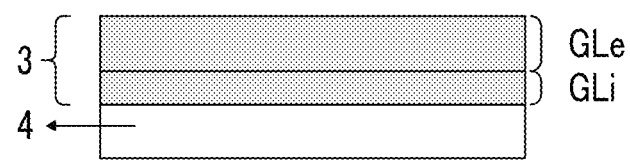
FIG. 7 is a schematic view illustrating still another example of the gas separation membrane of the present invention.

A preferred configuration of the gas separation membrane of the present invention will be described with reference to the accompanying drawings. An example of a gas separation membrane 10 of the present invention illustrated in FIG. 1 is a gas separation membrane which is a thin film composite and includes a porous support A (reference numeral 4) and a resin layer 3 containing a compound having a siloxane bond. In the gas separation membrane of the present invention as illustrated in FIG. 7, the resin layer containing a compound having a siloxane bond includes the region GLi present in the porous support B and the region GLe present on the porous support B.

Another example of the gas separation membrane 10 of the present invention which is illustrated in FIG. 2 further includes a layer (an additional resin layer described below) 1 containing a polyimide compound on a side opposite to the porous support A (reference numeral 4) of the resin layer 3 containing a compound having a siloxane bond in addition to the porous support A (reference numeral 4) and the resin layer 3 containing a compound having a siloxane bond.

The gas separation membrane of the present invention may have only one or two or more resin layers containing a compound having a siloxane bond. The gas separation membrane of the present invention has preferably one to five resin layers containing a compound having a siloxane bond, more preferably one to three resin layers, particularly preferably one or two layers, and more particularly preferably only one resin layer from the viewpoint of production cost. Another example of the gas separation membrane 10 of the present invention illustrated in FIG. 3 has two resin layers 3 containing a compound having a siloxane bond.

The expression "on the support" in the present specification means that another layer may be interposed between the support and a layer having separation selectivity. Further, in regard to the expressions related to up and down, the direction in which a gas to be separated is supplied to is set as "up" and the direction in which the separated gas is discharged is set as "down" as illustrated in FIG. 1 unless otherwise specified.

In FIG. 4, in a case where the depth d is 10 nm, the surface parallel with the "surface 6 of the resin layer containing a compound having a siloxane bond" at a depth 10 nm (in the direction of the porous support A) from the surface of the resin layer 3 containing a compound having a siloxane bond is a "surface of a resin layer containing a compound having a siloxane bond at a depth of 10 nm (in the direction of the porous support A) from the surface of the resin layer containing a compound having a siloxane bond" which is represented by the reference numeral 7.

<Porous Support A>

The gas separation membrane of the present invention includes the porous support A and the resin layer containing a compound having a siloxane bond positioned on the porous support A. Since the gas permeability can be sufficiently secured, it is preferable that the porous support A is thin and is formed of a porous material.

In the gas separation membrane of the present invention, the resin layer containing a compound having a siloxane bond includes the region GLi present in the porous support B and the region GLe present on the porous support B. That is, the thin film composite is obtained by forming and disposing the resin layer 3 containing a compound having a siloxane bond in (inside) or on (on the surface) the porous support. When the resin layer 3 containing a compound having a siloxane bond is formed on the surface of the porous support, the resin layer permeates into a part of the porous support so that the part of the porous support is filled with the compound having a siloxane bond. As the result, the porous support A that is not filled with the resin layer containing a compound having a siloxane bond, the above-described GLi in which a part of the resin layer containing a compound having a siloxane bond is present in the porous support B, and the above-described GLe in which the remaining resin layer containing a compound having a siloxane bond is present on the porous support B are formed and thus a gas separation membrane with an advantage of having high separation selectivity, high gas permeability, and bending resistance at the same time can be obtained.

In a case where the gas separation membrane of the present invention is a thin film composite, it is preferable that the thin film composite is formed by coating (the term "coating" in the present specification includes a form made by a coating material being adhered to a surface through immersion) the surface of the porous support with a coating solution (dope) that forms the resin layer 3 containing a compound having a siloxane bond. Specifically, it is preferable that the porous support A has a porous layer on the side of the resin layer 3 containing a compound having a siloxane bond and more preferable that the support is a laminate formed of non-woven fabric and a porous layer disposed on the side of the resin layer 3 containing a compound having a siloxane bond.

The material of the porous layer which is preferably applied to the porous support A is not particularly limited and may be an organic or inorganic material as long as the material satisfies the purpose of providing mechanical strength and high gas permeability. A porous membrane of an organic polymer is preferable, and the thickness thereof is in a range of 1 µm to 3,000 µm, preferably in a range of 5 µm to 500 µm, and more preferably in a range of 5 µm to 150 µm. In regard to the pore structure of the porous layer, the average pore diameter is typically 10 µm or less, preferably 0.5 µm or less, and more preferably 0.2 µm or less. The porosity is preferably in a range of 20% to 90% and more preferably in a range of 30% to 80%. Further, the molecular weight cut-off of the porous layer is preferably 100,000 or less. Moreover, the gas permeability is preferably $3 \times 10^{-5}$ cm$^3$ (STP: STP is an abbreviation for standard temperature and pressure)/cm$^2$·cm·sec·cmHg (30 GPU: GPU is an abbreviation for gas permeation unit) or greater in terms of the permeation rate of carbon dioxide. Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous layer, any of a flat shape, a spiral shape, a tubular shape, and a hallow fiber shape can be employed.

In the thin film composite, it is preferable that woven fabric, non-woven fabric, or a net used to provide mechanical strength is provided in the lower portion of the porous layer disposed on the side of the resin layer 3 containing a compound having a siloxane bond. In terms of film forming properties and the cost, non-woven fabric is suitably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer Containing Compound Having Siloxane Bond>

The gas separation membrane of the present invention includes a resin layer containing a compound having a siloxane bond.

In the gas separation membrane of the present invention, the resin layer containing a compound having a siloxane bond includes a region GLi present in the porous support B and a region GLe present on the porous support B, the thickness of GLe is in a range of 50 to 1,000 nm, the thickness of GLi is 20 nm or greater and the thickness of GLe is in a range of 10% to 350%, and a difference between the content of the repeating unit represented by Formula (3) in 20 nm of the GLe surface layer and the content of the repeating unit represented by Formula (3) in 20 nm of the GLi surface layer is in a range of 30% to 90%, (Characteristics)

In the gas separation membrane of the present invention, the thickness of GLe is in a range of 50 to 1,000 nm, preferably in a range of 200 to 900 nm, and more preferably in a range of 300 to 800 nm. When the thickness of GLe is greater than or equal to the lower limit thereof, an action for relaxing the stress with respect to bending is improved so that bending resistance with respect to a region with a large amount of silica components (content of a repeating unit represented by Formula (3) is high) formed in the upper portion (region on a side opposite to the porous support A) of the inside of the resin layer containing a compound having a siloxane bond is improved. When the thickness of GLe is lower than or equal to the upper limit thereof, the gas separation performance is improved without inhibiting the gas permeability.

In the gas separation membrane of the present invention, the thickness of GLi is 20 nm or greater, and the absolute value of the thickness of GLi can be set to be in an arbitrary range unless this does not depart from the scope of the present invention.

In the gas separation membrane of the present invention, the thickness of GLi (ratio of the thickness of GLi [to the thickness of GLe %]) is in a range of 10% to 350%, preferably in a range of 20% to 90%, more preferably in a range of 20% to 60%, and particularly preferably in a range of 21.2% to 60%. When the ratio of the thickness of GLi [to the thickness of GLe %] is greater than or equal to the lower limit, adhesiveness to the porous support A is improved and thus bending resistance with respect to a region with a large amount of silica components (content of a repeating unit represented by Formula (3) is high) formed in the upper portion (region on a side opposite to the porous support A) of the inside of the resin layer containing a compound having a siloxane bond is improved. When the ratio of the thickness of GLi [to the thickness of GLe %] is lower than or equal to the upper limit, that is, when the permeation ratio of GLi becomes small to some extent, the gas separation performance is improved without inhibiting the gas permeability.

In the gas separation membrane of the present invention, a difference between the content of the repeating unit represented by Formula (3) in 20 nm of the GLe surface layer and the content of the repeating unit represented by Formula (3) in 20 nm of the GLi surface layer is in a range of 30% to 90% and preferably in a range of 40% to 90% from the viewpoint of being resistance. When the difference between the content of the repeating unit represented by Formula (3) in 20 nm of the GLe surface layer and the content of the repeating unit represented by Formula (3) in 20 nm of the GLi surface layer is greater than or equal to the lower limit thereof, desired selectivity related to gas permeability is obtained. When the difference between the content of the repeating unit represented by Formula (3) in 20 nm of the GLe surface layer and the content of the repeating unit represented by Formula (3) in 20 nm of the GLi surface layer is lower than or equal to the upper limit, a difference in stress between the surface of GLe and the surface of GLi with respect to bending is sufficiently relaxed by the resin layer containing a compound having a siloxane bond present therebetween and thus the bending resistance is improved.

In the gas separation membrane, the content of the repeating unit represented by Formula (3) in 20 nm of the GLe surface layer is preferably in a range of 30% to 95%, more preferably in a range of 40% to 95%, and particularly preferably in a range of 45% to 90%.

In the gas separation membrane, the content of the repeating unit represented by Formula (3) in 20 nm of the GLi surface layer is preferably in a range of 1% to 10%, more preferably in a range of 3% to 8%, and particularly preferably in a range of 4% to 6%.

In the gas separation membrane of the present invention, the film thickness (same as the thickness) of the resin layer containing a compound having a siloxane bond is not particularly limited, but the film thickness of the resin layer containing a compound having a siloxane bond is preferably 0.1 µm or greater from the viewpoint that film formation is easily carried out, more preferably in a range of 0.1 to 5 µm, particularly preferably in a range of 0.1 to 4 µm, and more particularly preferably in a range of 0.3 to 3 µm.

In the gas separation membrane having the resin layer containing a compound having a siloxane bond on the porous support A, the thickness of each layer is unlikely to be evaluated by SEM including a case where a plurality of other layers are present. Here, GLe and GLi in the present invention are confirmed by performing analysis in the depth direction of TOF-SIMS. In regard to the profile in the depth direction, an area in which the peak intensity of peaks continuously present from a peak position with the maximum intensity with respect to the maximum intensity of the peak intensity derived from silicon is 90% or greater is defined as GLe, an area in which the peak intensity of peaks continuously present from a peak position with the maximum intensity with respect to the maximum intensity of the peak intensity derived from silicon is 20% or greater and less than 90% is defined as GLi, and an area in which the peak intensity of peaks continuously present from a peak position with the maximum intensity with respect to the maximum intensity of the peak intensity derived from silicon is less than 20% is set to the porous support A.

The film thickness of the resin layer containing a compound having a siloxane bond can be controlled by adjusting the coating amount of the curable composition.

(Surface of Resin Layer Containing Compound Having Siloxane Bond)

The O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the O/Si ratio (B) that is a ratio of the number of oxygen atoms relative to the number of silicon atoms in the surface of the resin layer containing a compound having a siloxane bond are calculated using electron spectroscopy for chemical analysis (ESCA). Further, the carbon/silicon ratio that is a ratio of the number of carbon atoms relative to the number of silicon atoms in the surface of the resin layer containing a compound having a siloxane bond are calculated in the same manner as described above.

The O/Si ratio (B) that is a ratio of the number of oxygen atoms relative to the number of silicon atoms in the surface of the resin layer containing a compound having a siloxane bond is calculated by putting the porous support on which the resin layer containing a compound having a siloxane bond is formed into Quantera SXM (manufactured by Physical Electronics, Inc.) under conditions of using Al-Kα rays (1,490 eV, 25 W, diameter of 100 µm) as an X-ray source with Pass Energy of 55 eV and Step of 0.05 eV in a measuring region having a size of 300 µm×300 µm.

Next, in order to acquire the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond, etching is performed using $C_{60}$ ions.

Specifically, the ion beam intensity is set to $C_{60}^+$ of 10 keV and 10 nA and a region having a size of 2 mm×2 mm is etched by 10 nm using a $C_{60}$ ion gun belonging to Quantera SXM (manufactured by Physical Electronics, Inc.). With this membrane, the O/Si ratio (A) that is a ratio of the number of oxygen atoms relative to the number of silicon atoms in the surface of the resin layer containing a compound having a siloxane bond is calculated using an ESCA device. The depth of the resin layer containing a compound having a siloxane bond from the surface of the resin layer containing a compound having a siloxane bond is calculated at an etching rate of 10 nm/min of the material of the resin layer containing a compound having a siloxane bond. As this value, an optimum numerical value is appropriately used depending on the material.

In the present specification, the surface of the resin layer containing a compound having a siloxane bond is a surface which has a maximum O/Si ratio in a case where the O/Si ratio is measured from the surface (preferably a surface on a side opposite to the porous support A) of the gas separation membrane and contains 3% (atomic %) or greater of silicon atoms.

In a case where the surface of the resin layer containing a compound having a siloxane bond does not have another layer, the O/Si ratio is the maximum in a case where the O/Si ratio is measured from the surface of the gas separation membrane using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond, and the surface having 3% (atomic %) or greater of silicon atoms is specified.

As the result, according to the above-described method, it is confirmed that the surface of the resin layer containing a compound having a siloxane bond in a state in which the resin layer containing a compound having a siloxane bond is formed on the porous support A (in a state without another layer (for example, a layer containing polyimide)) is a "surface which has a maximum O/Si ratio in a case where the O/Si ratio is measured from the surface of the gas separation membrane and contains 3% (atomic %) or greater of silicon atoms".

In a case where the surface of the resin layer containing a compound having a siloxane bond has another layer (for example, a layer containing polyimide), the surface of the resin layer containing a compound having a siloxane bond (that is, the surface which has the maximum O/Si ratio in a case where the O/Si ratio is measured from the surface of the gas separation membrane and contains 3% (atomic %) or greater of silicon atoms) is acquired using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond.

As the result, according to the above-described method, the surface of the resin layer containing a compound having a siloxane bond in a state in which the resin layer containing a compound having a siloxane bond is formed on the porous support A (in a state without another layer (for example, a layer containing polyimide)) is the "surface which has a maximum O/Si ratio in a case where the O/Si ratio is measured from the surface of the gas separation membrane and contains 3% (atomic %) or greater of silicon atoms". Specifically, the "surface of the resin layer containing a compound having a siloxane bond in a state in which the resin layer containing a compound having a siloxane bond is formed on the porous support A (in a state without another layer (for example, a layer containing polyimide))" is the "surface which has a maximum O/Si ratio in a case where the O/Si ratio is measured from the surface of the gas separation membrane and contains 3% (atomic %) or greater of silicon atoms".

In the gas separation membrane, the resin layer containing a compound having a siloxane bond which satisfies the above-described expression is present in the plane of the gas separation membrane by preferably 50% or greater, more preferably 70% or greater, and particularly preferably 90% or greater.

Another region other than the resin layer containing a compound having a siloxane bond which satisfies the above-described expression may be present in the plane of the gas separation membrane. Examples of another region include a region for which an adhesive or a pressure sensitive adhesive is provided and a region in which the resin layer containing a compound having a siloxane bond is not sufficiently subjected to a specific treatment (preferably an oxygen atom permeating treatment).

The resin layer containing a compound having a siloxane bond contains a compound having a siloxane bond. The compound having a siloxane bond may be a "compound which includes a repeating unit having at least silicon atoms, oxygen atom, and carbon atoms". Further, the compound having a siloxane bond may be a "compound having a siloxane bond and a repeating unit", and a compound having a polysiloxane bond is preferable.

(Material)

In the gas separation membrane of the present invention, the compound having a siloxane bond includes at least a repeating unit represented by the following Formula (2) or a repeating unit represented by the following Formula (3).

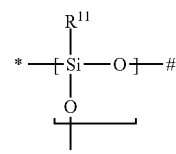

Formula (2)

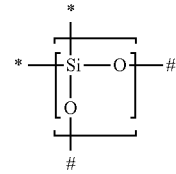

Formula (3)

In Formulae (2) and (3), $R^{11}$ represents a substituent, the symbol "*" represents a binding site with respect to # in Formula (2) or (3), and the symbol "#" represents a binding site with respect to * in Formula (2) or (3).

$R^{11}$ in Formula (2) represents preferably a hydroxyl group, an alkyl group having 1 or more carbon atoms, an aryl group, an amino group, an epoxy group, or a carboxyl group, more preferably a hydroxyl group, an alkyl group having 1 or more carbon atoms, an amino group, an epoxy group, or a carboxyl group, and still more preferably a hydroxyl group, an alkyl group having 1 or more carbon atoms, an epoxy group, or a carboxyl group.

The hydroxyl group or the carboxyl group represented by $R^{11}$ in Formula (2) may form an arbitrary salt.

In Formulae (2) and (3), the symbol "*" represents a binding site with respect to # in Formula (2) or (3) and the symbol "#" represents a binding site with respect to "*" in Formula (2) or (3). Further, the symbol "*" may be a binding site with respect to an oxygen atom in the following Formula (1) and the symbol "#" may be a binding site with respect to a silicon atom in the following Formula (1).

In the gas separation membrane of the present invention, it is preferable that the compound having a siloxane bond includes a repeating unit represented by the following Formula (1).

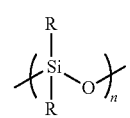

Formula (1)

In Formula (1), R's each independently represent a hydrogen atom, an alkyl group having 1 or more carbon atoms, an aryl group, an amino group, an epoxy group, a fluorinated alkyl group, a vinyl group, an alkoxy group, or a carboxyl group, and n represents an integer of 2 or greater.

In a case where a resin layer containing a compound having a siloxane bond is formed using such a compound having a siloxane bond as the material of the resin layer containing a compound having a siloxane bond, it is possible to exhibit high gas permeability and gas separation selectivity under high pressure.

Further, in the case where a resin layer containing a compound having a siloxane bond is formed using such a compound having a siloxane bond as the material of the resin layer containing a compound having a siloxane bond, it is not intended to adhere to any theory, but it is considered that high gas permeability and gas separation selectivity are exhibited under high pressure because oxygen atoms enter not only the surface of the resin layer containing a compound having a siloxane bond but also the inside of the resin layer in the thickness direction so as to be the composition of SiOx. Particularly, even in a case where polydimethylsiloxane that is known to have high gas permeability is used, a resin layer containing a compound having a siloxane bond is formed using dimethylsiloxane, it is possible to exhibit high gas permeability and gas separation selectivity under high pressure. In the surface of the resin layer containing a compound having a siloxane bond and the inside of the resin layer containing a compound having a siloxane bond in the thickness direction after oxygen atoms enter not only the surface of the resin layer containing a compound having a siloxane bond but also the inside of the resin layer in the thickness direction, the compound having a siloxane bond includes at least a repeating unit represented by Formula (2) or a repeating unit represented by Formula (3).

In Formula (1), R's each independently represent preferably an alkyl group having 1 or more carbon atoms, an aryl group, an amino group, an epoxy group, or a carboxyl group, more preferably an alkyl group having 1 or more carbon atoms, an amino group, an epoxy group, or a carboxyl group, and particularly preferably an alkyl group having 1 or more carbon atoms, an epoxy group, or a carboxyl group.

The alkyl group having 1 or more carbon atoms which is represented by R in Formula (1) is preferably an alkyl group having 1 to 10 carbon atoms, more preferably a methyl group, an ethyl group, or a propyl group, and particularly preferably a methyl group. The alkyl group having 1 or more carbon atoms which is represented by R may be linear, branched, or cyclic.

The aryl group represented by R in Formula (1) is preferably an aryl group having 6 to 20 carbon atoms and particularly preferably a phenyl group.

The fluorinated alkyl group represented by R in Formula (1) is preferably a fluorinated alkyl group having 1 to 10 carbon atoms, more preferably a fluorinated alkyl group having 1 to 3 carbon atoms, and particularly preferably a trifluoromethyl group. The fluorinated alkyl group represented by R may be linear, branched, or cyclic.

The alkoxy group represented by R in Formula (1) is preferably an alkoxy group having 1 to 10 carbon atoms, more preferably a methoxy group, an ethoxy group, or a propyloxy group, and particularly preferably a methoxy group. The alkoxy group having 1 or more carbon atoms which is represented by R may be linear, branched, or cyclic.

In Formula (1), n represents an integer of 2 or greater, preferably in a range of 40 to 800, more preferably in a range of 50 to 700, and particularly preferably in a range of 60 to 500.

The compound having a siloxane bond which has a repeating unit represented by Formula (1) may include an arbitrary substituent other than the repeating unit represented by Formula (1) in the terminal of a molecule. Examples and preferable ranges of the substituent which the terminal of a molecule of the compound having a siloxane bond which includes a repeating unit represented by Formula (1) may have are the same as the examples and preferable ranges of R in Formula (1).

In the gas separation membrane of the present invention, it is preferable that the surface of the resin layer containing a compound having a siloxane bond contains a compound having a siloxane bond which includes a repeating unit represented by Formula (1) and at least a repeating unit represented by Formula (2) or a repeating unit represented by Formula (3).

In the gas separation membrane of the present invention, the ratio of the repeating unit represented by Formula (3) to the repeating unit represented by Formula (2) and the repeating unit represented by Formula (1) in the compound having a siloxane bond contained in the surface of the resin layer containing a compound having a siloxane bond is preferably in a range of 100% to 600% by mole, more preferably in a range of 200% to 600% by mole, and particularly preferably in a range of 300% to 600% by mole.

In the gas separation membrane of the present invention, it is preferable that the resin layer containing a compound having a siloxane bond at a depth of 20 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 20 nm from the surface of the resin layer containing a compound having a siloxane bond is preferably in a range of 3.0% to 500% by mole, more preferably in a range of 3.5% to 450% by mole, and particularly preferably in a range of 4.0% to 400% by mole.

It is preferable that the compound having a siloxane bond used for the resin layer containing a compound having a siloxane bond has a functional group which can be polymerized. Examples of such a functional group include an epoxy group, an oxetane group, a carboxyl group, an amino group, a hydroxyl group, and a thiol group. It is more preferable that the resin layer containing a compound having a siloxane bond includes an epoxy group, an oxetane group, a carboxyl group, and a compound having a siloxane bond which includes two or more groups among these groups. It is preferable that such a resin layer containing a compound having a siloxane bond is formed by being cured by irradiating a radiation-curable composition on the support with radiation.

The compound having a siloxane bond which is used for the resin layer containing a compound having a siloxane bond may be polymerizable dialkylsiloxane formed from a partially cross-linked radiation-curable composition having a dialkylsiloxane group. Polymerizable dialkylsiloxane is a monomer having a dialkylsiloxane group, a polymerizable oligomer having a dialkylsiloxane group, or a polymer having a dialkylsiloxane group. As the dialkylsiloxane group, a group represented by $-\{O-Si(CH_3)_2\}_{n2}-$ ($n2$ represents a number of 1 to 100) can be exemplified. A poly(dialkylsiloxane) compound having a vinyl group at the terminal can be preferably used.

It is preferable that the compound having a siloxane bond which is used for the material of the resin layer containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane], and poly(1-trimethylsilyl-1-propyne) (hereinafter, also referred to as PTMSP), more preferable that the compound contains polydimethylsiloxane or poly(1-trimethylsilyl-1-propyne), and particularly preferable that the compound contains polydimethylsiloxane.

Commercially available materials can be used as the compound having a siloxane bond which is used for the material of the resin layer containing a compound having a siloxane bond and preferred examples of the compound having a siloxane bond which is used for the resin layer containing a compound having a siloxane bond include UV9300 (polydimethylsiloxane (PDMS), manufactured by Momentive Performance Materials Inc.) and X-22-162C (manufactured by Shin-Etsu Chemical Co., Ltd.).

UV9380C (bis(4-dodecylphenyl)iodonium hexafluoroantimonate, manufactured by Momentive Performance Materials Inc.) can be preferably used as other materials of the resin layer containing a compound having a siloxane bond.

The material of the resin layer containing a compound having a siloxane bond can be prepared as a composition including an organic solvent when the resin layer containing a compound having a siloxane bond is formed, and it is preferable that the material thereof is a curable composition. The organic solvent which can be used when the resin layer containing the compound having a siloxane bond is formed is not particularly limited, and examples thereof include n-heptane.

<Additional Resin Layer>

The gas separation membrane of the present invention may contain an additional resin layer other than the resin layer containing a compound having a siloxane bond (hereinafter, the additional resin layer will be described).

Examples of the resin contained in the additional resin layer are described below, but are not limited thereto. Specifically, the compound having a siloxane bond, polyimides, polyamides, celluloses, polyethylene glycols, and polybenzoxazoles are preferable and at least one selected from the compound having a siloxane bond, polyimide, polybenzoxazole, and acetic acid cellulose is more preferable. It is particularly preferable that the gas separation membrane of the present invention includes the resin layer containing a compound having a siloxane bond and further includes a layer containing a polyimide compound as the additional resin layer.

Polyimide having a reactive group is preferable as the polyimide compound.

Hereinafter, a case where the resin of the additional resin layer is polyimide having a reactive group will be described as a typical example, but the present invention is not limited to the case where a polymer having a reactive group is polyimide having a reactive group.

The polyimide having a reactive group which can be used in the present invention will be described below in detail.

According to the present invention, in a polyimide compound having a reactive group, it is preferable that a polymer having a reactive group includes a polyimide unit and a repeating unit having a reactive group (preferably a nucleophilic reactive group and more preferably a carboxyl group, an amino group, or a hydroxyl group) on the side chain thereof.

More specifically, it is preferable that the polymer having a reactive group includes at least one repeating unit represented by the following Formula (I) and at least one repeating unit represented by the following Formula (III-a) or (III-b).

Further, it is more preferable that the polymer having a reactive group includes at least one repeating unit represented by the following Formula (I), at least one repeating unit represented by the following Formula (II-a) or (II-b), and at least one repeating unit represented by the following Formula (III-a) or (III-b).

The polyimide having a reactive group which can be used in the present invention may include repeating units other than the respective repeating units described above, and the number of moles thereof is preferably 20 or less and more preferably in a range of 0 to 10 when the total number of moles of the respective repeating units represented by each of Formulae is set to 100. It is particularly preferable that the polyimide having a reactive group which can be used in the present invention is formed of only the respective repeating units represented by each of the following formulae.

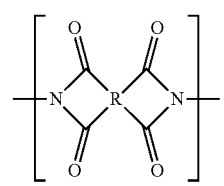

Formula (I)

In Formula (I), R represents a group having a structure represented by any of the following Formulae (I-a) to (I-h). In the following Formulae (I-a) to (I-h), the symbol "*" represents a binding site with respect to a carbonyl group of Formula (I). R in Formula (I) is occasionally referred to as a mother nucleus, and it is preferable that this mother nucleus R is a group represented by Formula (I-a), (I-b), or (I-d), more preferable that this mother nucleus R is a group represented by Formula (I-a) or (I-d), and particularly preferable that this mother nucleus R is a group represented by Formula (I-a).

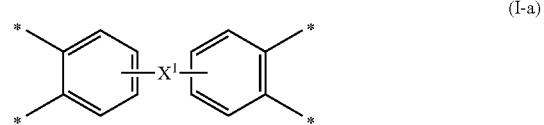

(I-a)

(I-b)

(I-c)

(I-d)

(I-e)

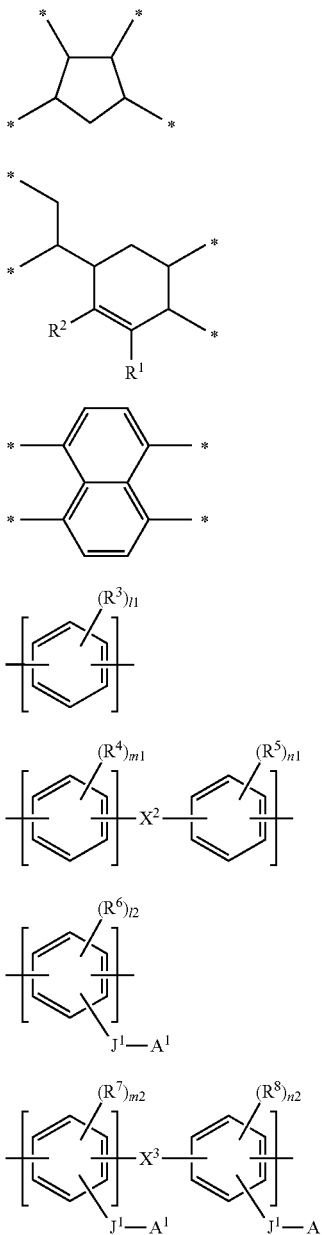

(I-f)

(I-g)

(I-h)

Formula (II-a)

Formula (II-b)

Formula (III-a)

Formula (III-b)

$X^1$, $X^2$, and $X^3$ $X^1$, $X^2$, and $X^3$ represent a single bond or a divalent linking group. As the divalent linking groups of these, —C($R^x$)$_2$— ($R^x$ represents a hydrogen atom or a substituent group. In a case where $R^x$ represents a substituent group, $R^x$'s may be linked to each other and form a ring), —O—, —SO$_2$—, —C(=O)—, —S—, —NR$^Y$— ($R^Y$ represents a hydrogen atom, an alkyl group (preferably a methyl group or an ethyl group), or an aryl group (preferably a phenyl group)), or a combination of these is preferable and a single bond or —C($R^x$)$_2$— is more preferable. When $R^x$ represents a substituent group, a group Z of substituent groups described below is specifically exemplified. Among these, an alkyl group is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and then a cyclic structure may be formed or condensation may be made and then a condensed ring structure may be formed.

L

L represents —CH$_2$=CH$_2$— or —CH$_2$— and —CH$_2$=CH$_2$— is preferable.

$R^1$ and $R^2$ $R^1$ and $R^2$ represent a hydrogen atom or a substituent group. As the substituent group, any one selected from the group Z of substituent groups described below can be used. $R^1$ and $R^2$ may be bonded to each other and form a ring.

$R^1$ and $R^2$ represent preferably a hydrogen atom or an alkyl group, more preferably a hydrogen atom, a methyl group, or an ethyl group, and still more preferably a hydrogen atom.

$R^3$ $R^3$ represents an alkyl group or a halogen atom. The preferable ranges of the alkyl group and the halogen atom are the same as those of an alkyl group and a halogen atom defined in the group Z of substituent groups described below. l1 showing the number of $R^3$'s represents an integer of 0 to 4, is preferably in a range of 1 to 4, and is more preferably 3 or 4. It is preferable that $R^3$ represents an alkyl group and more preferable that $R^3$ represents a methyl group or an ethyl group.

$R^4$ and $R^5$ $R^4$ and $R^5$ represent an alkyl group or a halogen atom or a group in which $R^4$ and $R^5$ are linked to each other and form a ring together with $X^2$. The preferable ranges of the alkyl group and the halogen atom are the same as those of an alkyl group and a halogen atom defined in the group Z of substituent groups described below. The structure formed by $R^4$ and $R^5$ being linked to each other is not particularly limited, but it is preferable that the structure is a single bond, —O—, or —S—. m1 and n1 respectively showing the numbers of $R^4$'s and $R^5$'s represent an integer of 0 to 4, are preferably in a range of 1 to 4, and are more preferably 3 or 4.

In a case where $R^4$ and $R^5$ represent an alkyl group, it is preferable that $R^4$ and $R^5$ represent a methyl group or an ethyl group and also preferable that $R^4$ and $R^5$ represent trifluoromethyl.

$R^6$, $R^7$, and $R^8$ $R^6$, $R^7$, and $R^8$ represent a substituent group. Here, $R^7$ and $R^8$ may be bonded to each other and form a ring. l2, m2, and n2 respectively showing the numbers of these substituents represent an integer of 0 to 4, are preferably in a range of 0 to 2, and are more preferably 0 or 1.

$J^1$

J1 represents a single bond or a divalent linking group. As the linking group, *—COO⁻N⁺$R^bR^cR^d$-** ($R^b$ to $R^d$ represent a hydrogen atom, an alkyl group, or an aryl group, and preferable ranges thereof are respectively the same as those described in the group Z of substituent groups described below), *—SO$_3$⁻N⁺$R^eR^fR^g$-** ($R^e$ to $R^g$ represent a hydrogen atom, an alkyl group, or an aryl group, and preferable ranges thereof are respectively the same as those described in the group Z of substituent groups described below), an alkylene group, or an arylene group is exemplified. The symbol "*" represents a binding site on the phenylene group side and the symbol "**" represents a binding site on the opposite side of the phenylene group. It is preferable that $J^1$ represents a single bond, a methylene group, or a phenylene group and a single bond is particularly preferable.

A¹

A¹ is not particularly limited as long as A¹ represents a group in which a crosslinking reaction may occur, but it is preferable that A¹ represents a nucleophilic reactive group and more preferable that A¹ represents a group selected from a carboxyl group, an amino group, a hydroxyl group, and —S(=O)$_2$OH. The preferable range of the amino group is the same as the preferable range of the amino group described in the group Z of substituent groups below. A¹ represents particularly preferably a carboxyl group, an amino group, or a hydroxyl group, more particularly preferably a carboxyl group or a hydroxyl group, and still more particularly preferably a carboxyl group.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, para-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methyl carbamoyl, diethyl carbamoyl, and phenyl carbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxyl group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

In the polyimide compound which can be used in the present invention, the ratios of the respective repeating units represented by Formulae (I), (II-a), (II-b), (III-a), and (III-b) are not particularly limited and appropriately adjusted in consideration of gas permeability and gas separation selectivity according to the purpose of gas separation (recovery rate, purity, or the like).

In the polyimide having a reactive group which can be used in the present invention, a ratio ($E_{II}/E_{III}$) of the total number ($E_{II}$) of moles of respective repeating units represented by Formulae (II-a) and (II-b) to the total number ($E_{III}$) of moles of respective repeating units represented by Formulae (III-a) and (III-b) is preferably in a range of 5/95 to 95/5, more preferably in a range of 10/90 to 80/20, and still more preferably in a range of 20/80 to 60/40.

The molecular weight of the polyimide having a reactive group which can be used in the present invention is preferably in a range of 10,000 to 1,000,000, more preferably in a range of 15,000 to 500,000, and still more preferably in a range of 20,000 to 200,000 as the weight-average molecular weight.

The molecular weight and the dispersity in the present specification are set to values measured using a gel permeation chromatography (GPC) method unless otherwise specified and the molecular weight is set to a weight-average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 to 2 mL/min and most preferable that the measurement is performed at a flow rate thereof of 0.5 to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

The polyimide having a reactive group which can be used in the present invention can be synthesized by performing condensation and polymerization of a specific bifunctional acid anhydride (tetracarboxylic dianhydride) and a specific diamine. As the method, a technique described in a general book (for example, "*The Latest Polyimide~Fundamentals and Applications~*" edited by Toshio Imai and Rikio Yokota, NTS Inc., pp. 3 to 49) can be appropriately selected.

Preferred specific examples of the polyimide having a reactive group which can be used in the present invention will be described below, but the present invention is not limited thereto. Further, "100," "x," and "y" in the following formulae indicate a copolymerization ratio (molar ratio). Examples of "x," "y," and the weight-average molecular weight are listed in the following Table 2. Moreover, in the polyimide compound which can be used in the present invention, it is preferable that y does not represent 0.

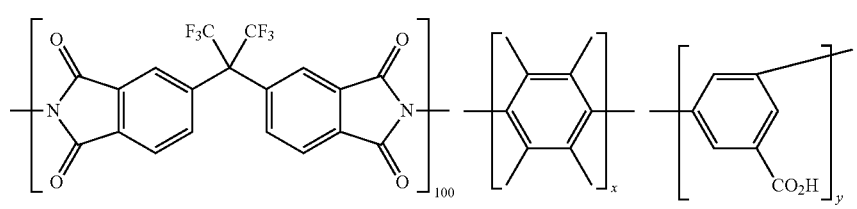

(P-100)

-continued
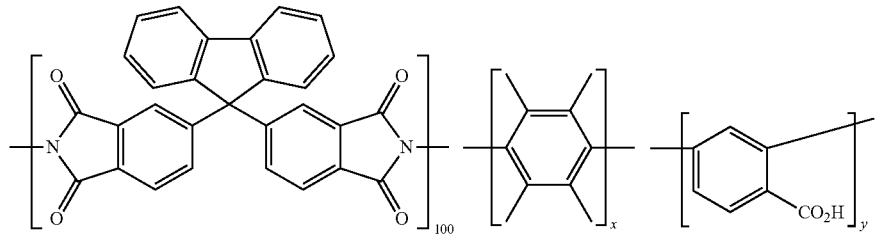
(P-200)
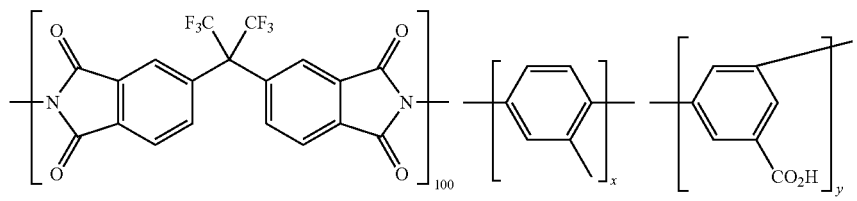
(P-300)
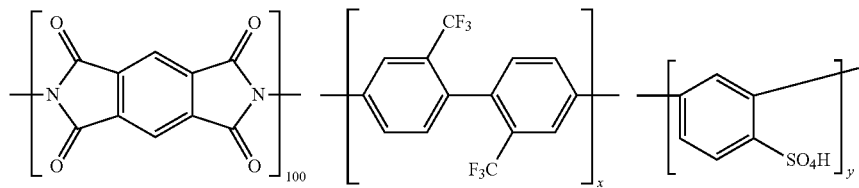
(P-400)
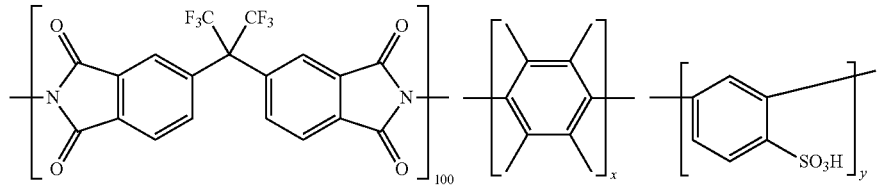
(P-500)
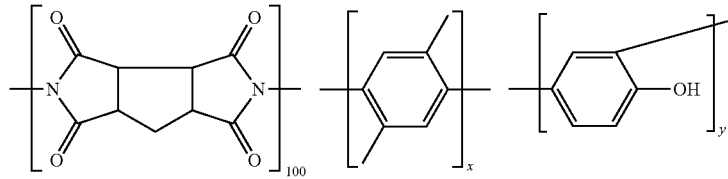
(P-600)
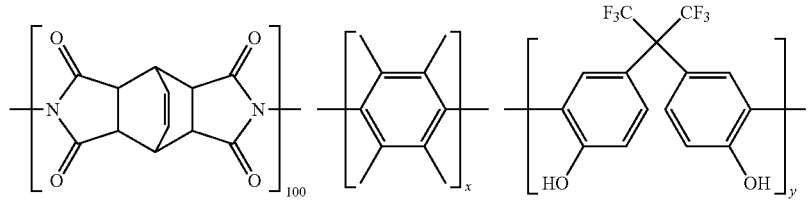
(P-700)
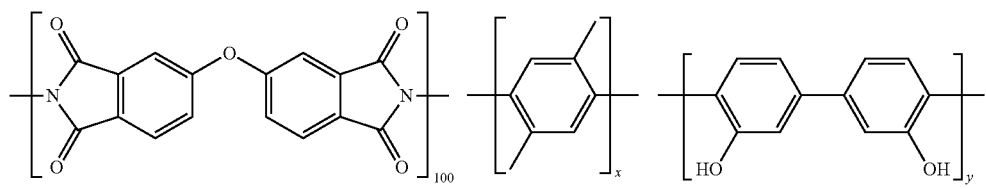
(P-800)
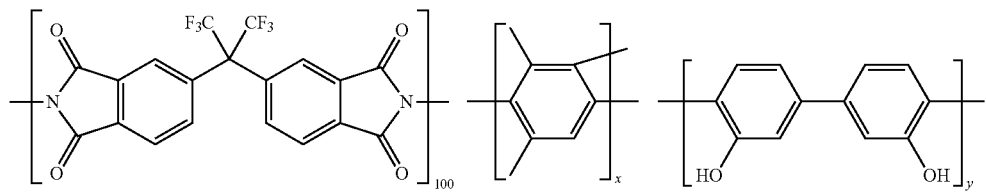
(P-900)

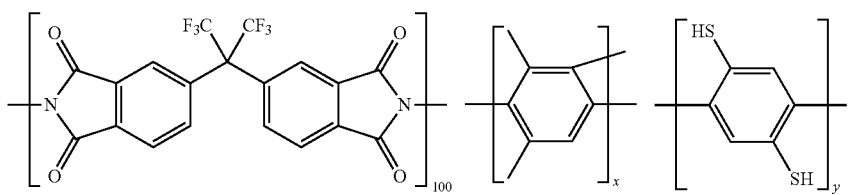

(P-1000)

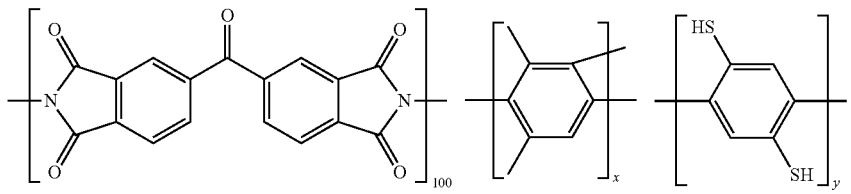

(P-1100)

TABLE 2

| Polymer | Copolymerization ratio | | Weight-average molecular weight |
|---|---|---|---|
| | x | y | |
| P-100 | 30 | 70 | 132,000 |
| P-200 | 40 | 60 | 168,000 |
| P-300 | 60 | 40 | 165,000 |
| P-400 | 10 | 90 | 158,000 |
| P-500 | 20 | 80 | 128,000 |
| P-600 | 50 | 50 | 155,000 |
| P-700 | 70 | 30 | 112,500 |
| P-800 | 30 | 70 | 158,000 |
| P-900 | 20 | 80 | 128,000 |
| P-1000 | 60 | 40 | 150,000 |
| P-1100 | 40 | 60 | 117,000 |

Moreover, in the copolymerization ratio of the polyimide compound P-100 exemplified above, a polymer (P-101) in which x is set to 20 and y is set to 80 can be preferably used.

Further, in a case where the resin of the additional resin layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

In addition, the resin of the additional resin layer other than polyimide can be selected from celluloses such as cellulose acetate, cellulose triacetate, cellulose acetate butyrate, cellulose propionate, ethyl cellulose, methyl cellulose, and nitrocellulose. As the celluloses which can be used for the additional resin layer, it is preferable that the degree of substitution of all acyl groups is in a range of 2.0 to 2.7. Cellulose acetate L-40 (degree of substitution of acyl groups: 2.5, manufactured by Daicel Corporation) which is commercially available as a product of cellulose acetate can be preferably used.

As other resins of the additional resin layer, polyethylene glycols such as a polymer obtained by polymerizing polyethylene glycol #200 diacrylate (manufactured by Shin-Nakamura Chemical Co., Ltd.); and a polymer described in JP2010-513021A can be selected.

From the viewpoints of increasing the adhesiveness and improving the bending resistance, it is preferable that another additional resin layer is not interposed between the porous support A and the resin layer containing a compound having a siloxane bond. As another additional resin layer, PVA whose hydrophilicity and hydrophobicity are adjusted or the like may be exemplified.

(Characteristics)

It is preferable that the film thickness of the additional resin layer is as small as possible under the conditions of imparting high gas permeability while maintaining the mechanical strength and gas separation selectivity.

From the viewpoint of improving the gas permeability, it is preferable that the additional resin layer other than the resin layer containing a compound having a siloxane bond of the gas separation membrane of the present invention is a thin layer. The thickness of the additional resin layer other than the resin layer containing a compound having a siloxane bond is typically 10 μm or less, preferably 3 μm or less, particularly preferably 1 μm or less, more particularly preferably 0.3 μm or less, and still more particularly preferably 0.2 μm or less.

Further, the thickness of the additional resin layer other than the resin layer containing a compound having a siloxane bond is typically 0.01 μm or greater, preferably 0.03 μm or greater from the practical viewpoint that film formation is easily carried out, and more preferably 0.1 μm or greater.

<Protective Layer>

The gas separation membrane of the present invention may include a protective layer formed on the additional resin layer or the resin layer containing a compound having a siloxane bond. The protective layer is a layer disposed on the additional resin layer or the resin layer containing a compound having a siloxane bond. At the time of handling or use, unintended contact between the additional resin layer or the resin layer containing a compound having a siloxane bond and other materials can be prevented.

(Material)

The material of the protective layer is not particularly preferable, but the preferable ranges of the material used for the protective layer are the same as the preferable ranges of the material used for the resin layer containing a compound having a siloxane bond. Particularly, it is preferable that the protective layer described above is at least one selected from polydimethylsiloxane, poly(1-trimethylsilyl-1-propyne), and polyethylene oxide, more preferable that the protective layer is polydimethylsiloxane or poly(1-trimethylsilyl-1-propyne), and particularly preferable that the protective layer is polydimethylsiloxane.

(Characteristics)

The film thickness of the protective layer is preferably in a range of 20 nm to 3 μm, more preferably in a range of 50 nm to 2 and particularly preferably in a range of 100 nm to 1 μm.

<Characteristics and Applications>

The separation membrane of the present invention can be suitably used according to a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable.

It is preferable that the gas separation membrane of the present invention selectively separates carbon dioxide from the gas mixture including particularly carbon dioxide and hydrocarbon (methane).

In addition, in a case where gas subjected to a separation treatment is mixed gas of carbon dioxide and methane, the permeation rate of the carbon dioxide at 30° C. and 5 MPa is preferably 10 GPU or greater, more preferably in a range of 10 to 300 GPU, and particularly preferably in a range of 15 to 300 GPU.

Further, 1 GPU is $1 \times 10^{-6}$ cm$^3$(STP)/cm$^2$·sec·cmHg.

In the case where the gas separation membrane of the present invention is a membrane in which the gas subjected to a separation treatment is mixed gas of carbon dioxide and methane, a gas separation selectivity a which is a ratio of the permeation flux of carbon dioxide at 30° C. and 5 MPa to the permeation flux of methane is preferably 30 or greater, more preferably 35 or greater, particularly preferably 40 or greater, and more particularly preferably greater than 50.

It is considered that a mechanism of dissolution and diffusion in a membrane is involved in the selective gas permeation. From this viewpoint, a separation membrane including a PEO composition is examined (see Journal of Membrane Science, 160 (1999), pp. 87 to 99). This is because interaction between carbon dioxide and the polyethyleneoxy composition is strong. Since this polyethyleneoxy film is a flexible rubber-like polymer film having a low glass transition temperature, a difference in the diffusion coefficient resulting from the kind of gas is small and the gas separation selectivity is mainly due to the effect of a difference in solubility. Meanwhile, the preferred embodiments of the present invention can be significantly improved from the viewpoints of the high glass transition temperature of the compound having a siloxane bond contained in the resin layer containing a compound having a siloxane bond and the thermal durability of the membrane while the above-described action of dissolution and diffusion is exhibited.

<Method of Producing Gas Separation Membrane>

A method of producing the gas separation membrane of the present invention is not particularly limited.

In the method of producing a gas separation membrane of the present invention, it is preferable that a specific treatment is performed on a resin layer precursor containing a compound having a siloxane bond. As the specific treatment performed on the resin layer precursor containing a compound having a siloxane bond, an oxygen atom permeating treatment of allowing oxygen atoms to permeate into the resin layer precursor containing a compound having a siloxane bond is preferable and a plasma treatment is more preferable.

When the gas separation membrane of the present invention is produced, the following parameters can be controlled as a method of controlling the thickness of GLe or GLi along with the coating system. Examples of the parameters include the viscosity of a composition (coating solution), the concentration of the solid content, and the time taken for curing after the coating. For example, in a case where the coating is performed according to a spin coating method, the thickness of GLe or GLi can be controlled by adjusting the amount of the coating solution and the spin coat rotation speed.

Preferred configurations of the method of producing a gas separation membrane of the present invention will be described with reference to the accompanying drawings.

It is preferable that the method of producing a gas separation membrane of the present invention includes a step of applying a specific treatment (oxygen atom permeating treatment 5) to a laminate of the porous support A (reference numeral: 4) and a resin layer precursor 2 containing a compound having a siloxane bond from one surface side of the resin layer precursor 2 containing a compound having a siloxane bond as illustrated in FIG. 5.

Thereafter, the method of producing a gas separation membrane of the present invention may include a step of forming an additional resin layer on the surface of the resin layer precursor containing a compound having a siloxane bond, which is subjected to the specific treatment (oxygen atom permeating treatment 5) (not illustrated).

<Formation of Resin Layer Precursor Containing Compound Having Siloxane Bond>

It is preferable that the method of producing the gas separation membrane of the present invention includes a step of forming a resin layer precursor containing a compound having a siloxane bond on the support.

The method of forming the resin layer precursor containing a compound having a siloxane bond on the support is not particularly limited, but it is preferable to coat the surface with a composition including a material of the resin layer precursor containing a compound having a siloxane bond and an organic solvent.

The concentration (viscosity) of the solid content in the composition is preferably in a range of 1% to 50% by mass, more preferably in a range of 2% to 40% by mass, and particularly preferably in a range of 3% to 30% by mass. When the concentration of the solid content in the composition is high, the thickness of GLi is easily reduced.

The dropwise addition amount of the composition is preferably in a range of 0.001 to 1 ml/cm$^2$, more preferably in a range of 0.002 to 0.5 ml/cm$^2$, and particularly preferably in a range of 0.005 to 0.3 ml/cm$^2$. When the dropwise addition amount of the composition is small, the thickness of GLi is easily reduced.

The coating method of the composition is not particularly limited and a known method can be used. For example, the coating can be appropriately performed according to a spin coating method, a dip coating method, or a bar coating method. The rotation speed of spin coating is preferably in a range of 100 to 10,000 rpm (round per minute), more preferably in a range of 500 to 9,000 rpm, and particularly preferably in a range of 700 to 8,000 rpm. When the rotation speed of spin coating is high, the thickness of GLi is easily reduced.

It is preferable that the composition including a material of the resin layer precursor containing a compound having a siloxane bond and an inorganic solvent is a curable composition. The time taken for curing after application of the composition is preferably in a range of 0.01 to 60 minutes, more preferably in a range of 0.02 to 50 minutes, and particularly preferably in a range of 0.03 to 30 minutes. When the time taken for curing after application of the composition is short, the thickness of GLi is easily reduced.

The method of irradiating a curable composition with radiation when the resin layer containing a compound having a siloxane bond is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy (radiation intensity) is preferably in a range of 10 to 2,000 mW/cm$^2$.

It is preferable that the compound having a siloxane bond which is used for the material of the resin layer precursor containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane], and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

<Treatment of Resin Layer Precursor Containing Compound Having Siloxane Bond>

It is preferable that the method of producing a gas separation membrane of the present invention includes a step of performing a specific treatment (oxygen atom permeating treatment) of allowing oxygen atoms to permeate into the resin layer precursor (preferably from one surface side thereof) containing a compound having a siloxane bond and more preferable that the above-described specific treatment is performed until a difference between the content of the repeating unit represented by Formula (3) in 20 nm of the GLe surface layer and the content of the repeating unit represented by Formula (3) in 20 nm of the GLi surface layer is set to be in a range of 30% to 90%.

The method of performing the above-described specific treatment is not particularly limited, and examples thereof include a method of performing a plasma treatment from one surface side of the resin layer precursor containing a compound having a siloxane bond.

The method of producing a gas separation membrane includes an oxygen atom permeating treatment step of allowing oxygen atoms to permeate into the resin layer precursor containing a compound having a siloxane bond, in which it is preferable that the oxygen atom permeating treatment step is a step for performing a plasma treatment using carrier gas having an oxygen flow rate of 10 cm$^3$ (STP)/min or greater at an input power of 23 W or greater.

For example, a method of performing the plasma treatment under the following conditions for 5 to 30 seconds may be exemplified.

Plasma treatment conditions: oxygen flow rate of 10 cm$^3$ (STP)/min or greater, argon flow rate of 100 cm$^3$ (STP)/min, and input power (discharge output) of 23 W or greater.

From the viewpoints of improving the gas separation selectivity and the scratch resistance so that the separation selectivity is unlikely to be degraded, the plasma treatment is carried out more preferably for 5 seconds or longer under the above-described conditions, particularly preferably 10 seconds or longer, and more particularly preferably 20 seconds or longer.

Meanwhile, it is preferable that the plasma treatment is performed for 1,000 seconds or shorter under the above-described conditions. Since the effects are sufficiently exhibited by performing the treatment for a short time in a case where the above-described specific treatment is a plasma treatment, applications of the plasma treatment to the production using a roll-to-roll system can be made. It is more preferable that the plasma treatment is performed for 40 seconds or shorter under the above-described conditions and particularly preferable that the plasma treatment is performed for 30 seconds or shorter.

Moreover, the integrated accumulate energy amount resulting from the plasma treatment amount is preferably in a range of 25 to 500,000 J/cm$^2$ and more preferably in a range of 2,500 to 100,000 J/cm$^2$.

As the plasma treatment applied to the present invention, an embodiment in which a workpiece is treated in a large vacuum chamber using a reduced-pressure plasma in order to generate a stabilized plasma is exemplified. Recently, an atmospheric pressure plasma treatment apparatus which is capable of performing a treatment in an atmospheric pressure atmosphere has been developed. Using the atmospheric pressure plasma treatment apparatus, gas is introduced into a process chamber and a high-density plasma can be stably generated in an atmospheric pressure atmosphere. As an example of the system configuration of the atmospheric pressure plasma treatment apparatus, a configuration formed of a gas mixing and controlling unit, a reactor, and a conveying conveyor (alternatively, an XY table) is exemplified. A configuration in which a treatment is carried out by blowing a plasma jet from a circular nozzle in a spot form has been suggested.

In regard to the plasma treatment conditions, the flow rate of argon is preferably in a range of 5 to 500 cm$^3$(STP)/min, more preferably in a range of 50 to 200 cm$^3$(STP)/min, and particularly preferably in a range of 80 to 120 cm$^3$(STP)/min. In the method of producing a gas separation membrane of the present invention, the flow rate of oxygen is 10 cm$^3$(STP)/min or greater, preferably in a range of 10 to 100 cm$^3$(STP)/min, more preferably in a range of 15 to 100 cm$^3$(STP)/min, and particularly preferably in a range of 20 to 50 cm$^3$(STP)/min.

In regard to the plasma treatment conditions, the vacuum degree is preferably in a range of 0.6 Pa to 100 Pa, more preferably in a range of 1 to 60 Pa, and particularly preferably in a range of 2 to 40 Pa.

In regard to the plasma treatment conditions of the method of producing a gas separation membrane of the present invention, the input power (discharge power) is 23 W or greater, preferably in a range of 23 W to 1,000 W, more preferably in a range of 40 to 1,000 W, and particularly preferably in a range of 110 to 500 W.

A corona treatment can be used in place of the plasma treatment.

<Method of Additional Resin Layer>

The method of preparing the additional resin layer other than the resin layer containing a compound having a siloxane bond is not particularly limited, and the additional resin layer may be formed by obtaining a commercially available product of a known material, may be formed according to a known method, or may be formed according to a method described below using a specific resin.

The method of forming the additional resin layer other than the resin layer containing a compound having a siloxane bond is not particularly limited, but it is preferable that an underlayer (for example, a resin layer containing a compound having a siloxane bond) is coated with a composition including a material of the additional resin layer other than the resin layer containing a compound having a siloxane bond and an organic solution. The coating method is not particularly limited and the coating can be performed according to a known method, for example, a spin coating method.

The conditions for forming the additional resin layer other than the resin layer containing a compound having a siloxane bond of the gas separation membrane of the present invention are not particularly limited, but the temperature thereof is preferably in a range of −30° C. to 100° C., more preferably in a range of −10° C. to 80° C., and particularly preferably in a range of 5° C. to 50° C.

In the present invention, the air and a gas such as oxygen may coexist at the time of forming the additional resin layer other than the resin layer containing a compound having a siloxane bond, but it is desired that the additional resin layer is formed in an inert gas atmosphere.

<Formation of Protective Layer>

The method of producing a gas separation membrane of the present invention may include a step of forming a protective layer on the surface of the resin layer precursor containing a compound having a siloxane bond which is subjected to a surface treatment.

The method of forming a protective layer on the surface of the resin layer precursor containing a compound having a siloxane bond which is subjected to the surface treatment is not particularly limited, but it is preferable to coat the surface with a composition including a material of the protective layer and an organic solvent. Examples of the organic solvent include organic solvents used to form the resin layer containing a compound having a siloxane bond. The coating method is not particularly limited and a known method can be used. For example, the coating can be performed according to a spin coating method.

The method of irradiating a curable composition with radiation when the protective layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy is preferably 10 to 2,000 mW/cm².

<Method of Separating Gas Mixture>

Using the gas separation membrane of the present invention, it is possible to perform separation of a gas mixture.

In the method of separating a gas mixture used for the gas separation membrane of the present invention, the components of the gas mixture of raw materials are affected by the production area of the raw materials, the applications, or the use environment and are not particularly defined, but it is preferable that the main components of the gas mixture are carbon dioxide and methane, carbon dioxide and nitrogen, or carbon dioxide and hydrogen.

That is, the proportion of carbon dioxide and methane or carbon dioxide and hydrogen in the gas mixture is preferably in a range of 5% to 50% and more preferably in a range of 10% to 40% in terms of the proportion of carbon dioxide. In a case where the gas mixture is present in the coexistence of an acidic gas such as carbon dioxide or hydrogen sulfide, the method of separating the gas mixture using the gas separation membrane of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the method of separating a gas mixture includes a process of allowing carbon dioxide to selectively permeate from mixed gas including carbon dioxide and methane. The pressure during gas separation is preferably in a range of 3 MPa to 10 MPa, more preferably in a range of 4 MPa to 7 MPa, and particularly preferably in a range of 5 MPa to 7 MPa. Further, the temperature during gas separation is preferably in a range of −30° C. to 90° C. and more preferably in a range of 15° C. to 70° C.

[Gas Separation Membrane Module and Gas Separator]

A gas separation membrane module of the present invention includes the gas separation membrane of the present invention.

It is preferable that the gas separation membrane of the present invention is used for a thin film composite obtained by combining with a porous support and also preferable that the gas separation membrane is used for a gas separation membrane module using this thin film composite. Further, using the gas separation membrane, the thin film composite, or the gas separation membrane module of the present invention, a gas separator having means for performing separation and recovery of gas or performing separation and purification of gas can be obtained. The gas separation membrane of the present invention can be made into a module and preferably used. Examples of the module include a spiral type module, a hollow fiber type module, a pleated module, a tubular module, and a plate & frame type module. The gas separation membrane of the present invention may be applied to a gas separation and recovery apparatus which is used together with an absorption liquid described in JP2007-297605A according to a membrane/absorption hybrid method.

Third Embodiment

Next, the third embodiment that satisfies Condition 3 will be described.

[Gas Separation Membrane]

A gas separation membrane of the present invention includes a resin layer containing a compound having a siloxane bond and the resin layer containing a compound having a siloxane bond, in which a minimum value $Si_0$ of the proportion of peaks of $Si^{2+}$ and $Si^{3+}$ to peaks of all Si in ESCA depth analysis of the resin layer containing a compound having a siloxane bond is in a range of 1% to 40%.

With such a configuration, at least one of gas permeability and gas separation selectivity of the gas separation membrane of the present invention is high under high pressure and pressure resistance is excellent.

In a case where the minimum value $Si_0$ of the proportion of peaks of $Si^{2+}$ and $Si^{3+}$ to peaks of all Si in ESCA depth analysis of the resin layer containing a compound having a siloxane bond is less than or equal to the upper limit thereof, the gas permeating performance and pressure resistance become excellent. Meanwhile, in a case where the minimum value $Si_0$ of the proportion of peaks of $Si^{2+}$ and $Si^{3+}$ to peaks of all Si in ESCA depth analysis of the resin layer containing a compound having a siloxane bond is greater than or equal to the lower limit thereof, the pressure resistance is not changed much, but the gas permeating performance becomes excellent.

A layer having separation selectivity indicates a layer in which a ratio ($PCO_2$:$PCH_4$) of a permeability coefficient ($PCO_2$) of carbon dioxide to a permeability coefficient ($PCH_4$) of methane, when a membrane having a thickness of 0.1 to 30 µm is formed and pure gas of carbon dioxide ($CO_2$) and methane ($CH_4$) is supplied to the obtained membrane at a temperature of 40° C. by setting the total pressure of the gas supply side to 0.5 MPa or greater, is 1.5 or greater.

In the related art, a layer containing a polyimide compound has been frequently used as the layer having separation selectivity of a gas separation membrane, and the configuration of the gas separation membrane of the present invention in which at least one of the gas permeability and the gas separation selectivity is high under high pressure without having the layer containing a polyimide compound by means of having a resin layer containing a compound having a siloxane bond, to which an oxygen atom permeating treatment is applied is not known conventionally.

Here, the gas permeability and the gas separation selectivity of the gas separation membrane are typically in a trade-off relationship. That is, in the gas separation membrane, there is a tendency that the gas separation selectivity is decreased when the gas permeability is increased and the gas separation selectivity is increased when the gas permeability is decreased. Accordingly, it is difficult to increase both of the gas permeability and the gas separation selectivity in a case of a gas separation membrane of the related art. Meanwhile, it is possible to increase both of the gas permeability and the gas separation selectivity in a case of the gas separation membrane of the present invention and pressure resistance is excellent.

In the gas separation membrane of the present invention, the minimum value $Si_0$ of the proportion of peaks of $Si^{2+}$ and $Si^{3+}$ to peaks of all Si in ESCA depth analysis of the resin layer containing a compound having a siloxane bond is in a range of 1% to 40%. FIG. 6B is a schematic view of the resin layer containing a compound having a siloxane bond according to an example of the gas separation membrane of the present invention. For example, in a case where the gas separation membrane of the present invention includes a resin layer 3 containing a compound having a siloxane bond which has a structure to which oxygen atoms are introduced with a gradation from the surface as illustrated in FIG. 6B, the minimum value $Si_0$ of the proportion of peaks of $Si^{2+}$ and $Si^{3+}$ to peaks of all Si in ESCA depth analysis of the resin layer containing a compound having a siloxane bond is easily set to be in a range of 1% to 40%. The portion to which oxygen atoms are introduced is formed with holes due to the siloxane bond. Because of introduction of oxygen atoms, thermal motion of a polymer is reduced. Therefore, holes which are capable of selective permeation of a large amount of gas are generated in the gas separation membrane of the present invention in which the minimum value $Si_0$ of the proportion of peaks of $Si^{2+}$ and $Si^{3+}$ to peaks of all Si in ESCA depth analysis of the resin layer containing a compound having a siloxane bond is easily set to be in a range of 1% to 40%. Meanwhile, in a polydimethylsiloxane membrane 11 which is not subjected to an oxygen atom permeating treatment step illustrated in FIG. 6A, the minimum value $Si_0$ of the proportion of peaks of $Si^{2+}$ and $Si^{3+}$ to peaks of all Si in ESCA depth analysis of the resin layer containing a compound having a siloxane bond exceeds 40%. Accordingly, high gas separation selectivity can be obtained by the configuration of the gas separation membrane of the present invention unlike the resin layer (polydimethylsiloxane film 11 which is not subjected to an oxygen atom permeating treatment step as illustrated in FIG. 6A)) containing a compound having a siloxane bond before the surface is treated.

In the gas separation membrane of the present invention, when the minimum value $Si_0$ of the proportion of peaks of $Si^{2+}$ and $Si^{3+}$ to peaks of all Si in ESCA depth analysis of the resin layer containing a compound having a siloxane bond is 40% or less, the pressure resistance is excellent. It is not intended to adhere to any theory, but the mechanism of obtaining excellent pressure resistance when the minimum value $Si_0$ of the proportion of peaks of $Si^{2+}$ and $Si^{3+}$ to peaks of all Si in ESCA depth analysis of the resin layer containing a compound having a siloxane bond is 40% or less is speculated, by the present inventors, as follows.

When considered from the comparison with a crystalline glass film formed of only $Si^{4+}$, the denseness of the film is degraded by the proportion of $Si^{2+}$ and $Si^{3+}$ being increased. Consequently, even in the gas separation membrane of the present invention, the denseness of the membrane which becomes sufficient pressure resistance is considered to be obtained when the minimum value $Si_0$ of the proportion of peaks of $Si^{2+}$ and $Si^{3+}$ to peaks of all Si is 40% or less.

A silica film to which oxygen atoms are uniformly introduced in the film thickness direction as illustrated in FIG. 6C can be prepared using a chemical vapor deposition (CVD) method or the like without a gradation having oxygen atoms being introduced in the film thickness direction. When such a film is compared to the resin layer 3 containing a compound having a siloxane bond of the gas separation membrane of the present invention, the silica film to which oxygen atoms are uniformly introduced in the film thickness direction as illustrated in FIG. 6C, the minimum value $Si_0$ of the proportion of peaks of $Si^{2+}$ and $Si^{3+}$ to peaks of all Si in ESCA depth analysis of the resin layer containing a compound having a siloxane bond is less than 1%. The possibility is high so that controlling is difficult.

Further, it is preferable that the portion to which oxygen atoms are densely introduced in the resin layer 3 containing a compound having a siloxane bond of the gas separation membrane of the present invention is thinner than a silica film 12 to which oxygen atoms are uniformly introduced in the film thickness direction. It is difficult for the silica film to which oxygen atoms are uniformly introduced in the film thickness direction to be made thin similar to the thickness of the portion to which oxygen atoms are densely introduced in the resin layer 3 containing a compound having a siloxane bond of the gas separation membrane of the present invention.

Therefore, extremely higher gas permeability than that of the silica film to which oxygen atoms are uniformly introduced in the film thickness direction and pressure resistance can be achieved by the gas separation membrane of the present invention.

Further, the gas separation membrane of the present invention can be designed such that the gas permeability is greatly increased and the gas separation selectivity is decreased. In addition, the gas separation membrane of the present invention can be also designed such that the gas permeability is decreased and the gas separation selectivity is greatly increased. Even in these cases, the gas separation selectivity of the gas separation membrane of the present invention is higher than that of a gas separation membrane of the related art when the gas separation membrane of the present invention is designed to have performance of gas permeability similar to the performance of gas permeability of the gas separation membrane of the related art and the gas permeability of the gas separation membrane of the present invention is higher than that of the gas separation membrane of the related art when the gas separation membrane of the present invention is designed to have performance of gas separation selectivity similar to the performance of gas separation selectivity of the gas separation membrane of the related art.

Hereinafter, preferred embodiments of the gas separation membrane of the present invention will be described.

<Configuration>

It is preferable that the gas separation membrane of the present invention is a thin film composite (also referred to as a gas separation composite membrane) or an asymmetric membrane or is formed of hollow fibers. Among these, a thin film composite is more preferable.

Hereinafter, a case where the gas separation membrane is a thin film composite is occasionally described as a typical example, but the gas separation membrane of the present invention is not limited by the thin film composite.

A preferred configuration of the gas separation membrane of the present invention will be described with reference to the accompanying drawings. An example of a gas separation membrane 10 of the present invention illustrated in FIG. 1 is a gas separation membrane which is a thin film composite and includes a support 4 and a resin layer 3 containing a compound having a siloxane bond.

Another example of the gas separation membrane 10 of the present invention which is illustrated in FIG. 2 further includes a layer (an additional resin layer described below) 1 containing a polyimide compound on a side opposite to the support 4 of the resin layer 3 containing a compound having a siloxane bond in addition to the support 4 and the resin layer 3 containing a compound having a siloxane bond.

The gas separation membrane of the present invention may have only one or two or more resin layers containing a compound having a siloxane bond. The gas separation membrane of the present invention has preferably one to five resin layers containing a compound having a siloxane bond, more preferably one to three resin layers, particularly preferably one or two layers, and more particularly preferably only one resin layer from the viewpoint of production cost. Another example of the gas separation membrane 10 of the present invention illustrated in FIG. 3 has two resin layers 3 containing a compound having a siloxane bond.

The expression "on the support" in the present specification means that another layer may be interposed between the support and a layer having separation selectivity. Further, in regard to the expressions related to up and down, the direction in which a gas to be separated is supplied to is set as "up" and the direction in which the separated gas is discharged is set as "down" as illustrated in FIG. 1 unless otherwise specified.

In FIG. 4, the surface of the resin layer 3 containing a compound having a siloxane bond is denoted by the reference numeral 6.

In FIG. 4, in a case where the depth d is 10 nm, the surface parallel with the "surface 6 of the resin layer containing a compound having a siloxane bond" at a depth 10 nm (in the direction of a support) from the surface of the resin layer 3 containing a compound having a siloxane bond is a "surface of a resin layer containing a compound having a siloxane bond at a depth of 10 nm (in the direction of the support) from the surface of the resin layer containing a compound having a siloxane bond" which is represented by the reference numeral 7.

<Support>

It is preferable that the gas separation membrane of the present invention includes a support and more preferable that the resin layer containing a compound having a siloxane bond is formed on the support. Since the gas permeability can be sufficiently secured, it is preferable that the support is thin and is formed of a porous material.

The gas separation membrane of the present invention may be obtained by forming and disposing the resin layer 3 containing a compound having a siloxane bond on or in the surface of the porous support or may be a thin film composite conveniently obtained by forming the resin layer on the surface thereof. When the resin layer 3 containing a compound having a siloxane bond is formed on the surface of the porous support, a gas separation membrane with an advantage of having high separation selectivity, high gas permeability, and mechanical strength at the same time can be obtained.

In a case where the gas separation membrane of the present invention is a thin film composite, it is preferable that the thin film composite is formed by coating (the term "coating" in the present specification includes a form made by a coating material being adhered to a surface through immersion) the surface of the porous support with a coating solution (dope) that forms the resin layer 3 containing a compound having a siloxane bond. Specifically, it is preferable that the support has a porous layer on the side of the resin layer 3 containing a compound having a siloxane bond and more preferable that the support is a laminate formed of non-woven fabric and a porous layer disposed on the side of the resin layer 3 containing a compound having a siloxane bond.

The material of the porous layer which is preferably applied to the support is not particularly limited and may be an organic or inorganic material as long as the material satisfies the purpose of providing mechanical strength and high gas permeability. A porous membrane of an organic polymer is preferable, and the thickness thereof is in a range of 1 to 3,000 µm, preferably in a range of 5 to 500 µm, and more preferably in a range of 5 to 150 µm. In regard to the pore structure of the porous layer, the average pore diameter is typically 10 µm or less, preferably 0.5 µm or less, and more preferably 0.2 µm or less. The porosity is preferably in a range of 20% to 90% and more preferably in a range of 30% to 80%. Further, the molecular weight cut-off of the porous layer is preferably 100,000 or less. Moreover, the gas permeability is preferably $3 \times 10^{-5}$ $cm^3$ (STP: STP is an abbreviation for standard temperature and pressure)/ $cm^2 \cdot cm \cdot sec \cdot cmHg$ (30 GPU: GPU is an abbreviation for gas permeation unit) or greater in terms of the permeation rate of carbon dioxide. Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous layer, any of a flat shape, a spiral shape, a tubular shape, and a hallow fiber shape can be employed.

In the thin film composite, it is preferable that woven fabric, non-woven fabric, or a net used to provide mechanical strength is provided in the lower portion of the porous layer disposed on the side of the resin layer 3 containing a compound having a siloxane bond. In terms of film forming properties and the cost, non-woven fabric is preferably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer Containing Compound Having Siloxane Bond>

The gas separation membrane of the present invention includes a resin layer containing a compound having a siloxane bond.

In the gas separation membrane of the present invention, the minimum value $Si_O$ of the proportion of peaks of $Si^{2+}$ and $Si^{3+}$ to peaks of all Si in ESCA depth analysis of the resin layer containing a compound having a siloxane bond is in a range of 1% to 40%. Moreover, the peaks of all Si indicate the total peaks (also referred to as all Si) of $Si^{2+}$, $Si^{3+}$, and $Si^{4+}$ in ESCA depth analysis of the resin layer containing a compound having a siloxane bond.

In the gas separation membrane of the present invention, the minimum value $Si_O$ of the proportion of peaks of $Si^{2+}$ and $Si^{3+}$ to peaks of all Si in ESCA depth analysis of the resin layer containing a compound having a siloxane bond is preferably in a range of 3% to 35% and more preferably in a range of 4% to 30%.

In a case where the minimum value $Si_O$ of the proportion of peaks of $Si^{2+}$ and $Si^{3+}$ to peaks of all Si in ESCA depth analysis of the resin layer containing a compound having a siloxane bond is lower than or equal to the upper limit, the gas permeating performance and the pressure resistance become excellent. Meanwhile, in a case where the minimum value $Si_O$ of the proportion of peaks of $Si^{2+}$ and $Si^{3+}$ to peaks of all Si in ESCA depth analysis of the resin layer containing a compound having a siloxane bond is greater than or equal to the lower limit, the pressure resistance is not changed much, but the gas permeating performance becomes excellent.

In a case where surface modification is carried out by performing a plasma treatment as a method of controlling the proportion of peaks of $Si^{2+}$ and $Si^{3+}$ to peaks of all Si, the proportion can be controlled by adjusting the plasma input power (W number), the plasma treatment time (irradiation time), and the introduced $O_2$ gas flow rate.

In the gas separation membrane of the present invention, a difference $\Delta 1$ between a ratio $Si_{10}$ of peaks of $Si^{2+}$ and $Si^{3+}$ relative to peaks of all Si at a depth of 10 nm from the position having the minimum value $Si_O$ of the proportion of peaks of $Si^{2+}$ and $Si^{3+}$ relative to peaks of all Si and the minimum value $Si_O$ of the proportion of peaks of $Si^{2+}$ and $Si^{3+}$ relative to peaks of all Si in ESCA depth analysis of the resin layer containing a compound having a siloxane bond is preferably in a range of 50% to 90%, more preferably in a range of 55% to 85%, and particularly preferably in a range of 60% to 80%.

In the gas separation membrane of the present invention, a difference $\Delta 2$ between a ratio $Si_{20}$ of peaks of $Si^{2+}$ and $Si^{3+}$ relative to peaks of all Si at a depth of 20 nm from the position having the minimum value $Si_O$ of the proportion of peaks of $Si^{2+}$ and $Si^{3+}$ relative to peaks of all Si and the minimum value $Si_O$ of the proportion of peaks of $Si^{2+}$ and $Si^{3+}$ relative to peaks of all Si in ESCA depth analysis of the resin layer containing a compound having a siloxane bond is preferably in a range of 55% to 90%, more preferably in a range of 60% to 85%, and particularly preferably in a range of 65% to 80%.

When the difference $\Delta 1$ or the difference $\Delta 2$ is in the above-described preferable range, pressure resistance can be held while having excellent gas permeating performance. In a case where the difference $\Delta 1$ or the difference $\Delta 2$ is greater than or equal to the lower limit of the above-described preferable range, the pressure resistance is not changed much, but the gas permeating performance becomes excellent. Meanwhile, in a case where the difference $\Delta 1$ or the difference $\Delta 2$ is lower than or equal to the upper limit of the above-described preferable range, pressure resistance becomes excellent.

When the difference $\Delta 1$ or the difference $\Delta 2$ is large, oxygen atoms permeate into the inside of the resin layer (this resin layer containing a compound having a siloxane bond functions as a layer having high gas separation selectivity, that is, so-called separation selectivity) containing a compound having a siloxane bond in the thickness direction. Here, in a case where the resin layer containing a compound having a siloxane bond is an outermost layer of the gas separation membrane, it is preferable that the "surface 6 of the resin layer containing a compound having a siloxane bond" (surface of the resin layer containing a compound having a siloxane bond which is on a side opposite to the support 4) in FIG. 4 becomes the position having the minimum value ($Si_O$) of the proportion of peaks of $Si^{2+}$ and $Si^{3+}$ relative to peaks of all Si. Further, even in a case where the resin layer containing a compound having a siloxane bond is not an outermost layer of the gas separation membrane and, for example, another layer such as the additional resin layer 1 in FIG. 2 is the outermost layer, it is preferable that the interface between the resin layer containing a compound having a siloxane bond and another layer (such as the additional resin layer 1 in FIG. 2), that is, the "surface of the resin layer containing a compound having a siloxane bond" (surface of the resin layer containing a compound having a siloxane bond which is on a side opposite to the support 4) becomes the position having the minimum value ($Si_O$) of the proportion of peaks of $Si^{2+}$ and $Si^{3+}$ relative to peaks of all Si. In these cases, when a corona treatment or a plasma treatment that is only used to modify the surface and improve the adhesiveness is carried out, oxygen atoms do not sufficiently enter into the depth of 10 nm or the depth of 20 nm from the surface of the resin layer containing a compound having a siloxane bond, that is, the position having the minimum value ($Si_O$) of the proportion of peaks of $Si^{2+}$ and $Si^{3+}$ relative to peaks of all Si, as the gas separation selectivity is higher. When the resin layer containing a compound having a siloxane bond satisfies the preferable range of the difference $\Delta 1$ or the difference $\Delta 2$, at least one of the gas permeability or the gas separation selectivity under high pressure can be further increased. It is not intended to adhere to any theory, but it is considered that the separation selectivity is exhibited by the oxygen atoms entering not only the surface of the resin layer containing a compound having a siloxane bond but also the inside of the resin layer in the thickness direction.

The resin layer containing a compound having a siloxane bond which satisfies the above-described expression is present in the plane of the gas separation membrane by preferably 50% or greater, more preferably 70% or greater, and particularly preferably 90% or greater.

Another region other than the resin layer containing a compound having a siloxane bond which satisfies the above-described expression may be present in the plane of the gas separation membrane. Examples of another region include a region for which an adhesive or a pressure sensitive adhesive is provided and a region in which the resin layer containing a compound having a siloxane bond is not sufficiently subjected to a specific treatment (preferably an oxygen atom permeating treatment).

The resin layer containing a compound having a siloxane bond contains a compound having a siloxane bond. The compound having a siloxane bond may be a "compound which includes a repeating unit having at least silicon atoms, oxygen atom, and carbon atoms". Further, the compound having a siloxane bond may be a "compound having a siloxane bond and a repeating unit", and a compound having a polysiloxane bond is preferable.

(Material)

In the gas separation membrane of the present invention, it is preferable that the compound having a siloxane bond includes at least a repeating unit represented by the following Formula (2) or a repeating unit represented by the following Formula (3).

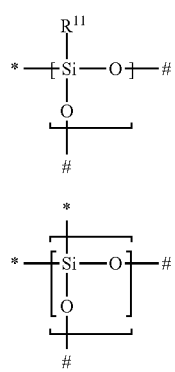

Formula (2)

Formula (3)

In Formulae (2) and (3), $R^{11}$ represents a substituent, the symbol "*" represents a binding site with respect to # in Formula (2) or (3), and the symbol "#" represents a binding site with respect to * in Formula (2) or (3).

$R^{11}$ in Formula (2) represents preferably a hydroxyl group, an alkyl group having 1 or more carbon atoms, an aryl group, an amino group, an epoxy group, or a carboxyl group, more preferably a hydroxyl group, an alkyl group having 1 or more carbon atoms, an amino group, an epoxy group, or a carboxyl group, and still more preferably a hydroxyl group, an alkyl group having 1 or more carbon atoms, an epoxy group, or a carboxyl group.

The hydroxyl group or the carboxyl group represented by $R^{11}$ in Formula (2) may form an arbitrary salt.

In Formulae (2) and (3), the symbol "*" represents a binding site with respect to # in Formula (2) or (3) and the symbol "#" represents a binding site with respect to "*" in Formula (2) or (3). Further, the symbol "*" may be a binding site with respect to an oxygen atom in the following Formula (1) and the symbol "#" may be a binding site with respect to a silicon atom in the following Formula (1).

In the gas separation membrane of the present invention, it is preferable that the compound having a siloxane bond includes a repeating unit represented by the following Formula (1).

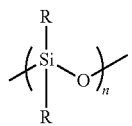

Formula (1)

In Formula (1), R's each independently represent a hydrogen atom, an alkyl group having 1 or more carbon atoms, an aryl group, an amino group, an epoxy group, a fluorinated alkyl group, a vinyl group, an alkoxy group, or a carboxyl group, and n represents an integer of 2 or greater.

In a case where a resin layer containing a compound having a siloxane bond is formed using such a compound having a siloxane bond as the material of the resin layer containing a compound having a siloxane bond, it is possible to exhibit high gas permeability and gas separation selectivity under high pressure.

Further, in the case where a resin layer containing a compound having a siloxane bond is formed using such a compound having a siloxane bond as the material of the resin layer containing a compound having a siloxane bond, it is not intended to adhere to any theory, but it is considered that high gas permeability and gas separation selectivity are exhibited under high pressure because oxygen atoms enter not only the surface of the resin layer containing a compound having a siloxane bond but also the inside of the resin layer in the thickness direction so as to be the composition of SiOx. Particularly, even in a case where polydimethylsiloxane that is known to have high gas permeability is used, a resin layer containing a compound having a siloxane bond is formed using dimethylsiloxane, it is possible to exhibit high gas permeability and gas separation selectivity under high pressure. In the surface of the resin layer containing a compound having a siloxane bond and the inside of the resin layer containing a compound having a siloxane bond in the thickness direction after oxygen atoms enter not only the surface of the resin layer containing a compound having a siloxane bond but also the inside of the resin layer in the thickness direction, it is preferable that the compound having a siloxane bond includes at least a repeating unit represented by Formula (2) or a repeating unit represented by Formula (3).

In Formula (1), R's each independently represent preferably an alkyl group having 1 or more carbon atoms, an aryl group, an amino group, an epoxy group, or a carboxyl group, more preferably an alkyl group having 1 or more carbon atoms, an amino group, an epoxy group, or a carboxyl group, and particularly preferably an alkyl group having 1 or more carbon atoms, an epoxy group, or a carboxyl group.

The alkyl group having 1 or more carbon atoms which is represented by R in Formula (1) is preferably an alkyl group having 1 to 10 carbon atoms, more preferably a methyl group, an ethyl group, or a propyl group, and particularly preferably a methyl group. The alkyl group having 1 or more carbon atoms which is represented by R may be linear, branched, or cyclic.

The aryl group represented by R in Formula (1) is preferably an aryl group having 6 to 20 carbon atoms and particularly preferably a phenyl group.

The fluorinated alkyl group represented by R in Formula (1) is preferably a fluorinated alkyl group having 1 to 10 carbon atoms, more preferably a fluorinated alkyl group having 1 to 3 carbon atoms, and particularly preferably a trifluoromethyl group. The fluorinated alkyl group represented by R may be linear, branched, or cyclic.

The alkoxy group represented by R in Formula (1) is preferably an alkoxy group having 1 to 10 carbon atoms, more preferably a methoxy group, an ethoxy group, or a propyloxy group, and particularly preferably a methoxy group. The alkoxy group having 1 or more carbon atoms which is represented by R may be linear, branched, or cyclic.

In Formula (1), n represents an integer of 2 or greater, preferably in a range of 40 to 800, more preferably in a range of 50 to 700, and particularly preferably in a range of 60 to 500.

The compound having a siloxane bond which has a repeating unit represented by Formula (1) may include an arbitrary substituent other than the repeating unit represented by Formula (1) in the terminal of a molecule. Examples and preferable ranges of the substituent which the terminal of a molecule of the compound having a siloxane bond which includes a repeating unit represented by Formula (1) may have are the same as the examples and preferable ranges of R in Formula (1).

In the gas separation membrane of the present invention, it is preferable that the surface of the resin layer containing a compound having a siloxane bond contains a compound having a siloxane bond which includes a repeating unit represented by Formula (1) and at least a repeating unit represented by Formula (2) or a repeating unit represented by Formula (3).

In the gas separation membrane of the present invention, the ratio of the repeating unit represented by Formula (3) to the repeating unit represented by Formula (2) and the repeating unit represented by Formula (1) in the compound having a siloxane bond contained in the surface of the resin layer containing a compound having a siloxane bond is preferably in a range of 100% to 600% by mole, more preferably in a range of 200% to 600% by mole, and particularly preferably in a range of 300% to 600% by mole.

In the gas separation membrane of the present invention, it is preferable that the resin layer containing a compound having a siloxane bond at a depth of 10 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 10 nm from the surface of the resin layer containing a compound having a siloxane bond is preferably in a range of 3.0% to 500% by mole, more preferably in a range of 3.5% to 450% by mole, and particularly preferably in a range of 4.0% to 400% by mole.

Further, in the gas separation membrane of the present invention, it is preferable that the resin layer containing a compound having a siloxane bond at a depth of 20 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 20 nm from the surface of the resin layer containing a compound having a siloxane bond is preferably in a range of 2.0% to 400% by mole, more preferably in a range of 2.5% to 350% by mole, and particularly preferably in a range of 3.0% to 300% by mole.

It is preferable that the compound having a siloxane bond used for the resin layer containing a compound having a siloxane bond has a functional group which can be polymerized. Examples of such a functional group include an epoxy group, an oxetane group, a carboxyl group, an amino group, a hydroxyl group, and a thiol group. It is more preferable that the resin layer containing a compound having a siloxane bond includes an epoxy group, an oxetane group, a carboxyl group, and a compound having a siloxane bond which includes two or more groups among these groups. It is preferable that such a resin layer containing a compound having a siloxane bond is formed by being cured by irradiating a radiation-curable composition on the support with radiation.

The compound having a siloxane bond which is used for the resin layer containing a compound having a siloxane bond may be polymerizable dialkylsiloxane formed from a partially cross-linked radiation-curable composition having a dialkylsiloxane group. Polymerizable dialkylsiloxane is a monomer having a dialkylsiloxane group, a polymerizable oligomer having a dialkylsiloxane group, or a polymer having a dialkylsiloxane group. As the dialkylsiloxane group, a group represented by $—\{O—Si(CH_3)_2\}_{n2}—$ ($n2$ represents a number of 1 to 100) can be exemplified. A poly(dialkylsiloxane) compound having a vinyl group at the terminal can be preferably used.

It is preferable that the compound having a siloxane bond which is used for the material of the resin layer containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane], and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

Commercially available materials can be used as the compound having a siloxane bond which is used for the material of the resin layer containing a compound having a siloxane bond and preferred examples of the compound having a siloxane bond which is used for the resin layer containing a compound having a siloxane bond include UV9300 (polydimethylsiloxane (PDMS), manufactured by Momentive Performance Materials Inc.) and X-22-162C (manufactured by Shin-Etsu Chemical Co., Ltd.).

UV9380C (bis(4-dodecylphenyl)iodonium hexafluoroantimonate, manufactured by Momentive Performance Materials Inc.) can be preferably used as other materials of the resin layer containing a compound having a siloxane bond.

The material of the resin layer containing a compound having a siloxane bond can be prepared as a composition including an organic solvent when the resin layer containing a compound having a siloxane bond is formed, and it is preferable that the material thereof is a curable composition. The organic solvent which can be used when the resin layer containing the compound having a siloxane bond is formed is not particularly limited, and examples thereof include n-heptane.

(Characteristics)

The film thickness (same as the thickness) of the resin layer containing a compound having a siloxane bond is not particularly limited, but the film thickness of the resin layer containing a compound having a siloxane bond is preferably 0.1 µm or greater from the viewpoint that film formation is easily carried out. In the gas separation membrane of the present invention, the thickness of the resin layer containing a compound having a siloxane bond is preferably in a range of 150 to 900 nm, particularly preferably in a range of 0.1 to 4 µm, and more particularly preferably in a range of 0.3 to 3 µm. When the thickness of the resin layer containing a compound having a siloxane bond is in the above-described preferable range, pressure resistance can be held while having excellent gas permeating performance. In a case where the thickness of the resin layer containing a compound having a siloxane bond is greater than or equal to the lower limit of the above-described preferable range, the pressure resistance is not changed much, but the gas permeating performance becomes excellent. Meanwhile, in a case where the thickness of the resin layer containing a compound having a siloxane bond is lower than or equal to the upper limit of the above-described preferable range, pressure resistance becomes excellent. In the gas separation membrane having the resin layer containing a compound having a siloxane bond on the support, the thickness of each layer is unlikely to be evaluated by SEM. Here, the measurement of the thickness of the resin layer containing a compound having a siloxane bond is confirmed by performing analysis in the depth direction of TOF-SIMS. In regard to the profile in the depth direction, an area in which the peak intensity of peaks continuously present from a peak position with the maximum intensity with respect to the maximum intensity of the peak intensity (peak intensity of $Si^{3+}$ and $Si^{4+}$) derived from silicone is 90% or greater is defined as the film thickness.

The film thickness of the resin layer containing a compound having a siloxane bond can be controlled by adjusting the coating amount of the curable composition. Further, the following parameters can be controlled as a method of controlling the thickness of the resin layer containing a compound having a siloxane bond along with the coating system. Examples of the parameters include the viscosity of a composition (coating solution), the concentration of the solid content, and the time taken for curing after the coating. For example, in a case where the coating is performed according to a spin coating method, the thickness of the resin layer containing a compound having a siloxane bond can be controlled by adjusting the amount of the coating solution and the spin coat rotation speed.

<Additional Resin Layer>

The gas separation membrane of the present invention may contain an additional resin layer other than the resin layer containing a compound having a siloxane bond (hereinafter, the additional resin layer will be described).

Examples of the resin contained in the additional resin layer are described below, but are not limited thereto. Specifically, the compound having a siloxane bond, polyimides, polyamides, celluloses, polyethylene glycols, and polybenzoxazoles are preferable and at least one selected from the compound having a siloxane bond, polyimide, polybenzoxazole, and acetic acid cellulose is more preferable. It is particularly preferable that the gas separation membrane of the present invention includes the resin layer containing a compound having a siloxane bond and further includes a layer containing a polyimide compound as the additional resin layer.

Polyimide having a reactive group is preferable as the polyimide compound.

Hereinafter, a case where the resin of the additional resin layer is polyimide having a reactive group will be described as a typical example, but the present invention is not limited to the case where a polymer having a reactive group is polyimide having a reactive group.

The polyimide having a reactive group which can be used in the present invention will be described below in detail.

According to the present invention, in a polyimide compound having a reactive group, it is preferable that a polymer having a reactive group includes a polyimide unit and a repeating unit having a reactive group (preferably a nucleophilic reactive group and more preferably a carboxyl group, an amino group, or a hydroxyl group) on the side chain thereof.

More specifically, it is preferable that the polymer having a reactive group includes at least one repeating unit represented by the following Formula (I) and at least one repeating unit represented by the following Formula (III-a) or (III-b).

Further, it is more preferable that the polymer having a reactive group includes at least one repeating unit represented by the following Formula (I), at least one repeating unit represented by the following Formula (II-a) or (II-b), and at least one repeating unit represented by the following Formula (III-a) or (III-b).

The polyimide having a reactive group which can be used in the present invention may include repeating units other than the respective repeating units described above, and the number of moles thereof is preferably 20 or less and more preferably in a range of 0 to 10 when the total number of moles of the respective repeating units represented by each of Formulae is set to 100. It is particularly preferable that the polyimide having a reactive group which can be used in the present invention is formed of only the respective repeating units represented by each of the following formulae.

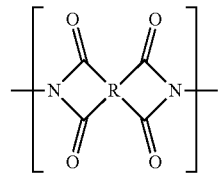

Formula (I)

In Formula (I), R represents a group having a structure represented by any of the following Formulae (I-a) to (I-h). In the following Formulae (I-a) to (I-h), the symbol "*" represents a binding site with respect to a carbonyl group of Formula (I). R in Formula (I) is occasionally referred to as a mother nucleus, and it is preferable that this mother nucleus R is a group represented by Formula (I-a), (I-b), or (I-d), more preferable that this mother nucleus R is a group represented by Formula (I-a) or (I-d), and particularly preferable that this mother nucleus R is a group represented by Formula (I-a).

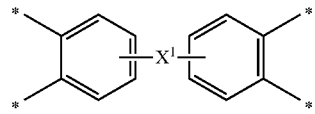

(I-a)

-continued (I-b)

(I-c)

(I-d)

(I-e)

(I-f)

(I-g)

(I-h)

Formula (II-a)

Formula (II-b)

Formula (III-a)

-continued

Formula (III-b)

$X^1$, $X^2$, and $X^3$ $X^1$, $X^2$, and $X^3$ represent a single bond or a divalent linking group. As the divalent linking groups of these, —C($R^x$)$_2$— ($R^x$ represents a hydrogen atom or a substituent group. In a case where $R^x$ represents a substituent group, $R^x$'s may be linked to each other and form a ring), —O—, —SO$_2$—, —C(=O)—, —S—, —NR$^Y$— ($R^Y$ represents a hydrogen atom, an alkyl group (preferably a methyl group or an ethyl group), or an aryl group (preferably a phenyl group)), or a combination of these is preferable and a single bond or —C($R^x$)$_2$— is more preferable. When $R^x$ represents a substituent group, a group Z of substituent groups described below is specifically exemplified. Among these, an alkyl group is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and then a cyclic structure may be formed or condensation may be made and then a condensed ring structure may be formed.

L

L represents —CH$_2$=CH$_2$— or —CH$_2$— and —CH$_2$=CH$_2$— is preferable.

$R^1$ and $R^2$ $R^1$ and $R^2$ represent a hydrogen atom or a substituent group. As the substituent group, any one selected from the group Z of substituent groups described below can be used. $R^1$ and $R^2$ may be bonded to each other and form a ring.

$R^1$ and $R^2$ represent preferably a hydrogen atom or an alkyl group, more preferably a hydrogen atom, a methyl group, or an ethyl group, and still more preferably a hydrogen atom.

$R^3$ $R^3$ represents an alkyl group or a halogen atom. The preferable ranges of the alkyl group and the halogen atom are the same as those of an alkyl group and a halogen atom defined in the group Z of substituent groups described below. l1 showing the number of $R^3$'s represents an integer of 0 to 4, is preferably in a range of 1 to 4, and is more preferably 3 or 4. It is preferable that $R^3$ represents an alkyl group and more preferable that $R^3$ represents a methyl group or an ethyl group.

$R^4$ and $R^5$ $R^4$ and $R^5$ represent an alkyl group or a halogen atom or a group in which $R^4$ and $R^5$ are linked to each other and form a ring together with $X^2$. The preferable ranges of the alkyl group and the halogen atom are the same as those of an alkyl group and a halogen atom defined in the group Z of substituent groups described below. The structure formed by $R^4$ and $R^5$ being linked to each other is not particularly limited, but it is preferable that the structure is a single bond, —O—, or —S—. m1 and n1 respectively showing the numbers of $R^4$'s and $R^5$'s represent an integer of 0 to 4, are preferably in a range of 1 to 4, and are more preferably 3 or 4.

In a case where $R^4$ and $R^5$ represent an alkyl group, it is preferable that $R^4$ and $R^5$ represent a methyl group or an ethyl group and also preferable that $R^4$ and $R^5$ represent trifluoromethyl.

$R^6$, $R^7$, and $R^8$ $R^6$, $R^7$, and $R^8$ represent a substituent group. Here, $R^7$ and $R^8$ may be bonded to each other and form a ring. l2, m2, and n2 respectively showing the numbers of these substituents represent an integer of 0 to 4, are preferably in a range of 0 to 2, and are more preferably 0 or 1.

$J^1$ $J^1$ represents a single bond or a divalent linking group. As the linking group, *—COO⁻N⁺$R^b R^c R^d$-** ($R^b$ to $R^d$ represent a hydrogen atom, an alkyl group, or an aryl group, and preferable ranges thereof are respectively the same as those described in the group Z of substituent groups described below), *—SO₃⁻N⁺$R^e R^f R^g$-** ($R^e$ to $R^g$ represent a hydrogen atom, an alkyl group, or an aryl group, and preferable ranges thereof are respectively the same as those described in the group Z of substituent groups described below), an alkylene group, or an arylene group is exemplified. The symbol "*" represents a binding site on the phenylene group side and the symbol "**" represents a binding site on the opposite side of the phenylene group. It is preferable that $J^1$ represents a single bond, a methylene group, or a phenylene group and a single bond is particularly preferable.

$A^1$ $A^1$ is not particularly limited as long as $A^1$ represents a group in which a crosslinking reaction may occur, but it is preferable that $A^1$ represents a nucleophilic reactive group and more preferable that $A^1$ represents a group selected from a carboxyl group, an amino group, a hydroxyl group, and —S(=O)₂OH. The preferable range of the amino group is the same as the preferable range of the amino group described in the group Z of substituent groups below. $A^1$ represents particularly preferably a carboxyl group, an amino group, or a hydroxyl group, more particularly preferably a carboxyl group or a hydroxyl group, and still more particularly preferably a carboxyl group.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, para-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methyl carbamoyl, diethyl carbamoyl, and phenyl carbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxyl group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

In the polyimide compound which can be used in the present invention, the ratios of the respective repeating units represented by Formulae (I), (II-a), (II-b), (III-a), and (III-b) are not particularly limited and appropriately adjusted in consideration of gas permeability and gas separation selectivity according to the purpose of gas separation (recovery rate, purity, or the like).

In the polyimide having a reactive group which can be used in the present invention, a ratio ($E_{II}/E_{III}$) of the total number ($E_{II}$) of moles of respective repeating units represented by Formulae (II-a) and (II-b) to the total number ($E_{III}$) of moles of respective repeating units represented by Formulae (III-a) and (III-b) is preferably in a range of 5/95 to 95/5, more preferably in a range of 10/90 to 80/20, and still more preferably in a range of 20/80 to 60/40.

The molecular weight of the polyimide having a reactive group which can be used in the present invention is preferably in a range of 10,000 to 1,000,000, more preferably in a range of 15,000 to 500,000, and still more preferably in a range of 20,000 to 200,000 as the weight-average molecular weight.

The molecular weight and the dispersity in the present specification are set to values measured using a gel permeation chromatography (GPC) method unless otherwise specified and the molecular weight is set to a weight-average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 to 2 mL/min and most preferable that the measurement is performed at a flow rate thereof of 0.5 to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

The polyimide having a reactive group which can be used in the present invention can be synthesized by performing condensation and polymerization of a specific bifunctional acid anhydride (tetracarboxylic dianhydride) and a specific diamine. As the method, a technique described in a general book (for example, "*The Latest Polyimide~Fundamentals and Applications~*" edited by Toshio Imai and Rikio Yokota, NTS Inc., pp. 3 to 49) can be appropriately selected.

Preferred specific examples of the polyimide having a reactive group which can be used in the present invention will be described below, but the present invention is not limited thereto. Further, "100," "x," and "y" in the following formulae indicate a copolymerization ratio (molar ratio). Examples of "x," "y," and the weight-average molecular weight are listed in the following Table 3. Moreover, in the polyimide compound which can be used in the present invention, it is preferable that y does not represent 0.

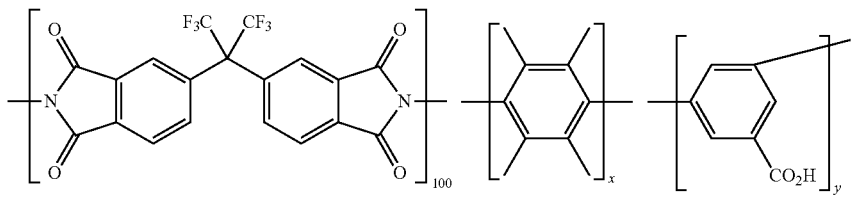
(P-100)
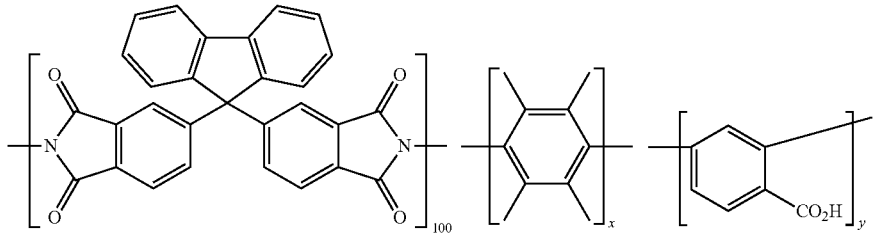
(P-200)
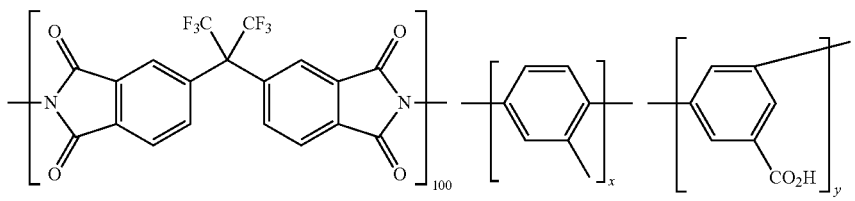
(P-300)
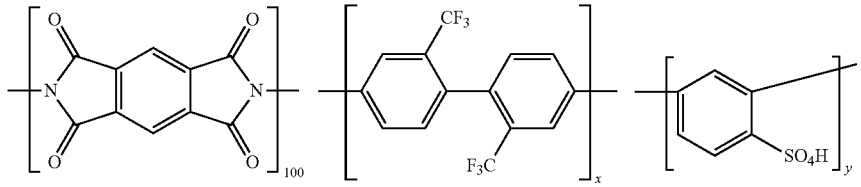
(P-400)
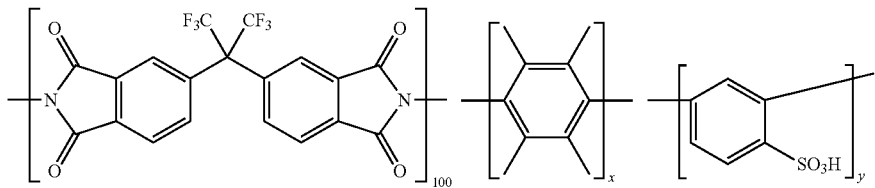
(P-500)
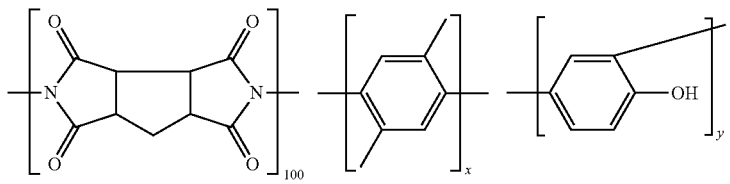
(P-600)
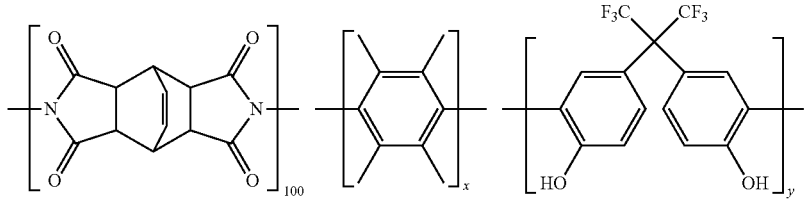
(P-700)

-continued

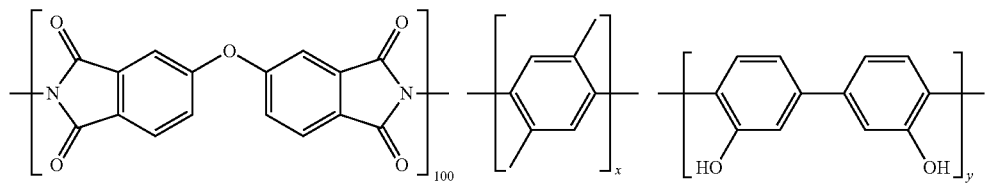
(P-800)

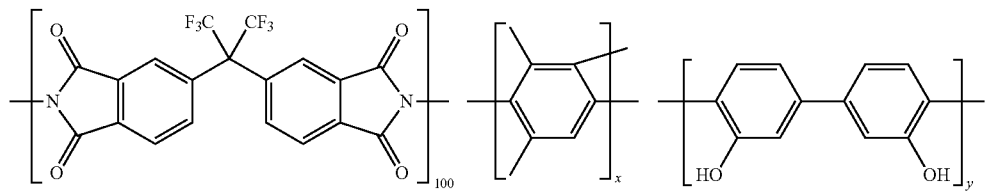
(P-900)

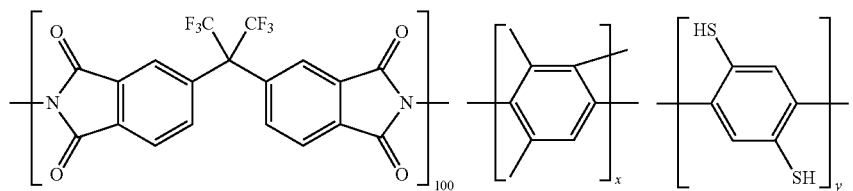
(P-1000)

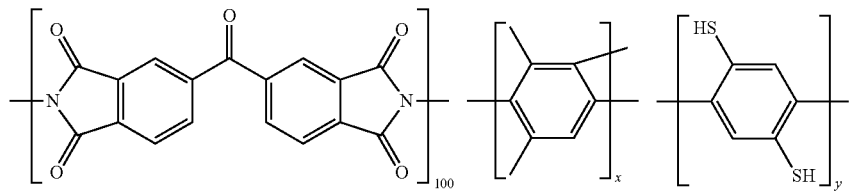
(P-1100)

TABLE 3

| Polymer | Copolymerization ratio | | Weight-average molecular weight |
|---|---|---|---|
| | x | y | |
| P-100 | 30 | 70 | 132,000 |
| P-200 | 40 | 60 | 168,000 |
| P-300 | 60 | 40 | 165,000 |
| P-400 | 10 | 90 | 158,000 |
| P-500 | 20 | 80 | 128,000 |
| P-600 | 50 | 50 | 155,000 |
| P-700 | 70 | 30 | 112,500 |
| P-800 | 30 | 70 | 158,000 |
| P-900 | 20 | 80 | 128,000 |
| P-1000 | 60 | 40 | 150,000 |
| P-1100 | 40 | 60 | 117,000 |

Moreover, in the copolymerization ratio of the polyimide compound P-100 exemplified above, a polymer (P-101) in which x is set to 20 and y is set to 80 can be preferably used.

Further, in a case where the resin of the additional resin layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

In addition, the resin of the additional resin layer other than polyimide can be selected from celluloses such as cellulose acetate, cellulose triacetate, cellulose acetate butyrate, cellulose propionate, ethyl cellulose, methyl cellulose, and nitrocellulose. As the celluloses which can be used for the additional resin layer, it is preferable that the degree of substitution of all acyl groups is in a range of 2.0 to 2.7. Cellulose acetate L-40 (degree of substitution of acyl groups: 2.5, manufactured by Daicel Corporation) which is commercially available as a product of cellulose acetate can be preferably used.

As other resins of the additional resin layer, polyethylene glycols such as a polymer obtained by polymerizing polyethylene glycol #200 diacrylate (manufactured by Shin-Nakamura Chemical Co., Ltd.); and a polymer described in JP2010-513021A can be selected.

Another additional resin layer may be interposed between the support and the resin layer containing a compound having a siloxane bond. As another additional resin layer, PVA whose hydrophilicity and hydrophobicity are adjusted or the like may be exemplified.

(Characteristics)

It is preferable that the film thickness of the additional resin layer is as small as possible under the conditions of imparting high gas permeability while maintaining the mechanical strength and gas separation selectivity.

From the viewpoint of improving the gas permeability, it is preferable that the additional resin layer other than the resin layer containing a compound having a siloxane bond of the gas separation membrane of the present invention is a thin layer. The thickness of the additional resin layer other than the resin layer containing a compound having a siloxane bond is typically 10 µm or less, preferably 3 µm or less, particularly preferably 1 µm or less, more particularly preferably 0.3 µm or less, and still more particularly preferably 0.2 µm or less.

Further, the thickness of the additional resin layer other than the resin layer containing a compound having a siloxane bond is typically 0.01 µm or greater, preferably 0.03 µm or greater from the practical viewpoint that film formation is easily carried out, and more preferably 0.1 µm or greater.

<Protective Layer>

The gas separation membrane of the present invention may include a protective layer formed on the additional resin layer or the resin layer containing a compound having a siloxane bond. The protective layer is a layer disposed on the additional resin layer or the resin layer containing a compound having a siloxane bond. At the time of handling or use, unintended contact between the additional resin layer or the resin layer containing a compound having a siloxane bond and other materials can be prevented.

(Material)

The material of the protective layer is not particularly preferable, but the preferable ranges of the material used for the protective layer are the same as the preferable ranges of the material used for the resin layer containing a compound having a siloxane bond. Particularly, it is preferable that the protective layer described above is at least one selected from polydimethylsiloxane, poly(1-trimethylsilyl-1-propyne), and polyethylene oxide, more preferable that the protective layer is polydimethylsiloxane or poly(1-trimethylsilyl-1-propyne), and particularly preferable that the protective layer is polydimethylsiloxane.

(Characteristics)

The film thickness of the protective layer is preferably in a range of 20 nm to 3 µm, more preferably in a range of 50 nm to 2 µm, and particularly preferably in a range of 100 nm to 1 µm.

<Characteristics and Applications>

The separation membrane of the present invention can be suitably used according to a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable.

It is preferable that the gas separation membrane of the present invention selectively separates carbon dioxide from the gas mixture including particularly carbon dioxide and hydrocarbon (methane).

In addition, in a case where gas subjected to a separation treatment is mixed gas of carbon dioxide and methane, the permeation rate of the carbon dioxide at 30° C. and 5 MPa is preferably 10 GPU or greater, more preferably in a range of 10 to 300 GPU, and particularly preferably in a range of 15 to 300 GPU.

Further, 1 GPU is $1\times10^{-6}$ cm$^3$(STP)/cm$^2$·sec·cmHg.

In the case where the gas separation membrane of the present invention is a membrane in which the gas subjected to a separation treatment is mixed gas of carbon dioxide and methane, a gas separation selectivity a which is a ratio of the permeation flux of carbon dioxide at 30° C. and 5 MPa to the permeation flux of methane is preferably 30 or greater, more preferably 35 or greater, particularly preferably 40 or greater, and more particularly preferably greater than 50.

It is considered that a mechanism of dissolution and diffusion in a membrane is involved in the selective gas permeation. From this viewpoint, a separation membrane including a polyethyleneoxy (PEO) composition is examined (see Journal of Membrane Science, 160 (1999), pp. 87 to 99). This is because interaction between carbon dioxide and the polyethyleneoxy composition is strong. Since this polyethyleneoxy film is a flexible rubber-like polymer film having a low glass transition temperature, a difference in the diffusion coefficient resulting from the kind of gas is small and the gas separation selectivity is mainly due to the effect of a difference in solubility. Meanwhile, the preferred embodiments of the present invention can be significantly improved from the viewpoints of the high glass transition temperature of the compound having a siloxane bond contained in the resin layer containing a compound having a siloxane bond and the thermal durability of the membrane while the above-described action of dissolution and diffusion is exhibited.

<Method of Producing Gas Separation Membrane>

A method of producing the gas separation membrane of the present invention is not particularly limited.

In the method of producing a gas separation membrane of the present invention, it is preferable that a specific treatment is performed on a resin layer precursor containing a compound having a siloxane bond. As the specific treatment performed on the resin layer precursor containing a compound having a siloxane bond, an oxygen atom permeating treatment of allowing oxygen atoms to permeate into the resin layer precursor containing a compound having a siloxane bond is preferable and a plasma treatment is more preferable.

It is preferable that the method of producing a gas separation membrane of the present invention includes an oxygen atom permeating treatment step of allowing oxygen atoms to permeate into a resin layer precursor containing a compound having a siloxane bond, in which the oxygen atom permeating treatment step is a step for performing a plasma treatment using carrier gas having an oxygen flow rate of 10 cm$^3$ (STP)/min or greater at an input power of 23 W or greater.

The method of producing a gas separation membrane of the present invention and preferred configurations thereof will be described with reference to the accompanying drawings.

It is preferable that the method of producing a gas separation membrane of the present invention includes a step of applying a specific treatment (oxygen atom permeating treatment 5) to a laminate of the support 4 and a resin layer precursor 2 containing a compound having a siloxane bond from one surface side of the resin layer precursor 2 containing a compound having a siloxane bond as illustrated in FIG. 5.

Thereafter, the method of producing a gas separation membrane of the present invention may include a step of forming an additional resin layer on the surface of the resin layer precursor containing a compound having a siloxane bond, which is subjected to the specific treatment (oxygen atom permeating treatment 5) (not illustrated).

<Formation of Resin Layer Precursor Containing Compound Having Siloxane Bond>

It is preferable that the method of producing the gas separation membrane of the present invention includes a step of forming a resin layer precursor containing a compound having a siloxane bond on the support.

The method of forming the resin layer precursor containing a compound having a siloxane bond on the support is not particularly limited, but it is preferable to coat the surface with a composition including a material of the resin layer precursor containing a compound having a siloxane bond and an organic solvent.

The concentration (viscosity) of the solid content in the composition is preferably in a range of 1% to 50% by mass, more preferably in a range of 2% to 40% by mass, and particularly preferably in a range of 3% to 11% by mass. When the concentration of the solid content in the composition is high, the thickness of the resin layer containing a compound having a siloxane bond is easily reduced.

The dropwise addition amount of the composition is preferably in a range of 0.001 to 1 ml/cm$^2$, more preferably in a range of 0.002 to 0.5 ml/cm$^2$, and particularly preferably in a range of 0.005 to 0.05 ml/cm$^2$. When the dropwise addition amount of the composition is small, the thickness of the resin layer containing a compound having a siloxane bond is easily reduced.

The coating method of the composition is not particularly limited and a known method can be used. For example, the coating can be appropriately performed according to a spin coating method, a dip coating method, or a bar coating method. The rotation speed of spin coating is preferably in a range of 100 to 10,000 rpm (round per minute), more preferably in a range of 500 to 2,500 rpm, and particularly preferably in a range of 700 to 1,500 rpm. When the rotation speed of spin coating is high, the thickness of the resin layer containing a compound having a siloxane bond is easily reduced.

It is preferable that the composition including a material of the resin layer precursor containing a compound having a siloxane bond and an organic solvent is a curable composition. The time taken for curing after application of the composition is preferably in a range of 0.01 to 60 minutes, more preferably in a range of 0.02 to 50 minutes, and particularly preferably in a range of 0.5 to 2 minutes. When the time taken for curing after application of the composition is in the above-described preferable range, excellent adhesiveness to the support and excellent surface smoothness of a cured film are easily obtained.

The method of irradiating a curable composition with radiation when the resin layer containing a compound having a siloxane bond is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy (radiation intensity) is preferably in a range of 10 to 2,000 mW/cm$^2$.

It is preferable that the compound having a siloxane bond which is used for the material of the resin layer precursor containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane]), and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

<Treatment of Resin Layer Precursor Containing Compound Having Siloxane Bond>

It is preferable that the method of producing a gas separation membrane of the present invention includes a step of performing a specific treatment (oxygen atom permeating treatment) of allowing oxygen atoms to permeate into the resin layer precursor (preferably from one surface side thereof) containing a compound having a siloxane bond and more preferable that the above-described specific treatment is performed until the minimum value $Si_0$ of the proportion of peaks of $Si^{2+}$ and $Si^{3+}$ to peaks of all Si in ESCA depth analysis of the resin layer containing a compound having a siloxane bond and preferably the difference $\Delta 1$ and the difference $\Delta 2$ are respectively in the above-described ranges.

The method of performing the above-described specific treatment is not particularly limited, and examples thereof include a method of performing a plasma treatment from one surface side of the resin layer precursor containing a compound having a siloxane bond.

The method of producing a gas separation membrane of the present invention includes an oxygen atom permeating treatment step of allowing oxygen atoms to permeate into the resin layer precursor containing a compound having a siloxane bond, in which it is preferable that the oxygen atom permeating treatment step is a step for performing a plasma treatment using carrier gas having an oxygen flow rate of 10 cm$^3$ (STP)/min or greater at an input power of 23 W or greater.

For example, a method of performing the plasma treatment under the following conditions for 5 to 30 seconds may be exemplified.

Plasma treatment conditions: oxygen flow rate of 10 cm$^3$ (STP)/min or greater, argon flow rate of 100 cm$^3$ (STP)/min, and input power (discharge output) of 23 W or greater.

From the viewpoints of improving the gas separation selectivity and the scratch resistance so that the separation selectivity is unlikely to be degraded, the plasma treatment is carried out preferably for 5 seconds or longer under the above-described conditions, particularly preferably 10 seconds or longer, and more particularly preferably 20 seconds or longer.

Meanwhile, it is preferable that the plasma treatment is performed for 1,000 seconds or shorter under the above-described conditions. Since the effects are sufficiently exhibited by performing the treatment for a short time in a case where the above-described specific treatment is a plasma treatment, applications of the plasma treatment to the production using a roll-to-roll system can be made. It is more preferable that the plasma treatment is performed for 40 seconds or shorter under the above-described conditions and particularly preferable that the plasma treatment is performed for 30 seconds or shorter.

Moreover, the integrating accumulate energy amount resulting from the plasma treatment amount is preferably in a range of 25 to 500,000 J/cm$^2$ and more preferably in a range of 2,500 to 100,000 J/cm$^2$.

As the plasma treatment applied to the present invention, an embodiment in which a workpiece is treated in a large vacuum chamber using a reduced-pressure plasma in order to generate a stabilized plasma is exemplified. Recently, an atmospheric pressure plasma treatment apparatus which is capable of performing a treatment in an atmospheric pressure atmosphere has been developed. Using the atmospheric pressure plasma treatment apparatus, gas is introduced into a process chamber and a high-density plasma can be stably generated in an atmospheric pressure atmosphere. As an example of the system configuration of the atmospheric pressure plasma treatment apparatus, a configuration formed of a gas mixing and controlling unit, a reactor, and a conveying conveyor (alternatively, an XY table) is exemplified. A configuration in which a treatment is carried out by blowing a plasma jet from a circular nozzle in a spot form has been suggested.

In regard to the plasma treatment conditions, the flow rate of argon is preferably in a range of 5 to 500 $cm^3$(STP)/min, more preferably in a range of 50 to 200 $cm^3$(STP)/min, and particularly preferably in a range of 80 to 120 $cm^3$(STP)/min. In the method of producing a gas separation membrane of the present invention, the flow rate of oxygen is 10 $cm^3$(STP)/min or greater, preferably in a range of 10 to 100 $cm^3$(STP)/min, more preferably in a range of 15 to 100 $cm^3$(STP)/min, and particularly preferably in a range of 20 to 50 $cm^3$(STP)/min.

In regard to the plasma treatment conditions, the vacuum degree is preferably in a range of 0.6 to 100 Pa, more preferably in a range of 1 to 60 Pa, and particularly preferably in a range of 2 to 40 Pa.

In regard to the plasma treatment conditions of the method of producing a gas separation membrane of the present invention, the input power (discharge power) is 23 W or greater, preferably in a range of 23 to 1,000 W, more preferably in a range of 40 to 1,000 W, and particularly preferably in a range of 110 to 500 W.

A corona treatment can be used in place of the plasma treatment.

<Method of Additional Resin Layer>

The method of preparing the additional resin layer other than the resin layer containing a compound having a siloxane bond is not particularly limited, and the additional resin layer may be formed by obtaining a commercially available product of a known material, may be formed according to a known method, or may be formed according to a method described below using a specific resin.

The method of forming the additional resin layer other than the resin layer containing a compound having a siloxane bond is not particularly limited, but it is preferable that an underlayer (for example, a resin layer containing a compound having a siloxane bond) is coated with a composition including a material of the additional resin layer other than the resin layer containing a compound having a siloxane bond and an organic solution. The coating method is not particularly limited and the coating can be performed according to a known method, for example, a spin coating method.

The conditions for forming the additional resin layer other than the resin layer containing a compound having a siloxane bond of the gas separation membrane of the present invention are not particularly limited, but the temperature thereof is preferably in a range of −30° C. to 100° C., more preferably in a range of −10° C. to 80° C., and particularly preferably in a range of 5° C. to 50° C.

In the present invention, the air and a gas such as oxygen may coexist at the time of forming the additional resin layer other than the resin layer containing a compound having a siloxane bond, but it is desired that the additional resin layer is formed in an inert gas atmosphere.

<Formation of Protective Layer>

The method of producing a gas separation membrane of the present invention may include a step of forming a protective layer on the surface of the resin layer precursor containing a compound having a siloxane bond which is subjected to a surface treatment.

The method of forming a protective layer on the surface of the resin layer precursor containing a compound having a siloxane bond which is subjected to the surface treatment is not particularly limited, but it is preferable to coat the surface with a composition including a material of the protective layer and an organic solvent. Examples of the organic solvent include organic solvents used to form the resin layer containing a compound having a siloxane bond. The coating method is not particularly limited and a known method can be used. For example, the coating can be performed according to a spin coating method.

The method of irradiating a curable composition with radiation when the protective layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy is preferably 10 to 2,000 $mW/cm^2$.

<Method of Separating Gas Mixture>

Using the gas separation membrane of the present invention, it is possible to perform separation of a gas mixture.

In the method of separating a gas mixture used for the gas separation membrane of the present invention, the components of the gas mixture of raw materials are affected by the production area of the raw materials, the applications, or the use environment and are not particularly defined, but it is preferable that the main components of the gas mixture are carbon dioxide and methane, carbon dioxide and nitrogen, or carbon dioxide and hydrogen.

That is, the proportion of carbon dioxide and methane or carbon dioxide and hydrogen in the gas mixture is preferably in a range of 5% to 50% and more preferably in a range of 10% to 40% in terms of the proportion of carbon dioxide. In a case where the gas mixture is present in the coexistence of an acidic gas such as carbon dioxide or hydrogen sulfide, the method of separating the gas mixture using the gas separation membrane of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the method of separating a gas mixture includes a process of allowing carbon dioxide to selectively permeate from mixed gas including carbon dioxide and methane. The pressure during gas separation is preferably in a range of 3 MPa to 10 MPa, more preferably in a range of 4 MPa to 7 MPa, and particularly preferably in a range of 5 MPa to 7 MPa. Further, the temperature during gas separation is preferably in a range of −30° C. to 90° C. and more preferably in a range of 15° C. to 70° C.

[Gas Separation Membrane Module and Gas Separator]

A gas separation membrane module of the present invention includes the gas separation membrane of the present invention.

It is preferable that the gas separation membrane of the present invention is used for a thin film composite obtained by combining with a porous support and also preferable that the gas separation membrane is used for a gas separation membrane module using this thin film composite. Further, using the gas separation membrane, the thin film composite, or the gas separation membrane module of the present invention, a gas separator having means for performing separation and recovery of gas or performing separation and purification of gas can be obtained. The gas separation membrane of the present invention can be made into a module and preferably used. Examples of the module include a spiral type module, a hollow fiber type module, a pleated module, a tubular module, and a plate & frame type module. The gas separation membrane of the present invention may be applied to a gas separation and recovery apparatus which is used together with an absorption liquid described in JP2007-297605A according to a membrane/absorption hybrid method.

Fourth Embodiment

Next, the fourth embodiment that satisfies Condition 4 will be described.

[Gas Separation Membrane]

A gas separation membrane of the present invention includes a resin layer containing a compound having a siloxane bond and positron lifetime τ3 of a third component in a case where the positron is implanted at a strength of 1 keV from the surface of the resin layer containing a compound having a siloxane bond is in a range of 3.40 to 4.20 ns.

With such a configuration, at least one of gas permeability and gas separation selectivity of the gas separation membrane of the present invention is high under high pressure. In the present invention, when positron lifetime τ3 of the third component in a case where the positron is implanted at a strength of 1 keV from the surface of the resin layer containing a compound having a siloxane bond is in a range of 3.40 to 4.20 ns, it is possible to obtain a gas separation membrane in which at least one of gas permeability and gas separation selectivity is high under high pressure.

A layer having separation selectivity indicates a layer in which a ratio ($PCO_2$:$PCH_4$) of a permeability coefficient ($PCO_2$) of carbon dioxide to a permeability coefficient ($PCH_4$) of methane, when a membrane having a thickness of 1 to 30 μm is formed and pure gas of carbon dioxide ($CO_2$) and methane ($CH_4$) is supplied to the obtained membrane at a temperature of 40° C. by setting the total pressure of the gas supply side to 0.5 MPa, is 1.5 or greater.

In the related art, a layer containing a polyimide compound has been frequently used as the layer having separation selectivity of a gas separation membrane, and the configuration of the gas separation membrane of the present invention in which at least one of the gas permeability and the gas separation selectivity is high under high pressure without having the layer containing a polyimide compound by means of having a resin layer containing a compound having a siloxane bond, to which an oxygen atom permeating treatment is applied is not known conventionally.

Here, the gas permeability and the gas separation selectivity of the gas separation membrane are typically in a trade-off relationship. That is, in the gas separation membrane, there is a tendency that the gas separation selectivity is decreased when the gas permeability is increased and the gas separation selectivity is increased when the gas permeability is decreased. Accordingly, it is difficult to increase both of the gas permeability and the gas separation selectivity in a case of a gas separation membrane of the related art. Meanwhile, it is possible to increase both of the gas permeability and the gas separation selectivity in a case of the gas separation membrane of the present invention.

It is preferable that the gas separation membrane of the present invention includes a resin layer 3 containing a compound having a siloxane bond which has a structure to which oxygen atoms are introduced with a gradation from the surface as illustrated in FIG. 6B. The portion to which oxygen atoms are introduced is formed with holes due to the siloxane bond. Because of introduction of oxygen atoms, thermal motion of a polymer is reduced. Therefore, holes which are capable of selective permeation of a large amount of gas are generated. Accordingly, high gas separation selectivity can be obtained unlike the resin layer (polydimethylsiloxane film 11 which is not subjected to an oxygen atom permeating treatment step as illustrated in FIG. 6A)) containing a compound having a siloxane bond before the surface is treated.

Further, when the resin layer includes a gradation structural unit, illustrated in FIG. 6B, formed by silica (compound having a tetravalent silicon atom $Si^{4+}$ represented by the following Formula (1)) and silicone (including a di- or trivalent silicon atom $Si^{2+}$ or $Si^{3+}$ represented by the following Formula (2) or (3)) being mixed, the adhesiveness to the interface between silica and silicone is increased, the membrane is not destroyed even in a case of high $CO_2$ partial pressure, and high selectivity is maintained. The gradation structural unit, which is formed by silica and silicone being mixed, being included in the resin layer containing a compound having a siloxane bond is related to the following X/Y value being in a preferable range.

A polydimethylsiloxane film to which oxygen atoms are uniformly introduced in the film thickness direction as illustrated in FIG. 6C can be prepared using a chemical vapor deposition (CVD) method or the like without a gradation having oxygen atoms being introduced in the film thickness direction. When such a film is compared to the resin layer 3 containing a compound having a siloxane bond of the gas separation membrane of the present invention, the portion to which oxygen atoms are densely introduced in the resin layer 3 containing a compound having a siloxane bond of the gas separation membrane of the present invention is thinner than a polydimethylsiloxane film 12 to which oxygen atoms are uniformly introduced in the film thickness direction. It is difficult for the polydimethylsiloxane film to which oxygen atoms are uniformly introduced in the film thickness direction to be made thin similar to the thickness of the portion to which oxygen atoms are densely introduced in the resin layer 3 containing a compound having a siloxane bond of the gas separation membrane of the present invention.

Meanwhile, the gas separation membrane of the present invention can be designed such that the gas permeability is greatly increased and the gas separation selectivity is decreased. In addition, the gas separation membrane of the present invention can be also designed such that the gas permeability is decreased and the gas separation selectivity is greatly increased. Even in these cases, the gas separation selectivity of the gas separation membrane of the present invention is higher than that of a gas separation membrane of the related art when the gas separation membrane of the present invention is designed to have performance of gas permeability similar to the performance of gas permeability of the gas separation membrane of the related art and the gas permeability of the gas separation membrane of the present invention is higher than that of the gas separation membrane of the related art when the gas separation membrane of the present invention is designed to have performance of gas separation selectivity similar to the performance of gas separation selectivity of the gas separation membrane of the related art.

Hereinafter, preferred embodiments of the gas separation membrane of the present invention will be described.

<Configuration>

It is preferable that the gas separation membrane of the present invention is a thin film composite (also referred to as a gas separation composite membrane) or an asymmetric membrane or is formed of hollow fibers. Among these, a thin film composite is more preferable.

Hereinafter, a case where the gas separation membrane is a thin film composite is occasionally described as a typical example, but the gas separation membrane of the present invention is not limited by the thin film composite.

A preferred configuration of the gas separation membrane of the present invention will be described with reference to the accompanying drawings. An example of a gas separation membrane 10 of the present invention illustrated in FIG. 1 is a gas separation membrane which is a thin film composite and includes a support 4 and a resin layer 3 containing a compound having a siloxane bond.

Another example of the gas separation membrane 10 of the present invention which is illustrated in FIG. 2 further includes a layer (an additional resin layer described below) 1 containing a polyimide compound on a side opposite to the support 4 of the resin layer 3 containing a compound having a siloxane bond in addition to the support 4 and the resin layer 3 containing a compound having a siloxane bond.

The gas separation membrane of the present invention may have only one or two or more resin layers containing a compound having a siloxane bond. The gas separation membrane of the present invention has preferably one to five resin layers containing a compound having a siloxane bond, more preferably one to three resin layers, particularly preferably one or two layers, and more particularly preferably only one resin layer from the viewpoint of production cost. Another example of the gas separation membrane 10 of the present invention illustrated in FIG. 3 has two resin layers 3 containing a compound having a siloxane bond.

The expression "on the support" in the present specification means that another layer may be interposed between the support and a layer having separation selectivity. Further, in regard to the expressions related to up and down, the direction in which a gas to be separated is supplied to is set as "up" and the direction in which the separated gas is discharged is set as "down" as illustrated in FIG. 1 unless otherwise specified.

In FIG. 4, the surface of the resin layer 3 containing a compound having a siloxane bond is denoted by the reference numeral 6.

In FIG. 4, in a case where the depth d is 10 nm, the surface parallel with the "surface 6 of the resin layer containing a compound having a siloxane bond" at a depth 10 nm (in the direction of a support) from the surface of the resin layer 3 containing a compound having a siloxane bond is a "surface of a resin layer containing a compound having a siloxane bond at a depth of 10 nm (in the direction of the support) from the surface of the resin layer containing a compound having a siloxane bond" which is represented by the reference numeral 7.

<Support>

It is preferable that the gas separation membrane of the present invention includes a support and more preferable that the resin layer containing a compound having a siloxane bond is formed on the support. Since the gas permeability can be sufficiently secured, it is preferable that the support is thin and is formed of a porous material.

The gas separation membrane of the present invention may be obtained by forming and disposing the resin layer 3 containing a compound having a siloxane bond on or in the surface of the porous support or may be a thin film composite conveniently obtained by forming the resin layer on the surface thereof. When the resin layer 3 containing a compound having a siloxane bond is formed on the surface of the porous support, a gas separation membrane with an advantage of having high separation selectivity, high gas permeability, and mechanical strength at the same time can be obtained.

In a case where the gas separation membrane of the present invention is a thin film composite, it is preferable that the thin film composite is formed by coating (the term "coating" in the present specification includes a form made by a coating material being adhered to a surface through immersion) the surface of the porous support with a coating solution (dope) that forms the resin layer 3 containing a compound having a siloxane bond. Specifically, it is preferable that the support has a porous layer on the side of the resin layer 3 containing a compound having a siloxane bond and more preferable that the support is a laminate formed of non-woven fabric and a porous layer disposed on the side of the resin layer 3 containing a compound having a siloxane bond.

The material of the porous layer which is preferably applied to the support is not particularly limited and may be an organic or inorganic material as long as the material satisfies the purpose of providing mechanical strength and high gas permeability. A porous membrane of an organic polymer is preferable, and the thickness thereof is in a range of 1 to 3,000 µm, preferably in a range of 5 to 500 µm, and more preferably in a range of 5 to 150 µm. In regard to the pore structure of the porous layer, the average pore diameter is typically 10 µm or less, preferably 0.5 µm or less, and more preferably 0.2 µm or less. The porosity is preferably in a range of 20% to 90% and more preferably in a range of 30% to 80%. Further, the molecular weight cut-off of the porous layer is preferably 100,000 or less. Moreover, the gas permeability is preferably $3 \times 10^{-5}$ cm$^3$ (STP: STP is an abbreviation for standard temperature and pressure)/cm$^2 \cdot$cm$\cdot$sec$\cdot$cmHg (30 GPU: GPU is an abbreviation for gas permeation unit) or greater in terms of the permeation rate of carbon dioxide. Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous layer, any of a flat shape, a spiral shape, a tubular shape, and a hallow fiber shape can be employed.

In the thin film composite, it is preferable that woven fabric, non-woven fabric, or a net used to provide mechanical strength is provided in the lower portion of the porous layer disposed on the side of the resin layer 3 containing a compound having a siloxane bond. In terms of film forming properties and the cost, non-woven fabric is preferably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer Containing Compound Having Siloxane Bond>

The gas separation membrane of the present invention includes a resin layer containing a compound having a siloxane bond.

(Positron Lifetime $\tau 3$ of Third Component)

In the gas separation membrane of the present invention, the positron lifetime $\tau 3$ of a third component in a case where the positron is implanted at a strength of 1 keV from the surface of the resin layer containing a compound having a siloxane bond is in a range of 3.40 to 4.20 ns, preferably in a range of 3.40 to 4.11 ns, more preferably in a range of 3.40 to 4.10 ns, and particularly preferably in a range of 3.40 to 3.99 ns.

The positron annihilation method is a method of evaluating pores (free volume pores) having a pore diameter of 1 Å to 10 nm, which is difficult to measure using other techniques, using the positron being extremely small. The pore diameter of a layer containing a polymer compound such as a polymer can be calculated by analyzing the third component which is a component having a long lifetime with a lifetime spectrum of the positron and measuring the positron lifetime $\tau 3$ of the third component (o-Ps). The positron is connected to the electron in a polymer to form ortho-positronium o-Ps. This o-Ps is considered to be trapped and annihilated in pores. The positron lifetime $\tau 3$ of o-Ps at this time is represented by a function of the radius R of pores. The positron lifetime can be analyzed using a non-linear least square program POSITRONFIT. At the same time, relative strength I3 of the third component which represents the porosity of pores is also calculated.

Further, when an electron linear accelerator-utilizing positron beam device is used, the energy of implanting the positron can be changed so that information of pores in the surface in a case where the energy is low and the information of pores in the inside in a case where the energy is high can be more obtained. The information of an area mainly at approximately 20 nm from the surface in the depth direction can be obtained when the implanting energy is 1 keV and information of an area mainly at 200 nm from the surface in the depth direction can be obtained when the implanting energy is 3 keV.

When the positron lifetime $\tau 3$ of the third component in a case where the positron is implanted at a strength of 1 keV from the surface of the resin layer containing a compound having a siloxane bond is in a range of 3.40 to 4.20 ns, it is assumed that pores having a pore diameter of 0.78 to 0.86 nm when averaged are present at approximately 20 nm, in the depth direction (direction of the support), from the surface of the resin layer containing a compound having a siloxane bond. The resin layer containing a compound having a siloxane bond has pore diameters suitable for separation into $CO_2$ and $CH_4$ when pores having such a pore diameter when averaged are present at approximately 20 nm, in the depth direction (direction of the support), from the surface of the resin layer containing a compound having a siloxane bond, and thus gas permeability and gas separation selectivity can be both increased. Since the compound is a mixture of siloxane and silica, relatively large pore diameters and relatively small pore diameters are blended with each other. Consequently, it is considered that the ratio thereof may have been changed.

In the gas separation membrane of the present invention, from the viewpoint of improving both of gas permeability and gas separation selectivity, the positron lifetime $\tau 3$ of the third component in a case where the positron is implanted at a strength of 1 keV from the surface of the resin layer containing a compound having a siloxane bond is set to X and positron lifetime $\tau 3$ of the third component in a case where the positron is implanted at a strength of 3 keV from the surface of the resin layer containing a compound having a siloxane bond is set to Y, it is preferable that the expression of $0.88 \leq X/Y \leq 0.99$ is satisfied, more preferable that the expression of $0.88 \leq X/Y \leq 0.98$ is satisfied, and particularly preferable that the expression of $0.88 \leq X/Y \leq 0.97$ is satisfied.

The information of an area mainly at approximately 20 nm from the surface in the depth direction can be obtained when the implanting energy is 1 keV and information of an area mainly at 200 nm from the surface in the depth direction can be obtained when the implanting energy is 3 keV.

When X/Y is less than 1, oxygen atoms permeate into the inside of the resin layer (this resin layer containing a compound having a siloxane bond functions as a layer having high gas separation selectivity, that is, so-called separation selectivity) containing a compound having a siloxane bond in the thickness direction as X/Y is larger. When a corona treatment or a plasma treatment that is only used to modify the surface and improve the adhesiveness is carried out, oxygen atoms do not enter into the inside sufficiently deep from the surface of the resin layer containing a compound having a siloxane bond as the gas separation selectivity is higher.

(Relative Strength I3 of Third Component)

In the gas separation membrane of the present invention, from the viewpoint of improving gas permeability and gas separation selectivity, the relative strength I3 of the third component in a case where the positron is implanted at a strength of 1 keV from the surface of the resin layer containing a compound having a siloxane bond is preferably in a range of 13% to 41%, more preferably in a range of 13% to 40%, particularly preferably in a range of 13% to 39%, and more particularly preferably in a range of 13% to 33%.

The relative strength I3 of the third component represents the porosity of pores (free volume pores). When the relative strength of the third component I3 in a case where the positron is implanted at a strength of 1 keV from the surface of the resin layer containing a compound having a siloxane bond is in a range of 13% to 41%, it is assumed that the porosity at approximately 20 nm from the surface of the resin layer containing a compound having a siloxane bond in the depth direction (direction of the support) is in a range of 13% to 41%. When the porosity at approximately 20 nm from the surface of the resin layer containing a compound having a siloxane bond in the depth direction (direction of the support) is in the above-described range, the resin layer containing a compound having a siloxane bond has pore diameters suitable for separation into $CO_2$ and $CH_4$ and gas permeability and gas separation selectivity can be both increased.

(Surface of Resin Layer Containing Compound Having Siloxane Bond)

The O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the O/Si ratio (B) that is a ratio of the number of oxygen atoms relative to the number of silicon atoms in the surface of the resin layer containing a compound having a siloxane bond are calculated using electron spectroscopy for chemical analysis (ESCA). Further, the carbon/silicon ratio that is a ratio of the number of carbon atoms relative to the number of silicon atoms in the surface of the resin layer containing a compound having a siloxane bond are calculated in the same manner as described above.

The O/Si ratio (B) that is a ratio of the number of oxygen atoms relative to the number of silicon atoms in the surface of the resin layer containing a compound having a siloxane bond is calculated by putting the porous support on which the resin layer containing a compound having a siloxane bond is formed into Quantera SXM (manufactured by Physical Electronics, Inc.) under conditions of using Al-Kα rays (1,490 eV, 25 W, diameter of 100 µm) as an X-ray source with Pass Energy of 55 eV and Step of 0.05 eV in a measuring region having a size of 300 µm×300 µm.

Next, in order to acquire the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond, etching is performed using $C_{60}$ ions.

Specifically, the ion beam intensity is set to $C_{60}^+$ of 10 keV and 10 nA and a region having a size of 2 mm×2 mm is etched by 10 nm using a $C_{60}$ ion gun belonging to Quantera SXM (manufactured by Physical Electronics, Inc.). With this membrane, the O/Si ratio (A) that is a ratio of the number of oxygen atoms relative to the number of silicon atoms in the surface of the resin layer containing a compound having a siloxane bond is calculated using an ESCA device. The depth of the resin layer containing a compound having a siloxane bond from the surface of the resin layer containing a compound having a siloxane bond is calculated at an etching rate of 10 nm/min of the material of the resin layer containing a compound having a siloxane bond. As this value, an optimum numerical value is appropriately used depending on the material.

In the present specification, the surface of the resin layer containing a compound having a siloxane bond is a surface which has a maximum O/Si ratio in a case where the O/Si ratio is measured from the surface (preferably a surface on a side opposite to the support) of the gas separation membrane and contains 3% (atomic %) or greater of silicon atoms.

In a case where the surface of the resin layer containing a compound having a siloxane bond does not have another layer, the O/Si ratio is the maximum in a case where the O/Si ratio is measured from the surface of the gas separation membrane using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond, and the surface having 3% (atomic %) or greater of silicon atoms is specified.

As the result, according to the above-described method, it is confirmed that the surface of the resin layer containing a compound having a siloxane bond in a state in which the resin layer containing a compound having a siloxane bond is formed on the porous support (in a state without another layer (for example, a layer containing polyimide)) is a "surface which has a maximum O/Si ratio in a case where the O/Si ratio is measured from the surface of the gas separation membrane and contains 3% (atomic %) or greater of silicon atoms".

In a case where the surface of the resin layer containing a compound having a siloxane bond has another layer (for example, a layer containing polyimide), the surface of the resin layer containing a compound having a siloxane bond (that is, the surface which has the maximum O/Si ratio in a case where the O/Si ratio is measured from the surface of the gas separation membrane and contains 3% (atomic %) or greater of silicon atoms) is acquired using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond.

As the result, according to the above-described method, the surface of the resin layer containing a compound having a siloxane bond in a state in which the resin layer containing a compound having a siloxane bond is formed on the porous support (in a state without another layer (for example, a layer containing polyimide)) is the "surface which has a maximum O/Si ratio in a case where the O/Si ratio is measured from the surface of the gas separation membrane and contains 3% (atomic %) or greater of silicon atoms". Specifically, the "surface of the resin layer containing a compound having a siloxane bond in a state in which the resin layer containing a compound having a siloxane bond is formed on the porous support (in a state without another layer (for example, a layer containing polyimide))" is the "surface which has a maximum O/Si ratio in a case where the O/Si ratio is measured from the surface of the gas separation membrane and contains 3% (atomic %) or greater of silicon atoms".

The resin layer containing a compound having a siloxane bond which satisfies the above-described expression is present in the plane of the gas separation membrane by preferably 50% or greater, more preferably 70% or greater, and particularly preferably 90% or greater.

Another region other than the resin layer containing a compound having a siloxane bond which satisfies the above-described expression may be present in the plane of the gas separation membrane. Examples of another region include a region for which an adhesive or a pressure sensitive adhesive is provided and a region in which the resin layer containing a compound having a siloxane bond is not sufficiently subjected to a specific treatment (preferably an oxygen atom permeating treatment).

(Material)

The resin layer containing a compound having a siloxane bond contains a compound having a siloxane bond. The compound having a siloxane bond may be a "compound which includes a repeating unit having at least silicon atoms, oxygen atom, and carbon atoms". Further, the compound having a siloxane bond may be a "compound having a siloxane bond and a repeating unit", and a compound having a polysiloxane bond is preferable.

In the gas separation membrane of the present invention, it is preferable that the compound having a siloxane bond includes at least a repeating unit represented by the following Formula (2) or a repeating unit represented by the following Formula (3).

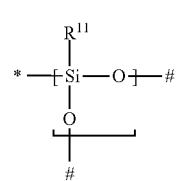

Formula (2)

Formula (3)

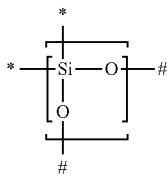

In Formulae (2) and (3), $R^{11}$ represents a substituent, the symbol "*" represents a binding site with respect to # in Formula (2) or (3), and the symbol "#" represents a binding site with respect to * in Formula (2) or (3).

$R^{11}$ in Formula (2) represents preferably a hydroxyl group, an alkyl group having 1 or more carbon atoms, an aryl group, an amino group, an epoxy group, or a carboxyl group, more preferably a hydroxyl group, an alkyl group having 1 or more carbon atoms, an amino group, an epoxy group, or a carboxyl group, and still more preferably a hydroxyl group, an alkyl group having 1 or more carbon atoms, an epoxy group, or a carboxyl group.

The hydroxyl group or the carboxyl group represented by $R^{11}$ in Formula (2) may form an arbitrary salt.

In Formulae (2) and (3), the symbol "*" represents a binding site with respect to # in Formula (2) or (3) and the symbol "#" represents a binding site with respect to "*" in Formula (2) or (3). Further, the symbol "*" may be a binding site with respect to an oxygen atom in the following Formula (1) and the symbol "#" may be a binding site with respect to a silicon atom in the following Formula (1).

In the gas separation membrane of the present invention, it is preferable that the compound having a siloxane bond includes a repeating unit represented by the following Formula (1).

Formula (1)

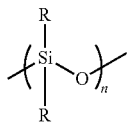

In Formula (1), R's each independently represent a hydrogen atom, an alkyl group having 1 or more carbon atoms, an aryl group, an amino group, an epoxy group, a fluorinated alkyl group, a vinyl group, an alkoxy group, or a carboxyl group, and n represents an integer of 2 or greater.

In a case where a resin layer containing a compound having a siloxane bond is formed using such a compound having a siloxane bond as the material of the resin layer containing a compound having a siloxane bond, it is possible to exhibit high gas permeability and gas separation selectivity under high pressure.

Further, in the case where a resin layer containing a compound having a siloxane bond is formed using such a compound having a siloxane bond as the material of the resin layer containing a compound having a siloxane bond, it is not intended to adhere to any theory, but it is considered that high gas permeability and gas separation selectivity are exhibited under high pressure because oxygen atoms enter not only the surface of the resin layer containing a compound having a siloxane bond but also the inside of the resin layer in the thickness direction so as to be the composition of SiOx. Particularly, even in a case where polydimethylsiloxane that is known to have high gas permeability is used, a resin layer containing a compound having a siloxane bond is formed using dimethylsiloxane, it is possible to exhibit high gas permeability and gas separation selectivity under high pressure. In the surface of the resin layer containing a compound having a siloxane bond and the inside of the resin layer containing a compound having a siloxane bond in the thickness direction after oxygen atoms enter not only the surface of the resin layer containing a compound having a siloxane bond but also the inside of the resin layer in the thickness direction, it is preferable that the compound having a siloxane bond includes at least a repeating unit represented by Formula (2) or a repeating unit represented by Formula (3).

In Formula (1), R's each independently represent preferably an alkyl group having 1 or more carbon atoms, an aryl group, an amino group, an epoxy group, or a carboxyl group, more preferably an alkyl group having 1 or more carbon atoms, an amino group, an epoxy group, or a carboxyl group, and particularly preferably an alkyl group having 1 or more carbon atoms, an epoxy group, or a carboxyl group.

The alkyl group having 1 or more carbon atoms which is represented by R in Formula (1) is preferably an alkyl group having 1 to 10 carbon atoms, more preferably a methyl group, an ethyl group, or a propyl group, and particularly preferably a methyl group. The alkyl group having 1 or more carbon atoms which is represented by R may be linear, branched, or cyclic.

The aryl group represented by R in Formula (1) is preferably an aryl group having 6 to 20 carbon atoms and particularly preferably a phenyl group.

The fluorinated alkyl group represented by R in Formula (1) is preferably a fluorinated alkyl group having 1 to 10 carbon atoms, more preferably a fluorinated alkyl group having 1 to 3 carbon atoms, and particularly preferably a trifluoromethyl group. The fluorinated alkyl group represented by R may be linear, branched, or cyclic.

The alkoxy group represented by R in Formula (1) is preferably an alkoxy group having 1 to 10 carbon atoms, more preferably a methoxy group, an ethoxy group, or a propyloxy group, and particularly preferably a methoxy group. The alkoxy group having 1 or more carbon atoms which is represented by R may be linear, branched, or cyclic.

In Formula (1), n represents an integer of 2 or greater, preferably in a range of 40 to 800, more preferably in a range of 50 to 700, and particularly preferably in a range of 60 to 500.

The compound having a siloxane bond which has a repeating unit represented by Formula (1) may include an arbitrary substituent other than the repeating unit represented by Formula (1) in the terminal of a molecule. Examples and preferable ranges of the substituent which the terminal of a molecule of the compound having a siloxane bond which includes a repeating unit represented by Formula (1) may have are the same as the examples and preferable ranges of R in Formula (1).

In the gas separation membrane of the present invention, it is preferable that the surface of the resin layer containing a compound having a siloxane bond contains a compound having a siloxane bond which includes a repeating unit represented by Formula (1) and at least a repeating unit represented by Formula (2) or a repeating unit represented by Formula (3).

In the gas separation membrane of the present invention, the ratio of the repeating unit represented by Formula (3) to the repeating unit represented by Formula (2) and the repeating unit represented by Formula (1) in the compound having a siloxane bond contained in the surface of the resin layer containing a compound having a siloxane bond is preferably in a range of 100% to 600% by mole, more preferably in a range of 200% to 600% by mole, and particularly preferably in a range of 300% to 600% by mole.

In the gas separation membrane of the present invention, it is preferable that the resin layer containing a compound having a siloxane bond at a depth of 10 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 10 nm from the surface of the resin layer containing a compound having a siloxane bond is preferably in a range of 3.0% to 500% by mole, more preferably in a range of 3.5% to 450% by mole, and particularly preferably in a range of 4.0% to 400% by mole.

Further, in the gas separation membrane of the present invention, it is preferable that the resin layer containing a compound having a siloxane bond at a depth of 100 nm from the surface of the resin layer containing a compound having a siloxane bond contains a compound having a siloxane bond which includes a repeating unit represented by Formula (1) and at least a repeating unit represented by Formula (2) or a repeating unit represented by Formula (3). In the gas separation membrane of the present invention, the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 100 nm from the surface of the resin layer containing a compound having a siloxane bond is preferably in a range of 2.0% to 400% by mole, more preferably in a range of 2.5% to 350% by mole, and particularly preferably in a range of 3.0% to 300% by mole.

It is preferable that the compound having a siloxane bond used for the resin layer containing a compound having a siloxane bond has a functional group which can be polymerized. Examples of such a functional group include an epoxy group, an oxetane group, a carboxyl group, an amino group, a hydroxyl group, and a thiol group. It is more preferable that the resin layer containing a compound having a siloxane bond includes an epoxy group, an oxetane group, a carboxyl group, and a compound having a siloxane bond which includes two or more groups among these groups. It is preferable that such a resin layer containing a compound having a siloxane bond is formed by being cured by irradiating a radiation-curable composition on the support with radiation.

The compound having a siloxane bond which is used for the resin layer containing a compound having a siloxane bond may be polymerizable dialkylsiloxane formed from a partially cross-linked radiation-curable composition having a dialkylsiloxane group. Polymerizable dialkylsiloxane is a monomer having a dialkylsiloxane group, a polymerizable oligomer having a dialkylsiloxane group, or a polymer having a dialkylsiloxane group. As the dialkylsiloxane group, a group represented by $-\{O-Si(CH_3)_2)_2\}_{n2}-$ (n2 represents a number of 1 to 100) can be exemplified. A poly(dialkylsiloxane) compound having a vinyl group at the terminal can be preferably used.

It is preferable that the compound having a siloxane bond which is used for the material of the resin layer containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane]), and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

Commercially available materials can be used as the compound having a siloxane bond which is used for the material of the resin layer containing a compound having a siloxane bond and preferred examples of the compound having a siloxane bond which is used for the resin layer containing a compound having a siloxane bond include UV9300 (polydimethylsiloxane (PDMS), manufactured by Momentive Performance Materials Inc.) and X-22-162C (manufactured by Shin-Etsu Chemical Co., Ltd.).

UV9380C (bis(4-dodecylphenyl)iodonium hexafluoroantimonate, manufactured by Momentive Performance Materials Inc.) can be preferably used as other materials of the resin layer containing a compound having a siloxane bond.

The material of the resin layer containing a compound having a siloxane bond can be prepared as a composition including an organic solvent when the resin layer containing a compound having a siloxane bond is formed, and it is preferable that the material thereof is a curable composition. The organic solvent which can be used when the resin layer containing the compound having a siloxane bond is formed is not particularly limited, and examples thereof include n-heptane.

(Thickness)

The film thickness (same as the thickness) of the resin layer containing a compound having a siloxane bond is not particularly limited, but the thickness of the resin layer containing a compound having a siloxane bond is preferably 0.1 μm from the viewpoint that film formation is easily carried out, more preferably in a range of 0.1 to 5 μm, particularly preferably in a range of 0.1 to 4 μm, and more particularly preferably in a range of 0.3 to 3 μm. The thickness of the resin layer containing a compound having a siloxane bond can be acquired by SEM.

When the film thickness of the resin layer containing a compound having a siloxane bond is reduced so as to be lower than the above-described upper limit, it is observed that the effect of expanding the pore diameter due to swelling resulting from $CO_2$ of the resin layer containing a compound having a siloxane bond can be suppressed so that the gas separation selectivity tends to be increased.

The film thickness of the resin layer containing a compound having a siloxane bond can be controlled by adjusting the coating amount of the curable composition.

<Additional Resin Layer>

The gas separation membrane of the present invention may contain an additional resin layer other than the resin layer containing a compound having a siloxane bond (hereinafter, the additional resin layer will be described).

Examples of the resin contained in the additional resin layer are described below, but are not limited thereto. Specifically, the compound having a siloxane bond, polyimides, polyamides, celluloses, polyethylene glycols, and polybenzoxazoles are preferable and at least one selected from the compound having a siloxane bond, polyimide, polybenzoxazole, and acetic acid cellulose is more preferable. It is particularly preferable that the gas separation membrane of the present invention includes the resin layer containing a compound having a siloxane bond and further includes a layer containing a polyimide compound as the additional resin layer.

Polyimide having a reactive group is preferable as the polyimide compound.

Hereinafter, a case where the resin of the additional resin layer is polyimide having a reactive group will be described as a typical example, but the present invention is not limited to the case where a polymer having a reactive group is polyimide having a reactive group.

The polyimide having a reactive group which can be used in the present invention will be described below in detail.

According to the present invention, in a polyimide compound having a reactive group, it is preferable that a polymer having a reactive group includes a polyimide unit and a repeating unit having a reactive group (preferably a nucleophilic reactive group and more preferably a carboxyl group, an amino group, or a hydroxyl group) on the side chain thereof.

More specifically, it is preferable that the polymer having a reactive group includes at least one repeating unit represented by the following Formula (I) and at least one repeating unit represented by the following Formula (III-a) or (III-b).

Further, it is more preferable that the polymer having a reactive group includes at least one repeating unit represented by the following Formula (I), at least one repeating unit represented by the following Formula (II-a) or (II-b), and at least one repeating unit represented by the following Formula (III-a) or (III-b).

The polyimide having a reactive group which can be used in the present invention may include repeating units other than the respective repeating units described above, and the number of moles thereof is preferably 20 or less and more preferably in a range of 0 to 10 when the total number of moles of the respective repeating units represented by each of Formulae is set to 100. It is particularly preferable that the polyimide having a reactive group which can be used in the present invention is formed of only the respective repeating units represented by each of the following formulae.

Formula (I)

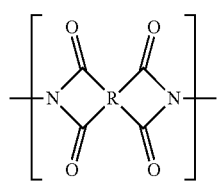

In Formula (I), R represents a group having a structure represented by any of the following Formulae (I-a) to (I-h). In the following Formulae (I-a) to (I-h), the symbol "*" represents a binding site with respect to a carbonyl group of Formula (I). R in Formula (I) is occasionally referred to as a mother nucleus, and it is preferable that this mother nucleus R is a group represented by Formula (I-a), (I-b), or (I-d), more preferable that this mother nucleus R is a group represented by Formula (I-a) or (I-d), and particularly preferable that this mother nucleus R is a group represented by Formula (I-a).

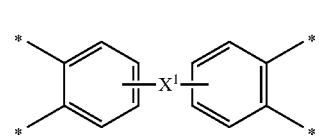
(I-a)

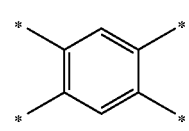
(I-b)

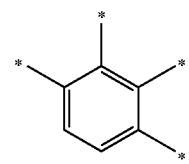
(I-c)

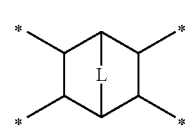
(I-d)

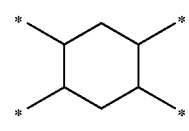
(I-e)

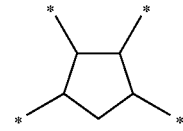
(I-f)

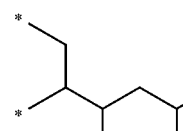
(I-g)

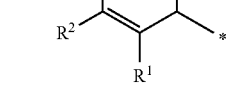
(I-h)

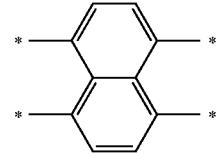

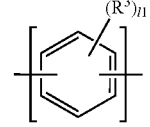
Formula (II-a)

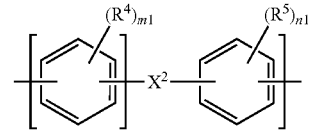
Formula (II-b)

-continued

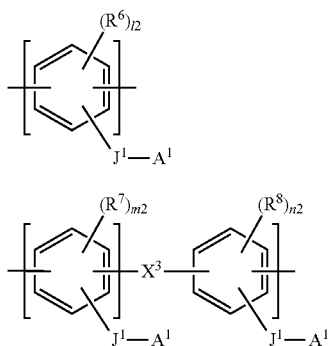

Formula (III-a)

Formula (III-b)

$X^1$, $X^2$, and $X^3$ $X^1$, $X^2$, and $X^3$ represent a single bond or a divalent linking group. As the divalent linking groups of these, —$C(R^x)_2$— ($R^x$ represents a hydrogen atom or a substituent group. In a case where $R^x$ represents a substituent group, $R^x$'s may be linked to each other and form a ring), —O—, —$SO_2$—, —C(=O)—, —S—, —$NR^Y$— ($R^Y$ represents a hydrogen atom, an alkyl group (preferably a methyl group or an ethyl group), or an aryl group (preferably a phenyl group)), or a combination of these is preferable and a single bond or —$C(R^x)_2$— is more preferable. When $R^x$ represents a substituent group, a group Z of substituent groups described below is specifically exemplified. Among these, an alkyl group is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and then a cyclic structure may be formed or condensation may be made and then a condensed ring structure may be formed.

L

L represents —$CH_2$=$CH_2$— or —$CH_2$— and —$CH_2$=$CH_2$— is preferable.

$R^1$ and $R^2$ $R^1$ and $R^2$ represent a hydrogen atom or a substituent group. As the substituent group, any one selected from the group Z of substituent groups described below can be used. $R^1$ and $R^2$ may be bonded to each other and form a ring.

$R^1$ and $R^2$ represent preferably a hydrogen atom or an alkyl group, more preferably a hydrogen atom, a methyl group, or an ethyl group, and still more preferably a hydrogen atom.

$R^3$ $R^3$ represents an alkyl group or a halogen atom. The preferable ranges of the alkyl group and the halogen atom are the same as those of an alkyl group and a halogen atom defined in the group Z of substituent groups described below. l1 showing the number of $R^3$'s represents an integer of 0 to 4, is preferably in a range of 1 to 4, and is more preferably 3 or 4. It is preferable that $R^3$ represents an alkyl group and more preferable that $R^3$ represents a methyl group or an ethyl group.

$R^4$ and $R^5$ $R^4$ and $R^5$ represent an alkyl group or a halogen atom or a group in which $R^4$ and $R^5$ are linked to each other and form a ring together with $X^2$. The preferable ranges of the alkyl group and the halogen atom are the same as those of an alkyl group and a halogen atom defined in the group Z of substituent groups described below. The structure formed by $R^4$ and $R^5$ being linked to each other is not particularly limited, but it is preferable that the structure is a single bond, —O—, or —S—. m1 and n1 respectively showing the numbers of $R^4$'s and $R^5$'s represent an integer of 0 to 4, are preferably in a range of 1 to 4, and are more preferably 3 or 4.

In a case where $R^4$ and $R^5$ represent an alkyl group, it is preferable that $R^4$ and $R^5$ represent a methyl group or an ethyl group and also preferable that $R^4$ and $R^5$ represent trifluoromethyl.

$R^6$, $R^7$, and $R^8$ $R^6$, $R^7$, and $R^8$ represent a substituent group. Here, $R^7$ and $R^8$ may be bonded to each other and form a ring. l2, m2, and n2 respectively showing the numbers of these substituents represent an integer of 0 to 4, are preferably in a range of 0 to 2, and are more preferably 0 or 1.

$J^1$

J1 represents a single bond or a divalent linking group. As the linking group, *—$COO^-N^+R^bR^cR^d$-** ($R^b$ to $R^d$ represent a hydrogen atom, an alkyl group, or an aryl group, and preferable ranges thereof are respectively the same as those described in the group Z of substituent groups described below), *—$SO_3^-N^+R^eR^fR^g$-** ($R^e$ to $R^g$ represent a hydrogen atom, an alkyl group, or an aryl group, and preferable ranges thereof are respectively the same as those described in the group Z of substituent groups described below), an alkylene group, or an arylene group is exemplified. The symbol "*" represents a binding site on the phenylene group side and the symbol "**" represents a binding site on the opposite side of the phenylene group. It is preferable that $J^1$ represents a single bond, a methylene group, or a phenylene group and a single bond is particularly preferable.

$A^1$ $A^1$ is not particularly limited as long as $A^1$ represents a group in which a crosslinking reaction may occur, but it is preferable that $A^1$ represents a nucleophilic reactive group and more preferable that $A^1$ represents a group selected from a carboxyl group, an amino group, a hydroxyl group, and —S(=O)$_2$OH. The preferable range of the amino group is the same as the preferable range of the amino group described in the group Z of substituent groups below. $A^1$ represents particularly preferably a carboxyl group, an amino group, or a hydroxyl group, more particularly preferably a carboxyl group or a hydroxyl group, and still more particularly preferably a carboxyl group.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, para-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methyl carbamoyl, diethyl carbamoyl, and phenyl carbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxyl group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

In the polyimide compound which can be used in the present invention, the ratios of the respective repeating units represented by Formulae (I), (II-a), (II-b), (III-a), and (III-b) are not particularly limited and appropriately adjusted in consideration of gas permeability and gas separation selectivity according to the purpose of gas separation (recovery rate, purity, or the like).

In the polyimide having a reactive group which can be used in the present invention, a ratio ($E_{II}/E_{III}$) of the total number ($E_{II}$) of moles of respective repeating units represented by Formulae (II-a) and (II-b) to the total number ($E_{III}$) of moles of respective repeating units represented by Formulae (III-a) and (III-b) is preferably in a range of 5/95 to 95/5, more preferably in a range of 10/90 to 80/20, and still more preferably in a range of 20/80 to 60/40.

The molecular weight of the polyimide having a reactive group which can be used in the present invention is preferably in a range of 10,000 to 1,000,000, more preferably in a range of 15,000 to 500,000, and still more preferably in a range of 20,000 to 200,000 as the weight-average molecular weight.

The molecular weight and the dispersity in the present specification are set to values measured using a gel permeation chromatography (GPC) method unless otherwise specified and the molecular weight is set to a weight-average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

The polyimide having a reactive group which can be used in the present invention can be synthesized by performing condensation and polymerization of a specific bifunctional acid anhydride (tetracarboxylic dianhydride) and a specific diamine. As the method, a technique described in a general book (for example, "*The Latest Polyimide~Fundamentals and Applications~*" edited by Toshio Imai and Rikio Yokota, NTS Inc., pp. 3 to 49) can be appropriately selected.

Preferred specific examples of the polyimide having a reactive group which can be used in the present invention will be described below, but the present invention is not limited thereto. Further, "100," "x," and "y" in the following formulae indicate a copolymerization ratio (molar ratio). Examples of "x," "y," and the weight-average molecular weight are listed in the following Table 4. Moreover, in the polyimide compound which can be used in the present invention, it is preferable that y does not represent 0.

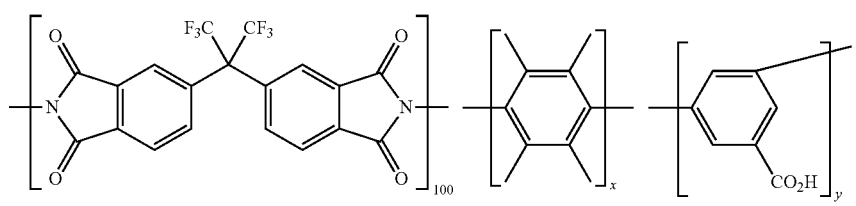

(P-100)

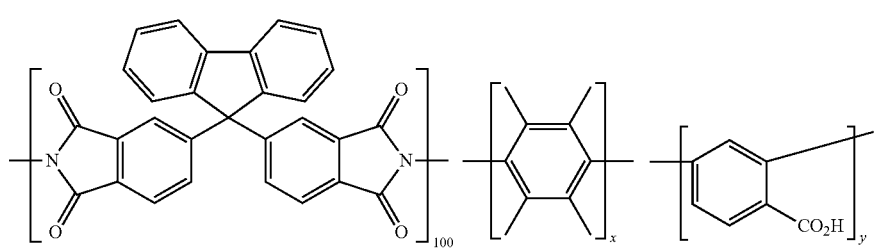

(P-200)

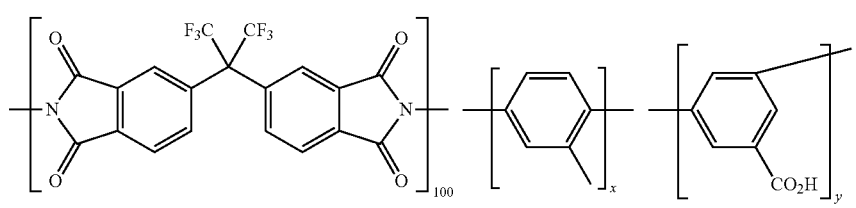

(P-300)

-continued
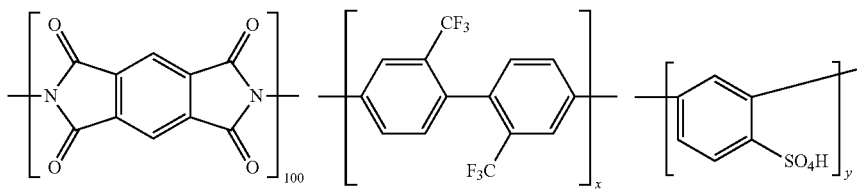 (P-400)
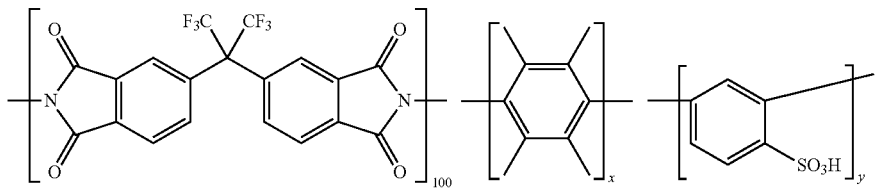 (P-500)
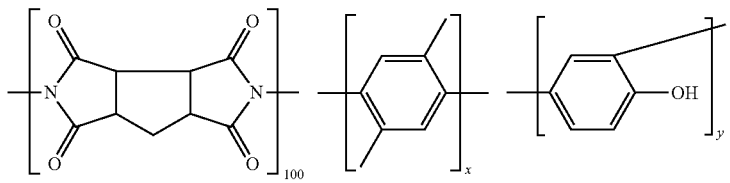 (P-600)
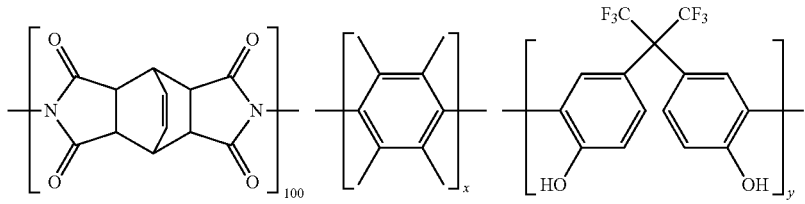 (P-700)
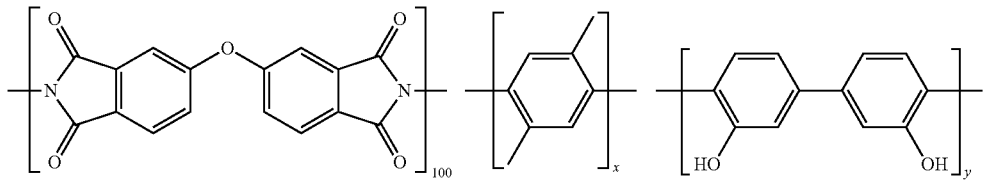 (P-800)
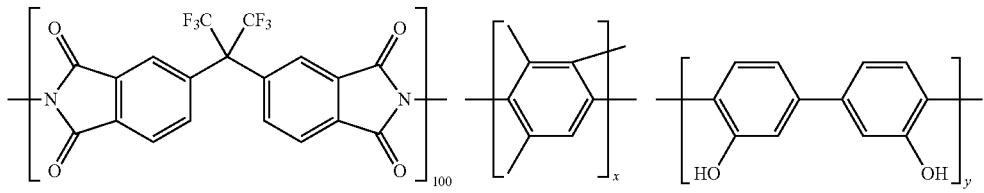 (P-900)
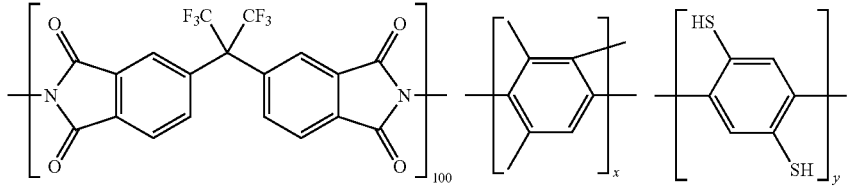 (P-1000)
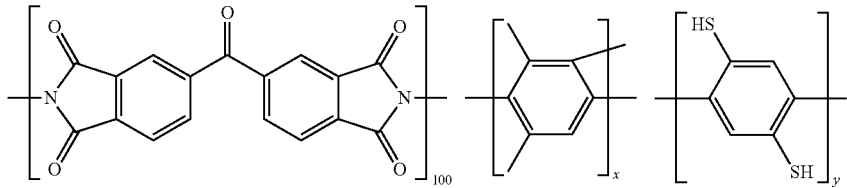 (P-1100)

TABLE 4

| Polymer | Copolymerization ratio | | Weight-average molecular weight |
| --- | --- | --- | --- |
| | x | y | |
| P-100 | 30 | 70 | 132,000 |
| P-200 | 40 | 60 | 168,000 |
| P-300 | 60 | 40 | 165,000 |
| P-400 | 10 | 90 | 158,000 |
| P-500 | 20 | 80 | 128,000 |
| P-600 | 50 | 50 | 155,000 |
| P-700 | 70 | 30 | 112,500 |
| P-800 | 30 | 70 | 158,000 |
| P-900 | 20 | 80 | 128,000 |
| P-1000 | 60 | 40 | 150,000 |
| P-1100 | 40 | 60 | 117,000 |

Moreover, in the copolymerization ratio of the polyimide compound P-100 exemplified above, a polymer (P-101) in which x is set to 20 and y is set to 80 can be preferably used.

Further, in a case where the resin of the additional resin layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

In addition, the resin of the additional resin layer other than polyimide can be selected from celluloses such as cellulose acetate, cellulose triacetate, cellulose acetate butyrate, cellulose propionate, ethyl cellulose, methyl cellulose, and nitrocellulose. As the celluloses which can be used for the additional resin layer, it is preferable that the degree of substitution of all acyl groups is in a range of 2.0 to 2.7. Cellulose acetate L-40 (degree of substitution of acyl groups: 2.5, manufactured by Daicel Corporation) which is commercially available as a product of cellulose acetate can be preferably used.

As other resins of the additional resin layer, polyethylene glycols such as a polymer obtained by polymerizing polyethylene glycol #200 diacrylate (manufactured by Shin-Nakamura Chemical Co., Ltd.); and a polymer described in JP2010-513021A can be selected.

Another additional resin layer may be interposed between the support and the resin layer containing a compound having a siloxane bond. As another additional resin layer, PVA whose hydrophilicity and hydrophobicity are adjusted or the like may be exemplified.

(Characteristics)

It is preferable that the thickness of the additional resin layer is as small as possible under the conditions of imparting high gas permeability while maintaining the mechanical strength and gas separation selectivity.

From the viewpoint of improving the gas permeability, it is preferable that the additional resin layer other than the resin layer containing a compound having a siloxane bond of the gas separation membrane of the present invention is a thin layer. The thickness of the additional resin layer other than the resin layer containing a compound having a siloxane bond is typically 10 μm or less, preferably 3 μm or less, particularly preferably 1 μm or less, more particularly preferably 0.3 μm or less, and still more particularly preferably 0.2 μm or less.

Further, the thickness of the additional resin layer other than the resin layer containing a compound having a siloxane bond is typically 0.01 μm or greater, preferably 0.03 μm or greater from the practical viewpoint that film formation is easily carried out, and more preferably 0.1 μm or greater.

<Protective Layer>

The gas separation membrane of the present invention may include a protective layer formed on the additional resin layer or the resin layer containing a compound having a siloxane bond. The protective layer is a layer disposed on the additional resin layer or the resin layer containing a compound having a siloxane bond. At the time of handling or use, unintended contact between the additional resin layer or the resin layer containing a compound having a siloxane bond and other materials can be prevented.

(Material)

The material of the protective layer is not particularly preferable, but the preferable ranges of the material used for the protective layer are the same as the preferable ranges of the material used for the resin layer containing a compound having a siloxane bond. Particularly, it is preferable that the protective layer described above is at least one selected from polydimethylsiloxane, poly(1-trimethylsilyl-1-propyne), and polyethylene oxide, more preferable that the protective layer is polydimethylsiloxane or poly(1-trimethylsilyl-1-propyne), and particularly preferable that the protective layer is polydimethylsiloxane.

(Characteristics)

The thickness of the protective layer is preferably in a range of 20 nm to 3 μm, more preferably in a range of 50 nm to 2 μm, and particularly preferably in a range of 100 nm to 1 μm.

<Characteristics and Applications>

The separation membrane of the present invention can be suitably used according to a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable.

It is preferable that the gas separation membrane of the present invention selectively separates carbon dioxide from the gas mixture including particularly carbon dioxide and hydrocarbon (methane).

In addition, in a case where gas subjected to a separation treatment is mixed gas of carbon dioxide and methane, the permeation rate of the carbon dioxide at 40° C. and 6 MPa is preferably 10 GPU or greater, more preferably in a range of 10 to 300 GPU, particularly preferably in a range of 15 to 300 GPU, and more particularly preferably in a range of 30 to 300 GPU.

Further, 1 GPU is $1\times10^{-6}$ cm$^3$(STP)/cm$^2$·sec·cmHg.

In the case where the gas separation membrane of the present invention is a membrane in which the gas subjected to a separation treatment is mixed gas of carbon dioxide and methane, a gas separation selectivity a which is a ratio of the permeation flux of carbon dioxide at 40° C. and 6 MPa to the permeation flux of methane is preferably 30 or greater, more preferably 35 or greater, particularly preferably 40 or greater, and more particularly preferably 50 or greater.

It is considered that a mechanism of dissolution and diffusion in a membrane is involved in the selective gas permeation. From this viewpoint, a separation membrane including a polyethyleneoxy (PEO) composition is examined (see Journal of Membrane Science, 160 (1999), pp. 87 to 99). This is because interaction between carbon dioxide and the polyethyleneoxy composition is strong. Since this polyethyleneoxy film is a flexible rubber-like polymer film having a low glass transition temperature, a difference in the diffusion coefficient resulting from the kind of gas is small and the gas separation selectivity is mainly due to the effect of a difference in solubility. Meanwhile, the preferred embodiments of the present invention can be significantly improved from the viewpoints of the high glass transition temperature of the compound having a siloxane bond contained in the resin layer containing a compound having a siloxane bond and the thermal durability of the membrane while the above-described action of dissolution and diffusion is exhibited.

<Method of Producing Gas Separation Membrane>

A method of producing the gas separation membrane of the present invention is not particularly limited.

In the method of producing a gas separation membrane of the present invention, it is preferable that a specific treatment is performed on a resin layer precursor containing a compound having a siloxane bond. As the specific treatment performed on the resin layer precursor containing a compound having a siloxane bond, an oxygen atom permeating treatment of allowing oxygen atoms to permeate into the resin layer precursor containing a compound having a siloxane bond is preferable and a plasma treatment is more preferable.

It is preferable that the method of producing a gas separation membrane of the present invention is a method of producing a gas separation membrane of the present invention described below.

The method of producing a gas separation membrane of the present invention includes an oxygen atom permeating treatment step of allowing oxygen atoms to permeate into a resin layer precursor containing a compound having a siloxane bond, in which the oxygen atom permeating treatment step is a step for performing a plasma treatment using carrier gas having an oxygen flow rate of 45 cm$^3$ (STP)/min or greater and anode coupling at an input power of 23 W or greater.

The method of producing a gas separation membrane of the present invention and preferred configurations of the method of producing a gas separation membrane of the present invention will be described with reference to the accompanying drawings.

It is preferable that the method of producing a gas separation membrane of the present invention includes a step of applying a specific treatment (oxygen atom permeating treatment 5) to a laminate of the support 4 and a resin layer precursor 2 containing a compound having a siloxane bond from one surface side of the resin layer precursor 2 containing a compound having a siloxane bond as illustrated in FIG. 5.

Thereafter, the method of producing a gas separation membrane of the present invention may include a step of forming an additional resin layer on the surface of the resin layer precursor containing a compound having a siloxane bond, which is subjected to the specific treatment (oxygen atom permeating treatment 5) (not illustrated).

<Formation of Resin Layer Precursor Containing Compound Having Siloxane Bond>

It is preferable that the method of producing the gas separation membrane of the present invention includes a step of forming a resin layer precursor containing a compound having a siloxane bond on the support.

The method of forming the resin layer precursor containing a compound having a siloxane bond on the support is not particularly limited, but it is preferable to coat the surface with a composition including a material of the resin layer precursor containing a compound having a siloxane bond and an organic solvent. The coating method is not particularly limited and a known method can be used. For example, the coating can be appropriately performed according to a spin coating method, a dip coating method, or a bar coating method.

It is preferable that the composition including a material of the resin layer precursor containing a compound having a siloxane bond and an inorganic solvent is a curable composition. The method of irradiating a curable composition with radiation when the resin layer containing a compound having a siloxane bond is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy is preferably in a range of 10 to 2,000 mW/cm$^2$.

It is preferable that the compound having a siloxane bond which is used for the material of the resin layer precursor containing a compound having a siloxane bond contains at least one selected from polydimethylsiloxane (hereinafter, also referred to as PDMS), polydiphenyl siloxane, polydi(trifluoropropyl)siloxane, poly[methyl(3,3,3-trifluoropropyl)siloxane]), and poly(1-trimethylsilyl-1-propyne) (hereinafter, also referred to as PTMSP), more preferable that the compound thereof contains polydimethylsiloxane or poly(1-trimethylsilyl-1-propyne), and particularly preferable that the compound thereof contains polydimethylsiloxane.

<Treatment of Resin Layer Precursor Containing Compound Having Siloxane Bond>

It is preferable that the method of producing a gas separation membrane of the present invention includes a step of performing a specific treatment (oxygen atom permeating treatment) of allowing oxygen atoms to permeate into the resin layer precursor (preferably from one surface side thereof) containing a compound having a siloxane bond and more preferable that the above-described specific treatment is performed until the positron lifetime τ3 of the third component in a case where the positron is implanted at a strength of 1 keV from the surface of the resin layer containing a compound having a siloxane bond is in a range of 3.40 to 4.20 ns.

The method of performing the above-described specific treatment is not particularly limited, and examples thereof include a method of performing a plasma treatment from one surface side of the resin layer precursor containing a compound having a siloxane bond.

The method of producing a gas separation membrane of the present invention includes an oxygen atom permeating treatment step of allowing oxygen atoms to permeate into the resin layer precursor containing a compound having a siloxane bond, in which the oxygen atom permeating treatment step is a step for performing a plasma treatment using carrier gas having an oxygen flow rate of 45 cm$^3$ (STP)/min or greater and anode coupling at an input power of 23 W or greater.

For example, a method of performing the plasma treatment under the following conditions for 5 to 30 seconds may be exemplified.

Plasma treatment conditions: oxygen flow rate of 45 cm$^3$ (STP)/min or greater, argon flow rate of 100 cm$^3$ (STP)/min, input power (discharge output) of 23 W or greater, and anode coupling.

From the viewpoints of improving the gas separation selectivity and the scratch resistance so that the separation selectivity is unlikely to be degraded, the plasma treatment is carried out preferably for 5 seconds or longer under the above-described conditions, particularly preferably 10 seconds or longer, and more particularly preferably 20 seconds or longer.

Meanwhile, it is preferable that the plasma treatment is performed for 1,000 seconds or shorter under the above-described conditions. Since the effects are sufficiently exhibited by performing the treatment for a short time in a case where the above-described specific treatment is a plasma treatment, applications of the plasma treatment to the production using a roll-to-roll system can be made. It is more preferable that the plasma treatment is performed for 40 seconds or shorter under the above-described conditions and particularly preferable that the plasma treatment is performed for 30 seconds or shorter.

Moreover, the integrated accumulate energy amount resulting from the plasma treatment amount is preferably in a range of 25 to 500,000 J/cm$^2$ and more preferably in a range of 2,500 to 100,000 J/cm$^2$.

As the plasma treatment applied to the present invention, an embodiment in which a workpiece is treated in a large vacuum chamber using a reduced-pressure plasma in order to generate a stabilized plasma is exemplified. Recently, an atmospheric pressure plasma treatment apparatus which is capable of performing a treatment in an atmospheric pressure atmosphere has been developed. Using the atmospheric pressure plasma treatment apparatus, gas is introduced into a process chamber and a high-density plasma can be stably generated in an atmospheric pressure atmosphere. As an example of the system configuration of the atmospheric pressure plasma treatment apparatus, a configuration formed of a gas mixing and controlling unit, a reactor, and a conveying conveyor (alternatively, an XY table) is exemplified. A configuration in which a treatment is carried out by blowing a plasma jet from a circular nozzle in a spot form has been suggested.

In regard to the plasma treatment conditions, the flow rate of argon is preferably in a range of 5 to 500 cm$^3$(STP)/min, more preferably in a range of 50 to 200 cm$^3$(STP)/min, and particularly preferably in a range of 80 to 120 cm$^3$(STP)/min. In the method of producing a gas separation membrane of the present invention, the flow rate of oxygen is 45 cm$^3$(STP)/min or greater, preferably 50 cm$^3$(STP)/min or greater, and more preferably in a range of 50 to 100 cm$^3$(STP)/min.

In regard to the plasma treatment conditions, the vacuum degree is preferably in a range of 0.6 to 100 Pa, more preferably in a range of 1 to 60 Pa, and particularly preferably in a range of 2 to 40 Pa.

In regard to the plasma treatment conditions of the method of producing a gas separation membrane of the present invention, the input power (discharge power) is 23 W or greater, preferably in a range of 23 to 1,000 W, more preferably in a range of 40 to 1,000 W, and particularly preferably in a range of 110 to 500 W.

In the method of producing a gas separation membrane of the present invention, from the viewpoint of gas separation selectivity, it is preferable to use anode coupling as the condition of carrying out the plasma treatment.

A corona treatment can be used in place of the plasma treatment.

<Method of Additional Resin Layer>

The method of preparing the additional resin layer other than the resin layer containing a compound having a siloxane bond is not particularly limited, and the additional resin layer may be formed by obtaining a commercially available product of a known material, may be formed according to a known method, or may be formed according to a method described below using a specific resin.

The method of forming the additional resin layer other than the resin layer containing a compound having a siloxane bond is not particularly limited, but it is preferable that an underlayer (for example, a resin layer containing a compound having a siloxane bond) is coated with a composition including a material of the additional resin layer other than the resin layer containing a compound having a siloxane bond and an organic solution. The coating method is not particularly limited and the coating can be performed according to a known method, for example, a spin coating method.

The conditions for forming the additional resin layer other than the resin layer containing a compound having a siloxane bond of the gas separation membrane of the present invention are not particularly limited, but the temperature thereof is preferably in a range of −30° C. to 100° C., more preferably in a range of −10° C. to 80° C., and particularly preferably in a range of 5° C. to 50° C.

In the present invention, the air and a gas such as oxygen may coexist at the time of forming the additional resin layer other than the resin layer containing a compound having a siloxane bond, but it is desired that the additional resin layer is formed in an inert gas atmosphere.

<Formation of Protective Layer>

The method of producing a gas separation membrane of the present invention may include a step of forming a protective layer on the surface of the resin layer precursor containing a compound having a siloxane bond which is subjected to a surface treatment.

The method of forming a protective layer on the surface of the resin layer precursor containing a compound having a siloxane bond which is subjected to the surface treatment is not particularly limited, but it is preferable to coat the surface with a composition including a material of the protective layer and an organic solvent. Examples of the organic solvent include organic solvents used to form the resin layer containing a compound having a siloxane bond. The coating method is not particularly limited and a known method can be used. For example, the coating can be performed according to a spin coating method.

The method of irradiating a curable composition with radiation when the protective layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 to 30 seconds.

The radiant energy is preferably 10 to 2,000 mW/cm$^2$.

<Method of Separating Gas Mixture>

Using the gas separation membrane of the present invention, it is possible to perform separation of a gas mixture.

In the method of separating a gas mixture used for the gas separation membrane of the present invention, the components of the gas mixture of raw materials are affected by the production area of the raw materials, the applications, or the use environment and are not particularly defined, but it is preferable that the main components of the gas mixture are carbon dioxide and methane, carbon dioxide and nitrogen, or carbon dioxide and hydrogen.

That is, the proportion of carbon dioxide and methane or carbon dioxide and hydrogen in the gas mixture is preferably in a range of 5% to 50% and more preferably in a range of 10% to 40% in terms of the proportion of carbon dioxide. In a case where the gas mixture is present in the coexistence of an acidic gas such as carbon dioxide or hydrogen sulfide, the method of separating the gas mixture using the gas separation membrane of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the method of separating a gas mixture includes a process of allowing carbon dioxide to selectively permeate from mixed gas including carbon dioxide and methane. The pressure during gas separation is preferably in a range of 3 MPa to 10 MPa, more preferably in a range of 4 MPa to 7 MPa, and particularly preferably in a range of 5 MPa to 7 MPa. Further, the temperature during gas separation is preferably in a range of −30° C. to 90° C. and more preferably in a range of 15° C. to 70° C.

[Gas Separation Membrane Module and Gas Separator]

A gas separation membrane module of the present invention includes the gas separation membrane of the present invention.

It is preferable that the gas separation membrane of the present invention is used for a thin film composite obtained by combining with a porous support and also preferable that the gas separation membrane is used for a gas separation membrane module using this thin film composite. Further, using the gas separation membrane, the thin film composite, or the gas separation membrane module of the present invention, a gas separator having means for performing separation and recovery of gas or performing separation and purification of gas can be obtained. The gas separation membrane of the present invention can be made into a module and preferably used. Examples of the module include a spiral type module, a hollow fiber type module, a pleated module, a tubular module, and a plate & frame type module. The gas separation membrane of the present invention may be applied to a gas separation and recovery apparatus which is used together with an absorption liquid described in JP2007-297605A according to a membrane/absorption hybrid method.

EXAMPLES

The characteristics of the present invention will be described in detail with reference to examples and comparative examples (the comparative examples do not correspond to known techniques) described below. The materials, the amounts to be used, the ratios, the treatment contents, and the treatment procedures shown in the examples described below can be appropriately changed as long as it is within the gist of the present invention. Accordingly, the scope of the present invention should not be limitatively interpreted by the specific examples described below.

Moreover, "part" and "%" in the sentences are on a mass basis unless otherwise noted.

First Embodiment

First, examples of the first embodiment that satisfy Condition 1 are described below.

Example 1

<Preparation of Resin Layer Precursor Containing Compound Having Siloxane Bond>

(Preparation of Radiation-Curable Polymer Having Dialkylsiloxane Group)

39 g of UV9300 (manufactured by Momentive Performance Materials Inc.), 10 g of X-22-162C (manufactured by Shin-Etsu Chemical Co., Ltd.), and 0.007% by mass of DBU (1,8-diazabicyclo[5.4.0]undec-7-ene) were added to a 150 mL three-neck flask and then dissolved in 50 g of n-heptane. The solution was maintained at 95° C. for 168 hours, thereby obtaining a radiation-curable polymer solution (viscosity of 22.8 mPa·s at 25° C.) having a poly(siloxane) group.

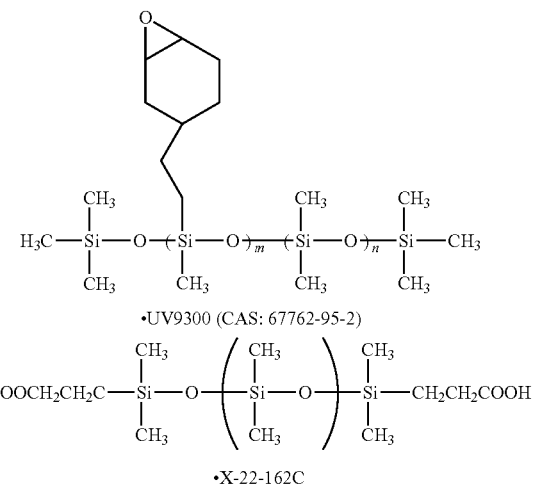

(Preparation of Polymerizable Radiation-Curable Composition)

0.5 g of the radiation-curable polymer solution cooled to 20° C. was diluted with 95 g of n-heptane. 0.5 g of UV9380C (manufactured by Momentive Performance Materials Inc.) as a photopolymerization initiator and 0.1 g of Orgatics TA-10 (manufactured by Matsumoto Fine Chemical Co., Ltd.) were added to the obtained solution, thereby preparing a polymerizable radiation-curable composition.

<Formation of Resin Layer Precursor Containing Compound Having Siloxane Bond>

A polyacrylonitrile (PAN) porous membrane (the polyacrylonitrile porous membrane was present on non-woven fabric, the thickness of the film including the non-woven fabric was approximately 180 μm) was used as a support, and the support was spin-coated with the polymerizable radiation-curable composition, subjected to a UV treatment (Light Hammer 10, D-VALVE, manufactured by Fusion UV System Corporation) under the conditions of a UV intensity of 9 kW/m$^2$ for a UV irradiation time of 10 seconds, and then dried. In this manner, a resin layer precursor containing a compound having a siloxane bond with a dialkylsiloxane group and containing a compound having a siloxane bond having a thickness of 1 µm was formed on the porous support.

<Oxygen Atom Permeating Treatment of Resin Layer Precursor Containing Compound Having Siloxane Bond-Plasma Treatment->

The porous support on which the resin layer precursor containing a compound having a siloxane bond was formed was put into a desktop vacuum plasma device (manufactured by YOUTEC Corporation), carrier gas conditions of an oxygen flow rate of 20 cm$^3$ (STP)/min and an argon flow rate of 100 cm$^3$ (STP)/min were set, and then a plasma treatment was performed at a vacuum degree of 30 Pa and an input power of 25 W for a treatment time of 10 seconds.

The obtained composite membrane was set as a gas separation membrane of Example 1.

(Calculation of Numbers of Silicon Atoms, Oxygen Atoms, and Carbon Atoms of Resin Layer Containing Compound Having Siloxane Bond)

The porous support on which the resin layer containing a compound having a siloxane bond on which the plasma treatment was performed was sampled, and the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the O/Si ratio (B) that is a ratio of the number of oxygen atoms relative to the number of silicon atoms in the surface of the resin layer containing a compound having a siloxane bond were calculated using electron spectroscopy for chemical analysis (ESCA).

The O/Si ratio (B) that is a ratio of the number of oxygen atoms relative to the number of silicon atoms in the surface of the resin layer containing a compound having a siloxane bond is calculated by putting the porous support on which the resin layer containing a compound having a siloxane bond was formed into Quantera SXM (manufactured by Physical Electronics, Inc.) under conditions of using Al-Kα rays (1,490 eV, 25 W, diameter of 100 µm) as an X-ray source with Pass Energy of 55 eV and Step of 0.05 eV in a measuring region having a size of 300 µm×300 µm. Further, the carbon/silicon ratio that is a ratio of the number of carbon atoms relative to the number of silicon atoms in the surface of the resin layer containing a compound having a siloxane bond were calculated in the same manner as described above.

Next, in order to acquire the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond, etching was performed using C$_{60}$ ions. In other words, the ion beam intensity was set to C$_{60}^+$ of 10 keV and 10 nA and a region having a size of 2 mm×2 mm was etched by 10 nm using a C$_{60}$ ion gun belonging to Quantera SXM (manufactured by Physical Electronics, Inc.). With this membrane, the O/Si ratio (A) that is a ratio of the number of oxygen atoms relative to the number of silicon atoms in the surface of the resin layer containing a compound having a siloxane bond is calculated using an ESCA device. The depth of the resin layer containing a compound having a siloxane bond from the surface of the resin layer containing a compound having a siloxane bond was calculated at an etching rate of 10 nm/min of the material of the resin layer containing a compound having a siloxane bond. This value was able to be acquired whenever the material was changed and an optimum numerical value was appropriately used for the material.

The value of A/B was calculated from the obtained O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond and the obtained O/Si ratio (B) that is a ratio of the number of oxygen atoms relative to the number of silicon atoms in the surface of the resin layer containing a compound having a siloxane bond. The results are listed in the following Tables 5 and 6.

The O/Si ratio (C) that is a ratio of the number of oxygen atoms relative to the number of silicon atoms of the resin layer containing a compound having a siloxane bond at a depth of 30 nm from the surface of the resin layer containing a compound having a siloxane bond was acquired in the same manner as that of the O/Si ratio (A) that is a ratio of the number of oxygen atoms relative to the number of silicon atoms contained in the resin layer containing a compound having a siloxane bond at a depth of 10 nm from the surface of the resin layer containing a compound having a siloxane bond. Further, the value of C/B was calculated from the O/Si ratio (B) and the O/Si ratio (C). The results are listed in the following Tables 5 and 6. Further, the carbon/silicon ratio that is a ratio of the number of carbon atoms relative to the number of silicon atoms in the surface of the resin layer containing a compound having a siloxane bond are listed in the following Tables 5 and 6.

The surface of the resin layer containing a compound having a siloxane bond is a surface which has a maximum O/Si ratio in a case where the O/Si ratio is measured from the surface of the gas separation membrane and contains 3% (atomic %) or greater of silicon atoms. The O/Si ratio was the maximum in a case where the O/Si ratio was measured from the surface of the gas separation membrane using the same method as the method of acquiring the O/Si ratio (A) that is a ratio of the number of oxygen atoms relative to the number of silicon atoms contained the resin layer containing a compound having a siloxane bond at a depth of 10 nm from the surface of the resin layer containing a compound having a siloxane bond, and the surface having 3% (atomic %) or greater of silicon atoms was specified.

As the result, according to the above-described method, it was confirmed that the surface of the resin layer containing a compound having a siloxane bond in a state in which the resin layer containing a compound having a siloxane bond was formed on the porous support (in a state without another layer (for example, a layer containing polyimide)) was a "surface which had a maximum O/Si ratio in a case where the O/Si ratio was measured from the surface of the gas separation membrane and contained 3% (atomic %) or greater of silicon atoms".

It was confirmed that the surface of the resin layer containing a compound having a siloxane bond contained a compound having a siloxane bond having a repeating unit represented by Formula (1) and at least a repeating unit represented by Formula (2) or a repeating unit represented by Formula (3) according to the following method.

The Si 2p spectrum was measured using ESCA and the valence of Si ($Si^{2+}$, $Si^3+$, and $Si^{4+}$) was separated and quantified from the curve fitting of obtained peaks.

Further, using the same method, it was confirmed that the ratio of the repeating unit represented by Formula (3) to the repeating unit represented by Formula (2) and the repeating unit represented by Formula (1) in the compound having a siloxane bond contained in the surface of the resin layer containing a compound having a siloxane bond was in a range of 100% to 600% by mole in Examples 1 to 8 and was in a range of 100% to 500% by mole in Example 9 to 12.

It was confirmed that the resin layer containing a compound having a siloxane bond at depths of 10 nm and 30 nm from the surface of the resin layer containing a compound having a siloxane bond contained a compound having a siloxane bond having a repeating unit represented by Formula (1) and at least a repeating unit represented by Formula (2) or a repeating unit represented by Formula (3) according to the following method.

The Si 2p spectrum was measured using ESCA by performing an etching treatment in the same manner as in the examples and the valence of Si ($Si^{2+}$, $Si^3+$, and $Si^{4+}$) was separated and quantified from the curve fitting of obtained peaks.

Further, using the same method, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 10 nm from the surface of the resin layer containing a compound having a siloxane bond was in a range of 3% to 500% by mole in Examples 1 to 8 and was in a range of 5% to 400% by mole in Example 9 to 12.

Further, using the same method, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 30 nm from the surface of the resin layer containing a compound having a siloxane bond was in a range of 3% to 400% by mole in Examples 1 to 8 and was in a range of 5% to 300% by mole in Example 9 to 12.

Examples 2 to 8

Gas separation membranes of Examples 2 to 8 were obtained in the same manner as in Example 1 except that the input power of the plasma treatment applied to the resin layer precursor containing a compound having a siloxane bond in Example 1 was respectively changed from 25W to values as listed in the following table.

Examples 9 and 10

In Example 8, gas separation membranes of Examples 9 and 10 were obtained in the same manner as in Example 8 except that the resin layer precursor material containing a compound having a siloxane bond was changed from PDMS to polydiphenyl siloxane and poly[methyl(3,3,3-trifluoropropyl)siloxane].

As polydiphenyl siloxane, a commercially available product of 482153 (trade name, manufactured by Sigma-Aldrich Japan K.K.) was used. As poly[methyl(3,3,3-trifluoropropyl)siloxane] (abbreviated as PMTFPS), a commercially available product of 481645 (trade name, manufactured by Sigma-Aldrich Japan K.K.) was used.

Example 11

In Example 4, after the oxygen atom permeating treatment was performed, the resin layer containing a compound having a siloxane bond was spin-coated with a polymerizable radiation-curable composition, subjected to a UV treatment (Light Hammer 10, D-VALVE, manufactured by Fusion UV System Corporation) under the conditions of a UV intensity of 24 $kW/m^2$ for a UV irradiation time of 10 seconds, and then dried. In this manner, the second layer of a resin layer precursor having a thickness of 1 μm and containing a compound having a siloxane bond was formed.

The porous support on which the second layer of the resin layer precursor containing a compound having a siloxane bond was formed was put into a desktop vacuum plasma device (manufactured by YOUTEC Corporation), carrier gas conditions of an oxygen flow rate of 20 $cm^3$ (STP)/min and an argon flow rate of 100 $cm^3$ (STP)/min were set, and then a plasma treatment was performed as a second oxygen atom permeating treatment at a vacuum degree of 30 Pa and an input power of 100 W for a treatment time of 10 seconds.

The obtained gas separation membrane was set as a gas separation membrane of Example 11.

Example 12

In Example 11, after the second oxygen atom permeating treatment was performed on the second resin layer precursor containing a compound having a siloxane bond, the second resin layer containing a compound having a siloxane bond was spin-coated with a polymerizable radiation-curable composition, subjected to a UV treatment (Light Hammer 10, D-VALVE, manufactured by Fusion UV System Corporation) under the conditions of a UV intensity of 24 $kW/m^2$ for a UV irradiation time of 10 seconds, and then dried. In this manner, a third resin layer precursor having a thickness of 1 μm and containing a compound having a siloxane bond was formed.

The porous support on which the third resin layer precursor containing a compound having a siloxane bond was formed was put into a desktop vacuum plasma device (manufactured by YOUTEC Corporation), carrier gas conditions of an oxygen flow rate of 20 $cm^3$ (STP)/min and an argon flow rate of 100 $cm^3$ (STP)/min were set, and then a plasma treatment was performed as a third oxygen atom permeating treatment at a vacuum degree of 30 Pa and an input power of 100 W for a treatment time of 10 seconds.

The obtained gas separation membrane was set as a gas separation membrane of Example 12.

Comparative Example 1

A gas separation membrane of Comparative Example 1 was obtained in the same manner as in Example 1 except that the input power of the plasma treatment applied to the resin layer precursor containing a compound having a siloxane bond in Example 1 was changed from 25W to 10 W.

Comparative Example 2

A gas separation membrane of Comparative Example 2 was obtained in the same manner as in Example 1 except that the carrier gas condition of an oxygen flow rate in Example 1 was changed from 20 cm³ (STP)min to 0 cm³ (STP)min.

Comparative Example 3

A polydimethylsiloxane film was treated at 5 W for 120 seconds in an Ar atmosphere based on a technique described in Journal of Membrane Science 99 (1995) pp. 139 to 147, thereby preparing a composite membrane. The obtained composite membrane was evaluated in the same manner as in Example 1. The temperature of a cell set to be 30° C. and the gas separation performance was evaluated using a SUS316 STAINLESS STEEL CELL (manufactured by DENISSEN Ltd.) having high pressure resistance. When the respective gas permeabilities of $CO_2$ and $CH_4$ were attempted to measure by TCD detection type gas chromatography by adjusting the total pressure on the gas supply side of mixed gas, in which the volume ratio of carbon dioxide ($CO_2$) to methane ($CH_4$) was set to 6:94, to 5 MPa (partial pressure of $CO_2$: 0.65 MPa), the pressure was not able to be held.

Comparative Example 4

A polydimethylsiloxane film was subjected to an atmospheric pressure plasma treatment based on a technique described in Journal of Membrane Science 440 (2013) pp. 1 to 8, thereby preparing a composite membrane. The obtained composite membrane was evaluated in the same manner as in Example 1. The temperature of a cell set to be 30° C. and the gas separation performance was evaluated using a SUS316 STAINLESS STEEL CELL (manufactured by DENISSEN Ltd.) having high pressure resistance. When the respective gas permeabilities of $CO_2$ and $CH_4$ were attempted to measure by TCD detection type gas chromatography by adjusting the total pressure on the gas supply side of mixed gas, in which the volume ratio of carbon dioxide ($CO_2$) to methane ($CH_4$) was set to 6:94, to 5 MPa (partial pressure of $CO_2$: 0.65 MPa), the pressure was not able to be held.

Example 13

<Preparation of Additional Resin Layer>
(Synthesis of Polymer (P-101))
A polymer (P-101) was synthesized by the following reaction scheme.

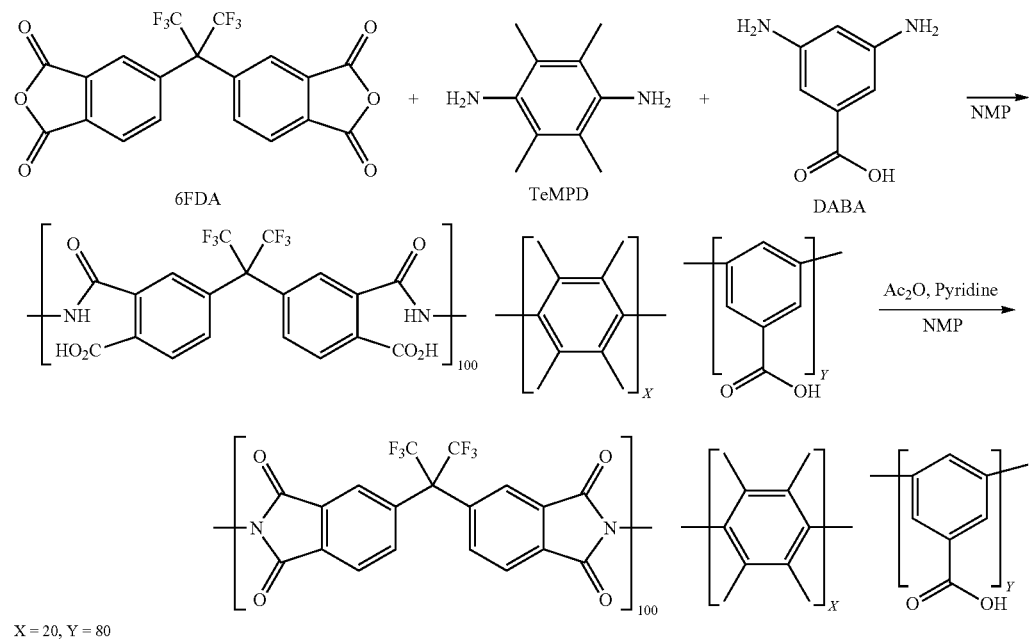

X = 20, Y = 80

Synthesis of Polymer (P-101)

123 ml of N-methylpyrrolidone and 54.97 g (0.124 mol) of 6FDA (manufactured by Tokyo Chemical Industry Co., Ltd., product number: H0771) were added to a 1 L three-neck flask, dissolved at 40° C., and stirred in a nitrogen stream. A solution obtained by dissolving 4.098 g (0.0248 mol) of 2,3,5,6-tetramethylphenylenediamine (manufactured by Tokyo Chemical Industry Co., Ltd., product number: T1457) and 15.138 g (0.0992 mol) of 3,5-diaminobenzoic acid in 84.0 ml of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The obtained polymer crystals were suctioned and filtered and then blast dried at 60° C., thereby obtaining 50.5 g of a polymer (P-101). Further, the polymer (P-101) was a polymer in which the ratio of X:Y was set to 20:80 in the polyimide compound P-100 exemplified above. In the following Table 6, the polymer (P-101) was abbreviated as PI.

(Formation of Additional Resin Layer)

1.4 g of the polymer (P-101) and 8.6 g of methyl ethyl ketone were mixed with each other in a 30 mL brown vial bottle and stirred at 25° C. for 30 minutes. Thereafter, the surface, subjected to the plasma treatment, of the resin layer containing a compound having a siloxane bond was spin-coated with the stirred solution in the same manner as in Example 5 to form an additional resin layer having a thickness of 150 nm, thereby obtaining a gas separation membrane.

The obtained separation membrane was set as a gas separation membrane of Example 13.

Example 14

An additional resin layer was formed in the same manner as in Example 13 except that the resin layer containing a compound having a siloxane bond which was subjected to a plasma treatment under the same conditions as in Example 6 was used as the resin layer containing a compound having a siloxane bond, thereby obtaining a gas separation membrane of Example 14.

Example 15

An additional resin layer was formed in the same manner as in Example 13 except that the resin layer containing a compound having a siloxane bond which was subjected to a plasma treatment under the same conditions as in Example 7 was used as the resin layer containing a compound having a siloxane bond, thereby obtaining a gas separation membrane of Example 15.

[Evaluation]

<Evaluation of Gas Separation Performance of Gas Separation Membrane>

The gas separation membranes of the respective examples and the comparative examples as the obtained thin film composites, were evaluated using a SUS316 STAINLESS STEEL CELL (manufactured by DENISSEN Ltd.) having high pressure resistance after the temperature of a cell was adjusted to 30° C. The respective gas permeabilities of $CO_2$ and $CH_4$ were measured by TCD detection type gas chromatography by adjusting the total pressure on the gas supply side of mixed gas, in which the volume ratio of carbon dioxide ($CO_2$) to methane ($CH_4$) was set to 6:94, to 5 MPa (partial pressure of $CO_2$: 0.65 MPa). The gas separation selectivity of a gas separation membrane of each example and each comparative example was calculated as a ratio ($P_{CO2}/P_{CH4}$) of the permeability coefficient $P_{CO2}$ of $CO_2$ to the permeability coefficient $P_{CH4}$ of $CH_4$ of this membrane. The $CO_2$ permeability of a gas separation membrane of each example and each comparative example was set as the permeability $Q_{CO2}$ (unit: GPU) of $CO_2$ of this membrane.

In addition, the unit of gas permeability was expressed by the unit of GPU [1 GPU=1×10$^{-6}$ cm$^3$ (STP)/cm$^2$·sec·cmHg] representing the permeation flux (also referred to as permeation rate, permeability, and Permeance) per pressure difference or the unit of barrer [1 barrer=1×10$^{-10}$ cm$^3$ (STP) ·cm/cm$^2$·sec·cmHg] representing the permeation coefficient. In the present specification, the symbol Q is used to represent in a case of the unit of GPU and the symbol P is used in a case of the unit of barrer.

In a case where the gas permeability (permeability $Q_{CO2}$ of $CO_2$) was 30 GPU or greater and the gas separation selectivity was 40 or greater, the gas separation performance was evaluated as AA.

In a case where the gas permeability (permeability $Q_{CO2}$ of $CO_2$) was 10 GPU or greater and less than 30 GPU and the gas separation selectivity was 30 or greater and less than 40, the gas separation performance was evaluated as A.

In a case where the gas permeability (permeability $Q_{CO2}$ of $CO_2$) was 10 GPU or greater and the gas separation selectivity was less than 30 or the gas permeability (permeability $Q_{CO2}$ of $CO_2$) was less than 10 GPU and the gas separation selectivity was 30 or greater, the gas separation performance was evaluated as B.

In a case where the gas permeability (permeability $Q_{CO2}$ of $CO_2$) was less than 10 GPU and the gas separation selectivity was less than 30 or the pressure was not applied (the pressure was not able to be held) so that the test was not able to be performed, the gas separation performance was evaluated as C.

TABLE 5

| | | | Example 1 | Example 2 | Example 3 | Example 4 | Example 5 | Example 6 | Example 7 | Example 8 | Example 9 |
|---|---|---|---|---|---|---|---|---|---|---|---|
| Resin layer containing compound having siloxane bond | Thickness [μm] | | 1 | 1 | 1 | 1 | 1 | 1 | 1 | 1 | 1 |
| | Material | | PDMS | PDMS | PDMS | PDMS | PDMS | PDMS | PDMS | PDMS | Polydiphenyl siloxane |
| | Plasma treatment | Treatment time [sec] | 10 | 10 | 10 | 10 | 10 | 10 | 10 | 10 | 10 |
| | | Input power [W] | 25 | 50 | 75 | 100 | 125 | 150 | 200 | 400 | 400 |
| | | $O_2$ flow rate [cm$^3$ (STP)/min] | 20 | 20 | 20 | 20 | 20 | 20 | 20 | 20 | 20 |
| | O/Si ratio | Surface of resin layer containing compound having siloxane bond (B) | 1.78 | 1.8 | 1.81 | 1.85 | 1.99 | 2.15 | 2.34 | 2.6 | 1.71 |
| | | Depth of 10 nm from surface of resin layer containing compound having siloxane bond (A) | 1.02 | 1.1 | 1.15 | 1.19 | 1.3 | 1.56 | 2.01 | 2.33 | 1.15 |

TABLE 5-continued

|  |  |  | | | | | | | | |
|---|---|---|---|---|---|---|---|---|---|---|
| | | Depth of 30 nm from surface of resin layer containing compound having siloxane bond (C) | 1 | 1 | 1 | 1 | 1.05 | 1.45 | 1.76 | 2.21 | 1.04 |
| | A/B | | 0.57 | 0.61 | 0.64 | 0.64 | 0.65 | 0.73 | 0.86 | 0.90 | 0.67 |
| | C/B | | 0.56 | 0.56 | 0.55 | 0.54 | 0.53 | 0.67 | 0.75 | 0.85 | 0.61 |
| | Ratio of carbon/silicon | | 1.60 | 1.50 | 1.32 | 1.15 | 1.10 | 0.96 | 0.85 | 0.72 | — |
| | Number of layers | | 1 | 1 | 1 | 1 | 1 | 1 | 1 | 1 | 1 |
| Evaluation | Gas separation performance | | B | A | A | A | AA | AA | AA | AA | A |

| | | | Example 10 | Example 11 | Example 12 | Comparative Example 1 | Comparative Example 2 | Comparative Example 3 | Comparative Example 4 |
|---|---|---|---|---|---|---|---|---|---|
| Resin layer containing compound having siloxane bond | Thickness [μm] | | 1 | 1 | 1 | 1 | 1 | 1 | 1 |
| | Material | | Poly[methyl (3,3,3-tri-fluoropropyl) siloxane] | PDMS | PDMS | PDMS | PDMS | PDMS | PDMS |
| | Plasma treatment | Treatment time [sec] | 10 | 10 | 10 | 10 | 10 | 120 | — |
| | | Input power [W] | 400 | 100 | 100 | 10 | 50 | 5 | — |
| | | O$_2$ flow rate [cm$^3$ (STP)/min] | 20 | 20 | 20 | 20 | 0 | 0 | — |
| | O/Si ratio | Surface of resin layer containing compound having siloxane bond (B) | 1.81 | 1.85 | 1.85 | 1.65 | 2.1 | 1.9 | 1.6 |
| | | Depth of 10 nm from surface of resin layer containing compound having siloxane bond (A) | 1.23 | 1.19 | 1.19 | 1 | 1 | 1 | — |
| | | Depth of 30 nm from surface of resin layer containing compound having siloxane bond (C) | 1.05 | 1 | 1 | 1 | 1 | 1 | — |
| | A/B | | 0.68 | 0.64 | 0.64 | 0.61 | 0.48 | 0.53 | — |
| | C/B | | 0.58 | 0.54 | 0.54 | 0.61 | 0.48 | 0.53 | — |
| | Ratio of carbon/silicon | | — | 1.15 | 1.15 | 1.80 | 1.85 | 1.80 | — |
| | Number of layers | | 1 | 2 | 3 | 1 | 1 | 1 | 1 |
| Evaluation | Gas separation performance | | A | A | A | C | C | C | C |

TABLE 6

| | | | Example 13 | Example 14 | Example 15 |
|---|---|---|---|---|---|
| Resin layer containing compound having siloxane bond | Thickness [μm] | | 1 | 1 | 1 |
| | Material | | PDMS | PDMS | PDMS |
| | Plasma treatment | Treatment time [sec] | 10 | 10 | 10 |
| | | Input power [W] | 125 | 150 | 200 |
| | | O$_2$ flow rate [cm$^3$ (STP)/min] | 20 | 20 | 20 |
| | O/Si ratio | Surface of resin layer containing compound having siloxane bond (B) | 1.99 | 2.15 | 2.34 |
| | | Depth of 10 nm from surface of resin layer containing compound having siloxane bond (A) | 1.3 | 1.56 | 2.01 |
| | | Depth of 30 nm from surface of resin layer containing compound having siloxane bond (C) | 1 | 1.45 | 1.76 |

TABLE 6-continued

|  |  | Example 13 | Example 14 | Example 15 |
|---|---|---|---|---|
|  | A/B | 0.65 | 0.73 | 0.86 |
|  | C/B | 0.50 | 0.67 | 0.75 |
|  | Ratio of carbon/silicon | 1.10 | 0.96 | 0.85 |
|  | Number of layers | 1 | 1 | 1 |
| Additional resin layer | Polymer | PI | PI | PI |
|  | Thickness [μm] | 0.15 | 0.15 | 0.15 |
| Evaluation | Gas separation performance | AA | AA | A |

From the above-described Tables 5 and 6, it was understood that at least one of the gas permeability ($CO_2$ permeability) or the gas separation selectivity of each gas separation membrane of the present invention under high pressure was high when compared to a case where the value of B was lower than the lower limit defined in the present invention (Comparative Example 1) and a case where the value of A/B was lower than the lower limit defined in the present invention (Comparative Example 2).

Examples 16 to 19

From the following Examples 16 to 19, it was understood that storage tolerance or moisture-heat resistance was improved by decreasing PDMS with fluidity. The details are described below.

Samples with different gel fractions were prepared, according to a method similar to the method used in Example 6 by coating a PAN porous support with a polymerizable radiation-curable composition containing PDMS as a compound having a siloxane bond in which the thickness of one layer was 600 nm and changing the UV irradiation conditions as listed in the following Table 7.

Specifically, adjustment was made by changing the irradiation intensity of a UV-A irradiation lamp such that the UV integrated accumulate light quantity (integrated accumulate energy amount) was set to the values listed in the following Table 7 from the conditions of the UV treatment carried out using Light Hammer 10 (D-VALVE, manufactured by Fusion UV System Corporation) at a UV intensity of 9 kW/m² for a UV irradiation time of 10 seconds in Example 1.

Thereafter, the samples having different gel fractions were subjected to the plasma treatment under the conditions listed in the following Table 7 similar to those in Example 6 and these samples were set to gas separation membranes of Examples 16 to 19.

The characteristics of the obtained gas separation membranes were evaluated in the same manner as in Example 1 and the obtained results are listed in the following Table 7.

<Gel Fraction>

A sample for measuring gel fraction which was irradiated with UV light was separately prepared according to the same method as the method used for the gas separation membranes of Examples 16 to 19 and the gel fraction of the resin layer containing a compound having a siloxane bond was measured using the following method.

A sample was prepared by cutting out a sample for measuring the gel fraction having the resin layer containing a compound having a siloxane bond on the support. The sample was immersed in a chloroform solvent for 24 hours and the signal strength of a Si component in X-ray fluorescence analysis (XRF) before and after the immersion was measured.

XRF-1700 (trade name, manufactured by Shimadzu Corporation) was used as a measuring device for XRF and the measurement was carried out under the conditions of an X-ray voltage of 40 kV, a current of 95 mA, a diaphragm of 30 mmφ (diameter), and a sample mask of 30 mmφ (diameter).

When the signal strength of the Si component of the sample before immersion was set to Xa and the signal strength of the Si component of the sample after immersion was set to Xb, Xb/Xa*100(%) was defined as the gel fraction of the gas separation membrane. Further, in a case where a gas separation membrane was produced, a certain amount of a polymerizable radiation-curable composition permeated into the support and the remaining composition formed the resin layer containing a compound having a siloxane bond. When the sample was immersed in a chloroform solvent, components which were not gelled by UV irradiation were distilled from both of the polymerizable radiation-curable composition permeating into the support and the polymerizable radiation-curable composition on which the resin layer containing a compound having a siloxane bond was formed in XRF, and gelled components remained. Xa and Xb are values obtained by continuously measuring the signal strengths of the Si component from the surface of the resin layer containing a compound having a siloxane bond of the sample to the surface on a side opposite to the support in the depth direction and summing the signal strengths of Si components in the depth direction.

The obtained results are listed in the following Table 7.

Further, the gas separation performance, the storage tolerance, and the moisture-heat resistance were evaluated using a sample subjected to the plasma treatment without being immersed in the above-described chloroform solvent.

<Storage Tolerance>

The storage tolerance was evaluated based on the following standard by comparing the results of evaluating the gas permeability before and after the plasma treatment with the results of evaluating the gas permeability of samples which were allowed to stand in a 50% environment at room temperature for two weeks.

In a case where the gas permeability was changed by 50% or greater, the storage tolerance was evaluated as B. In a case where the gas permeability was only changed by less than 50%, the storage tolerance was evaluated as A.

The obtained results are listed in the following Table 7.

<Moisture-Heat Resistance>

The moisture-heat (conveyance) resistance was evaluated based on the following standard by comparing the results of evaluating the gas permeability immediately after the plasma treatment with the results of evaluating the gas permeability of a sample which were allowed to stand in a 65% environment at 70° C. for two weeks.

In a case where the gas permeability was changed by 50% or greater, the moisture-heat resistance was evaluated as B.

In a case where the gas permeability was only changed by less than 50%, the moisture-heat resistance was evaluated as A.

The obtained results are listed in the following Table 7.

TABLE 7

| | | | Example 16 | Example 17 | Example 18 | Example 19 |
|---|---|---|---|---|---|---|
| Resin layer containing compound having siloxane bond | Thickness [μm] | | 600 | 600 | 600 | 600 |
| | Material | | PDMS | PDMS | PDMS | PDMS |
| | UV treatment | Curing condition [J/cm² (UV-A)] | 0.05 | 0.1 | 0.28 | 0.3 |
| | | Gel fraction [%] | 21 | 50 | 70 | 80 |
| | Plasma treatment | Treatment time [sec] | 10 | 10 | 10 | 10 |
| | | Input power [W] | 150 | 150 | 150 | 150 |
| | | O₂ flow rate [cm³ (STP)min] | 20 | 20 | 20 | 20 |
| | O/Si ratio | Surface of resin layer containing compound having siloxane bond (B) | 2.15 | 2.1 | 2.2 | 2.12 |
| | | Depth of 10 nm from surface of resin layer containing compound having siloxane bond (A) | 1.57 | 1.49 | 1.54 | 1.53 |
| | | Depth of 30 nm from surface of resin layer containing compound having siloxane bond (C) | 1.45 | 1.45 | 1.45 | 1.45 |
| | A/B | | 0.73 | 0.71 | 0.70 | 0.72 |
| | C/B | | 0.67 | 0.69 | 0.66 | 0.68 |
| | Ratio of carbon/silicon | | 0.96 | 0.95 | 0.96 | 0.97 |
| | Number of layers | | 1 | 1 | 1 | 1 |
| Evaluation | Gas separation performance | | AA | AA | AA | AA |
| | Storage tolerance (room temperature, 50%, 2 weeks) | | B | A | A | A |
| | Moisture-heat (conveyance) resistance (70° C., 65%, 2 weeks) | | B | B | A | A |

As shown from the results listed in the above-described Table 7, when the gel fraction of the gas separation membrane was 45% or greater, storage tolerance became excellent. Further, when the gel fraction thereof is 55% or greater, the moisture-heat resistance became excellent in addition to the storage tolerance.

Examples 101 to 119

—Made into Modules—

Spiral type modules were prepared using the gas separation membranes prepared in Examples 1 to 19 with reference to paragraphs [0012] to [0017] of JP1993-168869A (JP-H05-168869A). The obtained gas separation membrane modules were made into gas separation membrane modules of Examples 101 to 119.

It was confirmed that the prepared gas separation membrane modules of Examples 101 to 119 were excellent based on the performance of the gas separation membranes incorporated therein.

In the prepared gas separation membrane modules of Examples 101 to 119, ten portions having a size of 1 cm×1 cm were randomly collected from the center of one surface of a leaf (leaf indicates a portion of a gas separation membrane in which the space on the permeation side in the spiral type module is connected to the central tube and which is folded into an envelope shape with a size of 10 cm×10 cm) and the element ratios of the surface in the depth direction were calculated according to the method of Example 1, and then the modules were confirmed to have the performance as understood from the separation membranes incorporated therein based on nine or more out of ten portions. It was confirmed that the spiral modules were excellent as the performance of the gas separation membranes incorporated therein.

Second Embodiment

Examples of the second embodiment that satisfy Condition 2 are described below.

Example 1001

<Preparation of Polymerizable Radiation-Curable Composition for Forming Resin Layer Precursor Containing Compound Having Siloxane Bond>

(Preparation of Radiation-Curable Polymer Having Dialkylsiloxane Group)

39 g of UV9300 (manufactured by Momentive Performance Materials Inc.), 10 g of X-22-162C (manufactured by Shin-Etsu Chemical Co., Ltd.), and 0.007 g of DBU (1,8-diazabicyclo[5.4.0]undec-7-ene) were added to a 150 mL three-neck flask and then dissolved in 50 g of n-heptane. The solution was maintained at 95° C. for 168 hours, thereby obtaining a radiation-curable polymer solution (viscosity of 22.8 mPa·s at 25° C.) having a poly(siloxane) group.

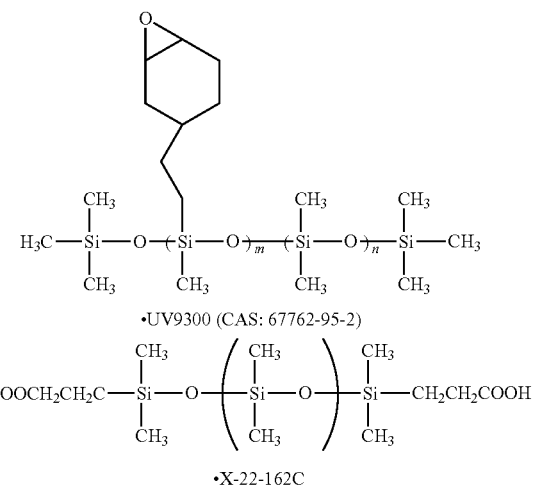

(Preparation of Polymerizable Radiation-Curable Composition)

The radiation-curable polymer solution cooled to 20° C. was diluted with n-heptane such that the solid content was set to 10% by mass. 0.5 g of IO591 (manufactured by Tokyo Chemical Industry Co., Ltd.) serving as a photopolymerization initiator and 0.1 g of Titanium isopropoxide (manufactured by manufactured by Sigma-Aldrich Japan K.K.) were added to the obtained solution, thereby preparing a polymerizable radiation-curable composition.

<Formation of Resin Layer Precursor Containing Compound Having Siloxane Bond>

A polyacrylonitrile (PAN) porous membrane (the polyacrylonitrile porous membrane was present on non-woven fabric, the thickness of the film including the non-woven fabric was approximately 200 μm) was used as a porous support, and the support was spin-coated with the polymerizable radiation-curable composition under conditions of a rotation speed of 3000 rpm and a dropwise addition amount of 0.04 mL/cm$^2$, and then the resultant was stored at room temperature for 30 minutes. Thereafter, the polymeriable radiation-curable composition was subjected to a UV treatment (Light Hammer 10, D-VALVE, manufactured by Fusion UV System Corporation) under the conditions of a UV intensity of 24 kW/m$^2$ for a UV irradiation time of 10 seconds, and then the resin layer precursor containing a compound having a siloxane bond was cured. In the PAN porous support, a region which was not nearly filled with the compound having a siloxane bond was set to a porous support A and the remaining region was set to a region GLi present in the porous support B of the resin layer containing a compound having a siloxane bond.

In this manner, a resin layer precursor containing a compound having a siloxane bond and also containing a region GLi (thickness: 200 nm) present in the porous support B of the resin layer containing a compound having a siloxane bond and a region GLe (thickness: 140 nm) present in the porous support B of the resin layer containing a compound having a siloxane bond was formed.

<Oxygen Atom Permeating Treatment of Resin Layer Precursor Containing Compound Having Siloxane Bond-Plasma Treatment->

The porous support A on which the resin layer precursor containing a compound having a siloxane bond was formed was put into a desktop vacuum plasma device (manufactured by YOUTEC Corporation), carrier gas conditions of an oxygen flow rate of 20 cm$^3$ (STP)/min and an argon flow rate of 100 cm$^3$ (STP)/min were set, and then a plasma treatment was performed at a vacuum degree of 30 Pa and an input power of 150 W for a treatment time of 10 seconds.

The obtained composite membrane was set as a gas separation membrane of Example 1001.

(Calculation of GLe and GLi)

The thickness of a gas separation membrane of each example and each comparative example was measured as follows.

The measurement was performed using time-of-flight secondary ion mass Spectrometry (TOF-SIMS, TRIFT V nano TOF) provided with an Ar-GCIB gun (manufactured by ULVAC-PHI, Inc.). Bi3++ (30 kV) was used as a primary ion source. A 20 eV electron gun was used together to neutralize the charge. Ar-GCIB (Ar2500+, 15 kV) was used for analyzing the depth direction. The thicknesses of GLe, GLi, and the porous support A by acquiring the maximum intensity of the peak intensity derived from silicone. The obtained values of the thicknesses of GLe and GLi are listed in the following Table 8. The ratio of the thickness of GLi to the thickness of GLe was displayed by a percentage and the results are listed in the following Table 8.

The content of a repeating unit represented by Formula (3) at 20 nm from the surface layer (from the surface) of each region of GLe and GLi defined as described above was acquired. The Si 2P spectrum was obtained from analysis of the depth direction using the electron spectroscopy for chemical analysis (ESCA). The valence of silicon atoms ($Si^{2+}$, $Si^{3+}$, and $Si^{4+}$) was separated and quantified from the curve fitting of Si 2P spectrum peaks. The profiles of $Si^{4+}$, $Si^{3+}$, and $Si^{2+}$ in the depth direction were measured, and the ratio of $Si^{4+}$ to all Si components ($Si^{4+}$, $Si^{3+}$, and $Si^{2+}$) was calculated as an integrated value to the depth of 20 nm from the surface layer and set as the content of a repeating unit represented by Formula (3) at 20 nm from the surface layer of GLe and the content of a repeating unit represented by Formula (3) at 20 nm from the surface layer of GLi. The average value through measurement (N=5) was adopted and the results thereof are listed in the following Table 8. Further, a difference between the content of the repeating unit represented by Formula (3) at 20 nm from the surface layer of GLe and the content of a repeating unit represented by Formula (3) at 20 nm from the surface layer of GLi was calculated and the results are listed in the following Table 8.

Further, it was confirmed that the region to a depth of 20 nm from the surface layer of GLe and the surface of GLe of the resin layer containing a compound having a siloxane bond contain the compound having a siloxane bond having the repeating unit represented by Formula (1), the repeating unit represented by Formula (2), and the repeating unit represented by Formula (3).

The depth of the resin layer containing a compound having a siloxane bond from the surface of the resin layer containing a compound having a siloxane bond in the direction of the support was calculated at an etching rate of 10 nm/min of the material of the resin layer containing a compound having a siloxane bond. This value is able to be acquired whenever the material is changed and an optimum numerical value is appropriately used for the material.

The surface (surface of GLe) of the resin layer containing a compound having a siloxane bond can be determined by measuring the O/Si ratio using ESCA in the same manner as described above. In other words, the O/Si ratio was the maximum when the measurement was performed in the direction of the porous support A from the surface of the gas separation membrane on a side opposite to the porous support A and the surface having 3% (atomic %) or greater of silicon atoms was set to the surface of GLe.

Examples 1002 to 1011 and Comparative Examples 1001 to 1004

Gas separation membranes of Examples 1002 to 1011 and Comparative Examples 1001 to 1004 were obtained in the same manner as in Example 1001 except that the conditions of producing the resin layer precursor containing a compound having a siloxane bond in Example 1001 were changed as listed in the following Table 8.

[Evaluation]

<Evaluation of Gas Separation Performance of Gas Separation Membrane>

The gas separation membranes of the respective examples and the comparative examples as the obtained thin film composites, were evaluated using a SUS316 STAINLESS STEEL CELL (manufactured by DENISSEN Ltd.) having high pressure resistance after the temperature of a cell was adjusted to 30° C. The respective gas permeabilities of $CO_2$ and $CH_4$ were measured by TCD detection type gas chromatography by adjusting the total pressure on the gas supply side of mixed gas, in which the volume ratio of carbon dioxide ($CO_2$) to methane ($CH_4$) was set to 6:94, to 5 MPa (partial pressure of $CO_2$: 0.65 MPa). The gas separation selectivity of a gas separation membrane of each example and each comparative example was calculated as a ratio ($P_{CO2}/P_{CH4}$) of the permeability coefficient $P_{CO2}$ of $CO_2$ to the permeability coefficient $P_{CH4}$ of $CH_4$ of this membrane. The $CO_2$ permeability of a gas separation membrane of each example and each comparative example was set as the permeability $Q_{CO2}$ (unit: GPU) of $CO_2$ of this membrane.

In addition, the unit of gas permeability was expressed by the unit of GPU [1 GPU=1×10$^{-6}$ cm$^3$ (STP)/cm$^2$·sec·cmHg] representing the permeation flux (also referred to as permeation rate, permeability, and Permeance) per pressure difference or the unit of barrer [1 barrer=1×10$^{-10}$ cm$^3$ (STP)·cm/cm$^2$·sec·cmHg] representing the permeation coefficient. In the present specification, the symbol Q is used to represent in a case of the unit of GPU and the symbol P is used in a case of the unit of barrer.

In a case where the gas permeability (permeability $Q_{CO2}$ of $CO_2$) was 30 GPU or greater and the gas separation selectivity was 40 or greater, the gas separation performance was evaluated as AA.

In a case where the gas permeability (permeability $Q_{CO2}$ of $CO_2$) was 10 GPU or greater and less than 30 GPU and the gas separation selectivity was 30 or greater and less than 40, the gas separation performance was evaluated as A.

In a case where the gas permeability (permeability $Q_{CO2}$ of $CO_2$) was 10 GPU or greater and the gas separation selectivity was less than 30 or the gas permeability (permeability $Q_{CO2}$ of $CO_2$) was less than 10 GPU and the gas separation selectivity was 30 or greater, the gas separation performance was evaluated as B.

In a case where the gas permeability (permeability $Q_{CO2}$ of $CO_2$) was less than 10 GPU and the gas separation selectivity was less than 30 or the pressure was not applied (the pressure was not able to be held) so that the test was not able to be performed, the gas separation performance was evaluated as C.

The obtained results are listed in the following Table 8.

<Evaluation of Bending Resistance>

A gas separation membrane of each example and each comparative example was wound around a roll having a diameter of 20 mm and allowed to stand under the conditions of a temperature of 25° C. and a relative humidity of 20% for 24 hours. The gas permeating performance after the gas separation membrane was wound around the roll was evaluated according to the above-described method. The ratio (retention ratio) of the gas permeating performance (gas permeability: permeability $Q_{CO2}$ of $CO_2$) after the gas separation membrane was wound around the roll to the gas permeating performance (gas permeability: permeability $Q_{CO2}$ of $CO_2$) before the gas separation membrane was wound around the roll was calculated. The obtained results were evaluated based on the following standard. In the evaluation of bending resistance, A or B is preferable and A is more preferable.

A: The retention ratio was 80% or greater.

B: The retention ratio was less than 80% and 30% or greater.

C: The retention ratio was less than 30%.

The obtained results are listed in the following Table 8.

TABLE 8

|  |  | Example 1001 | Example 1002 | Example 1003 | Example 1004 | Example 1005 | Example 1006 | Example 1007 | Example 1008 |
|---|---|---|---|---|---|---|---|---|---|
| Production condition | Solid content of polymerizable radiation-curable composition [% by mass] | 10 | 10 | 10 | 10 | 10 | 10 | 10 | 10 |
|  | Rotation speed at time of spin coating [rpm] | 3,000 | 2,000 | 3,000 | 1,000 | 2,000 | 1,000 | 1,000 | 1,000 |
|  | Dropwise addition amount of polymerizable radiation-curable composition [ml/cm$^2$] | 0.04 | 0.025 | 0.03 | 0.04 | 0.03 | 0.035 | 0.03 | 0.03 |
|  | Time taken from spin coating to exposure to UV light [min] | 30 | 10 | 1 | 1 | 1 | 1 | 1 | 1 |
|  | Plasma input power [W] | 150 | 150 | 150 | 150 | 150 | 150 | 50 | 200 |
| Layer configuration of resin layer containing compound having siloxane bond | Thickness of GLe [nm] | 140 | 130 | 120 | 950 | 250 | 880 | 750 | 750 |
|  | Thickness of GLi [nm] | 200 | 100 | 45 | 200 | 90 | 190 | 160 | 160 |
|  | Ratio of thickness of GLi [relative to GLe %] | 142.9 | 76.9 | 37.5 | 21.1 | 36.0 | 21.6 | 21.3 | 21.3 |
| Content of repeating unit represented by Formula (3) | 20 nm from surface layer of GLe [%] | 88 | 88 | 88 | 88 | 88 | 88 | 35 | 95 |
|  | 20 nm from surface layer of GLi [%] | 5 | 5 | 5 | 5 | 5 | 5 | 5 | 5 |
|  | Difference between 20 nm from surface layer of GLe and 20 nm from surface layer of GLi [%] | 83 | 83 | 83 | 83 | 83 | 83 | 30 | 90 |
| Evaluation | Gas separation performance | B | A | AA | B | AA | A | AA | AA |
|  | Bending resistance | B | B | B | A | A | AA | A | AA |

TABLE 8-continued

| | | Example 1009 | Example 1010 | Example 1011 | Comparative Example 1001 | Comparative Example 1002 | Comparative Example 1003 | Comparative Example 1004 |
|---|---|---|---|---|---|---|---|---|
| Production condition | Solid content of polymerizable radiation-curable composition [% by mass] | 10 | 10 | 10 | 10 | 12 | 7 | 10 |
| | Rotation speed at time of spin coating [rpm] | 1,000 | 1,000 | 1,000 | 1,000 | 2,000 | 5,000 | 1,000 |
| | Dropwise addition amount of polymerizable radiation-curable composition [ml/cm$^2$] | 0.03 | 0.025 | 0.025 | 0.05 | 0.08 | 0.04 | 0.025 |
| | Time taken from spin coating to exposure to UV light [min] | 1 | 10 | 10 | 30 | 1 | 10 | 10 |
| | Plasma input power [W] | 150 | 150 | 75 | 10 | 10 | 10 | 600 |
| Layer configuration of resin layer containing compound having siloxane bond | Thickness of GLe [nm] | 750 | 480 | 480 | 300 | 1,500 | 40 | 480 |
| | Thickness of GLi [nm] | 160 | 280 | 280 | 1,200 | 600 | 120 | 280 |
| | Ratio of thickness of GLi [relative to GLe %] | 21.3 | 58.3 | 58.3 | 400.0 | 40.0 | 300.0 | 58.3 |
| Content of repeating unit represented by Formula (3) | 20 nm from surface layer of GLe [%] | 88 | 88 | 50 | 31 | 31 | 31 | 99 |
| | 20 nm from surface layer of GLi [%] | 5 | 5 | 5 | 2 | 2 | 2 | 5 |
| | Difference between 20 nm from surface layer of GLe and 20 nm from surface layer of GLi [%] | 83 | 83 | 45 | 29 | 29 | 29 | 94 |
| Evaluation | Gas separation performance | AA | AA | AA | C | C | C | C |
| | Bending resistance | AA | AA | AA | C | C | C | C |

From the above-described Table 8, it was understood that at least one of the gas permeability ($CO_2$ permeability) or the gas separation selectivity of each gas separation membrane of the present invention was high under high pressure when compared to Comparative Examples 1001 to 1004 and the gas separation membranes had excellent bending resistance.

Example 1012

<Preparation of Additional Resin Layer>
(Synthesis of Polymer (P-101))
A polymer (P-101) was synthesized by the following reaction scheme.

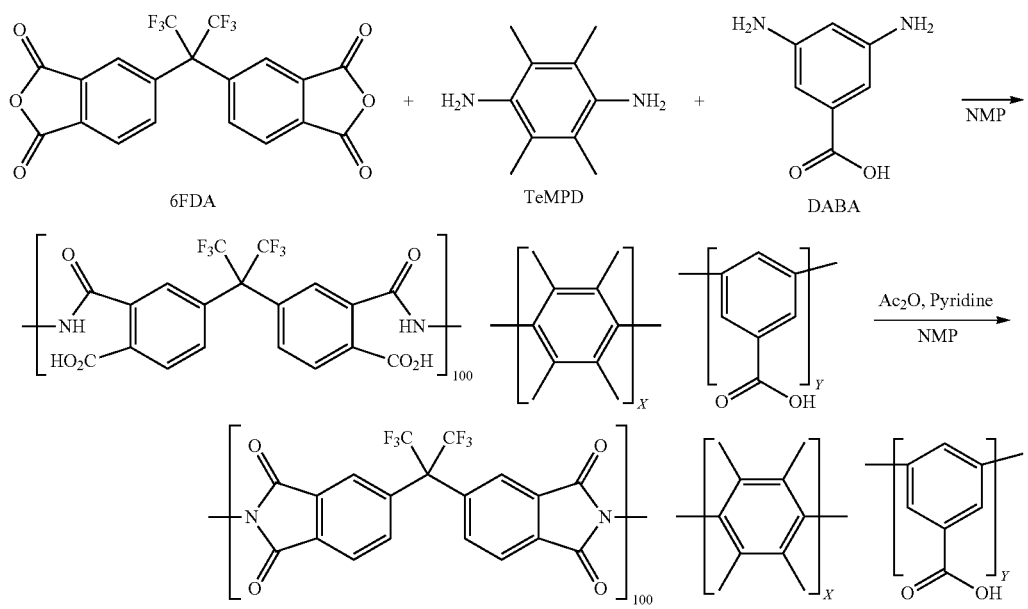

X = 20, Y = 80

Synthesis of Polymer (P-101)

123 ml of N-methylpyrrolidone and 54.97 g (0.124 mol) of 6FDA (manufactured by Tokyo Chemical Industry Co., Ltd., product number: H0771) were added to a 1 L three-neck flask, dissolved at 40° C., and stirred in a nitrogen stream. A solution obtained by dissolving 4.098 g (0.0248 mol) of 2,3,5,6-tetramethylphenylenediamine (manufactured by Tokyo Chemical Industry Co., Ltd., product number: T1457) and 15.138 g (0.0992 mol) of 3,5-diaminobenzoic acid in 84.0 ml of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The obtained polymer crystals were suctioned and filtered and then blast dried at 60° C., thereby obtaining 50.5 g of a polymer (P-101). Further, the polymer (P-101) was a polymer in which the ratio of X:Y was set to 20:80 in the polyimide compound P-100 exemplified above.

(Formation of Additional Resin Layer)

1.4 g of the polymer (P-101) and 8.6 g of methyl ethyl ketone were mixed with each other in a 30 mL brown vial bottle and stirred at 25° C. for 30 minutes. Thereafter, the resin layer containing a compound having a siloxane bond subjected to the plasma treatment under the same conditions as in Example 1008 was spin-coated with the stirred solution in the same manner as in Example 1008 to form an additional resin layer having a thickness of 150 nm, thereby obtaining a gas separation membrane.

The obtained separation membrane was set as a gas separation membrane of Example 1012.

Example 1013

An additional resin layer was formed in the same manner as in Example 1012 except that the resin layer containing a compound having a siloxane bond which was subjected to a plasma treatment under the same conditions as in Example 1009 was used as the resin layer containing a compound having a siloxane bond, thereby obtaining a gas separation membrane of Example 1013.

Example 1014

An additional resin layer was formed in the same manner as in Example 1012 except that the resin layer containing a compound having a siloxane bond which was subjected to a plasma treatment under the same conditions as in Example 1010 was used as the resin layer containing a compound having a siloxane bond, thereby obtaining a gas separation membrane of Example 1014.

In each of the gas separation membranes of Example 1012 to 1014, the gas separation performance and bending resistance were all evaluated as AA.

Examples 1101 to 1114

—Made into Modules—

Spiral type modules were prepared using the gas separation membranes prepared in Examples 1001 to 1014 with reference to paragraphs [0012] to [0017] of JP1993-168869A (JP-H05-168869A). The obtained gas separation membrane modules were made into gas separation membrane modules of Examples 1101 to 1114.

It was confirmed that the prepared gas separation membrane modules of Examples 1101 to 1114 were excellent based on the performance of the gas separation membranes incorporated therein.

In the prepared gas separation membrane modules of Examples 1101 to 1114, ten portions having a size of 1 cm×1 cm were randomly collected from the center of one surface of a leaf (leaf indicates a portion of a gas separation membrane in which the space on the permeation side in the spiral type module is connected to the central tube and which is folded into an envelope shape with a size of 10 cm×10 cm) and the element ratios of the surface in the depth direction were calculated according to the method of Example 1001, and then the modules were confirmed to have the performance as understood from the separation membranes incorporated therein based on nine or more out of ten portions. It was confirmed that the spiral modules were excellent as the performance of the gas separation membranes incorporated therein.

Third Embodiment

Examples of the third embodiment that satisfy Condition 3 are described below.

Example 2001

<Preparation of Polymerizable Radiation-Curable Composition for Forming Resin Layer Precursor Containing Compound Having Siloxane Bond>

KF-102 (side chain type/alicyclic epoxy-modified reactive silicone oil, manufactured by Shin-Etsu Chemical Co., Ltd.) cooled to 20° C. was diluted with n-heptane such that the solid content was set to 10% by mass. 0.5 g of 10591 (manufactured by Tokyo Chemical Industry Co., Ltd.) serving as a photopolymerization initiator and 0.1 g of Titanium isopropoxide (manufactured by manufactured by Sigma-Aldrich Japan K.K.) were added to the obtained solution, thereby preparing a polymerizable radiation-curable composition.

<Formation of Resin Layer Precursor Containing Compound Having Siloxane Bond>

A polyacrylonitrile (PAN) porous membrane (the polyacrylonitrile porous membrane was present on non-woven fabric, the thickness of the film including the non-woven fabric was approximately 180 μm) was used as a support, and the support was spin-coated with the polymerizable radiation-curable composition under conditions of a rotation speed of 3,000 rpm and a dropwise addition amount of 0.03 mL/cm$^2$, and then the resultant was stored at room temperature for one minute. Thereafter, the polymeriable radiation-curable composition was subjected to a UV treatment (Light Hammer 10, D-VALVE, manufactured by Fusion UV System Corporation) under the conditions of a UV intensity of 24 kW/m$^2$ for a UV irradiation time of 10 seconds, and then the resin layer precursor containing a compound having a siloxane bond was cured. In this manner, a resin layer precursor containing a compound having a siloxane bond with a dialkylsiloxane group and containing a compound having a siloxane bond having a thickness of 120 nm was formed on the porous support.

<Oxygen Atom Permeating Treatment of Resin Layer Precursor Containing Compound Having Siloxane Bond-Plasma Treatment->

The porous support on which the resin layer precursor containing a compound having a siloxane bond was formed was put into a desktop vacuum plasma device (manufactured by YOUTEC Corporation), carrier gas conditions of an oxygen flow rate of 20 cm$^3$ (STP)/min and an argon flow rate of 100 cm$^3$ (STP)/min were set, and then a plasma treatment was performed at a vacuum degree of 30 Pa and an input power of 400 W for a treatment time of 7 seconds.

The obtained composite membrane was set as a gas separation membrane of Example 2001.

<Calculation of Proportion of Peaks of $Si^{2+}$ and $Si^{3+}$ Relative to Peaks of all Si Using ESCA Depth Analysis>

The ratio of the total peaks of $Si^{2+}$ and $Si^{3+}$ relative to peaks of all Si of the resin layer containing a compound having a siloxane bond in the depth direction was calculated using electron spectroscopy for chemical analysis (ESCA) with respect to the resin subjected to an etching treatment promoted using $C_{60}$ ions.

In other words, the ion beam intensity was set to $C_{60}^+$ of 10 keV and 10 nA and a region having a size of 2 mm×2 mm was etched at an etching rate of 10 nm/min using a $C_{60}$ ion gun belonging to Quantera SXM (manufactured by Physical Electronics, Inc.), the Si 2p spectrum on the surface of the resin layer containing a compound having a siloxane bond was measured using an ESCA device, and the valence of Si ($Si^{2+}$, $Si^{3+}$, and $Si^{4+}$) was separated and quantified from the curve fitting of obtained peaks, thereby measuring the profile of each peak intensity in the depth direction.

Further, the proportion of peaks of $Si^{2+}$ and $Si^{3+}$ relative to peaks of all Si ($Si^{2+}$, $Si^{3+}$, and $Si^{4+}$) quantified in each depth was calculated and then set as the profile of $Si^{2+}$ and $Si^{3+}$ in the depth direction, and then the minimum value ($Si_0$) was derived. In the gas separation membranes of Examples 2001 to 2013, the surface of the outermost layer (on a side opposite to the support) of the resin layer containing a compound having a siloxane bond was a position having the minimum value ($Si_0$) of the proportion of peaks of $Si^{2+}$ and $Si^{3+}$ relative to peaks of all Si.

A difference ($Si_{10}$)-($Si_0$) between a ratio ($Si_{10}$) ($Si^{2+}$+$Si^{3+}$/all Si) of peaks of $Si^{2+}$ and $Si^{3+}$ relative to peaks of all Si at a depth of 10 nm from the position having the minimum value ($Si_0$) of the ratio ($Si^{2+}$+$Si^{3+}$/all Si) of peaks of $Si^{2+}$ and $Si^{3+}$ relative to peaks of all Si and the minimum value ($Si_0$) of the ratio ($Si^{2+}$+$Si^{3+}$/all Si) of peaks of $Si^{2+}$ and $Si^{3+}$ relative to peaks of all Si was set to Δ1.

Similarly, a difference ($Si_{20}$)-($Si_0$) between a ratio ($Si_{20}$) ($Si^{2+}$+$Si^{3+}$/all Si) of peaks of $Si^{2+}$ and $Si^{3+}$ relative to peaks of all Si at a depth of 20 nm from the position having the minimum value ($Si_0$) of the ratio ($Si^{2+}$+$Si^{3+}$/all Si) of peaks of $Si^{2+}$ and $Si^{3+}$ relative to peaks of all Si and the minimum value ($Si_0$) of the ratio ($Si^{2+}$+$Si^{3+}$/all Si) of peaks of $Si^{2+}$ and $Si^{3+}$ relative to peaks of all Si was set to Δ2.

Moreover, in calculation of $Si_0$, $Si_{10}$, $Si_{20}$, the average value of calculated values obtained by performing measurement five times (the number of N) by changing the location for measurement was adopted.

Further, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond in the surface of the resin layer containing a compound having a siloxane bond from the peaks of $Si^{2+}$, $Si^{3+}$, and $Si^{4+}$ was in a range of 3% to 500% by mole in Examples 2001 and 2004 to 2013 and was in a range of 5% to 400% by mole in Examples 2002 and 2003 using the same method as described above.

Further, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 10 nm from the surface of the resin layer containing a compound having a siloxane bond was in a range of 3% to 500% by mole in Examples 2001 and 2004 to 2013 and was in a range of 5% to 400% by mole in Examples 2002 and 2003 using the same method as described above.

Further, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 20 nm from the surface of the resin layer containing a compound having a siloxane bond was in a range of 3% to 400% by mole in Examples 2001 and 2004 to 2013 and was in a range of 5% to 300% by mole in Examples 2002 and 2003 using the same method as described above.

<Calculation of Thickness of Resin Layer Containing Compound Having Siloxane Bond>

The thickness of the resin layer containing a compound having a siloxane bond of a gas separation membrane of each example and each comparative example was measured as follows.

The measurement was performed using time-of-flight secondary ion mass Spectrometry (TOF-SIMS, TRIFT V nano TOF) provided with an Ar-GCIB gun (manufactured by ULVAC-PHI, Inc.). Bi3++(30 kV) was used as a primary ion source. A 20 eV electron gun was used together to neutralize the charge. Ar-GCIB (Ar2500+, 15 kV) was used for analyzing the depth direction.

Examples 2002 to 2013 and Comparative Examples 2001 to 2003

Gas separation membranes of Examples 2002 to 2013 and Comparative Examples 2001 to 2003 were obtained in the same manner as in Example 2001 except that the conditions of producing the resin layer precursor containing a compound having a siloxane bond and the conditions of the plasma treatment in Example 2001 were changed as listed in the following table.

In Examples 2002 and 2003, UV POLY201 (cationic curing type UV silicone resin, manufactured by ARAKAWA CHEICAL INDUSTRIES, LTD.) was used in place of KF-102 (manufactured by Shin-Etsu Chemical Co., Ltd.), as a compound having a siloxane bond.

[Evaluation]

<Evaluation of Gas Separation Performance of Gas Separation Membrane>

The gas separation membranes of the respective examples and the comparative examples as the obtained thin film composites, were evaluated using a SUS316 STAINLESS STEEL CELL (manufactured by DENISSEN Ltd.) having high pressure resistance after the temperature of a cell was adjusted to 30° C. The respective gas permeabilities of $CO_2$ and $CH_4$ were measured by TCD detection type gas chromatography by adjusting the total pressure on the gas supply side of mixed gas, in which the volume ratio of carbon dioxide ($CO_2$) to methane ($CH_4$) was set to 6:94, to 5 MPa (partial pressure of $CO_2$: 0.65 MPa). The gas separation selectivity of a gas separation membrane of each example and each comparative example was calculated as a ratio ($P_{CO2}/P_{CH4}$) of the permeability coefficient $P_{CO2}$ of $CO_2$ to the permeability coefficient $P_{CH4}$ of $CH_4$ of this membrane. The $CO_2$ permeability of a gas separation membrane of each example and each comparative example was set as the permeability $Q_{CO2}$ (unit: GPU) of $CO_2$ of this membrane.

In addition, the unit of gas permeability was expressed by the unit of GPU [1 GPU=1×10$^{-6}$ cm$^3$ (STP)/cm$^2$·sec·cmHg] representing the permeation flux (also referred to as permeation rate, permeability, and Permeance) per pressure difference or the unit of barrer [1 barrer=1×10$^{-10}$ cm$^3$ (STP)·cm/cm$^2$·sec·cmHg] representing the permeation coefficient. In the present specification, the symbol Q is used to represent in a case of the unit of GPU and the symbol P is used in a case of the unit of barrer.

In a case where the gas permeability (permeability $Q_{CO2}$ of $CO_2$) was 30 GPU or greater and the gas separation selectivity was 40 or greater, the gas separation performance was evaluated as AA.

In a case where the gas permeability (permeability $Q_{CO2}$ of $CO_2$) was 10 GPU or greater and less than 30 GPU and the gas separation selectivity was 30 or greater and less than 40, the gas separation performance was evaluated as A.

In a case where the gas permeability (permeability $Q_{CO2}$ of $CO_2$) was 10 GPU or greater and the gas separation selectivity was less than 30 or the gas permeability (permeability $Q_{CO2}$ of $CO_2$) was less than 10 GPU and the gas separation selectivity was 30 or greater, the gas separation performance was evaluated as B.

In a case where the gas permeability (permeability $Q_{CO2}$ of $CO_2$) was less than 10 GPU and the gas separation selectivity was less than 30 or the pressure was not applied (the pressure was not able to be held) so that the test was not able to be performed, the gas separation performance was evaluated as C.

The obtained results are listed in the following Table 9.

<Evaluation of Pressure Resistance>

In evaluation of the gas separation performance, after the evaluation was performed, a pressure resistance test of performing a step of increasing the total pressure on a gas supply side to 8 MPa and holding the state for 1 hour and then decreasing the total pressure to 5 MPa and holding the state for 1 hour was carried out three times. Next, the gas permeating performance at a total pressure of 5 MPa on the gas supply side was evaluated according to the same method as described above. The ratio (retention ratio) of the gas permeating performance (gas permeability: permeability $Q_{CO2}$ of $CO_2$) after the pressure resistance test was performed to the gas permeating performance (gas permeability: permeability $Q_{CO2}$ of $CO_2$) before the pressure resistance test was performed was calculated. The obtained results were evaluated based on the following standard. In the evaluation of bending resistance, AA, A, or B is preferable, AA or A is more preferable, and AA is particularly preferable.

AA: 80% or greater.
A: 70% or greater and less than 80%.
B: 30% or greater and less than 70%.
C: Less than 30%.

The obtained results are listed in the following Table 9.

TABLE 9

| | | Example 2001 | Example 2002 | Example 2003 | Example 2004 | Example 2005 | Example 2006 | Example 2007 | Example 2008 |
|---|---|---|---|---|---|---|---|---|---|
| Production condition of resin layer precursor containing compound having siloxane bond | Compound having siloxane bond | KF-102 | UV POLY201 | UV POLY201 | KF-102 | KF-102 | KF-102 | KF-102 | KF-102 |
| | Solid content of polymerizable radiation-curable composition [% by mass] | 10 | 10 | 10 | 10 | 12 | 10 | 10 | 10 |
| | Rotation speed at time of spin coating [rpm] | 3,000 | 3,000 | 3,000 | 3,000 | 2,000 | 1,200 | 1,200 | 1,200 |
| | Dropwise addition amount of polymerizable radiation-curable composition [ml/cm$^2$] | 0.03 | 0.03 | 0.03 | 0.03 | 0.08 | 0.03 | 0.03 | 0.03 |
| | Time taken from spin coating to exposure to UV light [min] | 1 | 1 | 1 | 1 | 1 | 1 | 1 | 1 |
| Conditions for plasma treatment | Treatment time [sec] | 7 | 10 | 15 | 10 | 10 | 10 | 10 | 10 |
| | Input power [W] | 400 | 400 | 400 | 400 | 400 | 25 | 50 | 75 |
| | Oxygen flow rate [cm$^3$ (STP)/min] | 20 | 20 | 20 | 20 | 20 | 20 | 20 | 20 |

TABLE 9-continued

|  | | | | | | | | |
|---|---|---|---|---|---|---|---|---|
| Minimum value Si$_0$ of Si$^{2+}$ + Si$^{3+}$/all Si [%] | 2.9 | 3.6 | 3.9 | 4.1 | 4.1 | 38.0 | 29.0 | 15.0 |
| Value Si$_{10}$ of Si$^{2+}$ + Si$^{3+}$/all Si at depth of 10 nm from position having minimum value Si$_0$ of Si$^{2+}$ + Si$^{3+}$/all Si [%] | 37.5 | 42.3 | 54.3 | 70.3 | 70.3 | 93.1 | 92.1 | 89.2 |
| Value Si$_{20}$ of Si$^{2+}$ + Si$^{3+}$/all Si at depth of 20 nm from position having minimum value Si$_0$ of Si$^{2+}$ + Si$^{3+}$/all Si [%] | 48.9 | 58.5 | 58.5 | 80.3 | 80.3 | 96.0 | 95.5 | 95.1 |
| Δ1[%] | 34.6 | 38.7 | 50.4 | 66.2 | 66.2 | 55.1 | 63.1 | 74.2 |
| Δ2[%] | 46.0 | 54.9 | 54.6 | 76.2 | 76.2 | 58.0 | 66.5 | 80.1 |
| Thickness of resin layer containing compound having siloxane bond [nm] | 120 | 120 | 120 | 120 | 1,500 | 600 | 600 | 600 |
| Gas separation performance | B | A | A | AA | B | A | AA | AA |
| Pressure resistance | B | B | A | A | AA | A | AA | A |

| | | Example 2009 | Example 2010 | Example 2011 | Example 2012 | Example 2013 | Comparative Example 2001 | Comparative Example 2002 | Comparative Example 2003 |
|---|---|---|---|---|---|---|---|---|---|
| Production condition of resin layer precursor containing compound having siloxane bond | Compound having siloxane bond | KF-102 | KF-102 | KF-102 | KF-102 | KF-102 | KF-102 | KF-102 | KF-102 |
| | Solid content of polymerizable radiation-curable composition [% by mass] | 10 | 10 | 10 | 10 | 10 | 10 | 10 | 10 |
| | Rotation speed at time of spin coating [rpm] | 1,200 | 1,200 | 1,200 | 1,200 | 1,200 | 1,200 | 1,200 | 1,200 |
| | Dropwise addition amount of polymerizable radiation-curable composition [ml/cm$^2$] | 0.03 | 0.03 | 0.03 | 0.03 | 0.03 | 0.03 | 0.03 | 0.03 |
| | Time taken from spin coating to exposure to UV light [min] | 1 | 1 | 1 | 1 | 1 | 1 | 1 | 1 |
| Conditions for plasma treatment | Treatment time [sec] | 10 | 10 | 10 | 10 | 10 | 10 | 120 | 90 |
| | Input power [W] | 100 | 125 | 150 | 200 | 400 | 10 | 5 | 600 |
| | Oxygen flow rate [cm$^3$ (STP)/min] | 20 | 20 | 20 | 20 | 20 | 20 | 0 | 60 |
| Minimum value Si$_0$ of Si$^{2+}$ + Si$^{3+}$/all Si [%] | | 11.5 | 8.9 | 7.2 | 6.2 | 4.1 | 46.0 | 64.0 | 0.5 |
| Value Si$_{10}$ of Si$^{2+}$ + Si$^{3+}$/all Si at depth of 10 nm from position having minimum value Si$_0$ of Si$^{2+}$ + Si$^{3+}$/all Si [%] | | 86.5 | 85.0 | 80.2 | 75.2 | 70.3 | 94.2 | 94.5 | 12.3 |
| Value Si$_{20}$ of Si$^{2+}$ + Si$^{3+}$/all Si at depth of 20 nm from position having minimum value Si$_0$ of Si$^{2+}$ + Si$^{3+}$/all Si [%] | | 94.5 | 92.6 | 91.3 | 84.3 | 80.3 | 96.3 | 96.4 | 19.3 |
| Δ1[%] | | 75.0 | 76.1 | 73.0 | 69.0 | 66.2 | 48.2 | 30.5 | 11.8 |
| Δ2[%] | | 83.0 | 83.7 | 84.1 | 78.1 | 76.2 | 50.3 | 32.4 | 18.8 |
| Thickness of resin layer containing compound having siloxane bond [nm] | | 600 | 600 | 600 | 600 | 600 | 600 | 600 | 600 |
| Gas separation performance | | AA | AA | AA | AA | AA | C | C | C |
| Pressure resistance | | A | A | A | AA | AA | C | C | AA |

From the above-described Table 9, it was understood that at least one of the gas permeability ($CO_2$ permeability) or the gas separation selectivity of each gas separation membrane of the present invention was high under high pressure and the pressure resistance was excellent when compared to cases (Comparative Examples 2001 and 2002) where the minimum value $Si_0$ of the proportion of peaks of $Si^{2+}$ and $Si^{3+}$ to peaks of all Si in ESCA depth analysis of the resin layer containing a compound having a siloxane bond was greater than the upper limit defined in the present invention.

In addition, it was understood that the pressure resistance of the gas separation membrane of the present invention was not nearly changed, but at least one of the gas permeability ($CO_2$ permeability) or the gas separation selectivity thereof was high under high pressure when compared to a case (Comparative Example 2003) where the minimum value $Si_0$ of the proportion of peaks of $Si^{2+}$ and $Si^{3+}$ to peaks of all Si in ESCA depth analysis of the resin layer containing a compound having a siloxane bond was less than the lower limit defined in the present invention.

Example 2014

<Preparation of Additional Resin Layer>
(Synthesis of Polymer (P-101))
A polymer (P-101) was synthesized by the following reaction scheme.

Synthesis of Polymer (P-101)
123 ml of N-methylpyrrolidone and 54.97 g (0.124 mol) of 6FDA (manufactured by Tokyo Chemical Industry Co., Ltd., product number: H0771) were added to a 1 L three-neck flask, dissolved at 40° C., and stirred in a nitrogen stream. A solution obtained by dissolving 4.098 g (0.0248 mol) of 2,3,5,6-tetramethylphenylenediamine (manufactured by Tokyo Chemical Industry Co., Ltd., product number: T1457) and 15.138 g (0.0992 mol) of 3,5-diaminobenzoic acid in 84.0 ml of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The obtained polymer crystals were suctioned and filtered and then blast dried at 60° C., thereby obtaining 50.5 g of a polymer (P-101). Further, the polymer (P-101) was a polymer in which the ratio of X:Y was set to 20:80 in the polyimide compound P-100 exemplified above.

(Formation of Additional Resin Layer)
1.4 g of the polymer (P-101) and 8.6 g of methyl ethyl ketone were mixed with each other in a 30 mL brown vial bottle and stirred at 25° C. for 30 minutes. Thereafter, the resin layer containing a compound having a siloxane bond subjected to the plasma treatment under the same conditions as in Example 2012 was spin-coated with the stirred solution in the same manner as in Example 2012 to form an additional resin layer having a thickness of 120 nm, thereby obtaining a gas separation membrane.

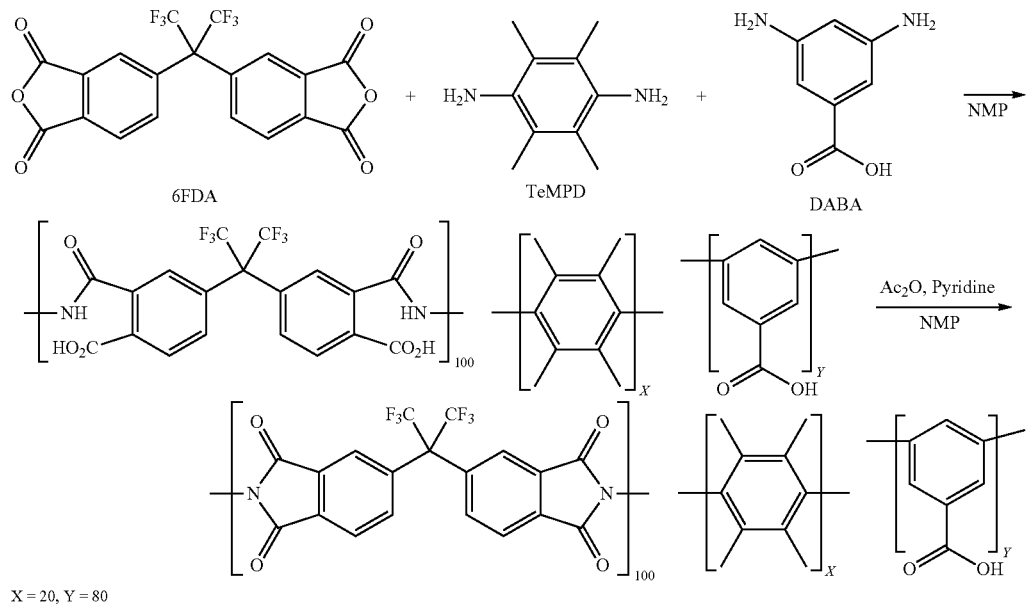

X = 20, Y = 80

The obtained separation membrane was set as a gas separation membrane of Example 2014.

Example 1015

An additional resin layer was formed in the same manner as in Example 2014 except that the resin layer containing a compound having a siloxane bond which was subjected to a plasma treatment under the same conditions as in Example 2013 was used as the resin layer containing a compound having a siloxane bond, thereby obtaining a gas separation membrane of Example 2015.

In each of the gas separation membranes of Example 2014 and 2015, the gas separation performance and pressure resistance were all evaluated as AA.

Examples 2101 to 2115

—Made into Modules—

Spiral type modules were prepared using the gas separation membranes prepared in Examples 2001 to 2015 with reference to paragraphs [0012] to [0017] of JP1993-168869A (JP-H05-168869A). The obtained gas separation membrane modules were made into gas separation membrane modules of Examples 2101 to 2115.

It was confirmed that the prepared gas separation membrane modules of Examples 2101 to 2115 were excellent based on the performance of the gas separation membranes incorporated therein.

In the prepared gas separation membrane modules of Examples 2101 to 2115, ten portions having a size of 1 cm×1 cm were randomly collected from the center of one surface of a leaf (leaf indicates a portion of a gas separation membrane in which the space on the permeation side in the spiral type module is connected to the central tube and which is folded into an envelope shape with a size of 10 cm×10 cm) and the element ratios of the surface in the depth direction were calculated according to the method of Example 2001, and then the modules were confirmed to have the performance as understood from the separation membranes incorporated therein based on nine or more out of ten portions. It was confirmed that the spiral modules were excellent as the performance of the gas separation membranes incorporated therein.

Fourth Embodiment

Examples of the fourth embodiment that satisfy Condition 4 are described below.

Example 3001

<Preparation of Polymerizable Radiation-Curable Composition for Forming Resin Layer Precursor Containing Compound Having Siloxane Bond>

(Preparation of Radiation-Curable Polymer Having Dialkylsiloxane Group)

39 g of UV9300 (manufactured by Momentive Performance Materials Inc.), 10 g of X-22-162C (manufactured by Shin-Etsu Chemical Co., Ltd.), and 0.007 g by mass of DBU (1,8-diazabicyclo[5.4.0]undec-7-ene) were added to a 150 mL three-neck flask and then dissolved in 50 g of n-heptane.

The solution was maintained at 95° C. for 168 hours, thereby obtaining a radiation-curable polymer solution (viscosity of 22.8 mPa·s at 25° C.) having a poly(siloxane) group.

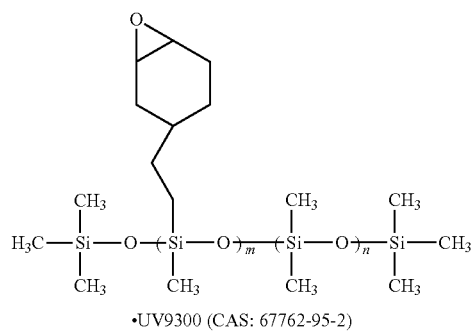

•UV9300 (CAS: 67762-95-2)

-continued

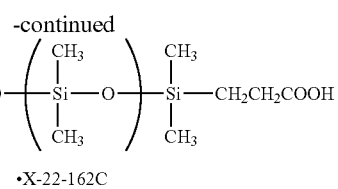

•X-22-162C (Preparation of Polymerizable Radiation-Curable Composition)

5 g of the radiation-curable polymer solution cooled to 20° C. was diluted with 95 g of n-heptane. 0.5 g of UV9380C (manufactured by Momentive Performance Materials Inc.) as a photopolymerization initiator and 0.1 g of Orgatics TA-10 (manufactured by Matsumoto Fine Chemical Co., Ltd.) were added to the obtained solution, thereby preparing a polymerizable radiation-curable composition.

<Formation of Resin Layer Precursor Containing Compound Having Siloxane Bond>

A polyacrylonitrile (PAN) porous membrane (the polyacrylonitrile porous membrane was present on non-woven fabric, the thickness of the film including the non-woven fabric was approximately 180 μm) was used as a support, and the support was spin-coated with the polymerizable radiation-curable composition, subjected to a UV treatment (Light Hammer 10, D-VALVE, manufactured by Fusion UV System Corporation) under the conditions of a UV intensity of 24 kW/m² for a UV irradiation time of 10 seconds, and then dried. In this manner, a resin layer precursor containing a compound having a siloxane bond with a dialkylsiloxane group and containing a compound having a siloxane bond having a thickness of 1 μm was formed on the porous support.

<Oxygen Atom Permeating Treatment of Resin Layer Precursor Containing Compound Having Siloxane Bond-Plasma Treatment->

The porous support on which the resin layer precursor containing a compound having a siloxane bond was formed was put into a desktop vacuum plasma device (manufactured by YOUTEC Corporation), carrier gas conditions of an oxygen flow rate of 50 cm³ (STP)/min and an argon flow rate of 100 cm³ (STP)/min were set, and then a plasma treatment was performed at a vacuum degree of 30 Pa and an input power of 25 W for a treatment time of 20 seconds. As the conditions of the plasma treatment common in each example and each comparative example, the treatment time was set to 20 seconds and the oxygen flow rate was set to 50 cm³ (STP)/min using anode coupling in all cases.

The obtained composite membrane was set as a gas separation membrane of Example 3001.

(Calculation of Valence of Silicon Atoms of Resin Layer Containing Compound Having Siloxane Bond)

The valence of silicon atoms contained in the resin layer containing a compound having a siloxane bond at depths of 10 nm and 100 nm from the surface of the resin layer containing a compound having a siloxane bond in the direction of the support and the valence of silicon atoms in the surface of the resin layer containing a compound having a siloxane bond were calculated using electron spectroscopy for chemical analysis (ESCA).

The spectrum in the surface of the resin layer containing a compound having a siloxane bond was obtained by putting the porous support on which the resin layer containing a compound having a siloxane bond is formed into Quantera SXM (manufactured by Physical Electronics, Inc.) under conditions of using Al-Kα rays (1,490 eV, 25 W, diameter of 100 μm) as an X-ray source with Pass Energy of 55 eV and Step of 0.05 eV in a measuring region having a size of 300 μm×300 μm. Further, etching was performed using $C_{60}$ ions. Specifically, the ion beam intensity was set to $C_{60}+$ of 10 keV and 10 nA and a region having a size of 2 mm×2 mm was etched by 10 nm and 100 nm using a $C_{60}$ ion gun belonging to Quantera SXM (manufactured by Physical Electronics, Inc.). With this membrane, the Si 2P spectrum at depths of 10 nm and 100 nm from the surface of the resin layer containing a compound having a siloxane bond in the direction of the support and the Si 2P spectrum in the surface of the resin layer containing a compound having a siloxane bond were obtained using an ESCA device. The valence of silicon atoms ($Si^{2+}$, $Si^{3+}$, and $Si^{4+}$) was separated and quantified from the curve fitting of the Si 2P spectrum peaks. From the description above, it was confirmed that the resin layer containing a compound having a siloxane bond at depths of 10 nm and 100 nm from the surface of the resin layer containing a compound having a siloxane bond in the direction of the support and the surface of the resin layer containing a compound having a siloxane bond contained a compound having a siloxane bond having a repeating unit represented by Formula (1) and at least a repeating unit represented by Formula (2) or a repeating unit represented by Formula (3).

The depth of the resin layer containing a compound having a siloxane bond from the surface of the resin layer containing a compound having a siloxane bond in the direction of the support was calculated at an etching rate of 10 nm/min of the material of the resin layer containing a compound having a siloxane bond. This value is able to be acquired whenever the material is changed and an optimum numerical value is appropriately used for the material.

Further, using the same method, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 10 nm from the surface of the resin layer containing a compound having a siloxane bond was in a range of 3% to 500% by mole in Examples 3001 to 3007 and was in a range of 5% to 400% by mole in Example 3008 and 3009.

Further, using the same method, it was confirmed that the ratio of the repeating unit represented by Formula (3) to the repeating unit represented by Formula (2) and the repeating unit represented by Formula (1) in the compound having a siloxane bond contained in the resin layer containing a compound having a siloxane bond at a depth of 100 nm from the surface of the resin layer containing a compound having a siloxane bond was in a range of 3% to 400% by mole in Examples 3001 to 3007 and was in a range of 5% to 300% by mole in Example 3008 and 3009.

The surface of the resin layer containing a compound having a siloxane bond can be determined by measuring the O/Si ratio using ESCA in the same manner as described above. That is, a surface in which the O/Si ratio when measured from the surface of the gas separation membrane on a side opposite to the support in the direction of the support was the maximum and which has 3% (atomic %) or greater of silicon atoms is set to the surface.

(Measurement of Positron Lifetime of Third Component and Relative Strength of Third Component)

A test piece having a size of 1.5 cm×1.5 cm square was cut out from the gas separation membrane of Example 3001, adhered to a commercially available Si wafer, vacuum-deaerated at room temperature (25° C.), and then measured using a positron annihilation method under the following conditions. According to the following conditions, the positron lifetime of the third component and the relative strength of the third component are uniquely determined

TABLE 10

| | |
|---|---|
| Measuring device | Small-sized electron beam generator (manufactured by Fuji Imvac Inc.) PALS-200A (electron lifetime measuring device for thin film) |
| Positron source | Positron beam based on 22 Na |
| Gamma ray detector | Scintillator formed of BaF2 and multiplier phototube |
| Device constant | Value suitably determined by device (263 to 280 ps, 25.55 ps/ch in this measurement) |
| Beam intensity | 1 keV, 3 keV |
| Measurement temperature | Room temperature (25° C.) |
| Measurement atmosphere | Vacuum |
| Total counts | 5,000,000 counts |

The positron lifetime τ3 (ns) of the third component and the relative strength I3 of the third component were calculated at beam intensities of 1 keV and 3 keV by analyzing the third component based on the non-linear least square program POSITRONFIT using the obtained data (P. Kirkegaard, M. Eldrup, O. E. Mogensen, N. J. Pedersen, Computer Physics Communications, 23, 307 (1981)). The obtained results are listed in the following table.

Further, in a case where the resin layer containing a compound having a siloxane bond is not an outermost layer and another layer such as the additional resin layer is positioned further outside than the resin layer containing a compound having a siloxane bond, the conditions for exposing the surface of the resin layer containing a compound having a siloxane bond were calculated using etching based on ESCA and then a sample which was etched under the same conditions was used for measurement of the positron lifetime of the third component and the relative strength of the third component.

Example 3002 to 3007

Gas separation membranes of Examples 3002 to 3007 were obtained in the same manner as in Example 3001 except that the input power of the plasma treatment applied to the resin layer precursor containing a compound having a siloxane bond in Example 3001 was respectively changed from 25 W to values as listed in the following table.

Examples 3008 and 3009

Gas separation membranes of Examples 3008 and 3009 were obtained in the same manner as in Example 3007 except that the resin layer precursor material containing a compound having a siloxane bond in Example 3007 was changed from PDMS to polydiphenyl siloxane and poly [methyl(3,3,3-trifluoropropyl)siloxane].

As polydiphenyl siloxane, a commercially available product of 482153 (trade name, manufactured by Sigma-Aldrich Japan K.K.) was used. As poly[methyl(3,3,3-trifluoropropyl)siloxane] (abbreviated as PMTFPS), a commercially available product of 481645 (trade name, manufactured by Sigma-Aldrich Japan K.K.) was used.

Example 3010

In Example 3004, after the oxygen atom permeating treatment was performed, the resin layer containing a compound having a siloxane bond was spin-coated with a polymerizable radiation-curable composition, subjected to a UV treatment (Light Hammer 10, D-VALVE, manufactured by Fusion UV System Corporation) under the conditions of a UV intensity of 24 kW/m² for a UV irradiation time of 10 seconds, and then dried. In this manner, the second layer of a resin layer precursor having a thickness of 1 μm and containing a compound having a siloxane bond was formed.

The porous support on which the second resin layer precursor containing a compound having a siloxane bond was formed was put into a desktop vacuum plasma device (manufactured by YOUTEC Corporation), carrier gas conditions of an oxygen flow rate of 50 cm³ (STP)/min and an argon flow rate of 100 cm³ (STP)/min were set, and then a plasma treatment was performed as a second oxygen atom permeating treatment at a vacuum degree of 30 Pa and an input power of 100 W for a treatment time of 20 seconds.

The obtained gas separation membrane was set as a gas separation membrane of Example 3010.

Example 3011

In Example 3010, after the second oxygen atom permeating treatment was performed on the second resin layer precursor containing a compound having a siloxane bond, the second resin layer containing a compound having a siloxane bond was spin-coated with a polymerizable radiation-curable composition, subjected to a UV treatment (Light Hammer 10, D-VALVE, manufactured by Fusion UV System Corporation) under the conditions of a UV intensity of 24 kW/m² for a UV irradiation time of 10 seconds, and then dried. In this manner, a third resin layer precursor having a thickness of 1 μm and containing a compound having a siloxane bond was formed.

The porous support on which the third resin layer precursor containing a compound having a siloxane bond was formed was put into a desktop vacuum plasma device (manufactured by YOUTEC Corporation), carrier gas conditions of an oxygen flow rate of 50 cm³ (STP)/min and an argon flow rate of 100 cm³ (STP)/min were set, and then a plasma treatment was performed as a third oxygen atom permeating treatment at a vacuum degree of 30 Pa and an input power of 100 W for a treatment time of 20 seconds.

The obtained gas separation membrane was set as a gas separation membrane of Example 3011.

Comparative Example 3001

A gas separation membrane of Comparative Example 3001 was obtained in the same manner as in Example 3001 except that the input power of the plasma treatment applied to the resin layer precursor containing a compound having a siloxane bond in Example 3001 was changed from 25 W to 10 W.

Comparative Example 3002

A gas separation membrane of Comparative Example 3002 was obtained in the same manner as in Example 3001 except that the carrier gas condition of an oxygen flow rate in Example 3001 was changed from 50 cm³ (STP)min to 0 cm³ (STP)min.

Comparative Example 3003

A polydimethylsiloxane film was treated at 5 W for 120 seconds in an Ar atmosphere based on a technique described in Journal of Membrane Science 99 (1995) pp. 139 to 147, thereby preparing a composite membrane. The obtained composite membrane was set to a gas separation membrane of Comparative Example 3003 and evaluated in the same manner as in Example 3001. The temperature of a cell set to be 40° C. and the gas separation performance was evaluated using a SUS316 STAINLESS STEEL CELL (manufactured by DENIS SEN Ltd.) having high pressure resistance. When the respective gas permeabilities of $CO_2$ and $CH_4$ were attempted to measure by TCD detection type gas chromatography by adjusting the total pressure on the gas supply side of mixed gas, in which the volume ratio of carbon dioxide ($CO_2$) to methane ($CH_4$) was set to 13:87, to 6 MPa (partial pressure of $CO_2$: 0.78 MPa), the pressure was not able to be held.

Comparative Example 3004

A polydimethylsiloxane film was subjected to an atmospheric pressure plasma treatment based on a technique described in Journal of Membrane Science 440 (2013) pp. 1 to 8, thereby preparing a composite membrane. The obtained composite membrane was set to a gas separation membrane of Comparative Example 3004 and evaluated in the same manner as in Example 3001. The temperature of a cell set to be 40° C. and the gas separation performance was evaluated using a SUS316 STAINLESS STEEL CELL (manufactured by DENISSEN Ltd.) having high pressure resistance. When the respective gas permeabilities of $CO_2$ and $CH_4$ were attempted to measure by TCD detection type gas chromatography by adjusting the total pressure on the gas supply side of mixed gas, in which the volume ratio of carbon dioxide ($CO_2$) to methane ($CH_4$) was set to 13:87, to 6 MPa (partial pressure of $CO_2$: 0.78 MPa), the pressure was not able to be held.

Comparative Example 3005

A silica film was deposited on a polyacrylonitrile (PAN) porous membrane (the polyacrylonitrile porous membrane was present on non-woven fabric, the thickness of the film including the non-woven fabric was approximately 180 μm) to have a thickness of 30 nm using a plasma hexamethyl disiloxane (CVD, 500 W, YOUTECH solution vaporization CVD device). The obtained composite membrane was set to a gas separation membrane of Comparative Example 3005 and evaluated in the same manner as in Example 3001.

Example 3012

<Preparation of Additional Resin Layer>
(Synthesis of Polymer (P-101))
A polymer (P-101) was synthesized by the following reaction scheme.

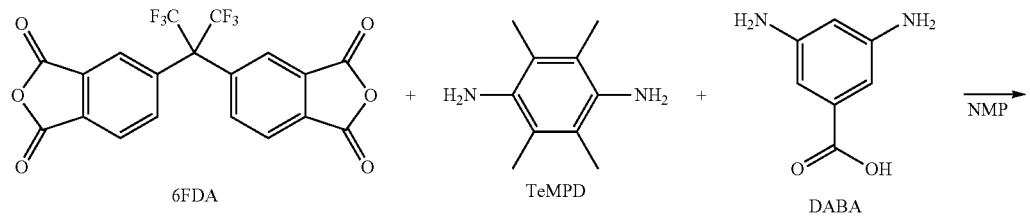

6FDA  TeMPD  DABA

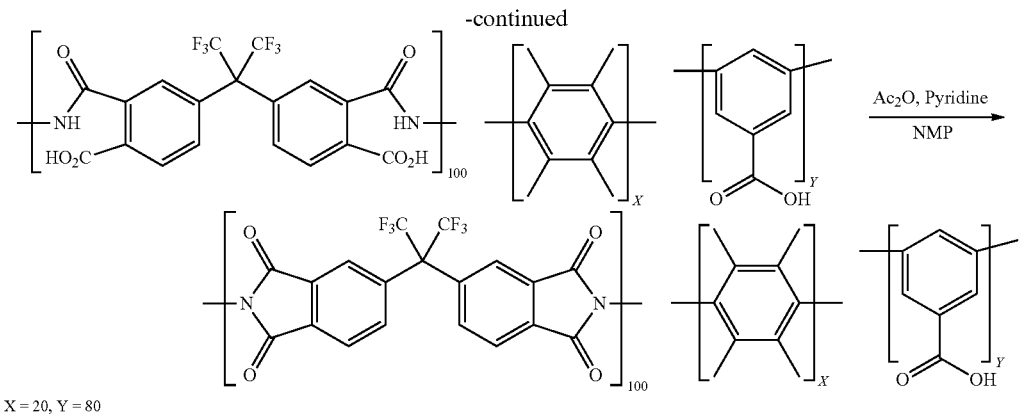

X = 20, Y = 80

Synthesis of Polymer (P-101)

123 ml of N-methylpyrrolidone and 54.97 g (0.124 mol) of 6FDA (manufactured by Tokyo Chemical Industry Co., Ltd., product number: H0771) were added to a 1 L three-neck flask, dissolved at 40° C., and stirred in a nitrogen stream. A solution obtained by dissolving 4.098 g (0.0248 mol) of 2,3,5,6-tetramethylphenylenediamine (manufactured by Tokyo Chemical Industry Co., Ltd., product number: T1457) and 15.138 g (0.0992 mol) of 3,5-diaminobenzoic acid in 84.0 ml of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The obtained polymer crystals were suctioned and filtered and then blast dried at 60° C., thereby obtaining 50.5 g of a polymer (P-101). Further, the polymer (P-101) was a polymer in which the ratio of X:Y was set to 20:80 in the polyimide compound P-100 exemplified above. In the following table, the polymer (P-101) was abbreviated as PI.

(Formation of Additional Resin Layer)

1.4 g of the polymer (P-101) and 8.6 g of methyl ethyl ketone were mixed with each other in a 30 mL brown vial bottle and stirred at 25° C. for 30 minutes. Thereafter, the surface, subjected to the plasma treatment, of the resin layer containing a compound having a siloxane bond was spin-coated with the stirred solution in the same manner as in Example 3005 to form an additional resin layer having a thickness of 150 nm, thereby obtaining a gas separation membrane.

The obtained separation membrane was set as a gas separation membrane of Example 3012.

Example 3013

An additional resin layer was formed in the same manner as in Example 3012 except that the resin layer containing a compound having a siloxane bond which was subjected to a plasma treatment under the same conditions as in Example 3006 was used as the resin layer containing a compound having a siloxane bond, thereby obtaining a gas separation membrane of Example 3013.

Example 3014

An additional resin layer was formed in the same manner as in Example 3012 except that the resin layer containing a compound having a siloxane bond which was subjected to a plasma treatment under the same conditions as in Example 3007 was used as the resin layer containing a compound having a siloxane bond, thereby obtaining a gas separation membrane of Example 3014.

Examples 3015 to 3017

Gas separation membranes were obtained in the same manner as in Example 3005 except that the plasma treatment was performed under the same conditions as in Example 3005 except that the thickness of the resin layer containing a compound having a siloxane bond was changed as listed in the following table. The obtained gas separation membranes were set to gas separation membranes of Examples 3015 to 3017.

[Evaluation]

<Evaluation of Gas Separation Performance of Gas Separation Membrane>

The gas separation membranes of the respective examples and the comparative examples as the obtained thin film composites, were evaluated using a SUS316 STAINLESS STEEL CELL (manufactured by DENISSEN Ltd.) having high pressure resistance after the temperature of a cell was adjusted to 40° C. The respective gas permeabilities of $CO_2$ and $CH_4$ were measured by TCD detection type gas chromatography by adjusting the total pressure on the gas supply side of mixed gas, in which the volume ratio of carbon dioxide ($CO_2$) to methane ($CH_4$) was set to 13:87, to 6 MPa (partial pressure of $CO_2$: 0.78 MPa). The gas separation selectivity of a gas separation membrane of each example and each comparative example was calculated as a ratio ($P_{CO2}/P_{CH4}$) of the permeability coefficient $P_{CO2}$ of $CO_2$ to the permeability coefficient $P_{CH4}$ of $CH_4$ of this membrane. The $CO_2$ permeability of a gas separation membrane of each example and each comparative example was set as the permeability $Q_{CO2}$ (unit: GPU) of $CO_2$ of this membrane.

In addition, the unit of gas permeability was expressed by the unit of GPU [1 GPU=1×10$^{-6}$ cm$^3$ (STP)/cm$^2$·sec·cmHg]

representing the permeation flux (also referred to as permeation rate, permeability, and Permeance) per pressure difference or the unit of barrer [1 barrer=1×10$^{-10}$ cm$^3$ (STP) ·cm/cm$^2$·sec·cmHg] representing the permeation coefficient. In the present specification, the symbol Q is used to represent in a case of the unit of GPU and the symbol P is used in a case of the unit of barrer.

In a case where the gas permeability (permeability $Q_{CO2}$ of $CO_2$) was 30 GPU or greater and the gas separation selectivity was 50 or greater, the gas separation performance was evaluated as AA.

In a case where the gas permeability (permeability $Q_{CO2}$ of $CO_2$) was 10 GPU or greater and less than 30 GPU and the gas separation selectivity was 30 or greater and less than 50, the gas separation performance was evaluated as A.

In a case where the gas permeability (permeability $Q_{CO2}$ of $CO_2$) was 10 GPU or greater and the gas separation selectivity was less than 30 or the gas permeability (permeability $Q_{CO2}$ of $CO_2$) was less than 10 GPU and the gas separation selectivity was 30 or greater, the gas separation performance was evaluated as B.

In a case where the gas permeability (permeability $Q_{CO2}$ of $CO_2$) was less than 10 GPU and the gas separation selectivity was less than 30 or the pressure was not applied (the pressure was not able to be held) so that the test was not able to be performed, the gas separation performance was evaluated as C.

TABLE 11

|  |  |  | Example 3001 | Example 3002 | Example 3003 | Example 3004 | Example 3005 | Example 3006 |
|---|---|---|---|---|---|---|---|---|
| Resin layer containing compound having siloxane bond | Thickness [μm] |  | 1 | 1 | 1 | 1 | 1 | 1 |
|  | Material |  | PDMS | PDMS | PDMS | PDMS | PDMS | PDMS |
|  | Plasma treatment | Coupling | Anode | Anode | Anode | Anode | Anode | Anode |
|  |  | Treatment time [sec] | 20 | 20 | 20 | 20 | 20 | 20 |
|  |  | Input power [W] | 25 | 50 | 75 | 100 | 150 | 200 |
|  |  | Oxygen flow rate [cm$^3$ (STP)/min] | 50 | 50 | 50 | 50 | 50 | 50 |
|  | τ3 (ns) (implanting at 1 keV) X |  | 4.20 | 4.11 | 4.05 | 4.02 | 3.99 | 3.70 |
|  | I3 (%) (implanting at 1 keV) |  | 41 | 40 | 38 | 35 | 33 | 21 |
|  | τ3 (ns) (implanting at 3 keV) Y |  | 4.24 | 4.18 | 4.12 | 4.10 | 4.10 | 4.12 |
|  | X/Y |  | 0.99 | 0.98 | 0.98 | 0.98 | 0.97 | 0.90 |
|  | Number of layers |  | 1 | 1 | 1 | 1 | 1 | 1 |
| Evaluation | Gas separation performance |  | B | A | AA | AA | AA | AA |

|  |  |  | Example 3007 | Example 3008 | Example 3009 | Example 3010 | Example 3011 |
|---|---|---|---|---|---|---|---|
| Resin layer containing compound having siloxane bond | Thickness [μm] |  | 1 | 1 | 1 | 1 | 1 |
|  | Material |  | PDMS | Polydiphenyl siloxane | Poly[methyl(3,3,3-trifluoropropyl) siloxane] | PDMS | PDMS |
|  | Plasma treatment | Coupling | Anode | Anode | Anode | Anode | Anode |
|  |  | Treatment time [sec] | 20 | 20 | 20 | 20 | 20 |
|  |  | Input power [W] | 400 | 400 | 400 | 100 | 100 |
|  |  | Oxygen flow rate [cm$^3$ (STP)/min] | 50 | 50 | 50 | 50 | 50 |
|  | τ3 (ns) (implanting at 1 keV) X |  | 3.52 | 3.72 | 3.62 | 4.02 | 4.02 |
|  | I3 (%) (implanting at 1 keV) |  | 16 | 35 | 20 | 35 | 35 |
|  | τ3 (ns) (implanting at 3 keV) Y |  | 3.99 | 3.94 | 4.01 | 4.10 | 4.10 |
|  | X/Y |  | 0.88 | 0.94 | 0.90 | 0.98 | 0.98 |
|  | Number of layers |  | 1 | 1 | 1 | 2 | 3 |
| Evaluation | Gas separation performance |  | AA | AA | AA | AA | AA |

TABLE 12

|  |  |  | Comparative Example 3001 | Comparative Example 3002 | Comparative Example 3003 | Comparative Example 3004 | Comparative Example 3005 |
|---|---|---|---|---|---|---|---|
| Resin layer containing compound having siloxane bond | Thickness [μm] |  | 1 | 1 | 1 | 1 | 1 |
|  | Material |  | PDMS | PDMS | PDMS | PDMS | PDMS + CVD silica film |
|  | Plasma treatment | Coupling | Anode | Anode | Anode | — |  |
|  |  | Treatment time [sec] | 20 | 10 | 120 | — |  |
|  |  | Input power [W] | 10 | 50 | 5 | — |  |
|  |  | Oxygen flow rate [cm$^3$ (STP)/min] | 50 | 0 | 0 | — |  |
|  | τ3 (ns) (implanting at 1 keV) X |  | 4.23 | 4.24 | 4.21 | 4.25 | 3.15 |
|  | I3 (%) (implanting at 1 keV) |  | 43 | 44 | 42 | 45 | 8 |
|  | τ3 (ns) (implanting at 3 keV) Y |  | 4.23 | 4.24 | 4.21 | 4 | 3.96 |
|  | X/Y |  | 1.00 | 1.00 | 1.00 | 1.00 | 0.80 |
|  | Number of layers |  | 1 | 1 | 1 | 1 | 1 |
| Additional resin layer | Polymer |  | — | — | — | — | — |
|  | Thickness [μm] |  | — | — | — | — | — |
| Evaluation | Gas separation performance |  | C | C | C | C | C |

TABLE 12-continued

|  |  |  | Example 3012 | Example 3013 | Example 3014 | Example 3015 | Example 3016 | Example 3017 |
|---|---|---|---|---|---|---|---|---|
| Resin layer containing compound having siloxane bond | Thickness [μm] | | 1 | 1 | 1 | 0.3 | 3 | 10 |
| | Material | | PDMS | PDMS | PDMS | PDMS | PDMS | PDMS |
| | Plasma treatment | Coupling | Anode | Anode | Anode | Anode | Anode | Anode |
| | | Treatment time [sec] | 20 | 20 | 20 | 20 | 20 | 20 |
| | | Input power [W] | 150 | 200 | 400 | 150 | 150 | 150 |
| | | Oxygen flow rate [cm³ (STP)/min] | 50 | 50 | 50 | 50 | 50 | 50 |
| | τ3 (ns) (implanting at 1 keV) X | | 3.99 | 3.70 | 3.52 | 3.99 | 3.99 | 3.99 |
| | I3 (%) (implanting at 1 keV) | | 33 | 21 | 16 | 33 | 33 | 33 |
| | τ3 (ns) (implanting at 3 keV) Y | | 4.10 | 4.12 | 3.99 | 4.10 | 4.10 | 4.10 |
| | X/Y | | 0.97 | 0.90 | 0.88 | 0.97 | 0.97 | 0.97 |
| | Number of layers | | 1 | 1 | 1 | 1 | 1 | 1 |
| Additional resin layer | Polymer | | PI | PI | PI | — | — | — |
| | Thickness [μm] | | 0.15 | 0.15 | 0.15 | | | |
| Evaluation | Gas separation performance | | AA | AA | AA | AA | AA | B |

From the above-described Tables 11 and 12, it was understood that at least one of the gas permeability ($CO_2$ permeability) or the gas separation selectivity of each gas separation membrane of the present invention was high under high pressure when compared to the gas separation membranes of Comparative Examples 3001 to 3005 in which the positron lifetime τ3 of the third component in a case where the positron was implanted at a strength of 1 keV from the surface of the resin layer containing a compound having a siloxane bond was departed from the range defined in the present invention.

Examples 3101 to 3117

—Made into Modules—

Spiral type modules were prepared using the gas separation membranes prepared in Examples 3001 to 3017 with reference to paragraphs [0012] to [0017] of JP1993-168869A (JP-H05-168869A). The obtained gas separation membrane modules were made into gas separation membrane modules of Examples 3101 to 3117.

It was confirmed that the prepared gas separation membrane modules of Examples 3101 to 3117 were excellent based on the performance of the gas separation membranes incorporated therein.

In the prepared gas separation membrane modules of Examples 3101 to 3117, ten portions having a size of 1 cm×1 cm were randomly collected from the center of one surface of a leaf (leaf indicates a portion of a gas separation membrane in which the space on the permeation side in the spiral type module is connected to the central tube and which is folded into an envelope shape with a size of 10 cm×10 cm) and the element ratios of the surface in the depth direction were calculated according to the method of Example 3001, and then the modules were confirmed to have the performance as understood from the separation membranes incorporated therein based on nine or more out of ten portions. It was confirmed that the spiral modules were excellent as the performance of the gas separation membranes incorporated therein.

EXPLANATION OF REFERENCES

1: additional resin layer
2: resin layer precursor containing compound having siloxane bond
3: resin layer containing compound having siloxane bond
4: support (porous support A in second embodiment)
5: oxygen atom permeating treatment
6: surface of resin layer containing compound having siloxane bond
7: surface of resin layer containing compound having siloxane bond at depth of d (in direction of support (porous support A in second embodiment)) from surface of resin layer containing compound having siloxane bond
10: gas separation membrane
11: polydimethylsiloxane film which is not subjected to oxygen atom permeating treatment
12: polydimethylsiloxane film to which oxygen atoms are uniformly introduced in film thickness direction
d: depth from surface (in direction of support (porous support A in second embodiment)) of resin layer containing compound having siloxane bond

What is claimed is:

1. A gas separation membrane which satisfies any one of the following Conditions 1, 3, and 4, Condition 1: a gas separation membrane which has a resin layer containing a compound having a siloxane bond, in which the resin layer containing a compound having a siloxane bond satisfies the following Expressions 1 and 2, $$0.9 \geq A/B \geq 0.55, \text{ and} \qquad \text{Expression 1}$$

$$B \geq 1.7 \qquad \text{Expression 2}$$

in Expressions 1 and 2, A represents an O/Si ratio that is a ratio of the number of oxygen atoms relative to the number of silicon atoms contained in the resin layer containing a compound having a siloxane bond at a depth of 10 nm from the surface of the resin layer containing a compound having a siloxane bond, and B represents an O/Si ratio that is a ratio of the number of oxygen atoms relative to the number of silicon atoms in the surface of the resin layer containing a compound having a siloxane bond, Condition 3: a gas separation membrane which has a resin layer containing a compound having a siloxane bond, in which a minimum value $Si_0$ of the proportion of peaks of $Si^{2+}$ and $Si^{3+}$ to peaks of all Si in ESCA depth analysis of the resin layer containing a compound having a siloxane bond is in a range of 1% to 40%, and Condition 4: a gas separation membrane which has a resin layer containing a compound having a siloxane bond, in which positron lifetime τ3 of a third component in a case where the positron is implanted at a strength of 1 keV from the surface of the resin layer containing a compound having a siloxane bond is in a range of 3.40 to 4.20 ns, and which further comprises a porous support A and satisfies the following Condition 2, Condition 2: a gas separation membrane which includes a porous support A; and a resin layer containing a compound having a siloxane bond positioned on the porous support A, wherein the compound having a siloxane bond includes at least a repeating unit represented by the following Formula (2) or a repeating unit represented by the following Formula (3), the resin layer containing a compound having a siloxane bond includes a region GLi present in the porous support B and a region GLe present on the porous support B, the thickness of GLe is in a range of 50 to 1,000 nm, the thickness of GLi is 20 nm or greater and the thickness of GLe is in a range of 10% to 350%, and a difference between the content of the repeating unit represented by Formula (3) described above in 20 nm of the GLe surface layer and the content of the repeating unit represented by Formula (3) described above in 20 nm of the GLi surface layer is in a range of 30% to 90%,

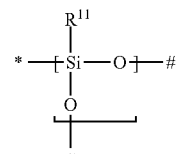

Formula (2)

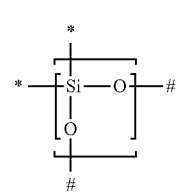

Formula (3)

in Formulae (2) and (3) described above, $R^{11}$ represents a substituent, the symbol "*" represents a binding site with respect to # in Formula (2) or (3) described above, and the symbol "#" represents a binding site with respect to * in Formula (2) or (3) described above.

2. The gas separation membrane according to claim 1, wherein the thickness of GLe is in a range of 200 to 900 nm.

3. The gas separation membrane according to claim 1, wherein the thickness of GLi is 20% to 90% of the thickness of GLe.

* * * * *